US008654264B2

(12) United States Patent
Callison et al.

(10) Patent No.: US 8,654,264 B2
(45) **Date of Patent: *Feb. 18, 2014**

(54) LASER PROJECTION SYSTEM

(75) Inventors: John P. Callison, Kansas City, MO (US); Jeffrey S. Pease, Emporia, KS (US); Richard W. Pease, Overland Park, KS (US)

(73) Assignee: Magic Lantern, LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/546,504

(22) Filed: Oct. 11, 2006

(65) Prior Publication Data

US 2007/0085936 A1 Apr. 19, 2007

Related U.S. Application Data

(60) Division of application No. 10/086,272, filed on Mar. 1, 2002, now Pat. No. 7,142,257, and a division of application No. 11/511,585, filed on Aug. 28, 2006, now abandoned, which is a continuation-in-part of application No. 09/654,246, filed on Sep. 2, 2000, now Pat. No. 7,102,700.

(30) Foreign Application Priority Data

Sep. 2, 2001 (WO) ...................... PCT/US01/27118

(51) Int. Cl.

| | |
|---|---|
| ***H04N 5/64*** | (2006.01) |
| ***H04N 9/31*** | (2006.01) |
| ***H04N 5/74*** | (2006.01) |
| ***H04N 3/02*** | (2006.01) |
| ***H04N 3/06*** | (2006.01) |

(52) U.S. Cl.
USPC ........... 348/744; 348/197; 348/202; 348/745; 348/750; 348/781

(58) Field of Classification Search
USPC ......... 348/744–745, 750, 780–781, 197, 202, 348/203; 353/31, 37, 69
See application file for complete search history.

(56) References Cited

U.S. PATENT DOCUMENTS 3,507,984 A * 4/1970 Stavis ........................... 348/757
3,567,847 A * 3/1971 Price ............................. 348/196

(Continued)

FOREIGN PATENT DOCUMENTS

| | | |
|---|---|---|
| WO | WO94/18802 | 8/1994 |
| WO | WO98/35504 | 8/1998 |
| WO | WO02/21850 | 3/2002 |

OTHER PUBLICATIONS

Richard W. Pease, "An Overview of Technology for Large Wall Screen Projection using Lasers as a Light Source", Jul. 1990, M90-28,The Mitre Corporation. Bellevue, Nebraska.

(Continued)

*Primary Examiner* — Brian Yenke
(74) *Attorney, Agent, or Firm* — Montgomery W. Smith

(57) ABSTRACT

Laser projection system suitable for commercial motion picture theaters and other large screen venues, including home theater, uses optical fibers to project modulated laser beams for simultaneously raster scanning multiple lines on screen. Emitting ends of optical fibers are arranged in an array such that red, green and blue spots are simultaneously scanned onto the screen in multiple lines spaced one or more scan lines apart. Use of optical fibers enables scanning of small, high resolution spots on screen, and permits convenient packaging and replacement, upgrading or modification of system components. Simultaneous raster scanning of multiple lines enables higher resolution, brightness, and frame rates with available economical components. Fiber-based beam coupling may be used to greatly enhance the flexibility of the system. Alternate embodiments illustrate the flexibility of the system for different optical fiber output head configurations and for different types, sizes, and arrangements of laser, modulation, and scanning components.

15 Claims, 78 Drawing Sheets

10

(56) References Cited

U.S. PATENT DOCUMENTS

| | | | | | |
|---|---|---|---|---|---|
| 3,569,988 | A | * | 3/1971 | Schmidt et al. | 348/57 |
| 3,699,242 | A | * | 10/1972 | Price | 348/196 |
| 3,760,096 | A | * | 9/1973 | Roth | 348/750 |
| 3,818,129 | A | * | 6/1974 | Yamamoto | 348/754 |
| 3,864,730 | A | * | 2/1975 | Roth | 348/750 |
| 3,892,468 | A | * | 7/1975 | Duguay | 385/4 |
| RE29,094 | E | * | 12/1976 | Price | 348/196 |
| 4,040,096 | A | * | 8/1977 | Starkweather | 358/302 |
| 4,145,712 | A | * | 3/1979 | Spooner et al. | 348/757 |
| 4,205,348 | A | * | 5/1980 | DeBenedictis et al. | 358/481 |
| 4,297,723 | A | * | 10/1981 | Whitby | 348/36 |
| 4,393,387 | A | * | 7/1983 | Kitamura | 347/240 |
| 4,423,426 | A | * | 12/1983 | Kitamura | 347/235 |
| 4,474,422 | A | * | 10/1984 | Kitamura | 359/204 |
| 4,533,215 | A | * | 8/1985 | Trias et al. | 349/7 |
| 4,613,201 | A | * | 9/1986 | Shortle et al. | 372/24 |
| 4,689,482 | A | * | 8/1987 | Horikawa et al. | 250/205 |
| 4,720,747 | A | * | 1/1988 | Crowley | 348/758 |
| 4,796,964 | A | * | 1/1989 | Connell et al. | 359/204 |
| 4,805,012 | A | * | 2/1989 | Agostinelli et al. | 358/505 |
| 4,833,528 | A | * | 5/1989 | Kobayashi | 348/196 |
| 4,835,601 | A | * | 5/1989 | Kobayashi | 348/196 |
| 4,851,918 | A | * | 7/1989 | Crowley | 348/754 |
| 4,871,231 | A | * | 10/1989 | Garcia, Jr. | 359/478 |
| 4,884,857 | A | * | 12/1989 | Prakash et al. | 359/204 |
| 4,892,371 | A | * | 1/1990 | Yamada et al. | 359/212 |
| 4,930,849 | A | * | 6/1990 | Tanaka | 359/214 |
| 4,931,874 | A | * | 6/1990 | Grillon et al. | 348/205 |
| 4,978,202 | A | * | 12/1990 | Yang | 349/15 |
| 4,979,030 | A | * | 12/1990 | Murata | 348/196 |
| 4,992,880 | A | * | 2/1991 | Trias | 348/761 |
| 5,015,064 | A | * | 5/1991 | Detig et al. | 359/211 |
| 5,029,975 | A | * | 7/1991 | Pease | 385/120 |
| 5,032,924 | A | * | 7/1991 | Brown et al. | 348/759 |
| 5,051,834 | A | * | 9/1991 | Matui et al. | 348/769 |
| 5,097,480 | A | * | 3/1992 | Pease | 372/97 |
| 5,136,426 | A | * | 8/1992 | Linden et al. | 359/583 |
| 5,136,674 | A | * | 8/1992 | Kakiuchi et al. | 385/115 |
| 5,140,427 | A | * | 8/1992 | Nakane et al. | 348/759 |
| 5,148,285 | A | * | 9/1992 | Nakane et al. | 348/196 |
| 5,166,778 | A | * | 11/1992 | Beamon, III | 348/53 |
| 5,255,082 | A | * | 10/1993 | Tamada | 348/750 |
| 5,311,321 | A | * | 5/1994 | Crowley | 348/760 |
| 5,317,348 | A | * | 5/1994 | Knize | 353/31 |
| 5,410,331 | A | * | 4/1995 | Schuneman | 345/602 |
| 5,418,546 | A | * | 5/1995 | Nakagakiuchi et al. | 345/85 |
| 5,424,771 | A | * | 6/1995 | Yu | 348/203 |
| 5,440,352 | A | * | 8/1995 | Deter et al. | 348/750 |
| 5,463,468 | A | * | 10/1995 | Takanashi et al. | 358/296 |
| 5,534,950 | A | * | 7/1996 | Hargis et al. | 348/758 |
| 5,577,148 | A | * | 11/1996 | Kamatani | 385/115 |
| 5,596,339 | A | * | 1/1997 | Furness et al. | 345/8 |
| 5,614,961 | A | * | 3/1997 | Gibeau et al. | 348/750 |
| 5,708,747 | A | * | 1/1998 | Danckwerth | 385/115 |
| 5,715,021 | A | * | 2/1998 | Gibeau et al. | 348/750 |
| 5,715,337 | A | * | 2/1998 | Spitzer et al. | 385/4 |
| 5,774,174 | A | * | 6/1998 | Hardie | 348/38 |
| 5,802,222 | A | * | 9/1998 | Rasch et al. | 385/1 |
| 5,818,546 | A | * | 10/1998 | Opower et al. | 348/750 |
| 5,822,022 | A | * | 10/1998 | Deter et al. | 348/750 |
| 5,828,424 | A | * | 10/1998 | Wallenstein | 348/760 |
| 5,874,929 | A | * | 2/1999 | Opower et al. | 345/32 |
| 5,920,361 | A | * | 7/1999 | Gibeau et al. | 348/750 |
| 6,125,440 | A | * | 9/2000 | Osovets | 712/205 |
| 6,137,461 | A | * | 10/2000 | Deter et al. | 345/84 |
| 6,154,259 | A | * | 11/2000 | Hargis et al. | 348/756 |
| 6,175,440 | B1 | * | 1/2001 | Conemac | 359/204 |
| 6,233,025 | B1 | * | 5/2001 | Wallenstein | 348/750 |
| 6,317,170 | B1 | * | 11/2001 | Hwang et al. | 348/750 |
| 6,590,606 | B1 | * | 7/2003 | Hiller et al. | 348/203 |
| 6,621,609 | B1 | * | 9/2003 | Conemac | 359/204 |
| 6,639,631 | B1 | * | 10/2003 | Hall et al. | 348/744 |

OTHER PUBLICATIONS

"Millenia—A New Class of High-Power Diode-Pumped CW Visible Lasers", LaserForefront, 1996, No. 6, Spectra-Physics Lasers, Inc., Mountain View, California.

Walter T. Welford, "Physical Optics and Limits of Image Formation", Useful Optics, 1991, Ch. 7, pp. 44-57, University of Chicago Press, Chicago, Illinois.

Milton Gottlieb, Clive L. M. Ireland, John Martin Ley, "Electro-Optic and Acousto-Optic Scanning and Deflection", 1983, pp. 2-97, 159-175, Marcel Dekker, Inc., New York, NY.

K. Blair Benson, Television Engineering Handbook, 1986, pp. 2.14-2.26, McGraw-Hill Book Company, New York, NY.

"Provisional Instruction Manual, Model SD 270 Video Projector", 1985, Dwight Cavendish Displays, Ltd., United Kingdom.

"Silica Single Mode Fibers", Thor Labs 2000 Catalog, 2000, p. 242, Thor Labs Inc., Newton, New Jersey.

* cited by examiner

× red + green ○ blue ✱ red+green ⊛ red+green+blue

× red + green ○ blue ✱ red+green ⊛ red+green+blue

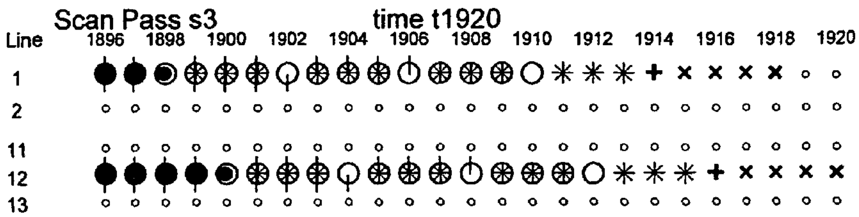
FIG. 42A
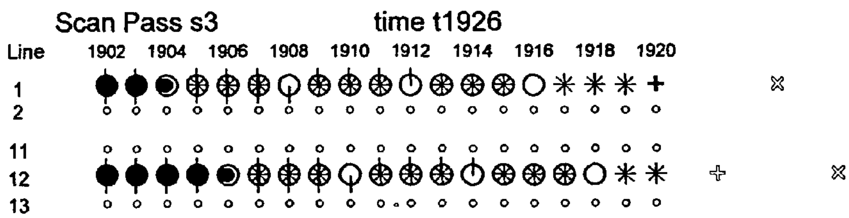
FIG. 42B
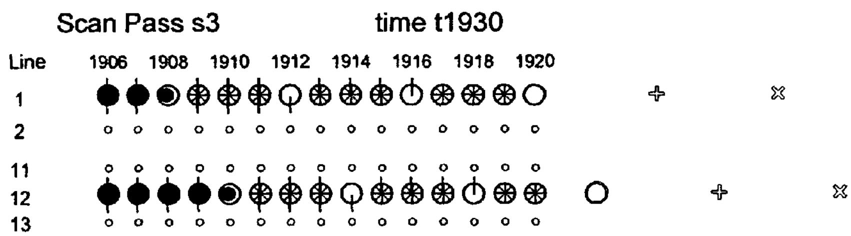
FIG. 42C
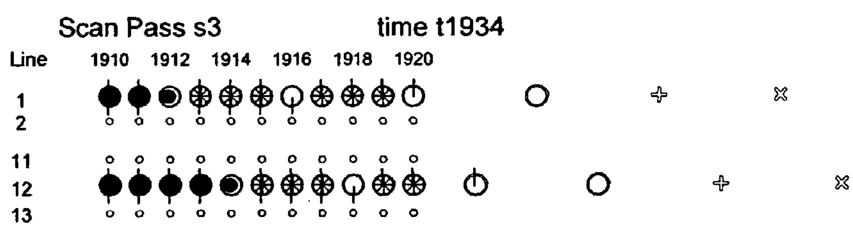
FIG. 42D
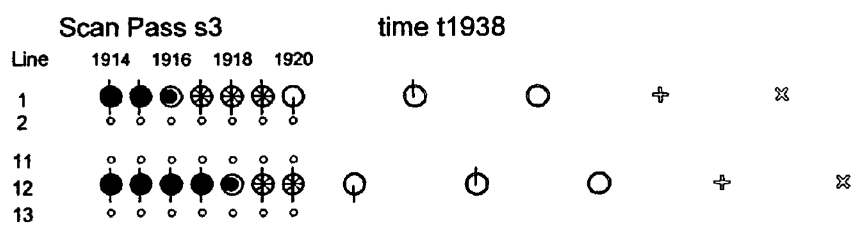
FIG. 42E
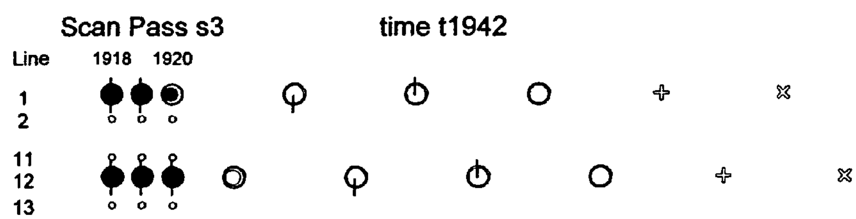
FIG. 42F
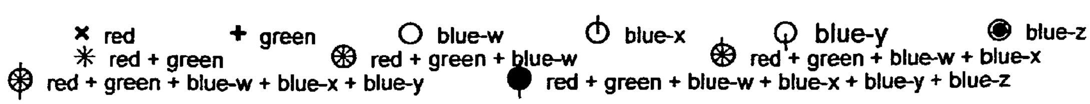

| s1 | s2 | s3 | s4 | s269 | s270 | s271 | s272 |
|---|---|---|---|---|---|---|---|
| Rl | Rl | RlGhBd | RlGhBd | GlBhRd | GlBhRd | GlBhRd | GlBhRd |
| Rk | Rk | 2 RkGgBc | 2 RkGgBc | 1030 GkBgRc | 1030 GkBgRc | 1042 GkBgRc | 1054 GkBgRc |
| Rj | Rj | RjGfBb | RjGfBb | GjBfRb | GjBfRb | GjBfRb | GjBfRb |
| Ri | Ri | 4 RiGeBa | 4 RiGeBa | 1032 GiBeRa | 1032 GiBeRa | 1044 GiBeRa | 1056 GiBeRa |
| Bl | Bl | BlRhGd | BlRhGd | RlGhBd | RlGhBd | RlGhBd | RlGhBd |
| Bk | Bk | 6 BkRgGc | 6 BkRgGc | 1034 RkGgBc | 1034 RkGgBc | 1046 RkGgBc | 1058 RkGgBc |
| Bj | Bj | BjRfGb | BjRfGb | RjGfBb | RjGfBb | RjGfBb | RjGfBb |
| Bi | Bi | 8 BiReGa | 8 BiReGa | 1036 RiGeBa | 1036 RiGeBa | 1048 RiGeBa | 1060 RiGeBa |
| Gl | Gl | GlBhRd | GlBhRd | BlRhGd | BlRhGd | BlRhGd | BlRhGd |
| Gk | Gk | 10 GkBgRc | 10 GkBgRc | 1038 BkRgGc | 1038 BkRgGc | 1050 BkRgGc | 1062 BkRgGc |
| Gj | Gj | GjBfRb | GjBfRb | BjRfGb | BjRfGb | BjRfGb | BjRfGb |
| Gi | Gi | 12 GiBeRa | 12 GiBeRa | 1040 BiReGa | 1040 BiReGa | 1052 BiReGa | 1064 BiReGa |
| Gh | -- GhBd | -- GhBd | RlGhBd | GlBhRd | GlBhRd | GlBhRd | GlBhRd |
| Gg | 2 -- GgBc | 14 -- GgBc | 14 RkGgBc | 1042 GkBgRc | 1042 GkBgRc | 1054 GkBgRc | 1066 GkBgRc |
| Gf | -- GfBb | -- Gf Bb | RjGfBb | GjBfRb | GjBfRb | GjBfRb | GjBfRb |
| Ge | 4 -- GeBa | 16 -- GeBa | 16 RiGeBa | 1044 GiBeRa | 1044 GiBeRa | 1056 GiBeRa | 1068 GiBeRa |
| Rh | -- RhGd | -- RhGd | BlRhGd | -- GhBd | RlGhBd | RlGhBd | RlGhBd |
| Rg | 6 -- RgGc | 18 -- RgGc | 18 BkRgGc | 1046 -- GgBc | 1046 RkGgBc | 1058 RkGgBc | 1070 RkGgBc |
| Rf | -- RfGb | -- Rf Gb | BjRfGb | -- Gf Bb | RjGfBb | RjGfBb | RjGfBb |
| Re | 8 -- ReGa | 20 -- ReGa | 20 BiReGa | 1048 -- GeBa | 1048 RiGeBa | 1060 RiGeBa | 1072 RiGeBa |
| Bh | -- BhRd | -- BhRd | GlBhRd | -- RhGd | BlRhGd | BlRhGd | BlRhGd |
| Bg | 10 -- BgRc | 22 -- BgRc | 22 GkBgRc | 1050 -- RgGc | 1050 BkRgGc | 1062 BkRgGc | 1074 BkRgGc |
| Bf | -- BfRb | -- Bf Rb | GjBfRb | -- Rf Gb | BjRfGb | BjRfGb | BjRfGb |
| Be | 12 -- BeRa | 24 -- BeRa | 24 GiBeRa | 1052 -- ReGa | 1052 BiReGa | 1064 BiReGa | 1076 BiReGa |
| ---- Bd | ---- Bd | ---- Bd | -- GhBd | -- BhRd | GlBhRd | GlBhRd | GlBhRd |
| 2 ---- Bc | 14 ---- Bc | 26 ---- Bc | 26 -- GgBc | 1054 -- BgRc | 1054 GkBgRc | 1066 GkBgRc | 1078 GkBgRc |
| ---- Bb | ---- Bb | ---- Bb | -- Gf Bb | -- Bf Rb | GjBfRb | GjBfRb | GjBfRb |
| 4 ---- Ba | 16 ---- Ba | 28 ---- Ba | 28 -- GeBa | 1056 -- BeRa | 1056 GiBeRa | 1068 GiBeRa | 1080 GiBeRa |
| ---- Gd | ---- Gd | ---- Gd | -- RhGd | ---- Bd | -- GhBd | -- GhBd | Gh |
| 6 ---- Gc | 18 ---- Gc | 30 ---- Gc | 30 -- RgGc | 1058 ---- Bc | 1058 -- GgBc | 1070 -- GgBc | Gg |
| ---- Gb | ---- Gb | ---- Gb | -- Rf Gb | ---- Bb | -- Gf Bb | -- Gf Bb | Gf |
| 8 ---- Ga | 20 ---- Ga | 32 ---- Ga | 32 -- ReGa | 1060 ---- Ba | 1060 -- GeBa | 1072 -- GeBa | Ge |
| ---- Rd | ---- Rd | ---- Rd | -- BhRd | ---- Gd | -- RhGd | -- RhGd | Rh |
| 10 ---- Rc | 22 ---- Rc | 34 ---- Rc | 34 -- BgRc | 1062 ---- Gc | 1062 -- RgGc | 1074 -- RgGc | Rg |
| ---- Rb | ---- Rb | ---- Rb | -- Bf Rb | ---- Gb | -- Rf Gb | -- Rf Gb | Rf |
| 12 ---- Ra | 24 ---- Ra | 36 ---- Ra | 36 -- BeRa | 1064 ---- Ga | 1064 -- ReGa | 1076 -- ReGa | Re |
| ------ | ------ | ------ | ---- Bd | ---- Rd | -- BhRd | -- BhRd | Bh |
| 14 ------ | 26 ------ | 38 ------ | 38 ---- Bc | 1066 ---- Rc | 1066 -- BgRc | 1078 -- BgRc | Bg |
| ------ | ------ | ------ | ---- Bb | ---- Rb | -- Bf Rb | -- Bf Rb | Bf |
| 16 ------ | 28 ------ | 40 ------ | 40 ---- Ba | 1068 ---- Ra | 1068 -- BeRa | 1080 -- BeRa | Be |
| ------ | ------ | ------ | ---- Gd | ------ | ---- Bd | Bd | Bd |
| 18 ------ | 30 ------ | 42 ------ | 42 ---- Gc | 1070 ------ | 1070 ---- Bc | Bc | Bc |
| ------ | ------ | ------ | ---- Gb | ------ | ---- Bb | Bb | Bb |
| 20 ------ | 32 ------ | 44 ------ | 44 ---- Ga | 1072 ------ | 1072 ---- Ba | Ba | Ba |
| ------ | ------ | ------ | ---- Rd | ------ | ---- Gd | Gd | Gd |
| 22 ------ | 34 ------ | 46 ------ | 46 ---- Rc | 1074 ------ | 1074 ---- Gc | Gc | Gc |
| ------ | ------ | ------ | ---- Rb | ------ | ---- Gb | Gb | Gb |
| 24 ------ | 36 ------ | 48 ------ | 48 ---- Ra | 1076 ------ | 1076 ---- Ga | Ga | Ga |
| ------ | ------ | -------- | ------ | ------ | ---- Rd | Rd | Rd |
| 26 ------ | 38 ------ | 50-------- | 50 ------ | 1078 ------ | 1078 ---- Rc | Rc | Rc |
| ------ | ------ | ------ | ------ | ------ | ---- Rb | Rb | Rb |
| 28 ------ | 40 ------ | 52 ------ | 52 ------ | 1080 ------ | 1080 ---- Ra | Ra | Ra |
| 70A | 70B | 70C | 70D | 70E | 70F | 70G | 70H |

FIGs. 70A-70H

| s1 | | s2 | | s269 | | s270 | |
|---|---|---|---|---|---|---|---|
| | RGBa | | RGBa | | RGBc | | RGBc |
| 2 | RGBb | 2 | RGBb | 1072 | RGBd | 1072 | RGBd |
| | RGBc | | RGBc | | RGBa | | RGBa |
| 4 | RGBd | 4 | RGBd | 1074 | RGBb | 1074 | RGBb |
| | ----- | | RGBa | | RGBc | | RGBc |
| 6 | ----- | 6 | RGBb | 1076 | RGBd | 1076 | RGBd |
| | ----- | | RGBc | | ----- | | RGBa |
| 8 | ----- | 8 | RGBd | 1078 | ----- | 1078 | RGBb |
| | ----- | | ----- | | ----- | | RGBc |
| 10 | ----- | 10 | ----- | 1080 | ----- | 1080 | RGBd |
| | 72A | | 72B | | 72C | | 72D |

FIGs. 72A-72D

Scan Pass s3 Time t1

| Line | Dot | 1 | | 3 | | 5 |
|---|---|---|---|---|---|---|
| 3 | Xa | o | o | o | o | o |
| 4 | | o | o | o | o | o |
| 5 | | o | o | o | o | o |
| 6 | | Xb | o | o | o | o |
| 7 | | o | o | o | o | o |
| 8 | | o | o | o | o | o |
| 9 | Xc | o | o | o | o | o |
| 10 | | o | o | o | o | o |
| 11 | | o | o | o | o | o |
| 12 | | Xd | o | o | o | o |
| 13 | | o | o | o | o | o |

FIG. 74A

Scan Pass s3 Time t3

| Line | 1 | | 3 | | 5 | | 7 |
|---|---|---|---|---|---|---|---|
| 3 | Xa | o | o | o | o | o | o |
| 4 | o | o | o | o | o | o | o |
| 5 | o | o | o | o | o | o | o |
| 6 | Xb | Xb | Xb | o | o | o | o |
| 7 | o | o | o | o | o | o | o |
| 8 | o | o | o | o | o | o | o |
| 9 | Xc | o | o | o | o | o | o |
| 10 | o | o | o | o | o | o | o |
| 11 | o | o | o | o | o | o | o |
| 12 | Xd | Xd | Xd | o | o | o | o |
| 13 | o | o | o | o | o | o | o |

FIG. 74B

Scan Pass s3 Time t1920

| Line | 1914 | | | 1916 | | 1918 | 1920 |
|---|---|---|---|---|---|---|---|
| 3 | Xa | Xa | Xa | Xa | Xa | o | o |
| 4 | o | o | o | o | o | o | o |
| 5 | o | o | o | o | o | o | o |
| 6 | Xb | Xb | Xb | Xb | Xb | Xb | Xb |
| 7 | o | o | o | o | o | o | o |
| 8 | o | o | o | o | o | o | o |
| 9 | Xc | Xc | Xc | Xc | Xc | o | o |
| 10 | o | o | o | o | o | o | o |
| 11 | o | o | o | o | o | o | o |
| 12 | Xd | Xd | Xd | Xd | Xd | Xd | Xd |
| 13 | o | o | o | o | o | o | o |

FIG. 74C

Scan Pass s3 Time t1924

| Line | | 1918 | | | 1920 | | 1922 | | 1924 |
|---|---|---|---|---|---|---|---|---|---|
| 3 | Xa | Xa | Xa | | | | | | |
| 4 | o | o | o | | | | | | |
| 5 | o | o | o | | | | | | |
| 6 | Xb | Xb | Xb | | Xb | | | | |
| 7 | o | o | o | | | | | | |
| 8 | o | o | o | | | | | | |
| 9 | Xc | Xc | Xc | | | | | | |
| 10 | | o | o | o | | | | | |
| 11 | | o | o | o | | | | | |
| 12 | | Xd | Xd | Xd | | Xd | | | |
| 13 | | o | o | o | | | | | |

FIG. 74D

Scan Pass s7 Time t1

| Line | Dot | | 1 | | 3 | | 5 | | 7 | | 9 |
|---|---|---|---|---|---|---|---|---|---|---|---|
| 1 | Ra | | **Ba** | G | G | G | G | G | G | G | G |
| 2 | | | X | X | X | X | X | X | X | X | X |
| 3 | | | X | X | X | X | X | X | X | X | X |
| 4 | | | G | G | G | G | G | G | G | G | G |
| 5 | | Ga | ∘ | ∘ | ∘ | ∘ | ∘ | ∘ | ∘ | ∘ | ∘ |
| 6 | | | X | X | X | X | X | X | X | X | X |
| 7 | | | G | G | G | G | G | G | G | G | G |
| 8 | | | RB | RB | RB | RB | RB | RB | RB | RB | RB |
| 9 | Rb | | **Bb** | G | G | G | G | G | G | G | G |
| 10 | | | ∘ | ∘ | ∘ | ∘ | ∘ | ∘ | ∘ | ∘ | ∘ |
| 11 | | | RB | RB | RB | RB | RB | RB | RB | RB | RB |
| 12 | | | G | G | G | G | G | G | G | G | G |
| 13 | | Gb | ∘ | ∘ | ∘ | ∘ | ∘ | ∘ | ∘ | ∘ | ∘ |
| 14 | | | RB | RB | RB | RB | RB | RB | RB | RB | RB |
| 15 | | | G | G | G | G | G | G | G | G | G |
| 16 | | | ∘ | ∘ | ∘ | ∘ | ∘ | ∘ | ∘ | ∘ | ∘ |
| 17 | Rc | | **Bc** | ∘ | ∘ | ∘ | ∘ | ∘ | ∘ | ∘ | ∘ |
| 18 | | | G | G | G | G | G | G | G | G | G |
| 19 | | | ∘ | ∘ | ∘ | ∘ | ∘ | ∘ | ∘ | ∘ | ∘ |
| 20 | | | ∘ | ∘ | ∘ | ∘ | ∘ | ∘ | ∘ | ∘ | ∘ |
| 21 | | Gc | ∘ | ∘ | ∘ | ∘ | ∘ | ∘ | ∘ | ∘ | ∘ |
| 22 | | | ∘ | ∘ | ∘ | ∘ | ∘ | ∘ | ∘ | ∘ | ∘ |

FIG. 87A

Scan Pass s7 Time t4

| Line | Dot | 1 | | 3 | | 5 | | 7 | | 9 |
|---|---|---|---|---|---|---|---|---|---|---|
| 1 | Ra | BG | BG | BG | **Ba** | G | G | G | G | G |
| 2 | | X | X | X | X | X | X | X | X | X |
| 3 | | X | X | X | X | X | X | X | X | X |
| 4 | | G | G | G | G | G | G | G | G | G |
| 5 | | **Ga** | ∘ | ∘ | ∘ | ∘ | ∘ | ∘ | ∘ | ∘ |
| 6 | | X | X | X | X | X | X | X | X | X |
| 7 | | G | G | G | G | G | G | G | G | G |
| 8 | | RB | RB | RB | RB | RB | RB | RB | RB | RB |
| 9 | Rb | BG | BG | BG | **Bb** | G | G | G | G | G |
| 10 | | ∘ | ∘ | ∘ | ∘ | ∘ | ∘ | ∘ | ∘ | ∘ |
| 11 | | RB | RB | RB | RB | RB | RB | RB | RB | RB |
| 12 | | G | G | G | G | G | G | G | G | G |
| 13 | | **Gb** | ∘ | ∘ | ∘ | ∘ | ∘ | ∘ | ∘ | ∘ |
| 14 | | RB | RB | RB | RB | RB | RB | RB | RB | RB |
| 15 | | G | G | G | G | G | G | G | G | G |
| 16 | | ∘ | ∘ | ∘ | ∘ | ∘ | ∘ | ∘ | ∘ | ∘ |
| 17 | Rc | Bc | Bc | Bc | **Bc** | ∘ | ∘ | ∘ | ∘ | ∘ |
| 18 | | G | G | G | G | G | G | G | G | G |
| 19 | | ∘ | ∘ | ∘ | ∘ | ∘ | ∘ | ∘ | ∘ | ∘ |
| 20 | | ∘ | ∘ | ∘ | ∘ | ∘ | ∘ | ∘ | ∘ | ∘ |
| 21 | | **Gc** | ∘ | ∘ | ∘ | ∘ | ∘ | ∘ | ∘ | ∘ |
| 22 | | ∘ | ∘ | ∘ | ∘ | ∘ | ∘ | ∘ | ∘ | ∘ |

FIG. 87B

Scan Pass s7 Time t7

| Line | 1 | | 3 | | 5 | | 7 | | 9 | | 11 | | 13 |
|---|---|---|---|---|---|---|---|---|---|---|---|---|---|
| 1 | Rx | BG | BG | BG | BG | BG | **Ba** | G | G | G | G | G | G |
| 2 | X | X | X | X | X | X | X | X | X | X | X | X | X |
| 3 | X | X | X | X | X | X | X | X | X | X | X | X | X |
| 4 | G | G | G | G | G | G | G | G | G | G | G | G | G |
| 5 | Ga | Ga | Ga | **Ga** | ∘ | ∘ | ∘ | ∘ | ∘ | ∘ | ∘ | ∘ | ∘ |
| 6 | X | X | X | X | X | X | X | X | X | X | X | X | X |
| 7 | G | G | G | G | G | G | G | G | G | G | G | G | G |
| 8 | RB | RB | RB | RB | RB | RB | RB | RB | RB | RB | RB | RB | RB |
| 9 | **Rx** | BG | BG | BG | BG | BG | **Bb** | G | G | G | G | G | G |
| 10 | ∘ | ∘ | ∘ | ∘ | ∘ | ∘ | ∘ | ∘ | ∘ | ∘ | ∘ | ∘ | ∘ |
| 11 | RB | RB | RB | RB | RB | RB | RB | RB | RB | RB | RB | RB | RB |
| 12 | G | G | G | G | G | G | G | G | G | G | G | G | G |
| 13 | Gb | Gb | Gb | **Gb** | ∘ | ∘ | ∘ | ∘ | ∘ | ∘ | ∘ | ∘ | ∘ |
| 14 | RB | RB | RB | RB | RB | RB | RB | RB | RB | RB | RB | RB | RB |
| 15 | G | G | G | G | G | G | G | G | G | G | G | G | G |
| 16 | ∘ | ∘ | ∘ | ∘ | ∘ | ∘ | ∘ | ∘ | ∘ | ∘ | ∘ | ∘ | ∘ |
| 17 | RB | Bc | Bc | Bc | Bc | Bc | **Bc** | ∘ | ∘ | ∘ | ∘ | ∘ | ∘ |
| 18 | G | G | G | G | G | G | G | G | G | G | G | G | G |
| 19 | ∘ | ∘ | ∘ | ∘ | ∘ | ∘ | ∘ | ∘ | ∘ | ∘ | ∘ | ∘ | ∘ |
| 20 | ∘ | ∘ | ∘ | ∘ | ∘ | ∘ | ∘ | ∘ | ∘ | ∘ | ∘ | ∘ | ∘ |
| 21 | Gc | Gc | Gc | **Gc** | ∘ | ∘ | ∘ | ∘ | ∘ | ∘ | ∘ | ∘ | ∘ |
| 22 | ∘ | ∘ | ∘ | ∘ | ∘ | ∘ | ∘ | ∘ | ∘ | ∘ | ∘ | ∘ | ∘ |

FIG. 87C

Scan Pass s7 Time t13

| Line | 1 | | 3 | | 5 | | 7 | | 9 | | 11 | | 13 | | 15 |
|---|---|---|---|---|---|---|---|---|---|---|---|---|---|---|---|
| 1 | Rx | Rx | Rx | Rx | Rx | Rx | **Rx** | BG | BG | BG | BG | BG | **Ba** | G | G |
| 2 | X | X | X | X | X | X | X | X | X | X | X | X | X | X | X |
| 3 | X | X | X | X | X | X | X | X | X | X | X | X | X | X | X |
| 4 | G | G | G | G | G | G | G | G | G | G | G | G | G | G | G |
| 5 | Ga | Ga | Ga | Ga | Ga | Ga | Ga | Ga | Ga | **Ga** | ∘ | ∘ | ∘ | ∘ | ∘ |
| 6 | X | X | X | X | X | X | X | X | X | X | X | X | X | X | X |
| 7 | G | G | G | G | G | G | G | G | G | G | G | G | G | G | G |
| 8 | RB | RB | RB | RB | RB | RB | RB | RB | RB | RB | RB | RB | RB | RB | RB |
| 9 | Rx | Rx | Rx | Rx | Rx | Rx | **Rx** | BG | BG | BG | BG | BG | **Bb** | G | G |
| 10 | ∘ | ∘ | ∘ | ∘ | ∘ | ∘ | ∘ | ∘ | ∘ | ∘ | ∘ | ∘ | ∘ | ∘ | ∘ |
| 11 | RB | RB | RB | RB | RB | RB | RB | RB | RB | RB | RB | RB | RB | RB | RB |
| 12 | G | G | G | G | G | G | G | G | G | G | G | G | G | G | G |
| 13 | Gb | Gb | Gb | Gb | Gb | Gb | Gb | Gb | Gb | **Gb** | ∘ | ∘ | ∘ | ∘ | ∘ |
| 14 | RB | RB | RB | RB | RB | RB | RB | RB | RB | RB | RB | RB | RB | RB | RB |
| 15 | G | G | G | G | G | G | G | G | G | G | G | G | G | G | G |
| 16 | ∘ | ∘ | ∘ | ∘ | ∘ | ∘ | ∘ | ∘ | ∘ | ∘ | ∘ | ∘ | ∘ | ∘ | ∘ |
| 17 | RB | RB | RB | RB | RB | RB | **RB** | Bc | Bc | Bc | Bc | Bc | **Bc** | ∘ | ∘ |
| 18 | G | G | G | G | G | G | G | G | G | G | G | G | G | G | G |
| 19 | ∘ | ∘ | ∘ | ∘ | ∘ | ∘ | ∘ | ∘ | ∘ | ∘ | ∘ | ∘ | ∘ | ∘ | ∘ |
| 20 | ∘ | ∘ | ∘ | ∘ | ∘ | ∘ | ∘ | ∘ | ∘ | ∘ | ∘ | ∘ | ∘ | ∘ | ∘ |
| 21 | Gc | Gc | Gc | Gc | Gc | Gc | Gc | Gc | Gc | **Gc** | ∘ | ∘ | ∘ | ∘ | ∘ |
| 22 | ∘ | ∘ | ∘ | ∘ | ∘ | ∘ | ∘ | ∘ | ∘ | ∘ | ∘ | ∘ | ∘ | ∘ | ∘ |

FIG. 87D

Scan Pass s7 Time t1920

| Line | 1906 | | 1908 | | 1910 | | 1912 | | 1914 | | 1916 | | 1918 | | 1920 |
|---|---|---|---|---|---|---|---|---|---|---|---|---|---|---|---|
| 1 | Rx | Rx | Rx | Rx | Rx | Rx | Rx | Rx | Rx | BG | BG | BG | BG | RG | **Ba** |
| 2 | X | X | X | X | X | X | X | X | X | X | X | X | X | X | X |
| 3 | X | X | X | X | X | X | X | X | X | X | X | X | X | X | X |
| 4 | G | G | G | G | G | G | G | G | G | G | G | G | G | G | G |
| 5 | Ga | Ga | Ga | Ga | Ga | Ga | Ga | Ga | Ga | Ga | Ga | **Ga** | ∘ | ∘ | ∘ |
| 6 | X | X | X | X | X | X | X | X | X | X | X | X | X | X | X |
| 7 | G | G | G | G | G | G | G | G | G | G | G | G | G | G | G |
| 8 | RB | RB | RB | RB | RB | RB | RB | RB | RB | RB | RB | RB | RB | RB | RB |
| 9 | Rx | Rx | Rx | Rx | Rx | Rx | Rx | Rx | Rx | BG | BG | BG | BG | BG | **Bb** |
| 10 | ∘ | ∘ | ∘ | ∘ | ∘ | ∘ | ∘ | ∘ | ∘ | ∘ | ∘ | ∘ | ∘ | ∘ | ∘ |
| 11 | RB | RB | RB | RB | RB | RB | RB | RB | RB | RB | RB | RB | RB | RB | RB |
| 12 | G | G | G | G | G | G | G | G | G | G | G | G | G | G | G |
| 13 | Gb | Gb | Gb | Gb | Gb | Gb | Gb | Gb | Gb | Gb | Gb | **Gb** | ∘ | ∘ | ∘ |
| 14 | RB | RB | RB | RB | RB | RB | RB | RB | RB | RB | RB | RB | RB | RB | RB |
| 15 | G | G | G | G | G | G | G | G | G | G | G | G | G | G | G |
| 16 | ∘ | ∘ | ∘ | ∘ | ∘ | ∘ | ∘ | ∘ | ∘ | ∘ | ∘ | ∘ | ∘ | ∘ | ∘ |
| 17 | RB | RB | RB | RB | RB | RB | RB | RB | RB | Bc | Bc | Bc | Bc | Bc | **Bc** |
| 18 | G | G | G | G | G | G | G | G | G | G | G | G | G | G | G |
| 19 | ∘ | ∘ | ∘ | ∘ | ∘ | ∘ | ∘ | ∘ | ∘ | ∘ | ∘ | ∘ | ∘ | ∘ | ∘ |
| 20 | ∘ | ∘ | ∘ | ∘ | ∘ | ∘ | ∘ | ∘ | ∘ | ∘ | ∘ | ∘ | ∘ | ∘ | ∘ |
| 21 | Gc | Gc | Gc | Gc | Gc | Gc | Gc | Gc | Gc | Gc | Gc | **Gc** | ∘ | ∘ | ∘ |
| 22 | ∘ | ∘ | ∘ | ∘ | ∘ | ∘ | ∘ | ∘ | ∘ | ∘ | ∘ | ∘ | ∘ | ∘ | ∘ |

FIG. 88A

Scan Pass s7 Time t1923

| Line | | | 1910 | | 1912 | | 1914 | | 1916 | | 1918 | | 1920 | | |
|---|---|---|---|---|---|---|---|---|---|---|---|---|---|---|---|
| 1 | Rx | Rx | Rx | Rx | Rx | Rx | Rx | Rx | Rx | BG | BG | BG | | | Ba |
| 2 | X | X | X | X | X | X | X | X | X | X | X | X | | | |
| 3 | X | X | X | X | X | X | X | X | X | X | X | X | | | |
| 4 | G | G | G | G | G | G | G | G | G | G | G | G | | | |
| 5 | Ga | Ga | Ga | Ga | Ga | Ga | Ga | Ga | Ga | Ga | Ga | **Ga** | | | |
| 6 | X | X | X | X | X | X | X | X | X | X | X | X | | | |
| 7 | G | G | G | G | G | G | G | G | G | G | G | G | | | |
| 8 | RB | RB | RB | RB | RB | RB | RB | RB | RB | RB | RB | RB | | | |
| 9 | Rx | Rx | Rx | Rx | Rx | Rx | Rx | Rx | Rx | BG | BG | BG | | | Bb |
| 10 | ∘ | ∘ | ∘ | ∘ | ∘ | ∘ | ∘ | ∘ | ∘ | ∘ | ∘ | ∘ | | | |
| 11 | RB | RB | RB | RB | RB | RB | RB | RB | RB | RB | RB | RB | | | |
| 12 | G | G | G | G | G | G | G | G | G | G | G | G | | | |
| 13 | Gb | Gb | Gb | Gb | Gb | Gb | Gb | Gb | Gb | Gb | Gb | **Gb** | | | |
| 14 | RB | RB | RB | RB | RB | RB | RB | RB | RB | RB | RB | RB | | | |
| 15 | G | G | G | G | G | G | G | G | G | G | G | G | | | |
| 16 | ∘ | ∘ | ∘ | ∘ | ∘ | ∘ | ∘ | ∘ | ∘ | ∘ | ∘ | ∘ | | | |
| 17 | RB | RB | RB | RB | RB | RB | RB | RB | RB | Bc | Bc | Bc | | | Bc |
| 18 | G | G | G | G | G | G | G | G | G | G | G | G | | | |
| 19 | ∘ | ∘ | ∘ | ∘ | ∘ | ∘ | ∘ | ∘ | ∘ | ∘ | ∘ | ∘ | | | |
| 20 | ∘ | ∘ | ∘ | ∘ | ∘ | ∘ | ∘ | ∘ | ∘ | ∘ | ∘ | ∘ | | | |
| 21 | Gc | Gc | Gc | Gc | Gc | Gc | Gc | Gc | Gc | Gc | Gc | **Gc** | | | |
| 22 | ∘ | ∘ | ∘ | ∘ | ∘ | ∘ | ∘ | ∘ | ∘ | ∘ | ∘ | ∘ | | | |

FIG. 88B

Scan Pass s7 Time t1924

| Line | 1910 | | 1912 | | 1914 | | 1916 | | 1918 | | 1920 | | | | |
|---|---|---|---|---|---|---|---|---|---|---|---|---|---|---|---|
| 1 | Rx | Rx | Rx | Rx | Rx | Rx | Rx | Rx | Rx | BG | BG | | | | Ba |
| 2 | X | X | X | X | X | X | X | X | X | X | X | | | | |
| 3 | X | X | X | X | X | X | X | X | X | X | X | | | | |
| 4 | G | G | G | G | G | G | G | G | G | G | G | | | | |
| 5 | Ga | Ga | Ga | Ga | Ga | Ga | Ga | Ga | Ga | Ga | Ga | **Ga** | | | |
| 6 | X | X | X | X | X | X | X | X | X | X | X | | | | |
| 7 | G | G | G | G | G | G | G | G | G | G | G | | | | |
| 8 | RB | RB | RB | RB | RB | RB | RB | RB | RB | RB | RB | | | | |
| 9 | Rx | Rx | Rx | Rx | Rx | Rx | Rx | Rx | Rx | BG | BG | | | | Bb |
| 10 | ∘ | ∘ | ∘ | ∘ | ∘ | ∘ | ∘ | ∘ | ∘ | ∘ | ∘ | | | | |
| 11 | RB | RB | RB | RB | RB | RB | RB | RB | RB | RB | RB | | | | |
| 12 | G | G | G | G | G | G | G | G | G | G | G | | | | |
| 13 | Gb | Gb | Gb | Gb | Gb | Gb | Gb | Gb | Gb | Gb | Gb | **Gb** | | | |
| 14 | RB | RB | RB | RB | RB | RB | RB | RB | RB | RB | RB | | | | |
| 15 | G | G | G | G | G | G | G | G | G | G | G | | | | |
| 16 | ∘ | ∘ | ∘ | ∘ | ∘ | ∘ | ∘ | ∘ | ∘ | ∘ | ∘ | | | | |
| 17 | RB | RB | RB | RB | RB | RB | RB | RB | RB | Bc | Bc | | | | Bc |
| 18 | G | G | G | G | G | G | G | G | G | G | G | | | | |
| 19 | ∘ | ∘ | ∘ | ∘ | ∘ | ∘ | ∘ | ∘ | ∘ | ∘ | ∘ | | | | |
| 20 | ∘ | ∘ | ∘ | ∘ | ∘ | ∘ | ∘ | ∘ | ∘ | ∘ | ∘ | | | | |
| 21 | Gc | Gc | Gc | Gc | Gc | Gc | Gc | Gc | Gc | Gc | Gc | **Gc** | | | |
| 22 | ∘ | ∘ | ∘ | ∘ | ∘ | ∘ | ∘ | ∘ | ∘ | ∘ | ∘ | ∘ | | | |

FIG. 88C

Scan Pass s7 Time t1926

| Line | | | 1910 | | 1912 | | 1914 | | 1916 | | 1918 | | 1920 | | |
|---|---|---|---|---|---|---|---|---|---|---|---|---|---|---|---|
| 1 | Rx | Rx | Rx | Rx | Rx | Rx | Rx | Rx | Rx | | | | | | Ba |
| 2 | X | X | X | X | X | X | X | X | X | | | | | | |
| 3 | X | X | X | X | X | X | X | X | X | | | | | | |
| 4 | G | G | G | G | G | G | G | G | G | | | | | | |
| 5 | Ga | Ga | Ga | Ga | Ga | Ga | Ga | Ga | Ga | | | Ga | | | |
| 6 | X | X | X | X | X | X | X | X | X | | | | | | |
| 7 | G | G | G | G | G | G | G | G | G | | | | | | |
| 8 | RB | RB | RB | RB | RB | RB | RB | RB | RB | | | | | | |
| 9 | Rx | Rx | Rx | Rx | Rx | Rx | Rx | Rx | Rx | | | | | | Bb |
| 10 | ∘ | ∘ | ∘ | ∘ | ∘ | ∘ | ∘ | ∘ | ∘ | | | | | | |
| 11 | RB | RB | RB | RB | RB | RB | RB | RB | RB | | | | | | |
| 12 | G | G | G | G | G | G | G | G | G | | | | | | |
| 13 | Gb | Gb | Gb | Gb | Gb | Gb | Gb | Gb | Gb | | | Gb | | | |
| 14 | RB | RB | RB | RB | RB | RB | RB | RB | RB | | | | | | |
| 15 | G | G | G | G | G | G | G | G | G | | | | | | |
| 16 | ∘ | ∘ | ∘ | ∘ | ∘ | ∘ | ∘ | ∘ | ∘ | | | | | | |
| 17 | BR | BR | BR | BR | BR | BR | BR | BR | BR | | | | | | Rc |
| 18 | G | G | G | G | G | G | G | G | G | | | | | | |
| 19 | ∘ | ∘ | ∘ | ∘ | ∘ | ∘ | ∘ | ∘ | ∘ | | | | | | |
| 20 | ∘ | ∘ | ∘ | ∘ | ∘ | ∘ | ∘ | ∘ | ∘ | | | | | | |
| 21 | Gc | Gc | Gc | Gc | Gc | Gc | Gc | Gc | Gc | | | Gc | | | |
| 22 | ∘ | ∘ | ∘ | ∘ | ∘ | ∘ | ∘ | ∘ | ∘ | | | | | | |

FIG. 88D

LASER PROJECTION SYSTEM

CROSS REFERENCE TO RELATED APPLICATIONS

This application is a divisional application of copending and commonly assigned U.S. application Ser. No. 10/086,272, filed Mar. 1, 2002, entitled "Laser Projection System", in the names of John P. Callison, Jeffrey S. Pease and Richard W. Pease which is incorporated herein by reference application Ser. No. 10/086,272 is a continuation-in-part of commonly assigned U.S. application Ser. No. 09/654,246, filed Sep. 2, 2000, issued as U.S. Pat. No. 7,102,700 on Sep. 5, 2006, entitled "Laser Projection System", in the names of Richard W. Pease, Jeffrey S. Pease and John P. Callison, which is incorporated herein by reference. Copending application Ser. No. 11/511,585 is a divisional application of commonly assigned U.S. application Ser. No. 09/654,246 identified above. This application also claims priority under International Patent Application Number PCT/US01/27118 filed Sep. 2, 2001, entitled "Laser Projection System", in the name of Magic Lantern LLC with Richard W. Pease, Jeffrey S. Pease and John P. Callison as inventors.

FIELD OF THE INVENTION

This invention relates generally to high resolution video projection systems using visible laser beams as a possible light source, and more particularly to systems for projecting large color motion picture or video images onto a screen suitable for viewing at home, in a theater, at a concert, or other presentation or gathering.

BACKGROUND OF THE INVENTION

Large motion color images, such as displayed in movie theaters, are formed by projecting light through individual film frames illuminating a full screen, with frames succeeding one another at 20 to 30 times a second. Movie projection utilizing an electronic (usually digital) image source (termed "video" herein) is a desirable alternative to film, assuming such an image can be projected with sufficient brightness, resolution, color balance, registration, and lack of motion artifacts to equal or exceed the capabilities of film.

The typical prior art laser projection systems used complicated lens and mirror systems to combine modulated colored beams into a composite beam to be scanned, and additional optics to scan and focus the beams onto a screen. These optics sap much of the power of the laser beams, making laser projection images substantially less bright than conventional film images.

Laser video-projectors have been used for the display of electronic images since about 1980, with the first projector built in England by the Dwight Cavendish Company. This projector used an Argon ion laser and a dye laser to produce standard television resolution images up to about ten feet across in a darkened room. The projector was very large and was difficult to operate. The Dwight Cavendish laser projector, and indeed any laser projector, required the following basic components to make a video image: (a) lasers to supply the light that is sent to the screen to form the image; (b) a method of controlling the intensity of the laser light for each portion of the image, often called "modulation"; and (c) a method of distributing the modulated light across the screen surface, often called "scanning".

An improved version of the Dwight Cavendish laser projector is described by Richard W. Pease in "An Overview of Technology for Large Wall Screen Projection using Lasers as a Light Source", MITRE Technical Report, The MITRE Corporation (July 1990). The projector described in the MITRE publication utilized the following components corresponding to the laser source, modulator and scanner described above. The laser sources included argon ion lasers to produce 454 to 476 nm blue and 514 nm green, and Rhodamine 6G dye laser pumped with an argon ion laser to produce 610 nm red. The system used acousto-optic modulators between the laser sources and the scanning component for the laser beam of each color, with the modulated beams later combined with dichroic mirrors and deflected and focused onto the scanning component. The scanning section included a rotating polygon mirror and galvanometer-controlled frame mirror, as further described below. The rotating polygon mirror had 25 mirror facets, each of which deflected the modulated beam horizontally across a predetermined angle onto a mirror tilted vertically by a galvanometer across a predetermined angle through lenses onto the screen.

Several problems in particular limit the ability of current large screen projection technology to produce movie theater quality laser images. Because such laser projection systems typically used complicated lens and mirror systems to combine modulated colored beams into a composite beam to be scanned, and to scan and focus beams onto a screen, much of the power of the laser beams was sapped away, making laser projection images substantially less bright than that produced by film projection. Further, because certain wavelengths, especially blue, have been difficult to produce at adequate power levels with lasers, brightness and color balance have been inadequate for large screen video applications. The complex optics and scanning systems also tended to cause color separation and image artifacts. Also, projection systems that used rotating polygon mirrors did not adequately address the problems of polygon facet pointing errors that would tend to slightly misdirect the beams, thus requiring additional complex optical or mirror array systems to compensate for the slight misdirections.

Perhaps the most significant problem, however, with prior laser projections systems in comparison with film projection technology is the lack of sufficient resolution. Attempts to increase resolution only exacerbated the problems noted above. In order to effectively compete with or displace film projection, it is widely believed that laser projection systems must be capable of resolutions approaching 1900 by 1100 fully resolved pixels, or roughly the maximum resolution of High Definition Television (HDTV) standard of 1920×1080p.

Standard television quality resolution rarely exceeds 525 horizontal lines repeated 30 times a second. For television to achieve this resolution, 525 horizontal lines of analog image data are scanned, roughly comparable to a digital pixel array of 525×525 pixels. Thus, television quality video would require the scanning of more than 945,000 lines per minute. A 25 facet polygon mirror writing one line with each facet would require a rotation of more than 37,500 rpm. Because of centrifugal force limitations, rotational speeds this high limit the feasible size and/or number of the facets.

If one were to attempt scanning 1920×1080 HDTV or better resolution video with prior art projectors the increased number of lines per frame would require either an increase in the number of facets or substantially increased polygon mirror rotational speeds. Further, such a system may also require larger facets further straining centrifugal force limitations. For HDTV 1920×1080p resolution at a full frame rate of 60 frames per second, this polygon would have to scan more than 3.8 million lines per minute, and achieve a rotational speed of more than 150,000 rpm. A polygon mirror assembly capable of these facet rates would be structurally difficult to manufacture and operate, and extremely expensive.

The limitations of modulation technology pose additional problems. Each laser beam of the three primary colors must be modulated to produce a different color intensity for each pixel being scanned. For standard television resolution, more than 250,000 modulations must occur for each frame for each color or laser, or a total of 7.5 million modulations per second for 30 full frames per second. For high resolution, at 1920×1080p, more than 2 million modulations must occur for each color or laser to scan each frame, or a total of at least 120 million modulations per second per color for 60 frames per second. For desired non-interlaced (progressive) imagery having even greater resolution, such as 3000×2000 pixels, the rate is above 360 million modulations per second. Current modulation technology as used in prior art laser projectors is not capable of modulating the laser beams, especially powerful laser beams, at a sufficient rate to enable the generation of the number of discreet pixels required for even film-quality digital resolution.

There are other inadequacies in the existing technology that are not addressed in detail here that impose additional challenges, including complexity of optics, brightness, resolution, contrast and image stability.

SUMMARY OF THE INVENTION

Nothing in the prior art has provided a laser projection system that combines sufficient resolution, brightness and color for large screen projection, such as in a movie theater, to rival or exceed that of film. Our invention uses a novel approach to scanning laser beams onto a screen that facilitates the use of many simple, proven laser projection components to produce a bright, color saturated, high resolution large screen image at a reasonable cost.

Before further summarizing our invention, it is necessary to define and place in context several terms and concepts to be utilized in describing the projection of laser beams on a screen. As noted in greater detail in the Detailed Description herein, video images projected by our preferred system according to our invention are formed by raster scanning. Raster scanning, the process used by our invention as well as television and many (but not all) other video display techniques, is a process where a flying spot of illumination scans across the image surface, or viewing surface or screen, forming an image line, repeating the process, until scanned lines fill the entire viewing surface. A completely scanned image is called a "frame". Continuous raster scanning is a process of scanning a pre-determined pattern of lines within a display space, wherein the horizontal scanning motion is continuous during the scanning of a line or scan pass (defined herein), and the traverse is continuous or nearly continuous within a frame or subframe (also defined herein). The lines will be parallel in most instances.

The locations and values of the separate elements of a frame of video data are referred to as "pixels" herein. The manifestation of the modulated laser beam on a screen that is visually apparent to the viewer is referred to as a "spot", that is, the visible illumination resulting from reflection of laser beam from the screen shall be considered a "spot". A location on the screen corresponding to the relative position of a particular pixel in the video data is referred to herein as a potential "dot location". A "line" shall herein be considered to refer to the horizontal (in most cases) row of individual dots. A "frame" shall be regarded as a series of contiguous lines forming a complete image. Frames are repeated many times per second in all motion video images. A "subframe" shall be regarded as a group of lines in which the drawing of one or more additional group(s) of lines in different locations at a later time is required to draw a complete desired image or frame. An example is the two subframes of lines required with typical interlaced scanning to form a complete frame, such as in standard television.

We define "refresh rate" as in the television industry standard where the refresh rate refers to the number of sweeps down the screen, in that case 60 per second, although some define the refresh rate as the rate at which all of the information is completely updated, which in the case of the interlaced scans of standard television as explained below would be 30 times per second.

In the National Television Standards Committee (NTSC) television system used in the United States, one-half frame is scanned about every 1/60th second, with odd lines scanned in one subframe and even lines scanned in the next (termed "interlaced scanning" herein), thereby effectively repeating or updating each full frame 30 times a second. In many computer monitors, the image is progressively scanned, that is all lines of each frame are scanned in one pass, typically at a refresh rate of 60 or more times per second. The size of the pixel arrays range from the equivalent of 525×525i, (where "i" refers to the interlaced method), to 1920×1080p (where "p" refers to the progressive method) in the most demanding high definition television (HDTV) resolution standard, and beyond. Thus, between 15,000 and 65,000 horizontal lines, or between 8.3 and 124.0 million pixels (or more), are scanned each second at a typical refresh rate of 60 frames per second.

"Primary colors" shall be understood to mean colors of appropriate laser beam wavelengths such that when combined at a dot location on a screen at the appropriate intensities, the resulting composite color will have the desired hue. We also contemplate the use of a single color for monochrome projection, or two colors, or more than three colors in combination to enhance the range of available composite colors, to accomplish the objectives of different projection systems.

A laser projection system according to our invention preferably utilizes optical fibers to transmit modulated laser beams in the three primary colors, red, blue and green, from laser sources. This effectively preserves the point source characteristics of narrow focus beams exiting from the laser sources which can be directed through the scanning component to the screen without complex and expensive optics used in prior art systems. The use of optical fibers for laser beam transmission also facilitates packaging of the system. Further, problems with divergence and degradation of laser beams transmitted through mirrors and other optics for scanning are reduced by the use of optical fibers, which emit light beams as though they originated from point sources, and are projected on the screen as smaller, more resolved spots.

A laser projection system according to our invention may also use the beams emitted from the emitting ends of two or more optical fibers, with each fiber transmitting one of the primary colors (red, green, blue), to draw a line of spots. Instead of combining the three primary color beams before transmitting the beams to the scanning apparatus as in prior systems, one aspect of our invention permits the individually modulated laser beams of each color to form spots that are transmitted at different times to strike a particular dot location on the screen and create a composite color having a value corresponding to the pixel data color values. However, other aspects of our invention allow the projection of high resolution images with combined beams. The use of the emitting ends of the optical fibers to direct the beams to the scanning apparatus, with the reordering or time combining of the actual illumination of each dot location with each color beam, avoids the complicated optics of prior systems which combined the various beams before projection onto a dot location. This reordering is discussed below and is further illustrated in the Detailed Description.

In a preferred laser projection system according to our invention, illuminating dot locations with appropriately modulated red, green and blue spots requires appropriate delays in timing of beam activation and modulation so that the beam is activated at the appropriate time when the beam is positioned to produce a spot at the specified dot location.

Further examples of this reordering, which may also be characterized as time delaying, time combining or time shifting, as well as the presentation of lines, presentation of colors and/or rearranging of the sequence in which the video data is originally input, are more specifically described in the Detailed Description section hereof.

It should be understood that the term "horizontal" to describe the scanning of lines and the term "vertical" to describe the adjustment of the position of horizontal lines in the frame, are for convenient reference only. Those familiar with raster scanning in televisions and CRTs such as computer monitors, will understand that this illustrative system could be rotated 90.degree, so that lines would be scanned vertically and transverse adjustments in the frame made horizontally. Further, scanning diagonally, and in a spiral from the center of the frame, or in from the outer edge, have been known in other applications. In some cases, we use the terms "sweeping direction" or "swept" to more generically describe the direction in which lines are scanned along desired paths on the screen or viewing surface, analogous to the horizontal scans described at length herein, without restricting the direction of the sweeping of the paths to any particular orientation. We may also use the term "frame direction" or "moved" or "adjusted" to more generically describe the transverse direction in which the position of the lines or desired sweep paths are offset, analogous to the vertical scans or adjustments also described at length herein, without restricting that direction to any particular orientation.

Our innovation using optical fibers frees large venue laser video projection from constraints on the method of modulation and on laser sources. Indeed, our system can be easily adapted to a variety of suitable laser sources or modulation components. Further, within our invention, various techniques of combining or splitting laser beams after they have been inserted into optical fibers can be advantageously employed. To illustrate these and other advantages of our invention, we will assume an exemplary arrangement of four rows of emitting ends with three emitting ends per row, also referred to as a 4×3 array (hereinafter referred to as our "Initial Example"). However, as will be made clear in the Detailed Description section, an almost unlimited number of alternatives may be used within the scope of our invention.

A laser projection system according to our invention further preferably utilizes a plurality of point sources, such as fiber emitting ends arranged in an array, to project a pattern of spots on a screen. For convenient reference, we prefer to call the fiber emitting ends used to draw a line of spots on the screen (in the Initial Example, horizontally aligned) a "row" of fiber emitting ends. As described below, a row may also comprise one or more beams or spots of a pattern of beams or spots projected on a screen. Such array of fiber emitting ends may be effectively arranged in rows of emitting ends spaced apart vertically to project and scan a two dimensional pattern of spots along more than one horizontal line at a time. Such multiple line scanning according to our invention provides a method of achieving high resolution with current scanning, modulation and laser components otherwise not capable of producing high resolution video images, as described above.

Thus, our system realizes several advantages of scanning more than one line per horizontal sweep. One advantage includes an ability to use simpler, less expensive scanning components, such as a polygon mirror having a more common number of facets and operating at a conventional rotational speed for high resolution raster scanning. For example, for 1920×1080p or better quality resolution, a 25 facet polygon mirror scanning one line per facet at a frame rate of 60 full frames per second would have to scan more than 3.8 million lines per minute at more than 150,000 rpm. The use of a 4×3 array of the Initial Example, which is arranged to scan four lines per facet, or horizontal sweep, would reduce that rotational speed by a factor of four, to about 37,500 rpm, which is within manageable limits for existing polygon mirror technology.

Another advantage is the reduction in modulation speed achieved by individually modulating, in the foregoing example, four rows of laser beams and scanning them simultaneously for the Initial Example, the modulation of the individual beams is thus reduced by a factor of four at the desired resolution. Without our invention, 1920×1080p requires modulation at 120 million modulations per second to scan each pixel or spot at a rate of one line at a time, whereas scanning four lines at a time reduces this requirement to approximately 30 million modulations per second, again within the capabilities of current acousto-optic or other existing modulation technology.

Also, given the flexibility afforded by our invention in accommodating various scanning systems and laser and modulator configurations, numerous scanning regimes for both front and rear projection could be utilized to effect.

Our invention relieves other problems associated with the laser power requirements for large screen. Laser beams of large screen projection systems must have sufficient power to illuminate each dot location on a screen with a minimum desired illumination.

The high power laser beams required for such prior art laser projection systems produce a power density in the modulator crystal that current acousto-optic modulators simply cannot handle. The division of the modulation tasks among multiple modulators in accordance with our invention, such as four times as many modulators with our Initial Example, reduces the power load that must be handled by each modulator by that multiple, or by a factor of four with the Initial Example, more within the capacity of current acousto-optic modulators.

In some cases, it may be more economical or otherwise more effective to use several small lasers per color, such as by using one laser per color per row or by using several emitting ends for a given color per row each with its own laser, than it is to use one large laser for each color where the output is split, or divided, among the several rows, even though the use of fiber makes such splitting far more efficient than in prior art laser projectors. Thus, our invention uniquely allows any of several approaches to using multiple lower power laser beam sources in a raster scanning environment.

The use of multiple line scanning and of optical fibers produces other advantages. Even if, hypothetically, a designer of a laser projection system were to attempt to use optical fibers, as taught by our invention, to transmit the laser beams to the scanning components, the high power density where the light enters and leaves the fiber could damage the fiber. As described for modulation requirements, dividing the laser power between multiple fibers to transmit the same effective power to the screen as prior art systems reduces the power density each individual fiber must handle, permitting the use of currently available optical fibers in a system according to our invention. Conversely, the use of optical fibers in our preferred system is enabling of multi-line scanning. If multi-line scanning in accordance with our invention were attempted without using fibers, the complexity and expense of the necessary optics to perform such scanning would be multiplied many times. Additionally, in the absence of optical fibers used in accordance with our invention, the problems associated with accurately positioning multiple separate beams or composite beams in a vertical spacing suitable for multi-line scanning with prior technology are for all practical purposes insurmountable.

Further, within our invention, the use of optical fibers also enables the use of various techniques of combining and splitting laser beams that have already been inserted into fibers (hereinafter "fiber-based beam coupling"). This allows us to efficiently combine beams of various primary colors to form a composite beam as in prior art projectors and, as will be discussed at length hereinafter, it also allows us unprecedented flexibility in the choice of laser sources and modulators, with the attendant advantages of favorable economics, size, availability and beam characteristics. This is especially important when one considers that combining the beams of more than two small lasers of the same or similar wavelengths into one beam is not feasible in laser projectors without our invention. The use of multiple lasers per color is also facilitated by using fibers and multiple line scanning.

As noted above, our system may employ a reordering of digital video signals to produce a high resolution laser image. We refer to the spacing of the rows of spots on the screen projected by the beams emitted from adjacent rows of emitting ends as the "effective row spacing", e.g., for a five line effective row spacing, there would be four lines of dot locations spaced between the two rows of spots. This definition applies as well to configurations where each row has only one spot. As shown later herein, for our Initial Example's four row by three emitting ends emitting a red, green and blue laser beam per row array and corresponding spot pattern on the screen, during a scan pass a beam of each color will illuminate each dot location along the line of dot locations on the screen with a beam of varying intensity, including an intensity recognized as black. The vertical adjustment from scan pass to scan pass will cause each additional line of desired dot locations to be illuminated. Because the scan of a full frame occurs at more than 60 times per second, the eye perceives all of the scan lines, regardless of actual order of scanning, as a complete image. Further examples of the effect of this reordering may be found in the Detailed Description section.

A feature of our invention is the use of a single lens or optic to direct the beams from the array of fiber emitting ends through the scanning components and thence to the screen. This avoids the use of complicated optical systems common to prior laser projection systems, such as disclosed in Linden, U.S. Pat. No. 5,136,426. Our preferred use of a single lens helps to effect the greatest possible resolution of the laser beam on the screen by producing the smallest feasible spot and by avoiding the degradation in beam quality that results from multiple optical elements in a complex optical path. The resulting increased optical efficiency also permits lower power lasers, because more of the laser power reaches the screen than with complex optical systems. The simple achromat lens preferred for our preferred system according to our invention is significantly less expensive than the multiple, and typically more complex, lenses and mirrors used in prior laser projection systems. Lastly, the use of a simple lens simplifies manufacture, setup, repair and adjustment of the preferred laser projection system.

Because of the precision required for directing the laser beam onto the screen, each polygon facet in reflect the beams at exactly the same vertical angle from facet to facet. However, such precision in manufacturing mirror polygons is not practical. Previous laser projection systems using mirror polygons used a system of lenses to correct these vertical facet errors. The Dwight Cavendish laser projection system used cylindrical optics to correct for the error in each facet. Unfortunately, the use of such optics results in color separation, and tends to degrade the image quality and resolution. In our preferred embodiment we use the galvanometer, the vertical scanning component, to make this correction.

The foregoing advantages of the present invention are realized in the following embodiments, which are described by way of example and not necessarily by way of limitation, and which disclose laser projection systems suitable for use in a large screen commercial motion picture theater and other large or small screen venues using video and having levels of brightness, resolution and color balance exceeding that of film. Additional advantages and novel features of the invention will be set forth in the description which follows and will become apparent to those skilled in the art upon examination of the following more detailed description and drawings in which like elements of the invention are similarly numbered throughout.

BRIEF DESCRIPTION OF THE DRAWINGS

FIGS. 42A through 42F are time sequence diagrams for Example 15, illustrating the time shifting of spots of each primary color in RowA through RowD of a pattern of spots shown in FIG. 8S to form composite spots at dot locations at the end of scan pass s3.

FIGS. 70A through 70H are time sequence diagrams for Example 27, illustrating line reordering for a linear spot pattern similar to that illuminated by the emitting array of FIG. 69 having an effective row spacing of 1 line and a vertical adjustment between scan passes of 12 lines.

FIGS. 72A through 72D are the time sequence diagrams for Example 28, illustrating line display sequencing with a 4×1 slant array, multiple colors per emitting end, and an effective one line spacing for a pattern spots as shown in FIG. 7.

FIGS. 74A through 74D are the horizontal time sequence diagrams for Example 28, illustrating the timing of the display of spots at the beginning and end of a horizontal sweep, using alternate spot pattern as shown in FIG. 71S.

FIGS. 87A through 87D are time sequence diagrams for Example 23 illustrating the time shifting of spots of each primary color at the start of scan pass s7 for a pattern of spots shown in FIG. 62S.

FIGS. 88A through 88D are time sequence diagrams for Example 23 illustrating the time shifting of spots of each primary color at the end of scan pass s7 for a pattern of spots shown in FIG. 62S.

DETAILED DESCRIPTION

Because the detailed description of the preferred and alternate embodiments is rather extensive, for ease of reference, we have included herein subheadings descriptive of the content appearing thereafter. These subheadings should not be considered as limiting the scope of the material identified thereby, but are provided merely for convenient reference to the subject matter of the detailed description.

Applicants have filed prior application on Sep. 2, 2000, assigned U.S. Ser. No. 09/654,246, entitled "LASER PROJECTION SYSTEM", which is incorporated herein by reference.

Figure 1:
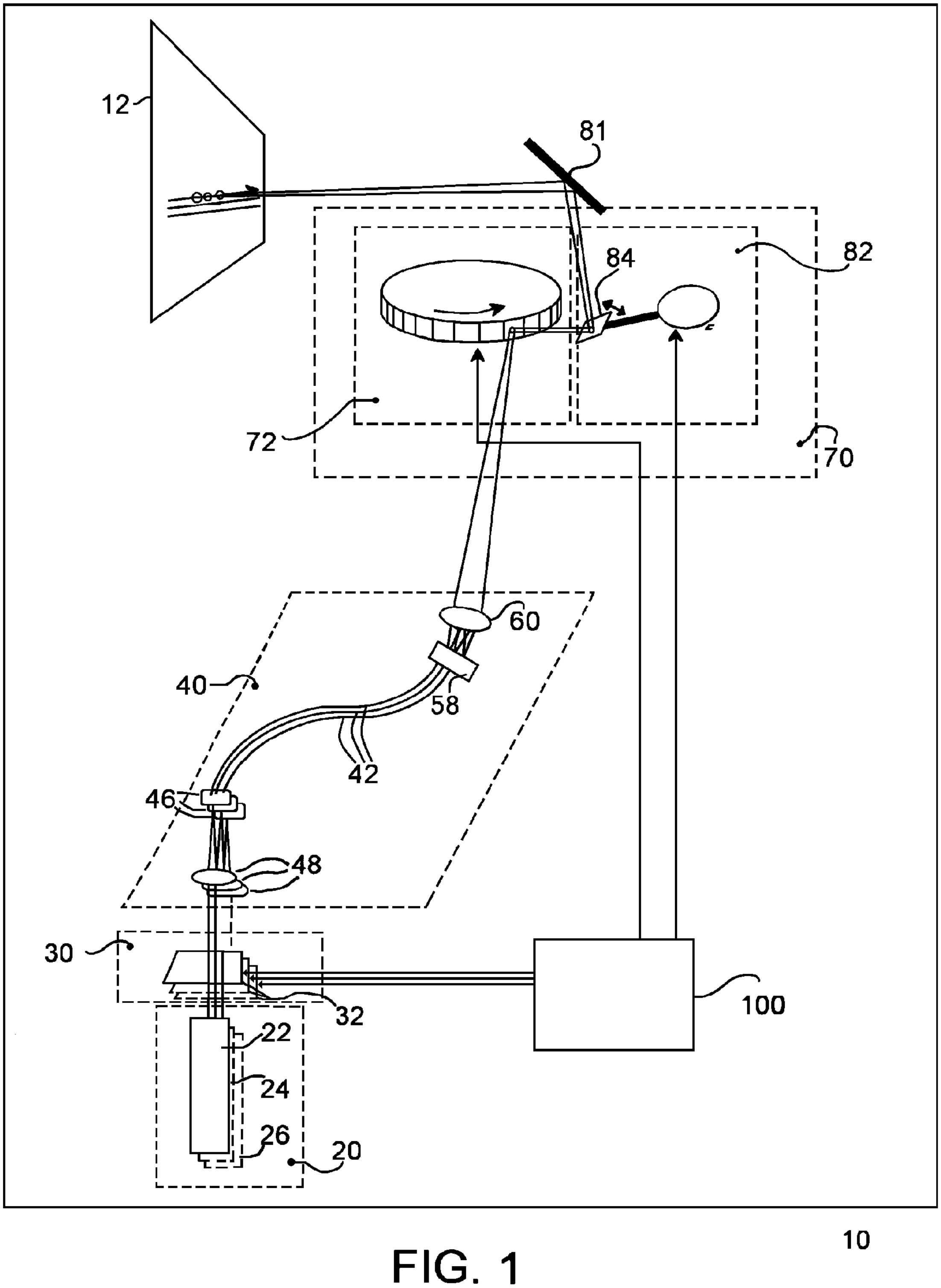
FIG. 1 is a schematic representation of a laser projection system of a first embodiment of our invention.

Referring to FIG. 1, a laser projection system 10 according to our invention may be seen to include: laser section 20 supplying light beams in three primary colors red, green and blue that will be directed toward a screen 12; modulation section 30 controlling the intensity of each light beam according to the pixel information; spot projection section 40 for forming the pattern of spots of light for transmission to the screen 12; scanning section 70 which includes a horizontal scanning subsystem 72 which distributes the spots of light in lines across the width of the screen 12, each traverse referred to herein as a "scan pass", and a vertical scanning subsystem 82 that vertically repositions the beams after each scan pass to different specific vertical locations on the screen traversing the height of the screen 12; and controller section 100 which converts the pixel data representing the image into signals that are used by the modulation and scanning sections 30 and 70, respectively, to illuminate the image indicated in the image data.

Advantages of Using Optical Fibers

The flexible optical fibers 42 permit an arrangement of the lasers of the laser section 20 that is convenient for the particular packaging of the preferred laser projection system 10 as a whole. The flexibility afforded by the transmission of the modulated laser beams to the scanning section 70 permits the placement of the laser and modulation sections 20 and 30, respectively, at locations remote from the scanning component.

Figure 2:
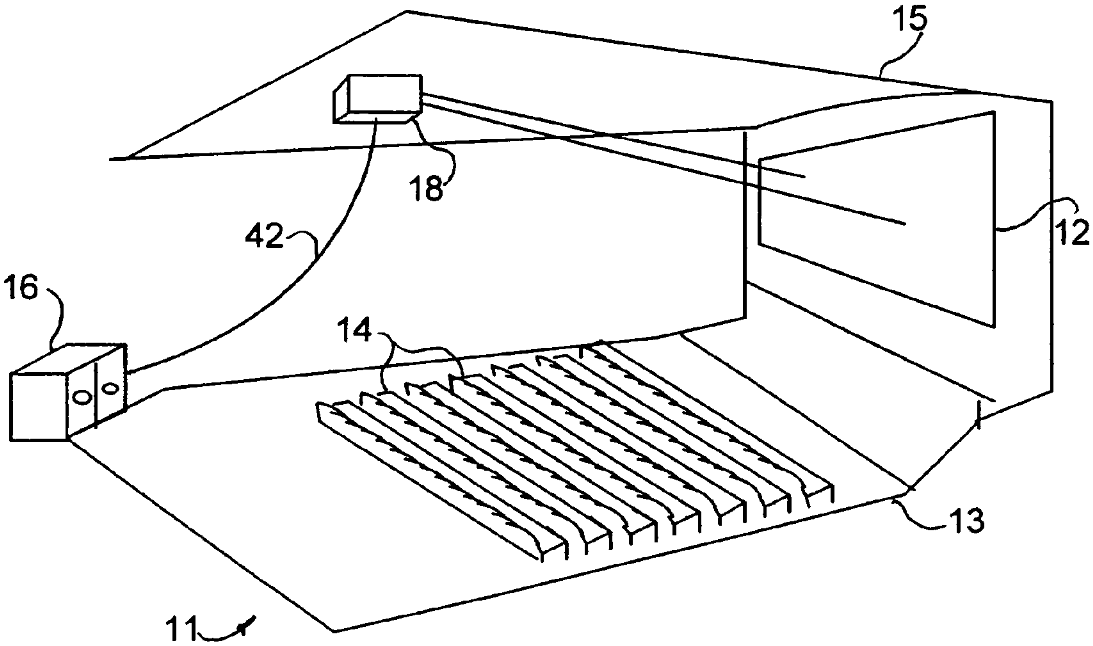
FIG. 2 is a diagram of a theater in which the system of FIG. 1 may be employed.

For example, as shown in FIG. 2 showing a schematic perspective view of a commercial theater 11, having the large screen 12, floor 13, seats 14 and ceiling 15. In the theater shown in FIG. 2, the laser, modulation and controller sections 20, 30 and 100, respectively, are located in closet 16 or other convenient location, and fibers 42 extend from the closet 16 to scanning module 18 containing the scanning section 70 positioned on the ceiling 15 or other desirable location at the desired throw distance from the screen 12.

Figure 4:
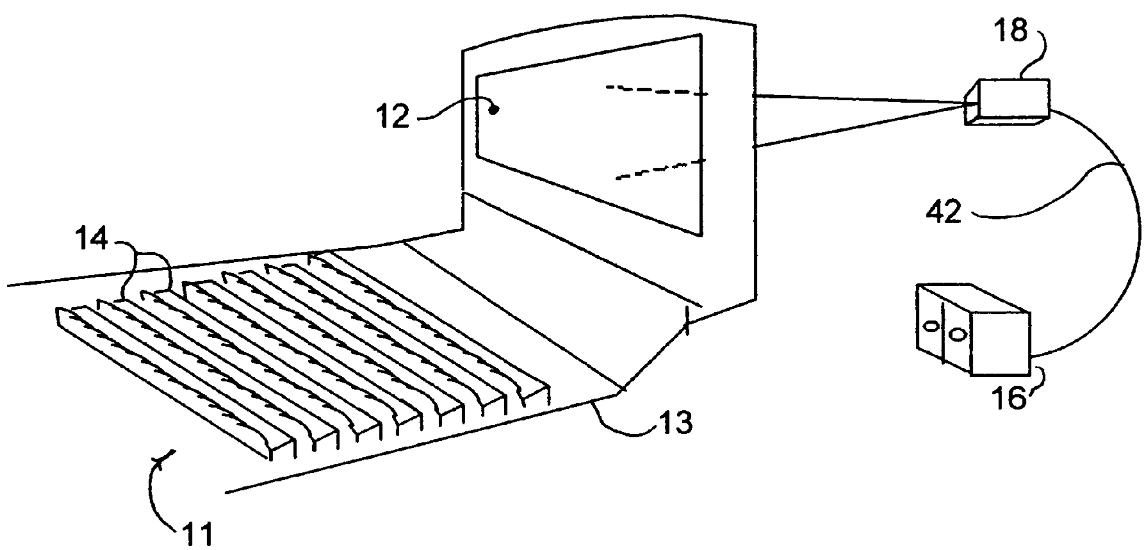
FIG. 4 is a diagram of a theater in which the system of FIG. 1 may be employed in rear projection.

In particular, another desirable location may be an existing projector booth, which would allow the laser, modulation and controller sections, respectively 20, 30 and 100, to be co-located with the spot projection section 40 and scanning section 70. Further, as shown in FIG. 4, rear projection may be advantageously employed with only minor modifications to our preferred embodiments.

The laser and modulation sections 20 and 30, respectively, preferred for anticipated initial commercial embodiments of our invention will be more particularly described herein. However, as we noted previously in the Summary of the Invention section hereof, significant advantages are separately and synergistically realized by our use of a spot projection system 40 using multiple optical fibers, for convenience referred to herein as fiber 42, to conduct multiple separately modulated laser beams to be emitted to the scanning section 70 in a closely spaced array of substantially parallel beams to form a desired spot pattern on the screen 12.

While considering the various embodiments of the spot projection, scanning and controller sections 40, 70 and 100, respectively, of our invention described later herein, it should be remembered that a significant advantage of a laser projection system according to our invention is that the use of the fibers 42 enables the use of practically any appropriate laser and modulator components in the laser and modulation sections 20 and 30, respectively. Our invention permits modifications and upgrades of initial lasers and modulation components, and even wholesale changes to substantially different laser and modulator components, without substantial changes to the spot projection, scanning and controller sections 40, 70 and 100, respectively. Improvements in laser and modulator technology may reduce the size and cost of these components.

As described hereinafter, the use of fiber allows great flexibility in using smaller lasers and modulators, by facilitating one laser per color per line, several emitting ends and lasers per color per line, and by the use of fiber-based beam coupling.

Further, the use of the fibers 42 to transmit the laser beams to the scanning module 18 thus enhances the utility of the system according to our invention, in that the laser sources, modulators, scanning components, and controller electronics may be separately replaced, upgraded or modified without the need to alter the remaining components.

Spot Projection Section

Referring again to FIG. 1, in the spot projection section 40 of the system 10 according to our invention the modulated beams are inserted into optical fibers, referred to herein as fibers 42, and emitted in a pattern that is projected through the scanning section 70 and thence to the screen 12.

In general, each of the fibers 42 has an insertion end 44 and an emitting end 56, although when fiber-based beam couplers 29 are optionally employed there may in aggregate be fewer (or more) emitting ends 56 than insertion ends 44. While not required within our invention, fiber may also be used to transmit the beams from the lasers 22, 24, or 26 to the modulators 32. As explained in more detail later herein fibers 41 may also have fiber-based beam couplers 29, and have inserting optics at the lasers to insert the beam into the fibers.

Figure 3:
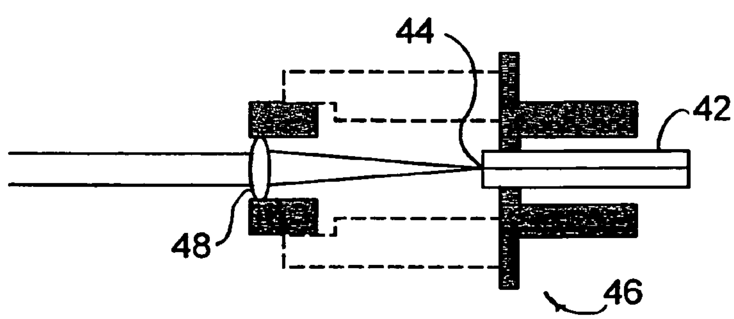
FIG. 3 is a schematic representation of the lens assembly used to insert the modulated beam into the fiber in the spot projection section of the system shown in FIG. 1.
Figure 9:
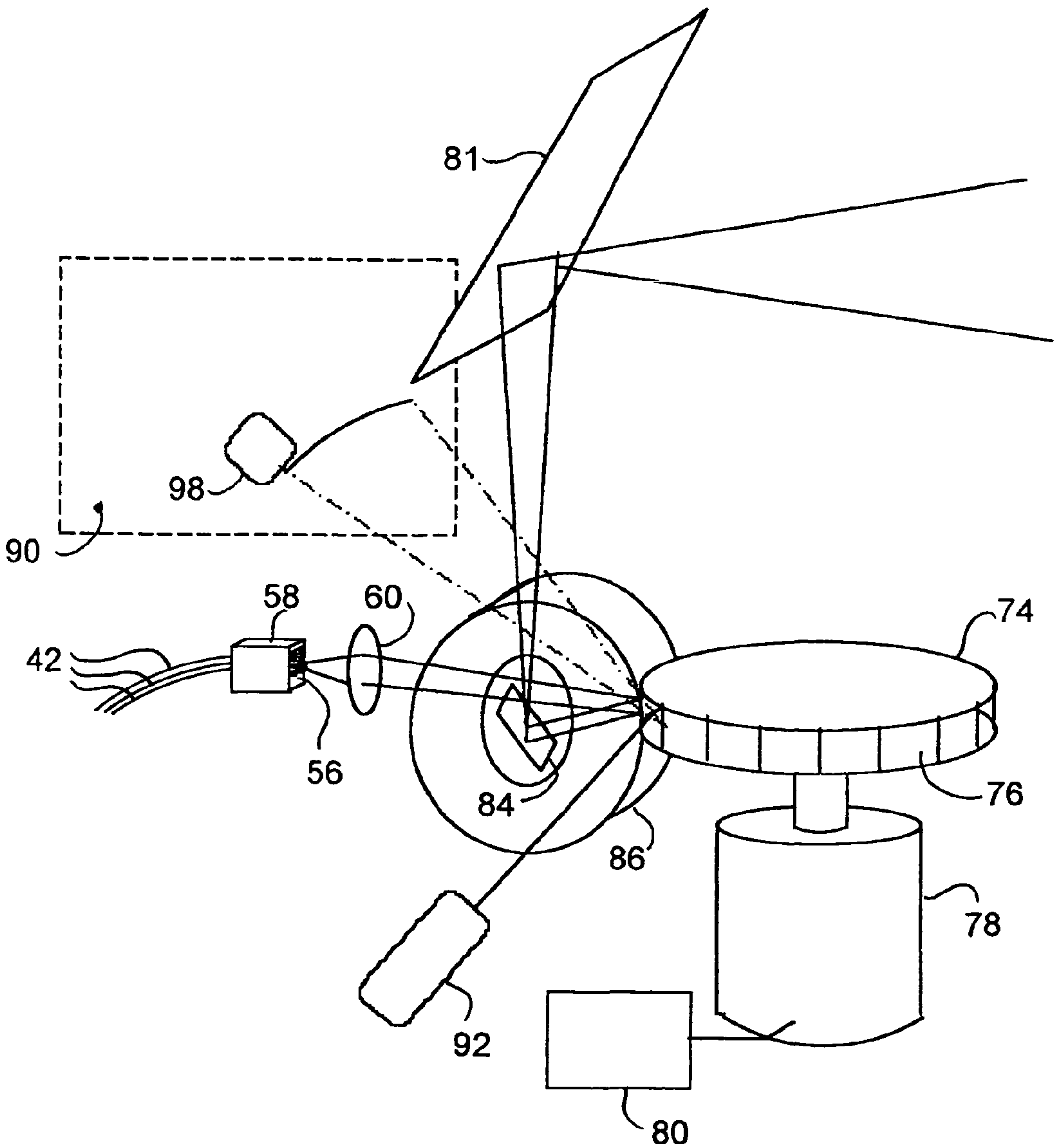
FIG. 9 is a schematic diagram of the scanning section of our preferred system of FIG. 1.

Referring to FIG. 3, associated with each insertion end 44 of the spot projection section 40 is a fiber input mechanism 46 that positions that insertion end 44 with respect to input optics or lens 48 of the mechanism 46. The technology for inserting laser beams into optical fiber is well known. We prefer to use the beam inserter and lens from OZ Optics LTD, Carp, Ontario, Canada, model # HPUC-23-514-S-6.2AS-1-SP. FIG. 9 shows the fiber emitting ends 56 of all of the fibers 42 mounted in one desired array in output head 58 in a desired position with respect to an output lens 60. It should be understood that FIG. 1 shows only three modulators, fibers 42, fiber input heads 46 and input lenses 48 to avoid unnecessarily cluttering the drawing, and that in our preferred system, twelve separate modulators, fibers 42, input heads 46 and input lenses 48 would be employed.

Figure 5:
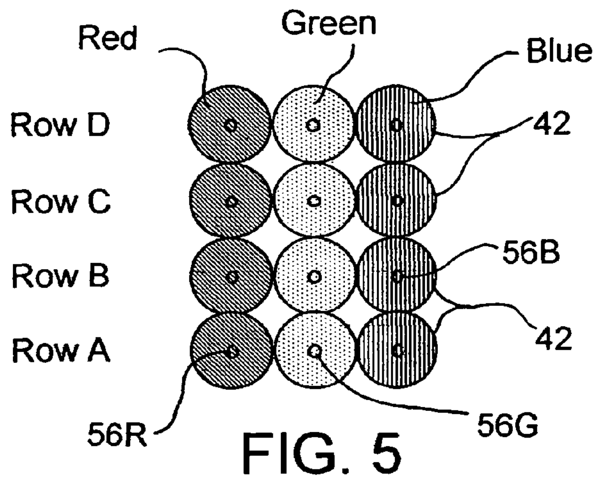
FIG. 5 is a diagram of the 4×3 array of fiber emitting ends in an output head of the system of FIG. 1, according to our Initial Example.

FIG. 5 shows the Initial Example of the 4×3 array wherein four rows of spots, with each row having each of the three primary colors, are projected to the screen 12 by laser beams emitted from the emitting ends 56. It is not possible with conventional reflective and refractive optics to make a large diffuse spot of light or an array of spots into an infinitely small spot. An image of the source must be formed. By using each of the fiber emitting ends 56 as the image forming or relay or spot projection device for transmission of a single spot, we form an image of the array of emitting ends 56 as a pattern of spots on the screen 12. Each individual spot can be diffraction limited in size, as discussed herein. A complete discussion of the theory of diffraction limits, that is, of how spot size at the final focusing optic and wavelength affects the spot size at a distant target is given in any modern text on Gaussian beam optics, such as "Useful Optics", Walter T. Welford, University of Chicago Press, 1991, Ch. 7, pp. 44-57.

Since the spots of each row are traveling along the same desired path across the screen 12, and striking the same apparent dot location at different times but within the time limit for integration by the eye, we can make the desired composite color at a particular dot location by timing the modulation of each separate color beam at the necessary intensity to occur when each color beam arrives at the desired dot location.

Figure 5S:
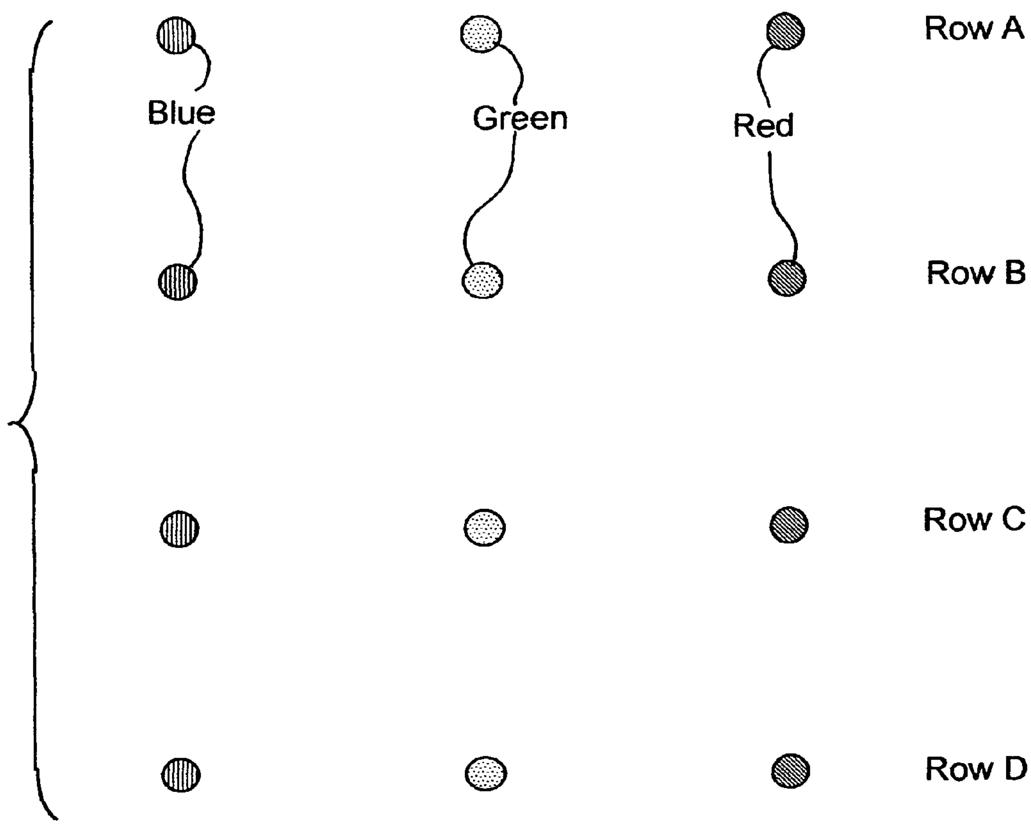
FIG. 5S is a diagram of the pattern of spots projected on a screen using the array shown in FIG. 5.
Figure 16:
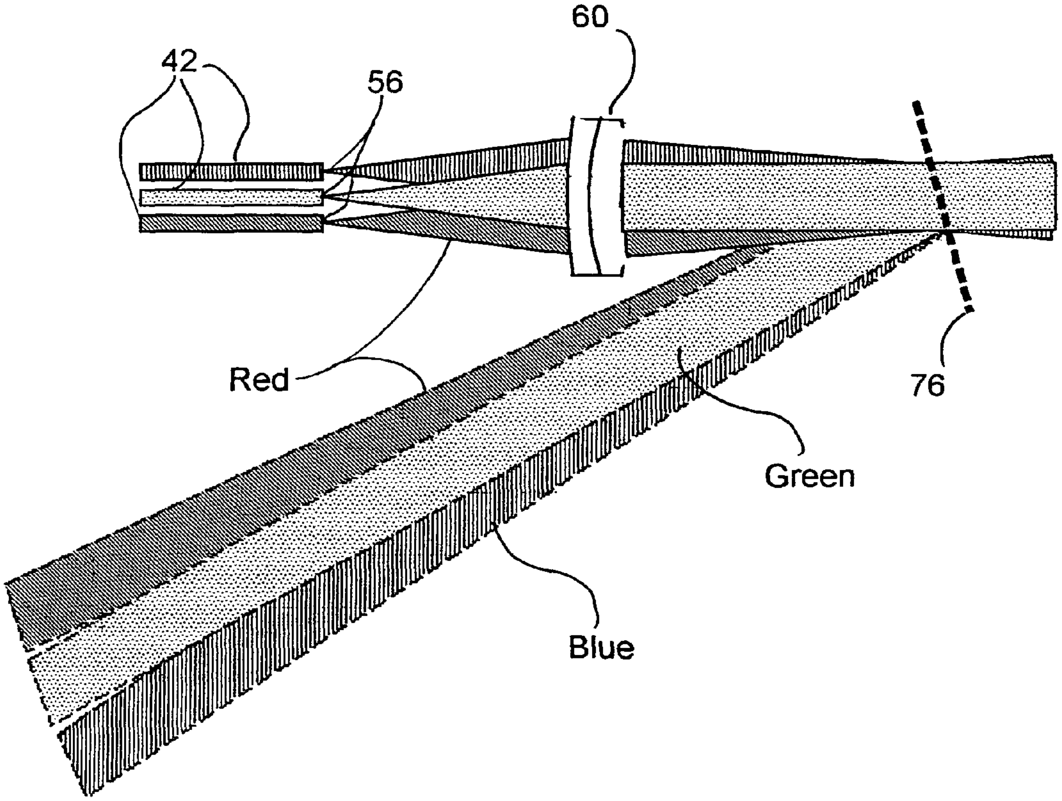
FIG. 16 is a diagram of the beam paths from the emitting ends to the facet of the polygon mirror.

Referring again to the Initial Example of FIG. 5, the rows of the pattern of spots are vertically spaced apart to scan four distinct lines of spots onto the screen 12. As shown in FIG. 16, at no time or position are any of the several separate beams coaxial even though the axes of the beams may cross at a position beyond the output lens 60. In the embodiment shown in FIG. 1 and further described herein one modulated beam is used for each color in each row of fibers 42. Four rows of three beams are scanned in a pattern of spots together to form four spaced apart lines with each horizontal scan pass. For this configuration, this requires three colors times four lines, or twelve separate fibers 42. Thus, the modulated spot projection section 40 of the Initial Example theater laser projection system 10 includes twelve fibers 42, emitting twelve separately modulated laser beams from twelve emitting ends 56 as shown in FIG. 5 to produce twelve spots on the screen in a pattern of 4 rows of 3 spots per row, as shown in FIG. 5S.

For consistency, in the remaining figures describing the preferred array of emitting ends and alternate arrays, we will sometimes describe instead the pattern of spots produced by the laser beams emitted from, and conforming to, the array of emitting ends 56, sometimes consisting of 56R red emitting ends, 56G green emitting ends, and 56B blue emitting ends. In this and subsequent drawings, all emitting ends may not be labeled, so as to avoid cluttering the drawings.

It should be understood that because of the lens used in our preferred system, the actual position of the spots is reversed and inverted on the screen 12 from the position of their corresponding emitting ends in the array, albeit in the same relative pattern. As described in more detail later herein, we refer to the rows of emitting ends from bottom to top as RowA, RowB, RowC and RowD. Using this convention, it may be seen that the lens inverts the image about the axis of the lens, such that the beam emitted from the left-most emitting end of the bottom RowA of the emitting end array will be projected as the right-most spot in the top RowA of the corresponding spot pattern projected on the screen.

While we prefer to use lens(es) as optics for beam shaping and manipulation, we do not exclude, within the realm of our invention, the use of curved mirrors, holographic optical elements and other elements adapted to deflect or refract the laser beams in a desired manner. Such focusing optic should preferably result in the light beams emitted from the emitting ends being substantially parallel when leaving the focusing optic, such as illustrated in FIG. 16, to produce a pattern of spots corresponding to the configuration of the emitting ends.

Optical Fibers of Spot Projection Section

Optical fibers guide light as follows: After insertion into a fiber 42, the light travels along the fiber 42 to a bend, where the difference in optical density between the fiber 42 and its cladding (if any) causes the light to reflect without loss to the next edge of the fiber 42. However, if the size of the fiber 42 is only a few times the wavelength of the light, then the light travels as if it were in a waveguide and does not actually bounce off the walls, but is guided along, bending with the fiber 42, preserving the beam quality. This is called a “single mode” fiber. When the diameter of the fiber increases beyond the single mode range for a particular wavelength of light, then the light emits from the emitting end 56 in luminous patches rather than a single patch, whatever the “quality” of the inserted beam, with more and smaller patches as the relative diameter increases. The beam emitting from a single mode fiber is equally as focusable as a single mode laser beam, i.e., the best of which have a cross-beam power profile in the shape of a Gaussian curve, known as TEM00. We refer to a beam of a lower quality as “multimode”. Multimode beams from a given laser are usually higher power but do not focus to as small a spot as single mode beams given the same focusing optics. If possible, we prefer a single mode beam emitting from the emitting ends 56. However, a TEM00 laser beam would be required for efficient insertion into a single mode fiber. Fortunately, a slightly larger than single mode fiber nearly preserves the point source characteristics of a single mode laser beam. Moreover, slightly larger than single mode fibers can also be used with somewhat less perfect than TEM00 laser beams and still achieve nearly the same benefits, namely a high order of focusability and high insertion efficiency. This results in a spot scanned to the screen that is sufficiently small for high resolution large screen laser projection. Our preferred fiber for such a larger-than-single-mode fiber 42 is an SMF-28 8.5 micron fiber from Corning Glass Works, or equivalent. This fiber is only slightly larger than the 4 to 5 micron diameter required for preserving a single mode beam with visible light. With this fiber, the emitted spot is more than adequate for high resolution, despite not being the ideal theoretically possible.

Our invention may also use to advantage almost any other “light pipes” other than the single mode or nearly single mode step-index optical fibers described previously herein. These alternates may, especially with further advances in optical fiber transmission, include fibers such as gradient index (GRIN) fibers where the change in index between the core and cladding is not practically instantaneous as with the step-index fibers, but rather increases or decreases gradually from center to external surface of the cladding. We may also include hollow glass tubes, light pipes, optical waveguides, liquid filled glass tubes, hollow tubes, photonic crystal fibers, holey fibers, and fibers made of other materials.

In addition to preferring nearly single mode fibers for the reasons set forth above, we further prefer such fibers 42 to have a narrow cone angle of acceptance, also known as numerical aperture (“NA”), for our preferred fiber output head 58 assembly shown in FIG. 5. The cone angle at which the light enters and leaves the fiber emitting ends is determined by the differences in optical density between the core & cladding. The preferred fiber having a narrow cone angle will cause the light emitting from the fiber 42 at the emitting ends 56 to be at a correspondingly narrow cone angle that can be directed at the screen 12 with a simpler output lens 60 and smaller polygon mirror facet size than would otherwise be required. Our preferred Corning Glass Works fiber described above has such a narrow cone angle.

In our exemplary fiber output head 58 shown in FIG. 5, with the fibers adjacent to one another, the spacing between the centers of the fiber emitting ends 56 is between 70 and 125 microns. Again referring to FIGS. 1, 9 and 11, the output lens 60 is preferably a simple two-element achromat of 12.5 to 25 mm focal length. For our preferred system 10 shown in FIGS. 1 and 9, the lens 60 is positioned at a distance from the emitting ends 56 that is appropriate, in consideration of the throw distance from the emitting ends 56 to the screen 12, to focus the beams to produce a pattern of spots, such as shown in FIG. 5S, having the desired resolution on the screen 12 without an intermediate focal point. One may consider skiving the cladding of fibers in a head to cause the emitting ends to be closer together, possibly allowing for single pixel spacing on the screen. However, when fiber cores come closer than about ten microns (for visible wavelengths) to one another, the energy from one will induce light energy into the other causing undesirable “cross talk”.

The emitting ends 56 are secured within the output head 58, and are, in our Initial Example, arranged in the output head 58 in the configuration shown in FIG. 5 in a rectangular array or pattern four fibers high and three fibers wide, with one laser a beam in each of the three primary colors issuing from one of the emitting ends in each row. At the emitting ends 56, the light emits from the fibers 42 and all of the individual beams travel through a single output lens 60. However, it should be understood that our invention should not be limited to this particular pattern, as a multitude of patterns could be employed, as described herein. Further, arrays having one, two, three or more than four vertically spaced rows of fibers 42 and more or less than three fibers 42 per row could be employed. Also, more than one separate array may be used to direct beams through the lens 60.

The use of high power laser beams for projection presents several problems in the insertion of the beam into the insertion ends 44. At the point where the beam is focused into the fiber insertion end, the laser beam has considerable energy. One problem with the high energy is with heating of the air or the cladding of the fiber 42 in the vicinity of the insertion end and at the emitting end. If the focused beam is powerful enough, which is possible at the powers required for theater projection, the air can become ionized and cause dust to be attracted to the space near the fiber insertion end 44 and near the emitting end 56. The dust in the paths of the beam near the insertion and emitting ends and the insertion and output lenses absorbs light energy, explodes, and dirties the face of the respective ends of the fibers 42 and the lenses which then absorbs more light, and the fiber 42 melts or vaporizes or the surface of the lens is pitted or etched.

Further, the transition from glass to air at the emitting end and from air to glass at the fiber 42 insertion ends 44 tends to result in Fresnel reflection losses of beam strength, necessitating even higher power laser energy at the source to make up for any such losses.

In order to avoid these problems, we prefer to employ for the segment of the system such as would be in the ceiling-mounted scanning module 18 shown in FIG. 2, and for the segment including the laser and modulation sections 20 and 30, and the input heads of insertion ends 44 shown in FIG. 3, such as in the closet 16 of the theater 11 of FIG. 2, a circulated or forced air system to move ambient air through HEPA-quality filters which remove substantially all dust and other particulates that might degrade the beams and be exploded to dirty the faces of the optical elements of these segments of the system. The minimization of the Fresnel losses mentioned above may be accomplished by coating both the input and output ends of the fibers 42 with antireflection coatings.

Spot Projection Section Configurations

It will be understood that alternate patterns, arrangements and numbers of emitting ends for producing spots of different colors or multiples of colors could be employed and be within the scope of our invention. Although it is not feasible in this context to provide a comprehensive catalog of all possible patterns and arrangements of fibers, modulators and lasers, the following examples, and additional examples described in connection with alternative spot patterns, illustrate the wonderful flexibility and power of our use of fibers and multiple line scanning. For example, in order to achieve our most preferred resolution of 3000×2000p, it may be necessary, for example, to add two additional rows of emitting ends for a configuration of 6×3 fiber emitting ends to project a spot pattern of 6 rows of 3 spots per row or 18 fibers or spots in total. The additional rows permit scanning of more lines and spots, while continuing to realize the benefits of our invention with respect to modulation rate for each modulator of the system, and to keep the scanning system components within acceptable economy and resolution capabilities. It should be understood that such a fiber emitting end pattern could be employed with our preferred system in place of the 4 row by 3 emitting ends per row array shown in FIG. 5, although this configuration requires additional modulators and other components.

Therefore, our Initial Example and preferred systems represent reasonable balances between system cost and performance for the resolution available at present. It should be noted at this point that the maximum HDTV resolution of which the embodiments described herein are capable is NOT the upper limit of our invention, but is an intermediate implementation constructed because of the anticipated availability of source material of HDTV resolution in the near future. However, as the available resolution of video sources increases, our invention will facilitate the use of such enhanced sources for laser projection.

Different emitting end arrays producing various corresponding spot patterns may also be employed to take advantage of availability of different laser sources. For example it may be possible to use two or more less powerful blue lasers for each row (rather than one per row as shown in FIGS. 1 and 5) to produce the desired intensity of blue spots on the screen without using combining optics or fiber-based beam combining (as described hereinafter) by using a 4×4, 4×5 or 4×6 (as in FIG. 8) emitting end configuration, as illustrated by the 4×6 spot patterns shown in FIG. 8S, such that in each row of emitting ends, one emitting end emits a red laser beam, one emits a green laser beam, and the other two or more emitting ends 56 emit blue laser beams, each having a portion of the total power desired for blue.

As described later herein in more detail in Example 15 employing a 4×6 output head configuration, for a 4 row by 6 spots per row spot pattern shown in FIG. 8S, six beams are reordered or time shifted so that the blue beams strike those dot locations in each line that require a blue component. Thus, our invention permits the simple addition of the number of necessary fibers and emitting ends to produce the desired color intensity and overall brightness with the lasers available or desired.

A 4×4 emitting end configuration producing a 4×4 spot pattern could also be used for a different reason, namely the use of four different wavelengths to form the composite color at each dot location. Examples of the wavelengths that might be suitably employed are a red in the 605 nm range, a green in a 530 nm range, a blue in the 460 nm range, and another red in the 660 nm range. As described in more detail later herein, the color values for each pixel of video data could be suitably converted to the four color scheme by an appropriate color lookup table in the controller section 100 in a manner familiar to anyone skilled in the art. For example, the red in the 660 nm wavelength might be activated when a deep red is needed, while the photoptically more efficient red at the 605 nm wavelength is utilized to form most composite colors and the less deep red colors.

It would also be possible to employ our invention by combining two laser beams of different wavelengths, such as a red beam in the 605 nm wavelength and a red beam in the 660 nm wavelength, or two or more primary colors, after their separate modulation, emitting a beam of both modulated wavelengths from a single emitting end of a fiber by using fiber-based beam couplers or other techniques. In this way, a 4×3 or 4×4 emitting end output head configuration could accommodate a combination of laser beams of 4, 5, 6 or more separate wavelengths needed to form a composite spot at dot locations on the screen to produce a particular combined color.

It should further be understood that fibers may be used to transmit the modulated laser beams to the scanning components without employing multiple line scanning, including in monochrome applications, where a single emitting end directs the beam to the scanning components. Further, a single row of emitting ends may be employed to advantage without multiple line scanning, especially with scanning components having a greater scanning capability than the economical and simple scanning components employed with our preferred system shown in FIGS. 1 and 9 or where resolution requirements are lower.

Spot Projection Section Optical Components

Figure 11:
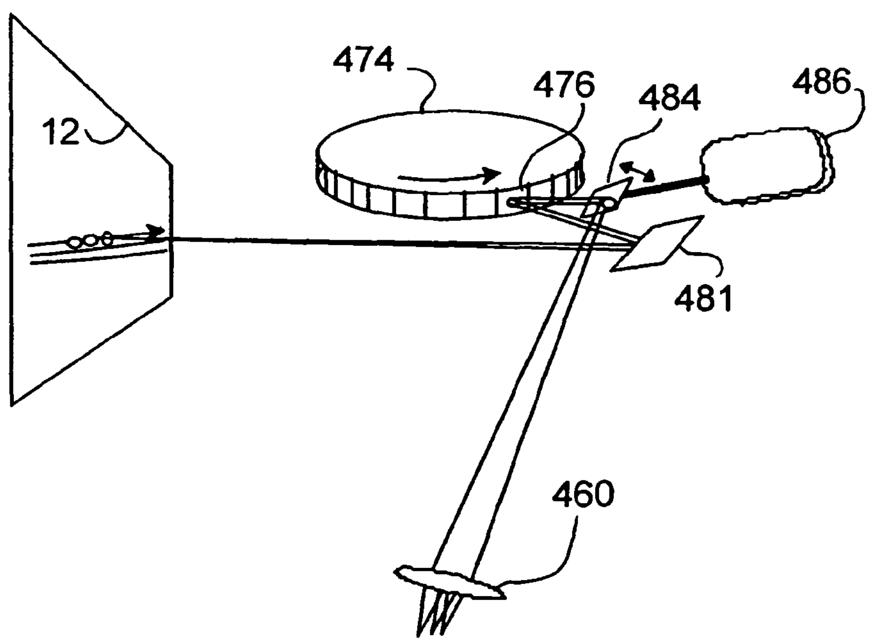
FIG. 11 is a schematic diagram of a system similar to that shown in FIG. 9, except that the aggregate beam is first directed to the galvanometer.

As schematically shown in FIGS. 1, 9 and 11, the spot projection section 40 of this embodiment further preferably includes a single output lens 60 to focus all of the beams emitted from each of the emitting ends 56 onto the screen 12 through the scanning section 70. Given that the fiber emitting ends 56 are placed close to the optical axis of the single output lens, as shown by way of example in FIG. 5, the spots at the distant target on the theater screen 12 as shown in FIG. 5S will be an enlarged image of the pattern of the twelve (actual count depends on number of fibers 42 in the output head 58) fiber emitting ends 56. The size of each spot will be a function of the diffraction limit for its wavelength and the diameter of its beam on the output lens 60. This assumes that the fibers 42 are of the single mode or near single mode type.

The emitting ends 56 are close enough together that the beams from each travel, nearly enough for our purposes, but not exactly, on the axis of the output lens 60. This also means that the output lens 60 can be, for example, a simple best form laser spherical or an aspheric singlet (both with a single element), or a simple achromat doublet or triplet. The use of a single output lens 60 also avoids complex optics and alignment problems inherent in using a separate output lens for each fiber emitting end 56, for each row as a whole or for all ends of each color. For convenience, we refer herein to the beams representing the pattern of spots projected by the array emitting ends onto the facet of the polygon mirror and thereafter the screen, as the "aggregate beam".

Figures 80A, 80B, 80C, 80D, 80E, 80F, 80G, 80H:
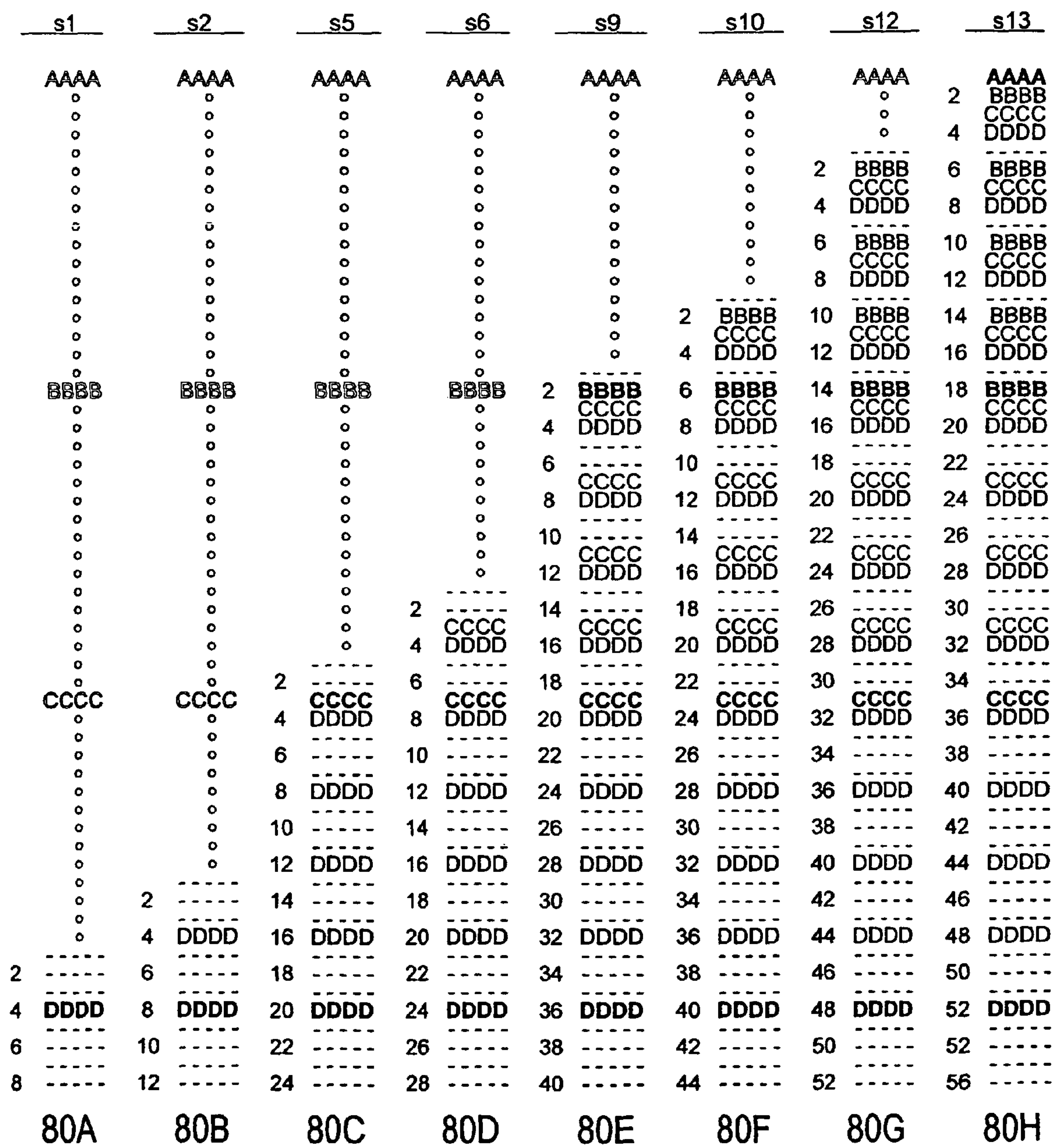
FIGS. 80A through 80P are time sequence diagrams for Example 5, illustrating line reordering for 4×3 spot pattern similar to that of FIG. 28S having an effective row spacing of 17 lines and a vertical adjustment between scan passes of four lines.

Within our invention, one may either have or not have an intermediate focal plane before the final image plane. Also, both prescan and postscan (described more fully hereinafter) configurations may be employed. One may even consider an optical configuration where there is no lens before the first (or only) scanning component as in FIG. 80 or no lens before any of several scanning components as in FIG. 81. Each of these alternatives projects a pattern of spots upon the final image plane. Our preferred embodiment was selected for ease of manufacture and highest potential quality of image.

Laser Beam Insertion and Emission with Optical Fibers

There is a difference between the insertion ends 44 and emitting ends 56 of the fibers 42. As described above, for the insertion end 44 of each fiber 42 there will usually be one beam and one lens 48. Where the beams are combined (or divided) within the fiber using fiber-based beam combiners 29 there will be more (or fewer) insertion ends 44 than emitting ends 56. In our Initial Example there are twelve fibers 42, each with one insertion end 44 and one emitting end 56. The twelve fibers are organized at their emitting ends into a single assembly such that the emitting ends form a desired array. Each of the beams will travel through one of the twelve fibers, be emitted from an emitting end 56 of each fiber 42 and thence travel as an aggregate beam through the single output lens 60. If the beams are different colors and the emitting ends 56 are equidistant from the output lens 60, then with a simple lens as the output lens 60 the focal length of the output lens 60 may be different for each color. Only one color would then be in exact focus on the screen 12, and the other two will be out of focus to an unacceptable extent. Our use of an achromat lens as the output lens 60 in our preferred embodiments satisfactorily resolves this problem.

Scanning Section Components

The function of the preferred scanner or scanning section 70 according to our invention is to sweep the laser spots across the screen 12 in a vertical succession of horizontal lines. Thus, the scanner is positioned to deflect the light beams emitted from the emitting end of each of said fibers to simultaneously illuminate separate locations on the viewing surface. In the scanning section 70 of the projection system 10 shown in FIGS. 1 and 9-12, two scanning components are employed. One is called the "line scanner", or horizontal "line" scanning subsystem 72, since it scans the spots produced by the beams in horizontal lines in a sweeping or line direction along dot locations across the screen 12. We prefer a type of mechanical line scanner such as rotating polygon mirror 74 shown in FIGS. 1 and 10, having between 24 and 60 mirrored facets 76, but most preferably 28 facets. It is possible to replace the mirrored facets 76 by small lenses or by holographic material, but these solutions tend to increase the cost of the line scanning components and introduce other issues. The polygon mirror 74 is rotated by polygon mirror motor 78, typically in a range of 25,000 to 50,000 rpm. The speed of the polygon mirror motor 78 is preferably controlled by polygon mirror controller 80. Our invention facilitates the use of a lower cost off-the-shelf line scanner in the form of the polygon mirror 74, such as in our preferred motor/polygon mirror and driver assembly similar to Model No. 1-2-2693-601-34 manufactured by Lincoln Laser Company of Phoenix, Ariz.

Referring to FIG. 9, the other scanning component of the scanning section 70 is called the "frame scanner", or vertical frame scanning subsystem 82, since it vertically displaces the projected lines, causing successive scans to occur further down the screen 12. The frame scanner cycles 50 to 120 times a second in keeping with the desired refresh rate. A preferred form of frame scanner is the galvanometer driven mirror 84 shown in FIG. 9. The mirror 84 is mounted with a galvanometer motor 86 and galvanometer motor driver 87 that pivots the mirror 84 to reflect the projected lines from the top to the bottom of the screen 12 during one frame. This form of frame scanner is relatively inexpensive, and our invention facilitates its use in a video laser projection system. We prefer to use a galvanometric frame scanner manufactured by Nutfield Technology, Inc., Windham, N. H., model # HS15, with D-QD-15 driver.

This preferred continuous adjustment mirror moves the spots forming the lines down the screen to accomplish continuous raster scanning as previously described and tends to produce slightly slanted lines. Given the large number of lines being written at the desired resolutions, this slight slant is not noticeable to the viewer, being approximately 0.8 inch from one side of a typical movie theater screen to the other, and avoids the complicated and more expensive stepped adjusting, non-continuous raster scanning approach, necessary to adjust each scan pass or line discretely. Further, if the discrete adjustments of a stepped adjusting mirror are not consistent or quick enough, i.e., aren't completed between the end of one line and the beginning of the next, undesirable image artifacts may be introduced. The preferred galvanometer mirror assembly 84 has a recovery rate from the bottom of the frame to the top of the next frame of approximately one millisecond.

Figures 83A, 83B, 83C, 83D, 83E, 83F, 83G, 83H:
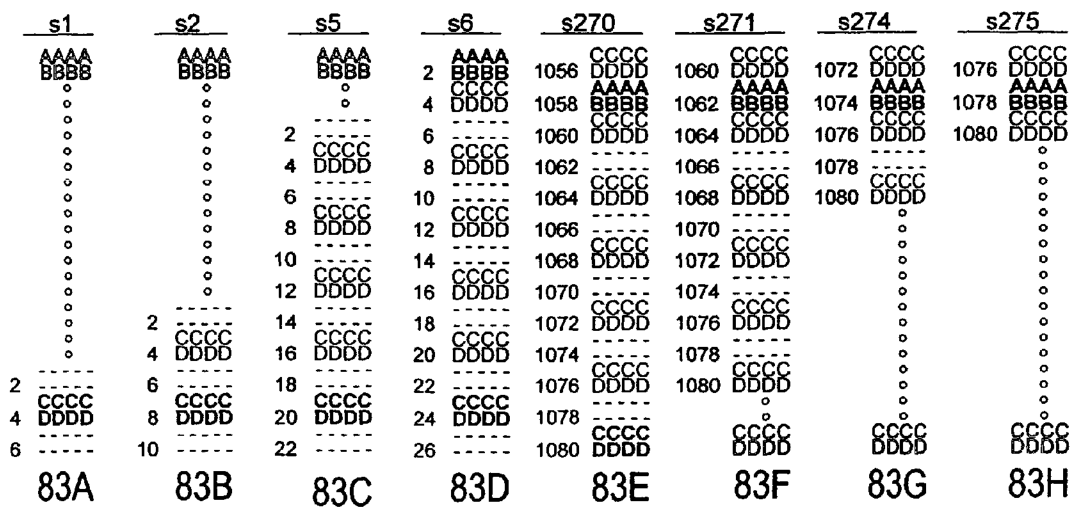
FIGS. 83A through 83H are time sequence diagrams for Example 12, illustrating the line reordering of the pattern of spots shown in FIG. 40S.
Figures 84A, 84B, 84C, 84D, 84E:
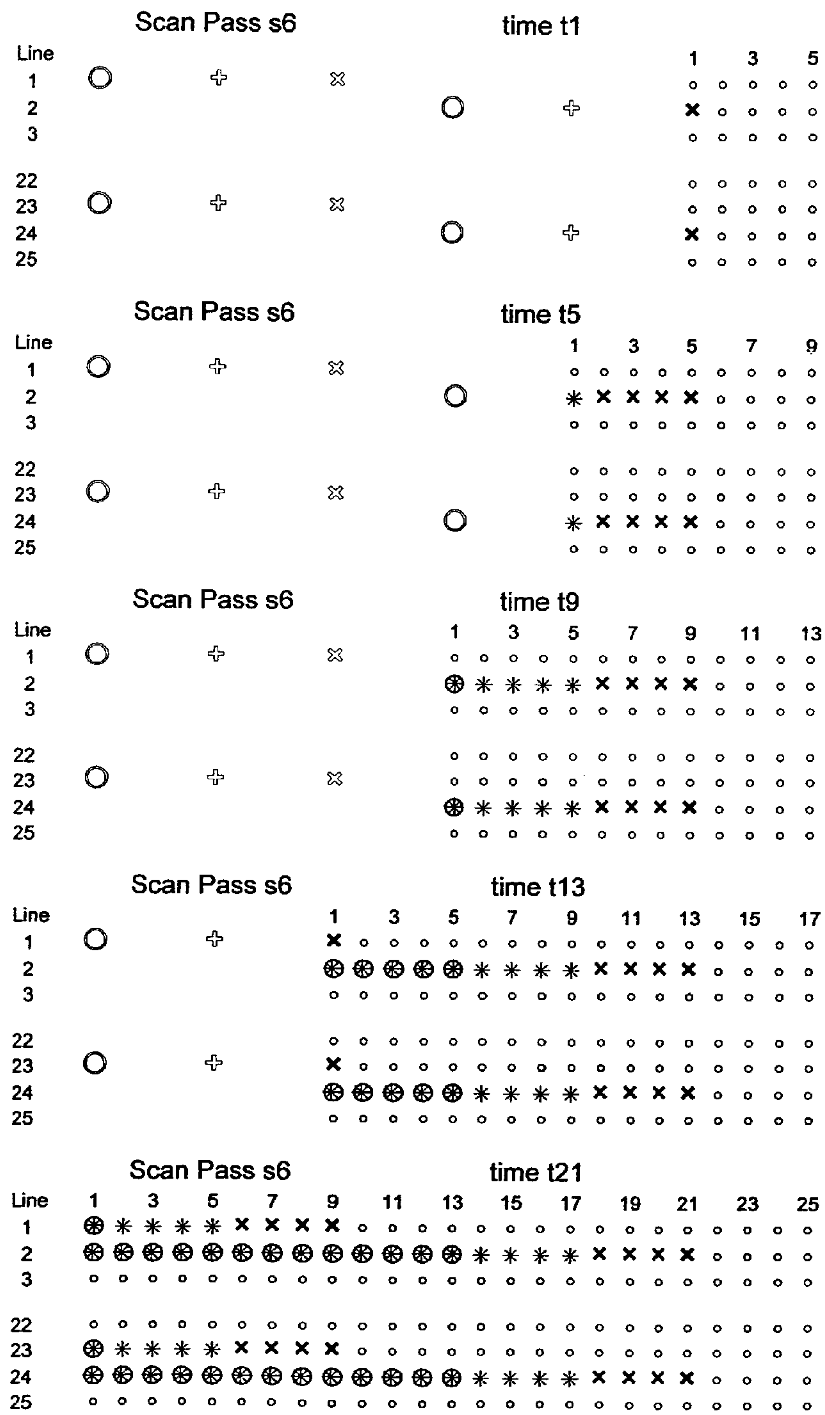
FIGS. 84A through 84J are time sequence diagrams for Example 12, illustrating line reordering for a 4×3 spot pattern of FIG. 40S having an effective row spacing of 1 line between RowA and RowB, 21 lines between RowB and RowC, and 1 line between RowD and RowD, and a vertical adjustment between scan passes of 4 lines.
Figure 84F:
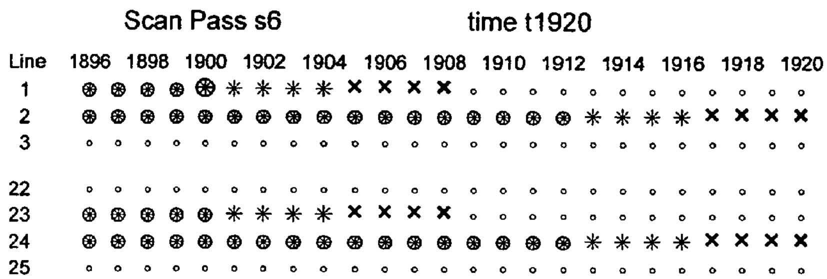
Figure 84G:
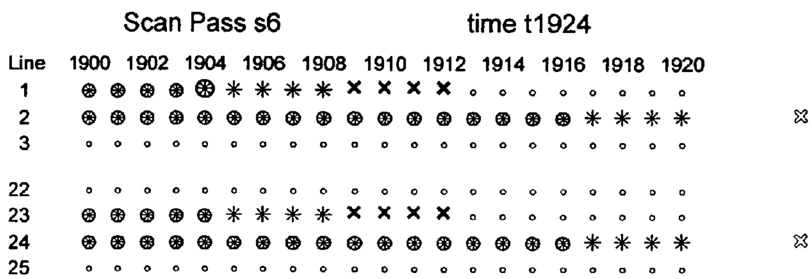
Figure 84H:
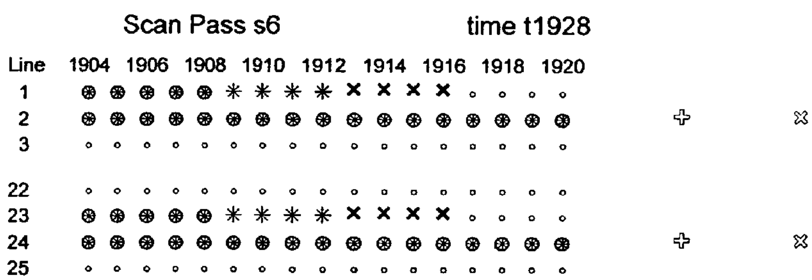
Figure 84I:
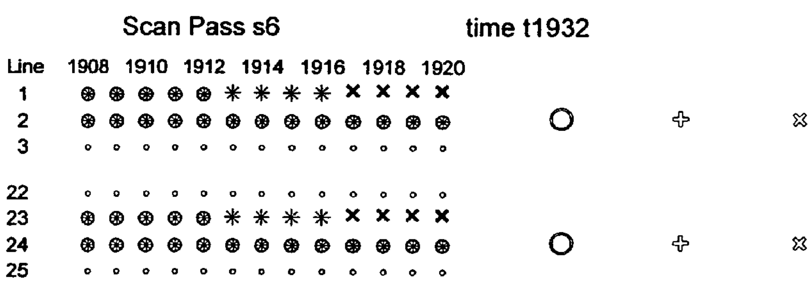
Figure 84J:

Other frame scanning apparatus, such as large rotating polygon mirrors, acousto-optic techniques, and resonant mirrors may be used within the contemplated scope of the present invention. One may even contemplate within our invention a scanning system as in FIG. 83 where motion of the fiber head itself is used to effect the scanning process. In this configuration we consider the mechanism that moves the fiber head to be the scanner. Further, although not preferred, it may be convenient to employ a relay mirror 81 to reflect the aggregate beam from the galvanometer mirror 84 in the appropriate path to the screen 12.

FIG. 16 illustrates the paths of beams from their emission from three of the emitting ends through the output lens 60 to their substantially coincident position on the mirror facet 76 of the polygon 74. The preferred single achromat output lens 60 enables the location of the emitting ends and lens 60 in a position to focus the collective beams to form the minimum size of "aggregate spot" on the facet 76 for reasons described below. In our preferred embodiments, the size of the mirrors in each of the galvanometer mirror 84 and polygon mirror facets 76 must be larger than the aggregate spot image reflected from the facet 76 by the pattern of beams directed from the output lens to the polygon mirror facet 76 and thence to the galvanometer mirror 84. The size of the galvanometer mirror 84 must be large enough to contain the pattern of beams or aggregate spot when its incidence is at an angle in one axis, and to contain the beam on the other axis as it is swept from side to side by the polygon mirror facet 76. As the ideal facet size described above is not practicable, we have determined that a facet 76 width about 2.5 times the aggregate spot diameter on the facet 76 is adequate for our uses. Our preferred aluminum polygon mirror 74 has a facet 76 size adequate for high resolution, or 5.4 mm wide by 10 mm tall. At times we refer to the aggregate of the scanning system components, both the line scanner and the frame scanner, as the "scanner". Such scanner performs the basic scanning functions to produce a raster scan or other scan appropriate for use with our invention.

Figure 10:
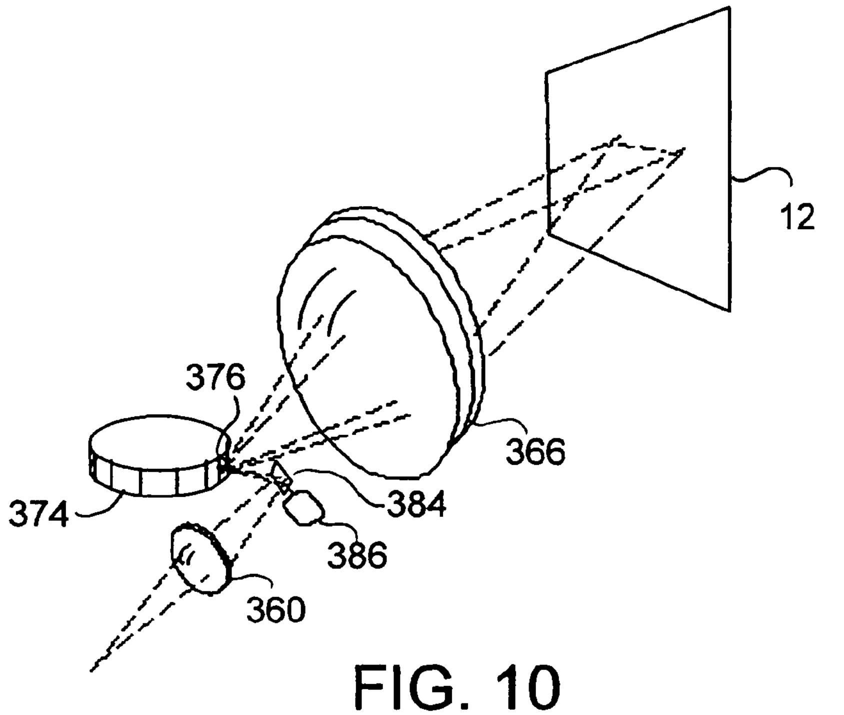
FIG. 10 is a schematic diagram of an alternate scanning section wherein the output lens is focused near to the polygon mirror facet and a complex relay lens focuses the pattern of spots onto the screen.

As an alternative to the simple output lens 60 described above, we may, within our invention, narrow the aggregate spot on a facet 376 of a polygon mirror 374 similar to the polygon mirror 74 by changing the focus of an output lens 360 as shown in FIG. 10, causing the beam from the polygon mirror facet 376 to expand, and then focusing the consequently wider pattern of aggregate beams reflected from the polygon facet 376 again with a complex lens 366, such as an F-Theta lens, onto the screen 12. This approach allows for smaller facets 376 because the pattern is focused to a smaller area on the polygon mirror facets, but requires the complicated lens array 360 and 366. Conversely, in the system shown in FIG. 16, we allow the aggregate beam emitted from the output head 58 to be reflected onto the polygon mirror facet 76 so that the aggregate spot is almost exactly the same size on the polygon mirror 74 as the aggregate spot is as it emerges from the output lens 60, and no further focusing lens, especially no complicated lens arrangement as in the system of FIG. 10, is required. From the foregoing alternatives, it may be understood that our simple output lens 60 and avoidance of focusing lens 366 after the horizontal and vertical scanning subsystems 72 and 82, are major factors in avoiding image artifacts and in attaining high resolution and high optical efficiency in our preferred embodiments. Thus, our system uses a greater proportion of the power generated by the laser sources, because less laser beam power is sapped by complex optics. This optical efficiency allows our system to employ lower aggregate laser power than would be required with prior art laser projection systems for large screen projection.

Our preferred implementation shown in FIGS. 1 and 9 calls for the image beam to strike the polygon mirror facet 76 first and then the galvanometer mirror 84. Alternatively, as shown in FIG. 11, with a taller facet 476 of polygon mirror 474, the opposite order of horizontal and vertical mirror reflection may be implemented allowing for a smaller galvanometer mirror 484 and galvanometer transducer 486, although this may introduce unwanted image artifacts. Either vertical or horizontal scanning component order, or any other scanning technique that moves a beam for that matter, falls within the purview of the present invention.

As previously noted, referring again to FIGS. 1 and 9, the rotating polygon mirror 74 we prefer to use is relatively inexpensive. However, while it is possible with diamond turning to create mirror facets 76 in such a polygon mirror that are optically indistinguishable, it is not possible to fabricate those facets 76 so that their vertical and horizontal pointing accuracy is sufficiently accurate for this application. Some consideration in the system design must be made to compensate for the inaccuracies, at least at the resolutions desired.

Those skilled in the art will recognize that there are many well known techniques for correcting for vertical facet pointing errors. We prefer to use the galvanometer of our vertical scanning subsystem 82 to effect this correction, as the pattern of the errors from facet to facet with our preferred polygon approximates a sine wave, easily tracked with our preferred galvanometer. Referring again to FIG. 9, the horizontal errors are preferably corrected with another component of the facet error detection assembly 90, which optically detects on a continuous basis when each facet 76, referred to hereinafter as the "active facet", is in fact in the correct position to initiate scanning of the line at the appropriate dot locations on the screen. The signal representing the positioning of the active facet is called the "facet pulse". This detection is accomplished by sensing a low power laser beam from facet detection laser 92 with photo detector 98 positioned such that the active facet 76 is in the exact position for initiation of a line. Thus, the horizontal error is corrected by initiating the timing of release of data to begin the projection of spots for a given scan pass by the modulated laser beams incident on the facet 76 so that the beam writes spots from appropriate data pixels at the appropriate position on the facet and consequently on the screen, thereby automatically correcting the horizontal facet error.

Scanning Section Optical Configurations

There are two basic configurations of optics for image scanning systems, pre-scan optics and post-scan optics. Almost all prior art laser projectors that use polygon mirrors use pre-scan optics similar to that shown in FIG. 10, where the lens comes after the scanning optics (so named because the SCANNING occurs BEFORE the lens) because of some of the following advantages: the output field can be made flat, the final focusing optic that determines the resolution is closer to screen, and barrel or pincushion distortions may be introduced or eliminated to compensate for non-ideal screen surface profiles. Further, with prescan optics partial correction of the polygon's vertical facet error can be accomplished with complex but passive optics. However pre-scan optics have the following disadvantages: color separation, uneven focus center-to-corner, uneven brightness center-to-corner, and they require larger complex lenses, especially for color images and high resolution.

While pre-scan optics may be used with embodiments of our invention, we prefer to use a post-scan optical configuration (again so-named because SCANNING occurs AFTER the lens, if any), such as shown in FIG. 1. Post-scan optics give better resolution and brightness, and avoid the image degradation and power losses typically resulting from complex optics. The advantage of this optical configuration, particularly within our preferred post-scanning embodiment, is that there still is no intermediate virtual image formed before the screen, in contrast with typical "pre-scanning" optical configurations, thus preserving resolution and orthogonality.

Reordering of Video Data for Multiple Spot Projection

The scanning components in our Initial Example determine the manner in which the four spaced apart rows of three spaced apart color spots are reordered in accordance with our invention. The closest feasible physical spacing of the emitting ends 56 in the output head 58 of our Initial Example as shown in FIGS. 1 and 5, assuming a desired resolution of 1920×1080p, produces an effective vertical row spacing of approximately ten or more lines, and a horizontal spacing between red, blue and green color spots of approximately 10 or more dot locations. Although we later provide examples of such spacing, the following illustrations of this data reordering assume a vertical spacing of five lines (4 lines of dot locations between rows of spots of the spot pattern on the screen) and a horizontal spacing of five dot locations within a row (four dot locations between each spot of a row of the pattern of spots on the screen).

This requires a re-ordering of the video data. FIGS. 13A through 13J and 14A through 14E illustrate the effect of reordering the writing of lines and dot locations within lines for the first embodiment of our invention, as briefly described in the Summary of the Invention section hereof, assuming a frame scan top to bottom, line scan left to right, and an effective row spacing of five lines and a horizontal spacing of five dot locations within a row. In FIGS. 13A through 13J, the composite color for each pixel is written at the appropriate dot location by scanning the image formed by the emitting ends 56 of the fibers 42 in one horizontal row of the output head 58. In the exemplary order, the dot location is first written by a red spot represented by "x", then by a green spot represented by "+", and by a blue spot represented by "○". A green spot overwriting a dot location already written with a red spot is shown by "*" and a blue spot overwriting a dot location already written by red and green spots is shown by "⊗". In FIGS. 13A-13J the dot location currently written by a spot at a particular time "t" during a particular scan pass is indicated by boldfacing, and a spot that is blanked because it will not at that time write a location within the frame on the screen is indicated by outlining.

For convenience in describing the time reordering of the color values of the pixel data for a particular dot location, also referred to as time combination or time combining, we refer to the time at which each adjacent dot is sequentially illuminated by the spot of the laser beam emitted by the appropriate emitting end, starting with the dot location at the beginning of the frame line, as time t1, t2, t3, . . . . For example, at time t1, the first dot location of a line is first written, at time t2 the second dot location of a line is first written. For the preferred 1920×1080p resolution, the time will range at least from time t1 to time t1920, and possibly to time t1921 and further, depending upon the amount of overscan necessitated by the dot spacing between spots in a row of the array.

Time Combining of Multiple Spots During Line Scanning

Figure 13A:
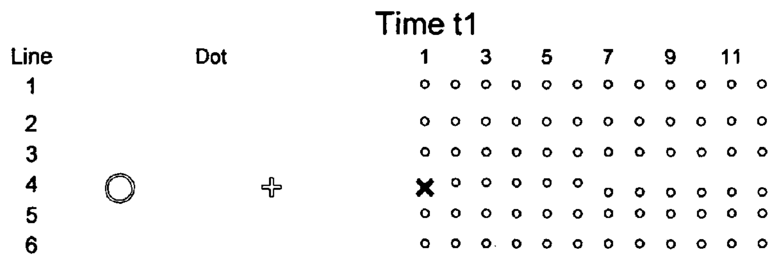
FIGS. 13A through 13J are time sequence diagrams illustrating the time shifting of spots of each primary color in a row of a pattern of spots shown in FIG. 5S to form composite spots at dot locations of a line of a frame.
Figure 13B:
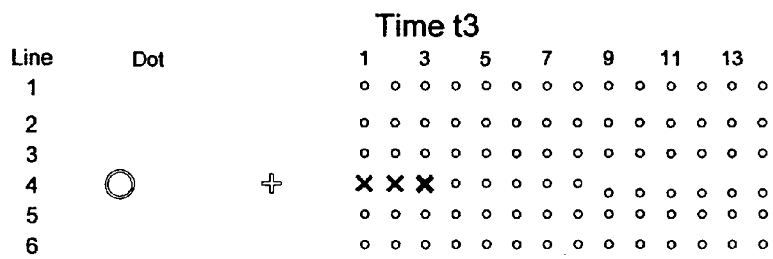
Figure 13C:
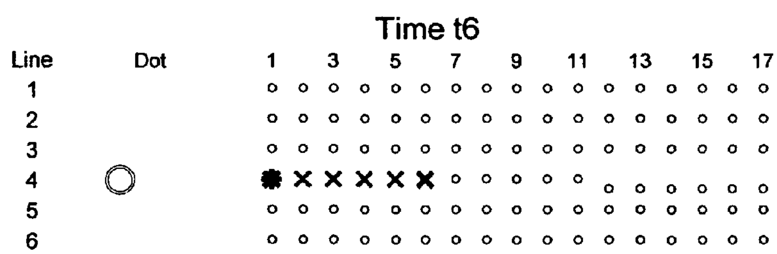
Figure 13D:
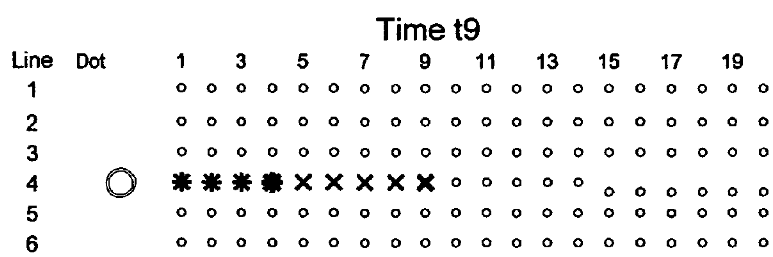
Figure 13E:
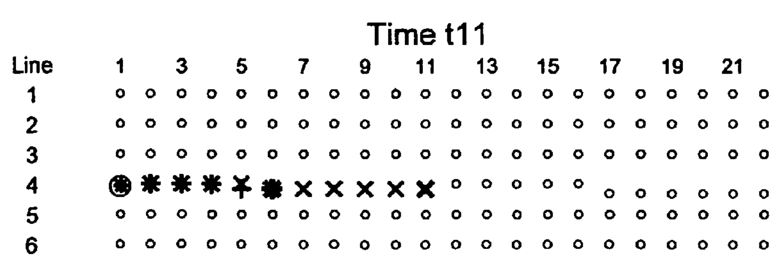

As shown in FIGS. 14A through 14E, to be discussed in more detail later herein, the 4 row by 3 spot per row array projected by the Initial Example preferably writes the fourth line of the frame on the first scan pass s1. Consistent with FIG. 13A, in the scanning of this line with the bottom row of spots, at time t1 of the first scan pass the first pixel in the fourth line is written by the red x beam modulated for the value of the red color assigned to that pixel in the video data, while the green and blue beams, which if activated would write pixels to the left of the frame (shown with outlined, lighter figures) are not yet activated (also referred to herein as "blanked" and sometimes identified by "b" in the Tables below) by their respective modulators. Continued rotation of the polygon mirror 74 successively positions the spot produced by the red beam at the locations of the second, third, fourth and fifth dots, which are respectively written at times t2, t3 (shown in FIG. 13B), t4, and t5 with the values of red assigned thereto in the pixel data, and the green and blue beams are still blanked. As shown in FIG. 13C, further rotation of the polygon mirror 74 positions the red x spot at the sixth dot location, and the first and sixth dots are respectively written at time t6 by red x and green + spots having the values of red and green respectively assigned thereto, with the blue spot still blanked. Continued rotation of the polygon mirror 74 successively positions the red x and green + beams at the locations of the seventh, eighth, ninth (shown in FIG. 13D) and tenth dots, and at the second, third, fourth (FIG. 13D) and fifth dots, respectively, which are respectively written at times t7, t8, t9 (FIG. 13D) and t10 with red x and green + spots having the values of red and green respectively assigned thereto, and the blue beam remains blanked because it is not yet in position to be written within the frame. As shown in FIG. 13E, still further rotation of the polygon mirror 74 positions the red x beam at the location of the eleventh dot, and the first, sixth and eleventh dots are written at time t11 by the red x, green + and blue ○ beams with the values of red, green and blue respectively assigned thereto. Continued rotation of the polygon mirror 74 successively positions the red x, green + and blue ○ beams at the locations of the remaining dots in the fourth row of the frame with the values of red, green and blue respectively assigned thereto.

It is apparent from the illustration of FIGS. 13A-13E that with this method according to our invention, a spot of each color modulated for the value of that pixel in the image data is projected for every dot location in that line on the screen. In the Initial Example the time between the arrival of a color spot and the subsequent arrival of the next color spot at a single dot location on the screen is on the order of one microsecond (1 μs).

Figure 13F:
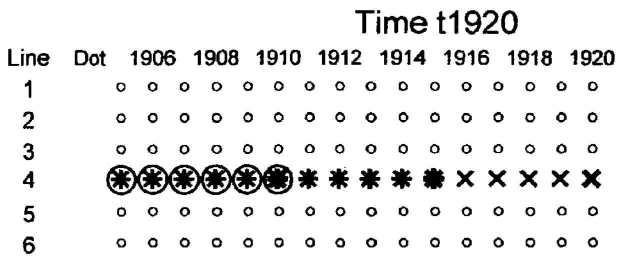
Figure 13G:
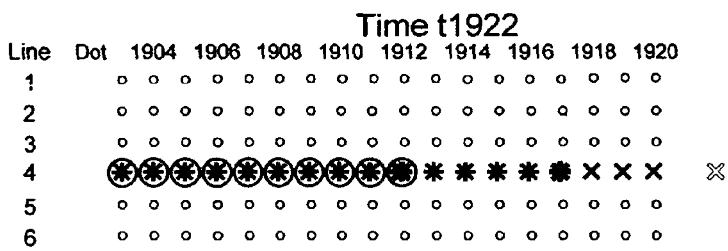
Figure 13H:
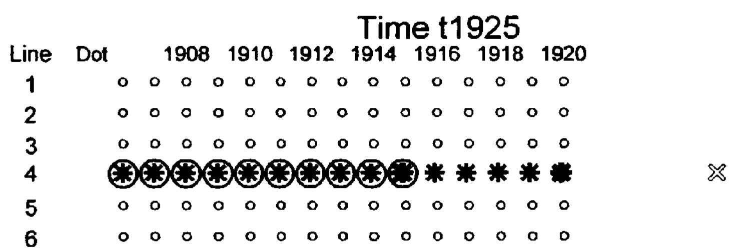
Figure 13I:
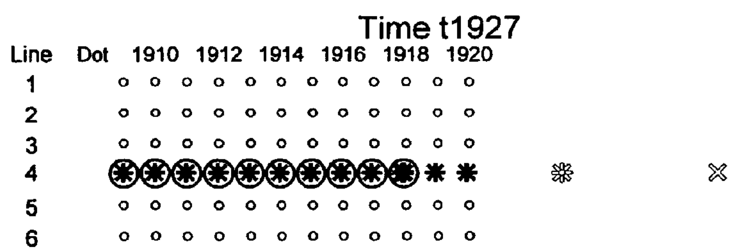
Figure 13J:
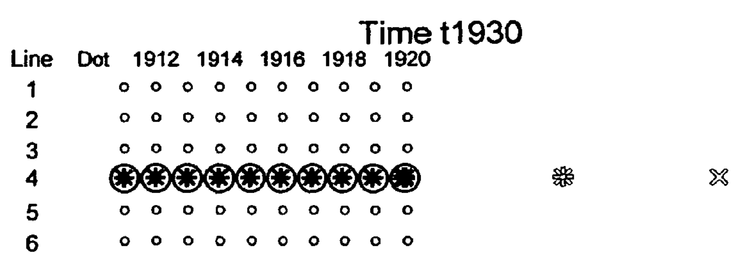

Referring now to FIG. 13F, at the end of the first scan pass s1, the last dot 1920 in the line will be written at time t1920 with the appropriate red x value, and the dots 1915 and 1910 with green and blue spots, respectively. Referring to FIG. 13G, continued rotation of the polygon mirror 74 will at time 1921 write dots 1916 and 1911 for green and blue, respectively, with the red beam blanked. The process repeats until, as shown in FIG. 13H, at time t1925 the green + spot writes the last dot location in the line. As shown in FIG. 13I, continued rotation at time t1926 will write dot location 1916 with the blue ○ spot, and the green and red spots are blanked. Finally, at time t1930 as shown in FIG. 13J, the blue ○ spot writes dot location 1915, which has already been written at times t1920 and t1925 by the red and green beams, respectively, and at such time t1930 the red and green beams remain blanked, whereupon the fourth line of the frame has been completely scanned.

After the galvanometer mirror 84 adjusts, or has adjusted, downward a spacing equivalent to four lines from the beginning of the last set of lines, the next facet 76 of the polygon mirror 74 in position to begin writing the next set of four lines at scan pass s2. In our preferred implementation as noted previously the galvanometer mirror 84 may actually move continuously so that all of the lines forming the image slant a minute amount, and consequently the spots arrive four lines down at the start of the next line scan pass as if the galvanometer mirror 84 had moved all at once between lines.

The positioning of separate emitting ends 56 for each row of the output head 58 projecting a pattern of spots such that they are separated on the screen by more than one dot location is preferred for ease of fabrication of the output head 80. However, it is possible, as described for an alternate embodiment herein in Example 28 to combine the different colored beams prior to insertion into the insertion ends of the fibers 42, such that four vertically adjacent single emitting ends emit spots of composite color. These composite color spots would be directed to the scanning components and thence to the screen, thereby obviating the need for the reordering the color values of horizontal pixels of each line.

It should also be understood that the adjustment of the time at which a beam of a desired color and intensity strikes a particular dot location on the screen within each line, and as shown in later embodiments within different lines, is a factor of data manipulation by the controller section. Hence, the assignment of colors to the emitting ends within each row, and as described later the relative position of emitting ends within rows, may differ from row to row of emitting ends. That is, the time combination used to write the line of dot locations with spots projected by the beams from one row is not necessarily the same as that required to write the line of dot locations with spots projected by the beams emitted from any other row of the output head array of emitting ends, especially considering potential manufacturing variations in the head.

Reordering of Multiple Rows of Spots During Frame Scanning

Referring again to FIGS. 14A-14E, although not restricted to such a scheme, for the Initial Example of our invention described herein, each vertical adjustment of the preferred galvanometer mirror 84 is four scan lines, equal to the number of rows of emitting ends of the output head 58. For purposes of illustration in connection with this first embodiment, the effective row spacing between each row of the emitting ends 56 in the output is five lines. Unlike the reordering required to write a beam for each emitting end 56 of a row on the same spot, for vertical scanning it is generally desired to write each unique line with only one of the rows of the output head 58. Thus, when the frame is complete, each row of the output head 58 will have written a unique set of lines, and all of the lines in the frame will have been written once each.

For convenient reference herein in describing line reordering, we refer to the rows of spots projected from the emitting ends of the output head of the Initial Example from top to bottom as rows "RowA", "RowB", "RowC", and "RowD", respectively. Further, for each of the figures involving the 4 row by 3 emitting ends per row output head configuration, for each scan s(x), where x is the sequential number of horizontal scans (e.g., for the preferred 1920×1080p resolution, s1 at the first scan pass at x=1, s2 at the second scan pass at x=2, and s273 at the last scan pass at x=273). Lines written by RowD, RowC, RowB, RowA of spots written by the beams emitted from the emitting ends are indicated by "DDD", "CCC", "BBB", "AAA", respectively. As with FIGS. 13A-13J, for FIGS. 14A-14E, currently written lines of the frame are indicated by boldfacing ("AAA", "BBB", "CCC" and/or "DDD"), and blanked lines are indicated by outlined ("AAA", etc.).

Figures 14A, 14B, 14C, 14D, 14E:
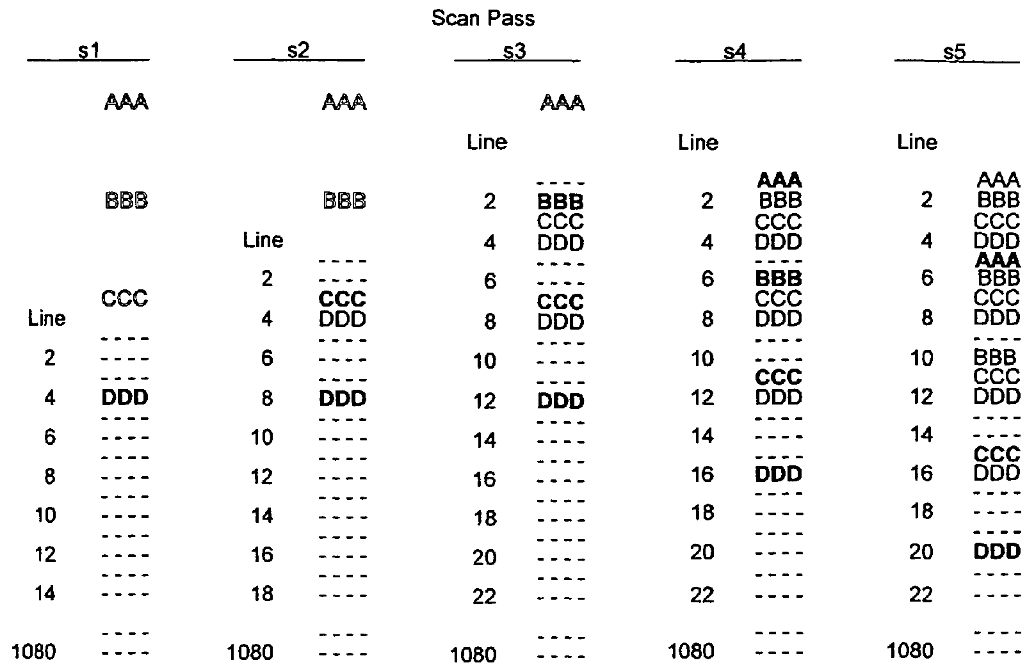
FIGS. 14A through 14E are time sequence diagrams illustrating the out-of-order illumination of lines for scan passes at the beginning of the frame with vertically spaced rows of the spot pattern shown in FIG. 5S, showing blanking of rows of spots not within the frame.
Figures 15A, 15B, 15C, 15D, 15E:
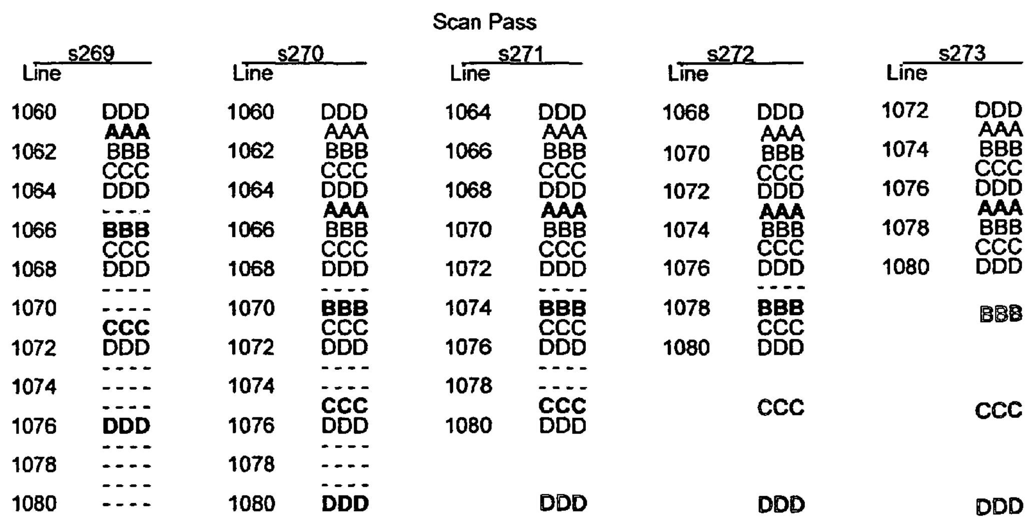
FIGS. 15A through 15E are time sequence diagrams illustrating the out-of-order illumination of lines for scan passes at the end of the frame with vertically spaced rows of the spot pattern shown in FIG. 5S, showing blanking of rows of spots not within the frame.

For the example of the Initial Example in FIGS. 1, 5 and 5S, the first line written at scan pass s1 is preferably the fourth line from the top of the frame (line L4) with the spots (one of each color) of the bottom row RowD, collectively shown by the boldfaced DDD in FIG. 14A, while RowC, RowB, and RowA of spots are blanked as shown by the outlined CCC, BBB and AAA in FIG. 14A. After the entire line L4 is scanned by rotation of one of the polygon mirror facets 76, the galvanometer mirror 84 will preferably have adjusted downward a distance equivalent to four frame lines, and scan pass s2 will be initiated when the next succeeding facet 76 is in position. Because of the effective five line row spacing (or 4 lines of dot locations between rows of spots) of the rows of spots as noted previously, lines L8 and L3 of the frame are written as shown in FIG. 14B during scan pass s2 by the spots of RowD and RowC (boldfaced DDD and CCC in FIG. 14B), while RowB and RowA of spots remain blanked (outlined BBB and AAA in FIG. 14B). Note that the non-boldfaced DDD in line L4 of the frame at scan s2 shown in FIG. 14B, and in all of the remaining figures relating to similar line reordering, denotes that those frame lines were previously written, in this case during scan pass s1 shown in FIG. 14A.

By the time of scan pass s3 shown in FIG. 14C, the galvanometer mirror 84 will again have adjusted downward by a distance equal to four lines, lines L12, L7 and L2 will be written by the spots of RowD, RowC and RowB (boldfaced DDD, CCC and BBB in FIG. 14C) and the spots of RowA are still blanked (outlined AAA in FIG. 14C). At scan pass s4 shown in FIG. 14D, lines L16, L11, L6 and L1 are written by the spots of RowD, RowC, RowB and RowA. At scan pass s5 shown in FIG. 14E, lines L20, L15, L10 and L5 are written by the spots of RowD, RowC, RowB and RowA. Thus, it can be seen from this illustration that by the end of scan pass s4, lines L1-L4 of the frame have all been written, albeit out of order; of the next four lines, only lines L6, L7 and L8 have been written; and of the following four lines, only lines L11 and L12 have been written, and of the fourth set of four lines, only line L16 has been written. The not-yet-written lines will be written on subsequent passes.

As shown in FIGS. 15A, 15B, 15C and 15D, assuming a resolution of 1920×1080p, continued regular downward adjustment of the galvanometer mirror 84 will eventually result in writing lines L1065, L1070, L1075, and L1080 of the frame with spots from RowA, RowB, RowC and RowD, respectively, at time s(1080/4), or scan pass s270. At scan pass s271, lines L1069, L1074 and L1079 will be written by spots of RowA, RowB and RowC, and RowD will be blanked. At scan pass s272, lines L1073 and L1078 will be written by spots of RowA and RowB, and RowC and RowD will be blanked. At scan pass s273, line L1077 will be written by spots of RowA, and RowB, RowC and RowD will be blanked. After line L1077 is written as shown in FIG. 15E, the frame is complete, and the galvanometer mirror 84 is adjusted to the top of the frame and the next frame is commenced. Thus, there will be three scan passes at both the top and bottom of the frame where at least one row of spots is blanked. Alternate embodiments having different reordering sequences are disclosed herein.

Based on the foregoing examples, a primary function performed by the controller section 100 may be more generally described as controlling the reordering of the digital input signals required for our invention. In the case of the first embodiment, the controller section 100 must provide the pixel data to the modulator section so that the beams inserted into each fiber are modulated to produce a color of the desired intensity at each dot location on the screen 12 at the time the scanning section 70 is in a position to illuminate that particular dot location. It should be understood that different spacings of the rows of emitting ends is possible, and even desirable. Several examples of such different row spacings, and of alternate head configurations, are described later herein.

Alternative Scanning Components

Continuing with the foregoing discussion of the scanning section, although we prefer to use moving mirrors in the form of a rotating polygon mirror 74 with multiple facets 76 for horizontal scanning and a galvanometer mirror 84 for vertical adjustment, our invention may facilitate the use of alternative scanning methods and components.

Some of these include using two pivoting or tilting mirrors moving by galvanometers or resonance scanners, acousto-optic beam steering, digitally controlled chip-mounted mirrors, piezo electrically controlled vertical and horizontal mirrors, or holographic beam steering replacing the polished facets 76 of the polygon mirror 74 of the first embodiment.

Two Pivoting Oscillating Galvanometer Mirrors

Figure 89:
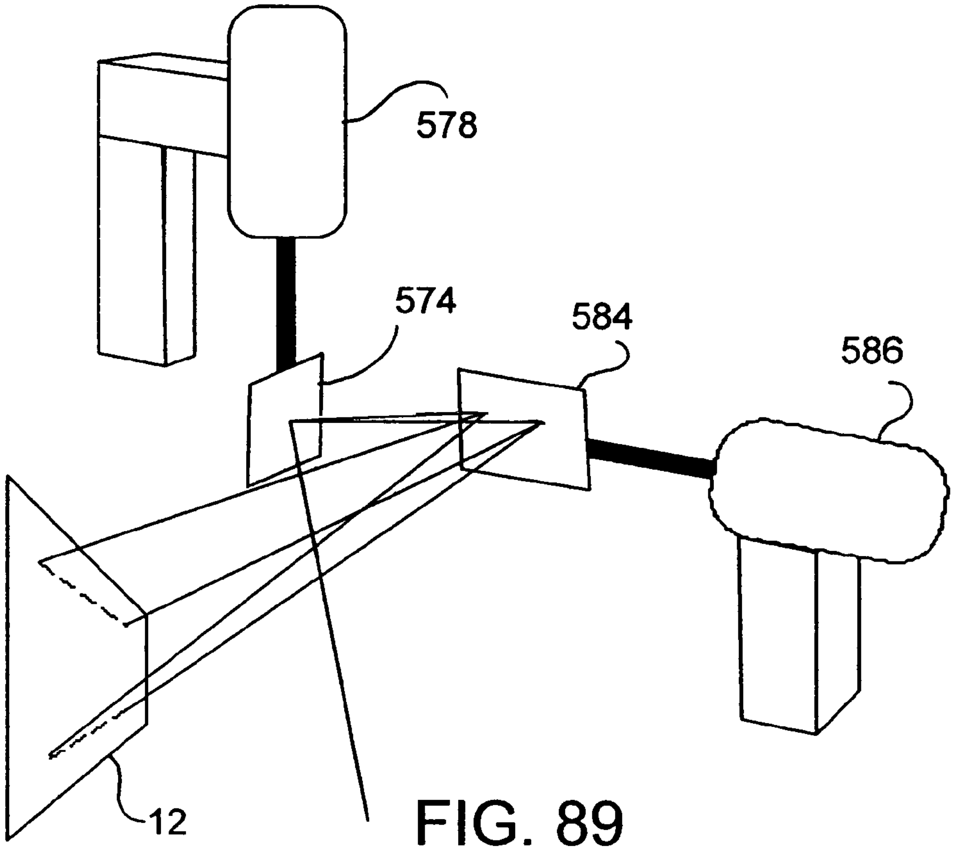
FIG. 89 is a schematic diagram of an alternate scanning section including two pivoting mirrors as the horizontal and vertical scanning subsystems.

In the first alternative, illustrated in FIG. 89, two mirrors 574 and 584 are each pivotable about separate axes oriented at ninety degrees (90.degree.) to each other. The mirrors 574 and 584 are respectively movable by small actuators, such as galvanometers 578 and 586, piezo-electric crystals or resonance scanners. These mirrors oscillate back and forth to direct the beam along the desired horizontal and vertical paths. Galvanometers or motors that cause the mirror to resonate through a cycle could be used. The technique is used for laser light shows, where the image itself is drawn with the beam of light, a much less stringent requirement than filling a screen with scan lines. Resonant scanner mirrors have approached the cycle rate appropriate for use with embodiments of our invention, but the mirror is very small. Very small mirrors do not allow for the full resolution to be developed at the screen 12 due to diffraction effects explained herein. Also, significant potential laser power would be lost during the time the mirrors are retracing to their starting point, or through compensation for non-linear motion velocities of resonant scanners. However, further advances in the technology relating to these scanners to make the cycling capabilities faster, coupled with our multi-line scanning, could make this alternative the preferred technique.

Acousto-Optic Beam Steering

Figure 90:
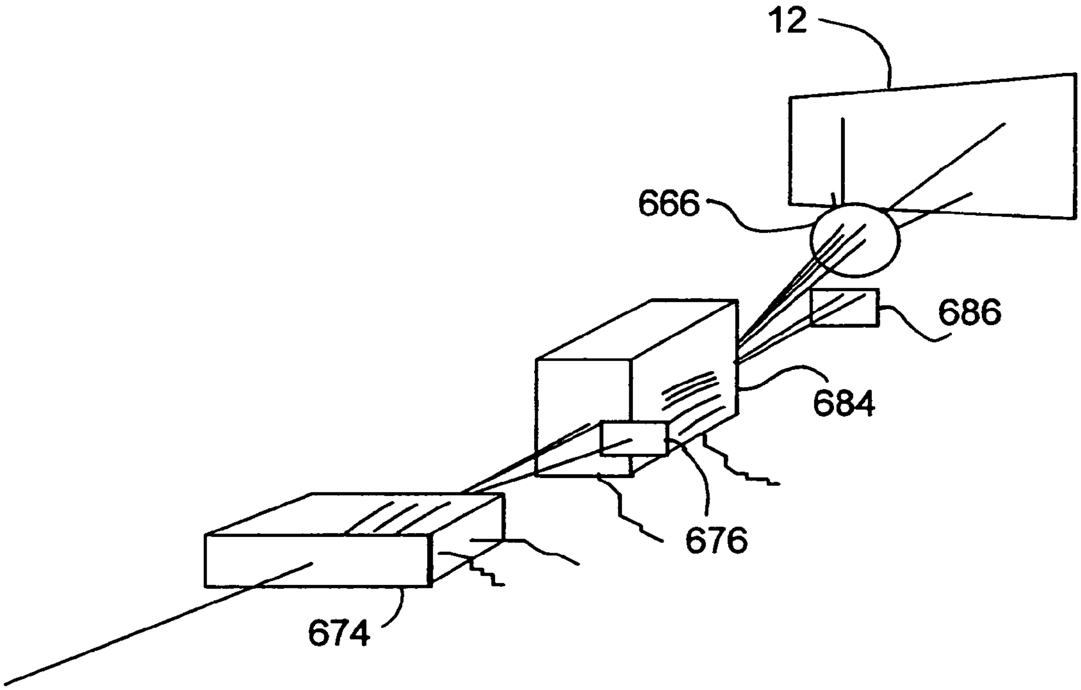
FIG. 90 is a schematic diagram of another alternate scanning section including two acousto-optic beam deflectors as the horizontal and vertical scanning subsystems.

The alternative shown in FIG. 90 could employ acousto-optic beam steering, wherein the diffraction of an aggregate beam by sound in a horizontal scanning crystal 674 deflects the aggregate beam in the horizontal direction with the undeflected beams absorbed by beam block 676. The aggregate beam is deflected in a vertical direction by vertical scanning crystal 684 with the undeflected beam absorbed by beam block 686. This concept is similar to the acousto-optic modulator described elsewhere herein, but instead of varying the sound intensity for modulation, the frequency of the sound in the crystal would be varied. With this use of acousto-optic crystals, the degree of deflection would change linearly with changes in sound frequency in the crystals 674 and/or 684. The concept of acousto-optic beam steering of laser beams is described in Gottlieb, Ireland, Ley, pp 158-174, albeit not in connection with a projection system similar to our invention. This technique would seem to be the fastest available, but the laser beam must be a finite size, and it takes a significant amount of time for new frequencies of sound to fill the beam within the crystal, thus reducing resolution. Also, the smaller the beam, the larger the spot is on the screen due to diffraction considerations. Thus, this technique is currently limited to about 500 pixels on each axis. Another problem is that the scan angle change is never more than one degree or so, and the optics necessary to bend such a scan angle across a screen are difficult and potentially expensive. Acousto-optic beam steering is rarely as much as 15% efficient in preserving the original optical power. However, if advances in technology solve these problems, the insertion of multiple spaced apart lines of laser beams from the imaging fiber output head 58 into the acousto-optic beam steering crystal for simultaneous deflection of the multiple beams would reduce the vertical cycle time, and thereby reduce the demands on the beam steering component for vertical scanning, thereby reducing cost and complexity.

Tilting Mirror

Figure 91:
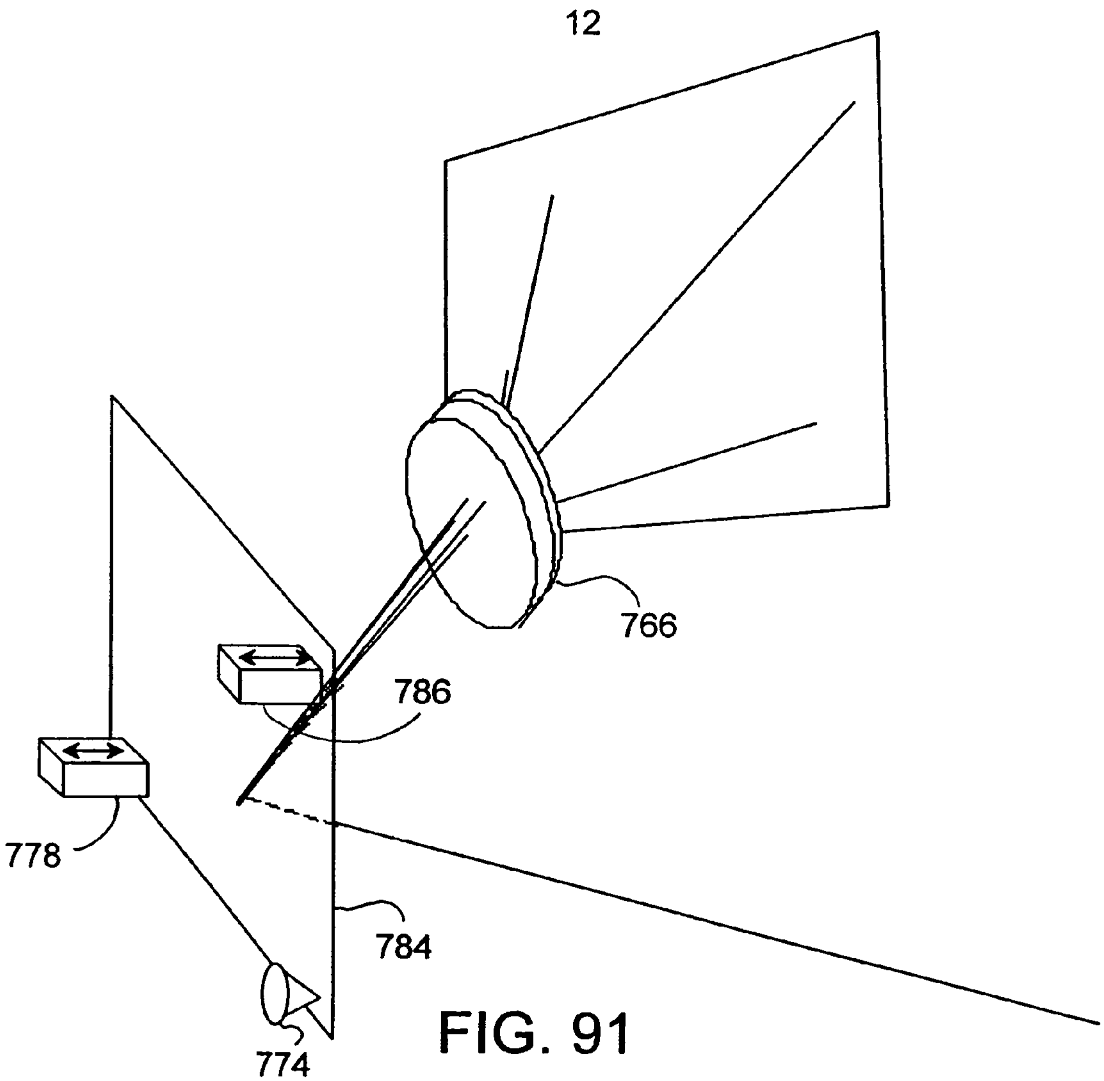
FIG. 91 is a schematic diagram of an alternate scanning section including a single tilting mirror.

In the alternative shown in FIG. 91, a pivoted mirror 784 can be controlled by two small piezo-electric actuators tilting the mirror 784 at appropriate angles with respect to pivot 774 to scan an image with a pattern of spots according to our invention. The actuators may be piezo-electric crystals such as horizontal piezo-actuator 778 and vertical piezo-actuator 786. Piezo-electric motion can be controlled in the 60 to 80 KHz range, but as in acousto-optic beam steering, the scan angle is very small. However, these speeds are only achievable with very small mirrors, eliminating any opportunity for high resolution. Assuming the angles produced by piezo-electric motion can be increased by further advances in this technology, the scanning of spaced-apart laser beams to write multiple lines per horizontal pass could be used to minimize cycle times required for these scanning components.

Holographic Beam Steering

In an additional alternative, called holographic beam steering, transmissive holograms replace the mirror facets in an arrangement much like the rotating polygon mirror 74 shown in FIGS. 1 and 9. With holographic beam steering as currently practiced, no real gain is achieved, because the holographic material is not as mechanically strong as the solid aluminum mirrors, and cannot be spun as fast for a particular spot size (which determines the resolution). Also, the holograms do not sweep the various colors through the same arc, so three separate paths must be used, one for each color; and they are also not nearly as efficient in the amount of light that gets diffracted to the screen. Quality control of the holograms is a significant problem, where each holographic element must treat the direction and sweep angle exactly the same as all others in the disk. However, resolution of these technical problems would result in the same kinds of advantages for this type of scanning section 70 as with the first embodiment disclosed in FIGS. 1 and 9 using the polygon mirror 74 with polished aluminum facets 76.

Modulation Section

Within our preferred embodiments, and at exemplary resolutions, refresh rate and emitting end configurations, each beam must be continuously modulated to assure as many as 50 million values per second. In the modulation section 30 schematically shown in FIG. 1, we prefer to utilize an acousto-optic crystal for the modulator 32 because of its ability to completely turn off the beam, permitting our desired high contrast ratio, and because its modulation is continuously variable. We prefer TeO2 200 MHz modulators part #1250c-848 with 235-BI drivers from Isomet Corporation, Springfield, Va. for the blue and green beams and PbMoO4 200 MHz modulators part #1250c (same manufacturer) for the red. The modulator 32 is preferably positioned between each primary color laser light source and the spot projection section. Each of the beams is thus directed through modulator 32 toward the spot projection section thence to the scanning beam projection component, where it flows through to a particular point on the screen 12. This action occurs exactly when the pixel information indicates that such spot on the screen 12 is to be illuminated.

Also, since acousto-optic modulators 32 only deflect the light if there is sound energy in response to a signal from the controller 106, the potential contrast ratio (the ratio on the screen between the amount of light in the brightest and darkest areas) is very high. Thus, in contrast to other projection techniques, if there is no signal, then no light is transmitted, and the dot location is black, instead of the gray common with film and other projection techniques. Additional techniques for modulating laser beams have been used with varying success in other applications, which could take advantage of our invention. With further technological advances, these additional techniques could be used to advantage in further possible embodiments of our laser projection system 10. Modulation could be accomplished in fiber with Mach-Zehnder modulators, in free space with grating light values or micromirrors, or with electro-optic modulation techniques.

When using certain kinds of lasers, the input power to the laser itself can be varied as required for each pixel. At present this technique only works for diode lasers, because other lasers do not react linearly or in a timely fashion to changes in power, in some lasers requiring several seconds or minutes to turn on and off. Diode lasers that can be modulated by direct power control at appropriate speeds are presently of much too low power for laser video use in theaters or other large screen applications. Also, it is difficult to operate these diode lasers in a continuously variable fashion. However, in the infrared wavelengths, modulation rates of several gigahertz are common in optical fiber communications applications with low power infrared on-and-off diode lasers. While it would seem tempting to use infrared diode lasers that are power-modulated to excite visible lasers, at this time there are too many non-linearities, inefficiencies and delays in the response of the excited laser to make such a process practical for commercial use with our invention. However, if suitable advances in these laser technologies are accomplished, continuously variable laser beams from such lasers could be inserted into the fibers 42 of our system 10 and scanned with the scanning subsystem of our first embodiment. Our invention could provide a cost effective means of employing such lasers. Such a system would have much reduced size, as the larger, more expensive laser and modulation components could be uniquely replaced in a system 10 according to our invention by such continuously modulatable diode lasers.

Alternate Modulation Section Configurations

In our Initial Example and in our preferred embodiments, and generally within our invention, the number of modulators 32 is equal to the number of emitting ends of the output head 56, with some exceptions, notably where composite beams are created as in Example 28 or as above where the lasers are self modulating. However, it may be advantageous, and is within the scope of our invention, to use more modulators, either for economic reasons, to lower power levels within the individual modulators or to accommodate changes in the laser section 20. Such alternatives are enabled by our use of fiber, multi-line scanning, time combination and fiber-based beam coupling. Some examples of these alternatives are shown in more detail later herein in connection with FIGS. 6, 23, and 24.

Laser Section—Wavelengths of Colored Beams

Figure 17:
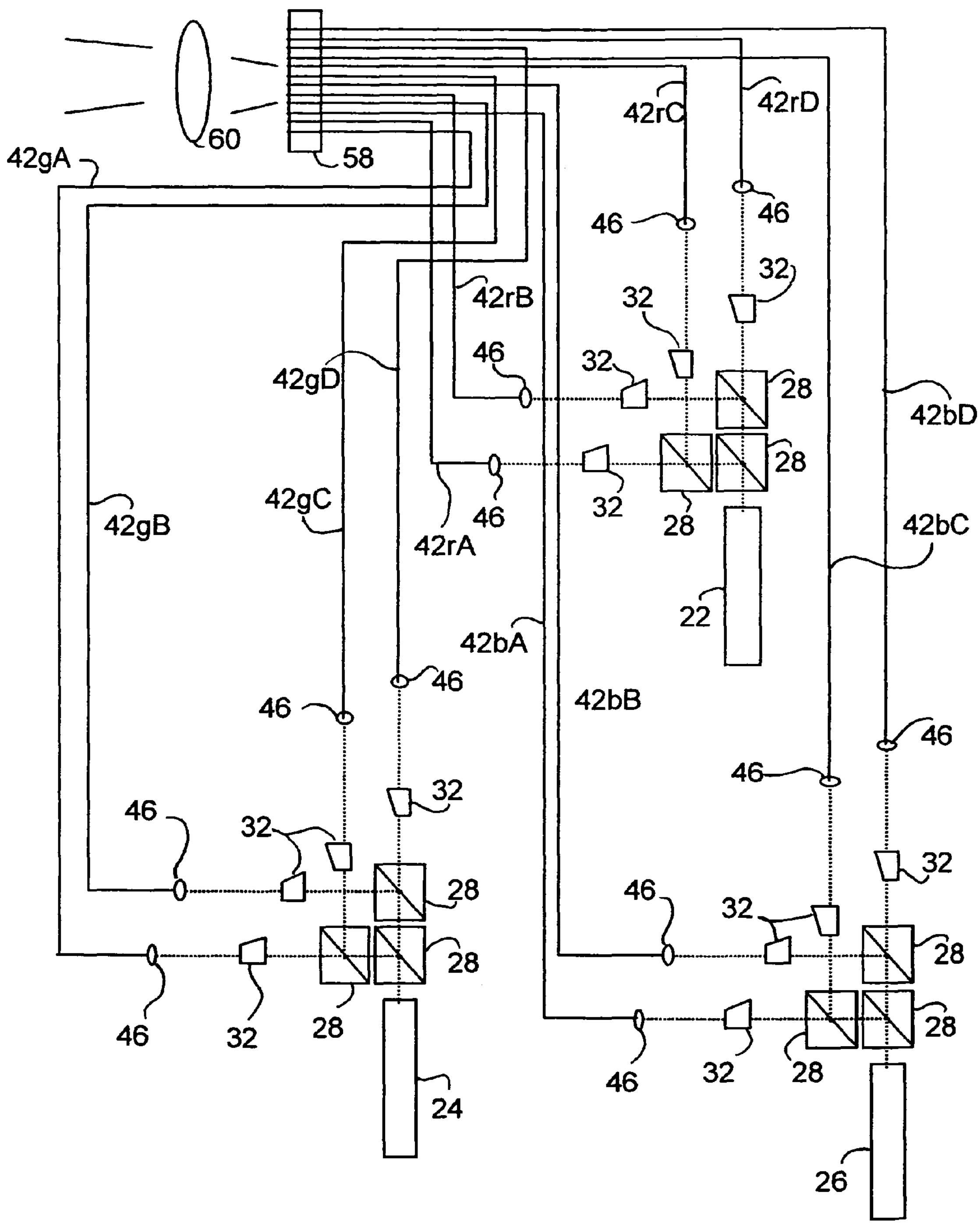
FIG. 17 is a schematic diagram of the laser section of the laser projection system of FIG. 1 having one laser of each primary color.

The laser section 20 shown as a block in the diagram of FIG. 1, and shown in more detail in FIG. 17, supplies the light beams in the three primary colors to be eventually directed toward the screen 12, preferably includes red lasers 22, green lasers 24 and blue lasers 26. These lasers must have appropriate wavelengths so that as many visible hues as possible can be made by combining various intensities of these primary wavelengths. In the anticipated commercial systems embodying our invention, at least three primary colors are required to make a full color display. Although more than three colors may be used to produce colors of the desired hues, the use of more than three colors may complicate the spot projection and scanning subsystems and may add only a very small range of potential hues not available using just three colors. It is also most likely that all video formats would originate in a three-color format, and this signal would have to be converted to a four or more color format, introducing additional processing requirements.

Laser Section—Quality of Beams

The light output of the lasers to be used in our preferred theater application should preferably be in single mode or near TEM00 in transverse mode, and must either be continuous wave or pulsed at a very fast rate. Of the common pulse generation techniques, mode-locking produces a train of evenly spaced pulses at 70 to 200 (or more) million pulses per second, and may be used in our invention. However, within our invention, any laser whatever may be used, as long as it meets beam quality, pulsing, color, and power requirements.

Laser Section—Configurations

We prefer to employ diode-pumped solid state (DPSS) lasers for reasons of economy, reliability, size, packaging considerations and infrastructure requirements. DPSS lasers have been commercially available since the late 1980's, although visible DPSS lasers in the colors and power range required for preferred embodiments of our laser projection system 10 are just now being developed. However, we also anticipate the possibility that Argon and Krypton ion, flowing jet dye, semiconductor, diode, or any other suitable lasers could be used to advantage. Optical fiber lasers, i.e., lasers wherein the optical fiber itself is the lasing material, with improvement could also be used. Fiber lasers would be particularly useful with our invention when they would be internally modulated, so as to replace both the laser and modulation sections.

The ability to combine multiple lasers to produce an image on a large screen 12 of acceptable brightness is another advantage of our invention. When attempting the use of multiple lasers prior to our invention, elaborate, complicated and expensive arrays of mirrors and lenses were required to combine beams from separate lasers for projection onto a screen 12. However, with the projection of multiple beams with the emitting ends of our invention, multiple lasers having reduced power in comparison to the total power needed to provide acceptable brightness can be combined to advantage. Each laser unit should preferably be true continuous wave or be mode-locked with a pulse rate faster than 70 MHZ, produce a beam of sufficient quality for insertion into a 8.5 micron optical fiber with at least 85% efficiency with very low insertion loss variation.

Referring again to FIG. 17, although not as yet commercially available, our preferred laser section would employ one each of solid state red, green and blue lasers producing the wavelengths and aggregate powers described below. However, a laser section utilizing currently available laser components would employ an argon ion laser manufactured by Spectra Physics Lasers, Inc., Coherent, or other vendors for green and blue beams, and use such argon ion laser to pump a flowing jet dye laser manufactured by the same vendors for the red beams. The beam from each laser 22, 24, 26 would be divided by staged beam splitters 28 into four separate beams each of which are separately directed to modulators 32. Specifically, the beam from laser 22 is split into four red beams by the dividers 28, which are directed to modulators 32; the beam from laser 24 is split into four green beams by the dividers 28, which are directed to modulators 32; and the beam from laser 26 is split into four blue beams by the dividers 28, which are directed to modulators 32. The beams from the modulators 32 are respectively directed to the input lenses 48 for insertion into the insertion ends 44 of the fibers 42. In FIG. 17 subscripts are used in the designation of the individual fibers 42 wherein the first subscript delineates the color (r=red, g=green, b=blue) and the second subscript delineates the row location of the associated emitting end; thus 42gC would be the green fiber for row C.

Figure 8:
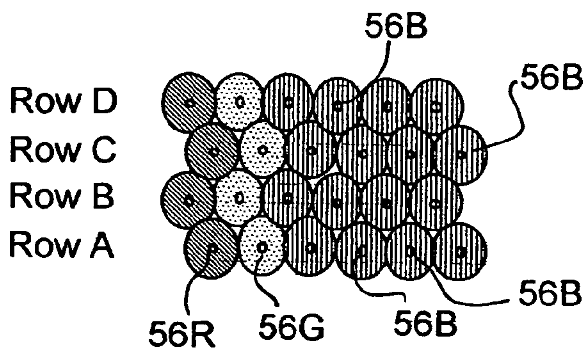
FIG. 8 is a diagram of a four row by six emitting ends per row array further described in connection with Example 15.
Figure 18:
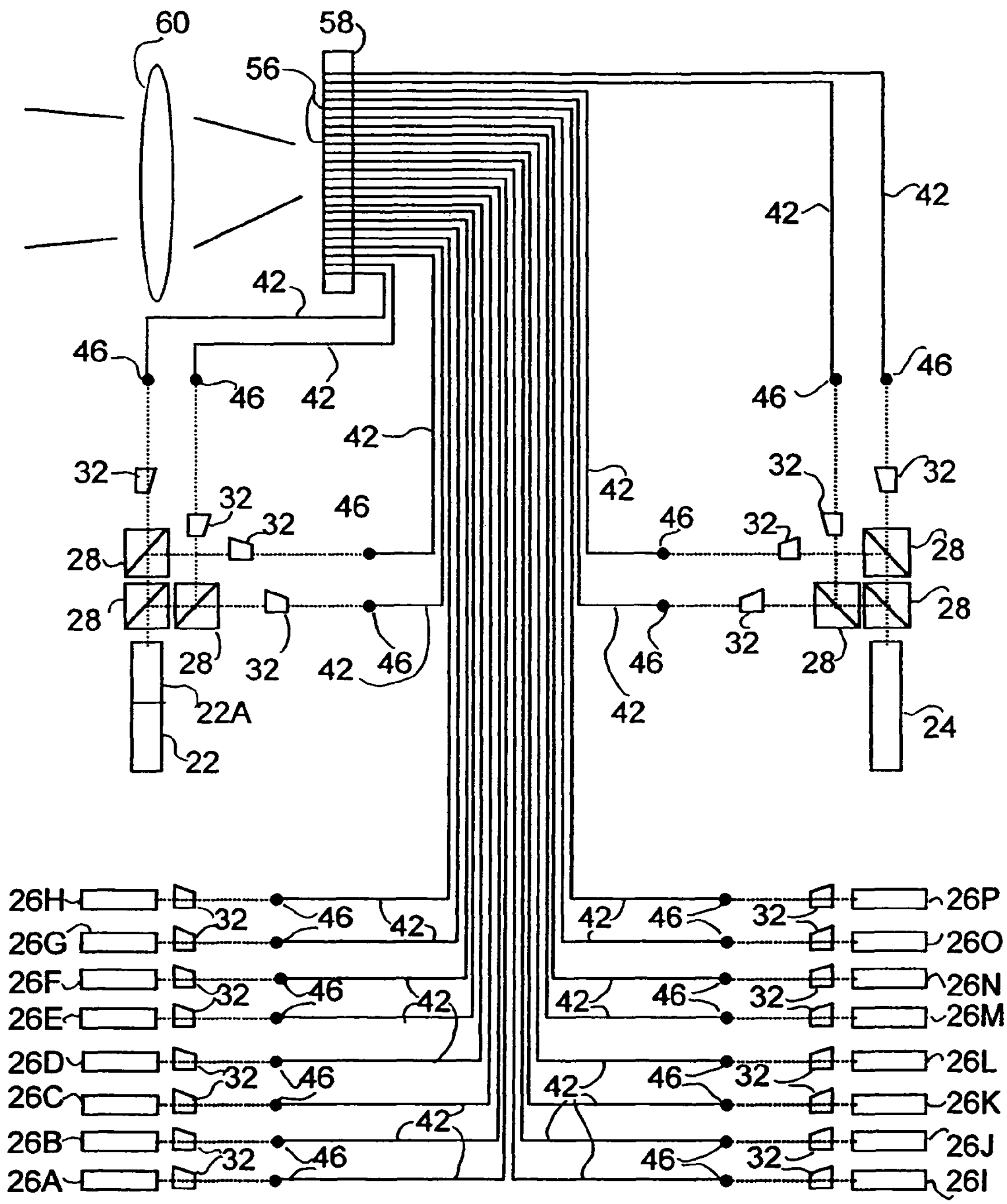
FIG. 18 is a schematic diagram of an alternate laser section for use in a system similar to that shown in FIG. 1 having one red laser, one green laser and sixteen blue lasers.

Referring to FIG. 18, an alternate laser section configuration for use with the 4 row by 6 spots per row output head configuration shown in FIG. 8, would preferably employ a Millennia 10 watt green DPSS laser 22 manufactured by Spectra Physics Lasers, Inc. pumping a model 375 dye laser 22A also manufactured by Spectra Physics Lasers, Inc. for producing a red laser beam, split into four beams with beam splitters 28 for insertion into the fibers 42. As discussed hereinafter, fiber couplers could also be used to divide the beams. Such an alternative laser section could further use a Millennia 5 watt green DPSS laser 24 manufactured by Spectra Physics Lasers, Inc. for producing a green laser beam, split into four green beams with beam splitters 28 for insertion into the fibers 42, and sixteen blue DPSS lasers, model 58BLD605 manufactured by Melles-Griot, mounted to respectively insert the blue beam from each blue laser 26A-26P directly into the insertion end 44 of the remaining sixteen fibers 42.

A variety of possible combinations of the blue beams may be employed to produce the desired intensity of blue at a specific dot location in the line. In our preferred system illustrated previously in FIG. 1 and in Example 15 later herein, we prefer to modulate all four blue beams within a particular row at one-fourth the required aggregate blue intensity, although other intensity combinations are possible.

Figure 19:
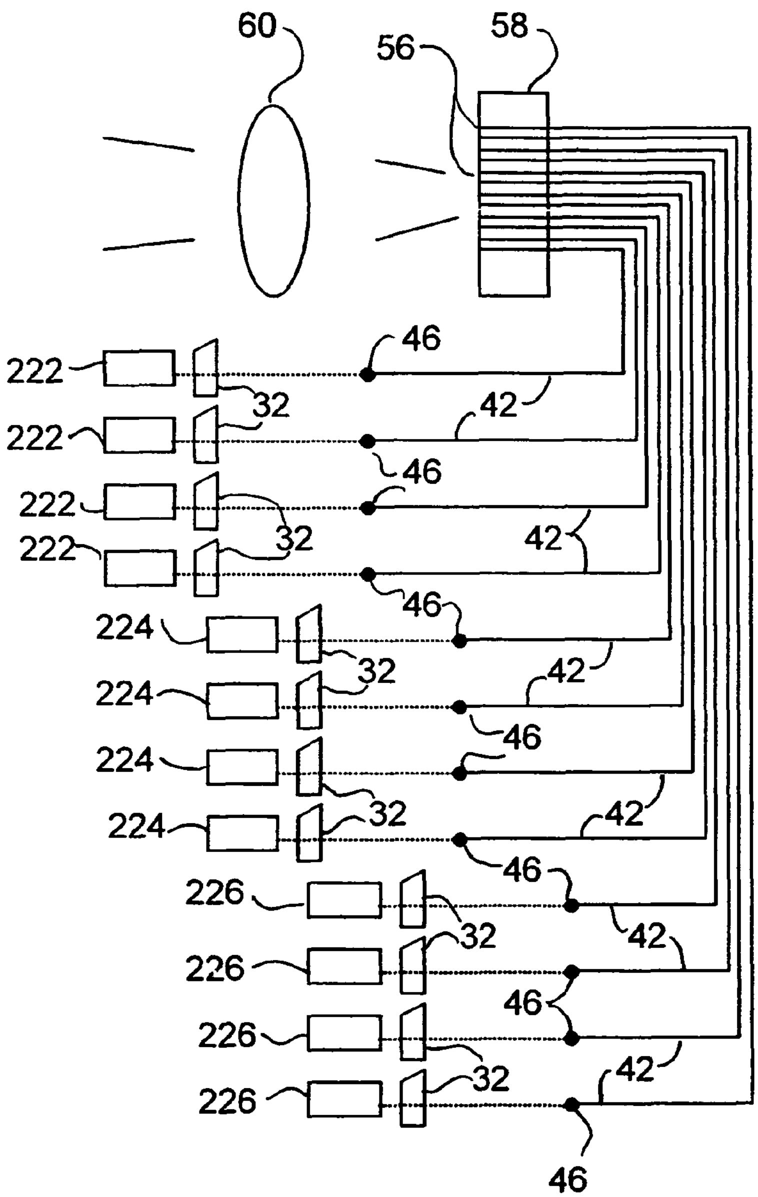
FIG. 19 is a schematic diagram of another laser section for use in a system similar to that shown in FIG. 1 having four lasers of each primary color.

FIG. 19 shows the use of twelve separate lasers 222, 224 and 226 to produce the red, green and blue beams independently respectively inserted through modulators 42 and input lenses 48 into each fiber 42 to emit from the output head of FIG. 5 a 4 row by 3 spots per row pattern of spots shown in FIG. 5S. This laser configuration could be employed if reasonable lower power lasers were available to produce each color instead of more expensive, more powerful lasers needed to produce beams split into multiple beams for insertion into the fibers.

Subject to constraints noted previously, such as beam quality, power levels within the modulators and at the point of insertion of the individual laser beams into fibers, any of a number of lasers and laser configurations can be employed to advantage within our invention to create the required total laser power. Further, as shown later herein in connection with FIGS. 20-25, only minor modifications to the modulation, spot projection and controller sections 30, 40 and 100, respectively, are needed to implement these alternative configurations.

We believe that 13 to 15 watts of laser power, balanced to white may be required for some theater applications. Given a green component of 514 to 535 mm, a blue component from 448 to 465 nm, and a red component from 620 to 630, the relative powers of each color component is about 36% green, 16% blue, and 48% red.

In summary, a variety of lasers and laser configurations may be used to generate the total laser power required of red, green and blue, including, without limitation, RGB lasers that generate red, green and blue beams from a single laser, lasers that each produce the total power required of one of red, green and blue, one laser of each color per line, and multiple lasers per color per line, either through expansion of the output head (as described above) or through use of fiber-based beam coupling either before or after modulation.

Controller Section

Figure 26:
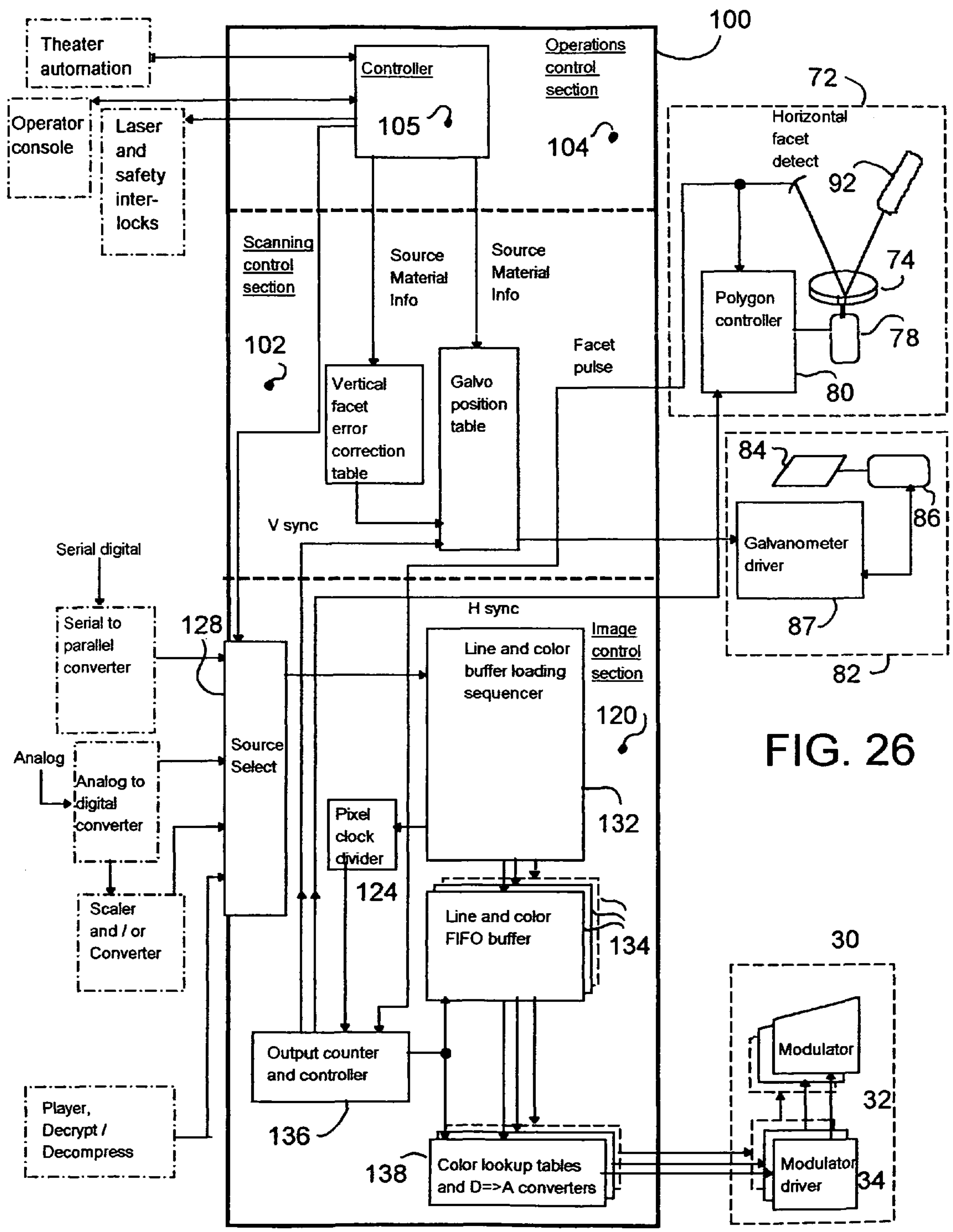
FIG. 26 is a block diagram of a controller section of the laser projection system of FIG. 1.

FIG. 26 shows a block diagram of the controller section 100 of the preferred embodiments of our theater laser projection system 10. The controller section 100 receives the video input, processes and presents the image data to the scanning and modulation components, and controls the overall operation of the projection system. The controller section 100 has three functional areas, the scanning control section 102, the image control section 120 and the operations control section 104.

The image control section 120 handles all of the functions directly related to acquiring the source image data and processing it for delivery to the modulator section 30, as well as sending certain signals, notably synchronization signals, to the horizontal scanning section 72 and to the scanning control section 102. As discussed in more detail hereinafter, the controller of our preferred embodiments preferably receives digital parallel progressive RGB formats as the source image data, converted or otherwise processed if necessary by outboard devices. The scanning control section 102 controls the components of the vertical scanning section 82, relays the facet pulse signal to the image control section 120, and, if applicable, controls transformation an alternate aspect ratio or throw distance (as described later herein). The operations control section 104 performs all other operational controls and requirements.

The operations control section 104 includes a controller 105. This section interfaces with external operator terminals and systems, such as a theater control system, receiving and executing all external commands. Additionally, it manages safety and start-up inter-locks, and initializes certain tables or information within the scanning control section 102 and image control section 120. In particular, the operations control section 104 identifies for both the scanning control section 120 and the image control section 102 certain data related to the source material and/or the location or source of the source material, most notably the desired frame rate and aspect ratio. The operations control section 104 also directs all start-up sequences, reads system readiness, and conveys status to the operator or theater control system.

In our preferred embodiments the scanning control section primarily performs certain control functions related to the vertical scanning section 82 (in our preferred embodiments a galvanometer). The scanning control section 102 directs the galvanometer to end one vertical traverse (based on the vertical synchronization signals from the image control section 120) and return to an appropriate location so as to locate the pattern of spots in an appropriate position at the top of the screen to begin a subsequent vertical traverse. The scanning control section 102 also controls the speed at which the galvanometer "flies back" in order to insure that the pattern of spots is in position at the top of the screen within the blanking period dictated by the video source material and its format. Generally, and in the case of our preferred embodiments, this is done by supplying to the galvanometer driver 87 a pattern of positions for the galvanometer to follow as it flies back. Within our invention we choose for the pattern of locations to follow a zero-third-order curve in order to minimize image artifacts at the bottom and top of the screen, including "ringing".

The traverse of the galvanometer between blanking periods as it moves the pattern of spots from the top of the screen to bottom is controlled in a similar manner, namely, it is sequentially directed to a pattern of locations by the scanning control section 120 acting through the galvanometer driver 87. This pattern is based on information from the operations control section 104 as to desired frame rate and aspect ratio. This pattern would generally be a straight-line ramp except, as noted previously, within the preferred embodiments of our invention we use the galvanometer to effect vertical facet error correction. To do this correction we superimpose a repeating pattern of a curve, in the case of our preferred embodiments a sine wave, on the straight-line ramp. Although it has been our experience that the vertical facet errors of many commercially available mirror polygons roughly approximate a sine wave during a polygon revolution, where necessary, we prefer to select mirror polygons most closely exhibiting this characteristic. Each iteration within the repeating pattern is a copy of the sine wave which best approximates the pattern of vertical facet errors on the polygon, and each iteration is directed to begin based on a once-per-revolution pulse supplied by the polygon driver 80, identifying the position of a particular facet. The sine wave pattern may be further "tuned" to adjust for variations in the individual facet errors from the best fitting sine wave, first using measurements of the individual facet errors and then visually from the resulting projected images and artifacts.

Further, if necessary, the scanning control section 102 controls the actuators which would implement any Barlow lens-based transformation of the projector to an alternate aspect ratio or throw distance as discussed later herein in connection with Examples 21 and 22, and causes any necessary adjustments to the focus and fiber output head 58 orientation.

The image control section 120 performs a number of functions related to processing the source image data for use by our invention. First, it receives the image data, pixel clock, and synchronization signals (horizontal and vertical) from one of several input ports that are connected to external devices.

Our preferred embodiments accept digital parallel progressive RGB formats preferably conforming to SMPTE 274. Video players or servers, which utilize such formats, might be connected to one or more of the input ports. Further, such a video player or server might contain a de-interlacer, which would allow it to accept or play interlaced versions of digital RGB formats and convert them to progressive for use by our projector, or, if necessary, a scaler (which is also familiar to anyone skilled in the art of video engineering). Other outboard devices might also be connected to one of the several input ports to convert other well known formats, such as serial digital (perhaps conforming to SMPTE 292), RGBHV or other analog signals (perhaps including commercial HDTV), to the preferred parallel digital format for use by our system. These outboard devices might accept either interlaced or progressive versions of such other formats. Any of these outboard devices, including those based on parallel digital, whether commercial products or constructed from available components by someone skilled in the art of video engineering, will also perform any necessary decompression or decryption of the incoming video source material.

The data (image, clock, and synchronization) enters the image controller at the buffer loading sequencer 132 which distributes the image pixel data by color and line to FIFO type buffers 134 as timed by the input pixel clock. Each of these buffers is uniquely associated with a fiber emitting end 56, a modulator 32, a modulator driver 34, and a color look-up tables and digital-to-analog converter 138. A time delay peculiar to the particular emitting end and the desired frame rate/polygon speed is stored in the output counter and controller section 136.

Within the image control section 120 the input pixel clock and horizontal synchronization signals are also sent to the pixel clock divider section 124, where they are divided (in our preferred embodiments by four) to create a slower output pixel clock and horizontal synchronization rate; this slower output pixel clock and horizontal synchronization signal are sent to the output counter and controller section 136, along with the undivided input pixel clock and vertical synchronization signal.

As noted previously, the vertical synchronization signal is also sent to the scanning control section 102, while the divided horizontal synchronization signal is also sent to the polygon driver 80 of the horizontal scanning section 72.

In the output counter and controller section 136 the faster input pixel clock is used to sample the incoming facet pulse relayed from the scanning control section 102. Once a facet pulse is recognized the output counter and controller 136 resets the slower output pixel clock, which is used to release the image data to the modulators. This sampling and synchronization/re-set process allows line start registration or scan pass start accuracy equivalent to less than one-half pixel.

With the recognition of the facet pulse signal, image data is read out of the FIFO buffers 134 and timed by the output pixel clock. The delay of each fiber emitting end/buffer combination is timed by the faster input pixel clock to preserve a level of positional accuracy for each spot that is consistent with our overall resolution objectives. This process continues until the next vertical synchronization pulse (at the end of the frame or subframe) is received and the FIFO buffers 134 are reset.

Color look-up tables, familiar to anyone skilled in the art of video engineering, for each modulator 32 are stored in each of the color look-up table and digital-to-analog converters 138. The selected color look-up table is used to transform the pixel color data from the FIFO buffers 134 into signals appropriate to the particular modulators and laser wavelengths in use, and the desired color temperature. The look-up tables are also used to effect gamma corrections as necessary. The transformed data is then converted by the digital-to-analog converter into an analog voltage signal for use by the modulator.

At startup, the image control section passively receives video data from the source designated by the operations control section 104, then conveys the initial horizontal synchronization signals to the horizontal scanning section 72, and begins sending the transformed, re-ordered and delayed line and color data to the modulator drivers 34 as it receives facet pulses from the scanning control section 102.

Alternate Spot Patterns and Consequent Differences in Reordering and Time Combination The foregoing descriptions of the spot projection, scanning and controller sections 40, 70 and 100, respectively, of the Initial Example have assumed an output head 58 having a 4×3 emitting end 56 configuration projecting a 4 row by 3 spots per row spot pattern.

However, as noted previously, an output head according to our invention is not limited to four rows of emitting ends, and encompasses five or more, or three or less, rows of emitting ends. Further, our invention is not limited to three emitting ends per row, and encompasses four or more emitting ends per row, or two or one emitting ends per row. For example five rows with three emitting ends each will write five lines per scan pass, reducing the number of scan passes required per frame for the same image and resolution as discussed with the four row embodiment, with advantages in increased degree similar to those described for the first embodiment, but at the increased expense of additional modulators, lasers and/or splitters. As noted elsewhere, five rows can also be used to increase resolution. Three rows with three emitting ends each, while again straightforward, will result in a lesser expense, primarily by avoiding the inclusion of expensive modulators and splitters and perhaps lasers, but will realize the advantages of the first embodiment to a lesser degree. The pattern of spots resulting from these different output head configurations or emitting end arrays must also be taken into consideration when determining how to reorder the image data.

Many of the following examples illustrate the wide swath of options available within our invention. Our preferred embodiment uses a slanted line of 12 emitting ends, four red, four green, and four blue, and realizes additional flexibilities in implementation and other advantages not previously discussed, not the least of which is the ease of manufacture of the fiber head array. This embodiment is shown below in Examples 21 and 22.

Description of Examples of Alternate Spot Patterns

In the description of each of the following Examples 1-28, for the sake of conciseness and clarity, we have included Tables EX-1 through Tables EX-28 in lieu of detailed textual description of the timing and location of the reordering of lines during frame scanning based on the number of, and the relative effective spacing of, the rows of spots projected on the screen, and/or of the time combining of spots at dot locations during line scanning based on the number of, and the relative effective dot spacing of, the spots projected on the screen. These Tables EX-1 through EX-28 include a listing of the assumed number of rows, number of spots per row, special configurations involving more than one spot of a particular color, or a special arrangement of color positions in the array, and the relevant Figures. The body of each Table includes values for scan pass "s" during frame scanning or time "t" during line scanning or between the beginning of scan passes, the number of the line or dot location on the screen, the row identification (e.g., AAA, BBB, CCC, DDD or AAAA, BBBB, CCCC, DDDD et seq.) or spot color (R,G,B) corresponding to the time written and location on the screen, and whether the row of spots or spot in a row is activated or blanked ("b"). The following Table EX indexes pertinent parameters for each of the examples, where the vertical adjustment for each embodiment, except as noted in the Description column, is assumed to be equal to the number of rows of spots projected on the screen.

TABLE EX

| Example Number | Rows × Spot/ Rw | Eff. Row Spacing | Description | Tables | FIGS. |
|---|---|---|---|---|---|
| 1 | 4/3 | 3 | Log Spot Pattern | EX-1 | 27-28 |
| 2 | 4/3 | 4 | Ineffective Row Spacing | EX-2 | 29 |
| 3 | 4/3 | 4 | Ineffective Row Spacing (5 Ln Vert Adjst) | EX-3 | 30 |
| 4 | 4/3 | 15 | Log Spot Pattern | EX-4 | 79 |
| 5 | 4/3 | 17 | Log Spot Pattern | EX-5 | 80 |
| 6 | 4/3 | 10 | Ineffective Row Spacing | EX-6 | 81 |
| 7 | 4/3 | 49 | Large Fiber Output Head | EX-7 | 32 |
| 8 | 3/3 | 4 | Brick Spot Pattern | EX-8 | 33, 34 |
| 9 | 3/3 | 17 | Brick Spot Pattern | EX-9 | 82 |
| 10 | 2/3 | 9 | Brick Spot Pattern | EX-10 | 35, 36 |
| 11 | 4/3 | 11-10-13 | Unequal Row Spacing | EX-11 | 27, 37 |
| 12 | 4/3 | 1-21-1 | Special Output Head | EX-12 | 83-85 |
| 13 | 5/3 | 6 | Brick Spot Pattern | EX-13 | 38, 39 |
| 14 | 5/3 | 24 | Brick Spot Pattern | EX-14 | 38, 85 |
| 15 | 4/6 | 11 | 4red, 4green, 16blue spots (3spot spcg/row) | EX-15 | 41-42 |
| 16 | 4/3 | 5 | Misalignment w/I row | — | 43 |
| 17 | 4/3 | 4 | Nonuniform Spcng w/I row | EX-17 | 44-46 |
| 18 | 4/3 | 1 | Step Spot Pattern | EX-18 | 47-49 |
| 19 | 4/3 | ~1 | Linear Spot Pattern | — | 50-51 |
| 20 | 4/3 | ~1 | Linear Spot Pattern w/ mod. emitting ends | — | 52-53 |
| 21 | 12/1 | 1 | Ramp Configuration in 4 RGB Groups | EX-21 | 54-57 |
| 22 | 12/1 | 1 | Ramp Spot Pattern (RRRR-GGGG-BBBB) | EX-22 | 58-61 |
| 23 | 6/2-1 | 4 | Totem Pole Spot Pattern | EX-23 | 86-88 |
| 24 | 12/1 | 2 | Ramp Interlaced | EX-24 | 63, 64 |
| 25 | 4/3 | 9 | Log Interlaced | EX-25 | 65, 66 |
| 26 | 4/3 | 10 | Log Interlaced | EX-26 | 67, 68 |
| 27 | 3/12 | 1 | Three Ramp | EX-27 | 69, 70 |
| 28 | 4/1 | 1 | Ramp Configuration w/ Composite Beams | EX-28 | 72-74 |

The physical distance between emitting ends, and therefore the physical distance between rows of spots on the remains constant, despite changes in aspect ratio or resolution. However, changes in throw distance, aspect ratio and/or resolution may alter the effective row spacing, or number of lines of dots between rows of spots projected on the screen, and the effective spot spacings or number of dot locations between spots within a row of spots. Therefore, it should be kept in mind while considering the disclosure appearing herein that a preferred resolution of 1920×1080p and aspect ratio of 16:9 are assumed for the sake of simplicity and convenience. However, the principles of our invention, and its adaptation to different resolutions and aspect ratios, remain applicable for innumerable different combinations and permutations of different variables of projection systems.

One can infer from the foregoing that only certain line spacings would be acceptable given a screen size and desired line configuration. For example, if the image is to have 1080 lines vertically spaced over the full height of a theater screen that is 18 feet tall, the spacing of the dot locations would be about 0.2 inches. Assuming that the actual spacing between rows of the pattern of spots on the screen is 2.28 inches given the preferred throw distance, this would result in an effective row spacing of 11.4, which is not an appropriate multiple of the line spacing on the screen. One could preferably move the projector closer or further from the screen (or adjust a prescan zoom output lens or select a different fixed prescan output lens) so that the effective row spacing is appropriate, such as 11.0 or 12.0, respectively, for the example, and then adjust the galvanometer sweep so that the 1080 lines again fills the screen.

In the 4 row by 3 emitting ends per row arrangement shown in FIG. 5, as stated previously, an effective row spacing as close as the five lines assumed for the Initial Example in actual practice may not be feasible at this time. In actual practice, we have determined that the closest effective row spacing physically possible without custom configurations of the fiber cladding, using a single lens to focus the beams onto the screen 12 through the facets 76 of the polygon mirror 74, could be more than 10 lines, or even more in other configurations. At present levels of technology, closer spot spacings are not feasible for our application. However, after numerous examples illustrating the effect of these different effective row spacings and output head configurations of emitting ends, we describe several possible implementations of our conception that may enable closer effective row spacing.

For each of the following examples, all system sections and components are the same as with the Initial Example of FIG. 1, except for the output head 58 (spot pattern) configuration and the consequent different reordering performed by the controller section 100, and possible addition of fiber combiners.

For reasons more fully described below, for each of these examples the effective row spacing of the scanned lines must not be an exact multiple of the number of rows of emitting ends in the output head 58 array. While it is a basic goal and assumption that each line is written by all colors exactly once, there are useful exceptions, one of which appears in EXAMPLE 15 below.

EXAMPLE 1

Figure 27:
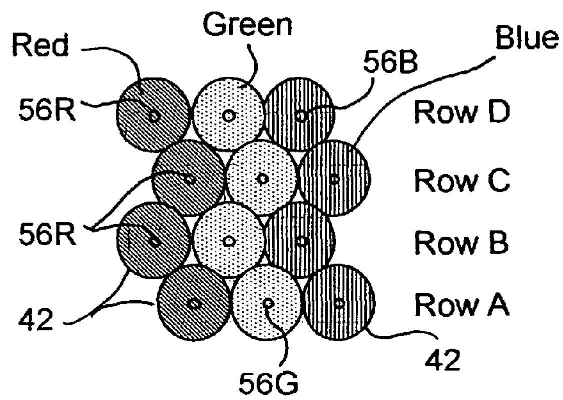
FIG. 27 is a diagram of a 4 row by 3 emitting end per row array of an alternate output head for use in the system of FIG. 1, having fibers of adjacent rows offset for a reduced effective row spacing, referred to as a "log" array.
Figure 27S:
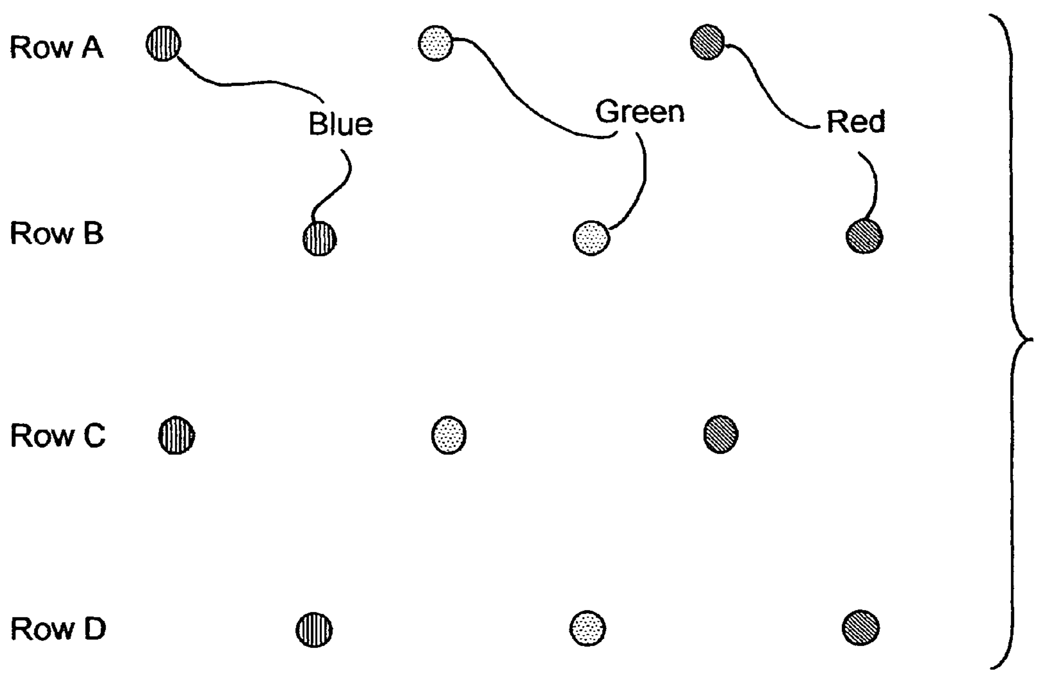
FIG. 27S is a diagram of the pattern of spots projected on a screen using the "log" array shown in FIG. 27.
Figures 28A, 28B, 28C, 28D, 28E, 28F, 28G, 28H:
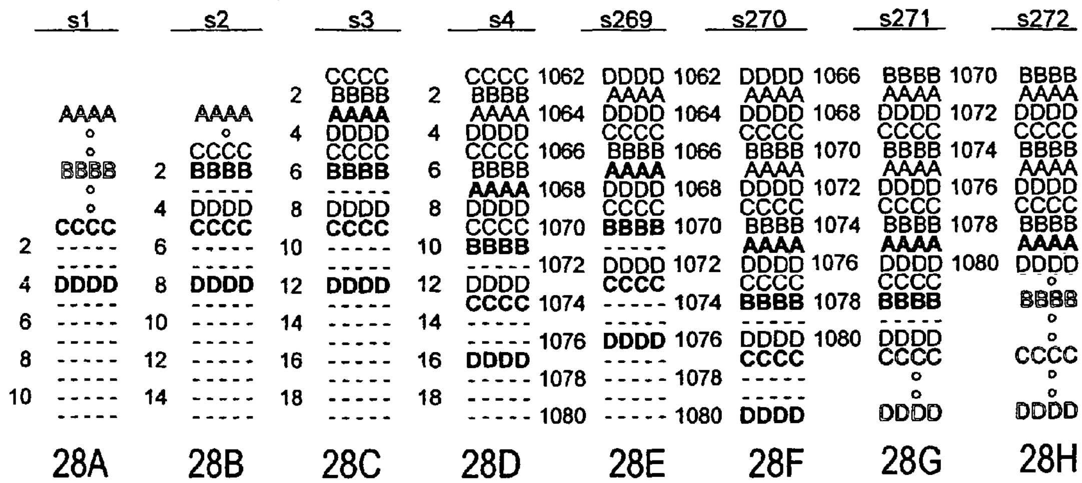
FIGS. 28A through 28H are time sequence diagrams for Example 1, illustrating line reordering for the 4×3 spot pattern of FIG. 27S having an effective row spacing of three lines and vertical adjustment between scan passes of four lines.
Figures 29A, 29B, 29C, 29D:
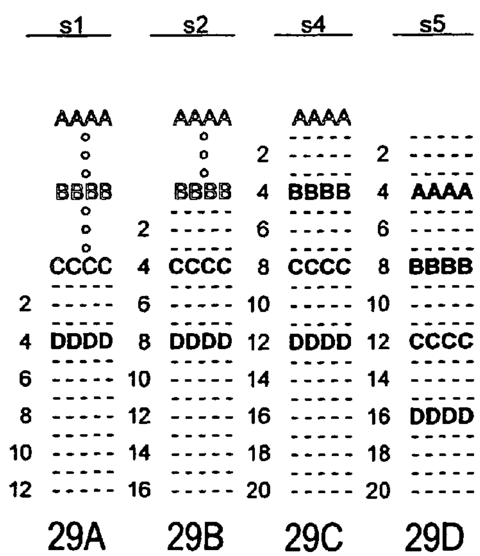
FIGS. 29A through 29D are time sequence diagrams for Example 2, illustrating the ineffective line reordering for a 4×3 spot pattern similar to FIG. 27S having an effective row spacing of four lines and a vertical adjustment between scan passes of four lines.
Figures 30A, 30B, 30C, 30D:
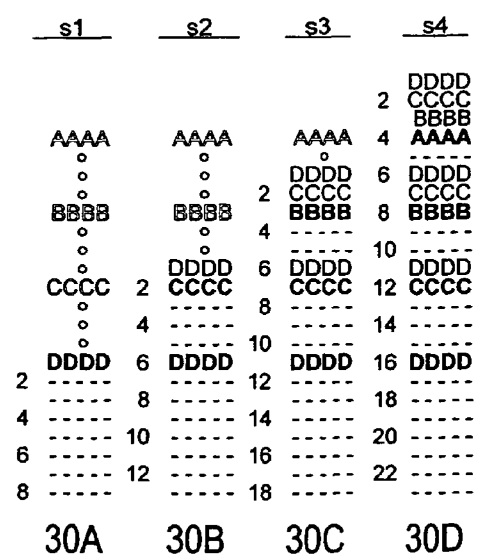
FIGS. 30A through 30D are time sequence diagrams for Example 3, illustrating the ineffective line reordering for a 4×3 spot pattern similar to FIG. 27S having an effective row spacing of four lines and a vertical adjustment between scan passes of five lines.
Figure 31A:
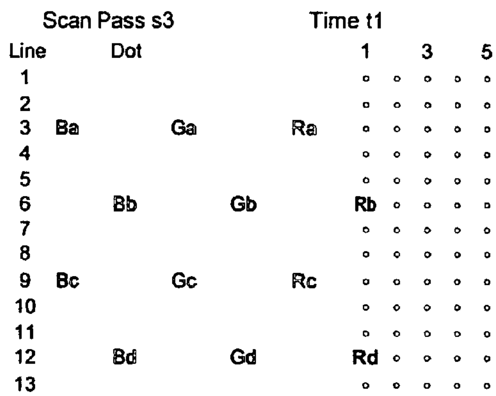
FIGS. 31A through 31F are time sequence diagrams for Example 1, illustrating the time shifting of spots of each primary color in a row of a pattern of spots of FIG. 27S to form a composite spot at each dot location of a line of a frame.
Figure 31B:
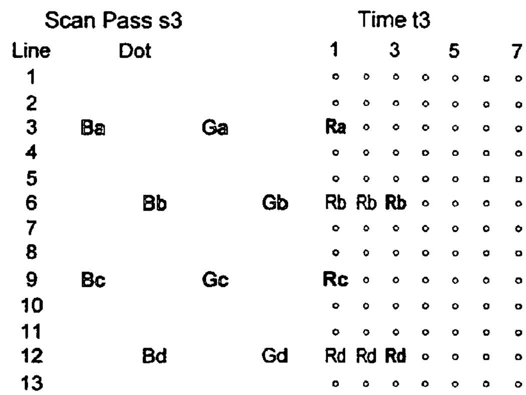
Figure 31C:
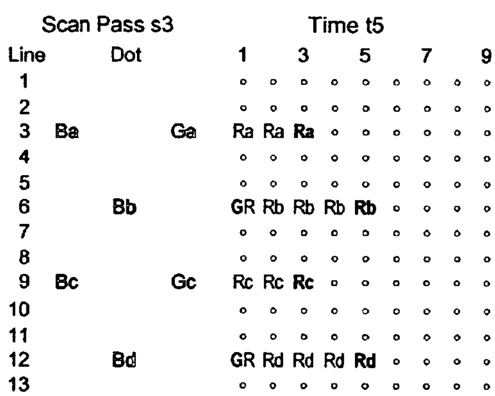
Figure 31D:
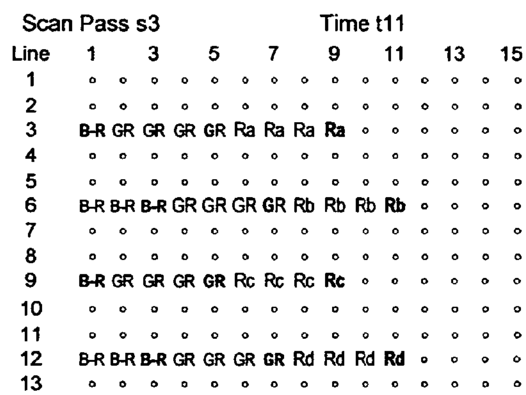
Figure 31E:
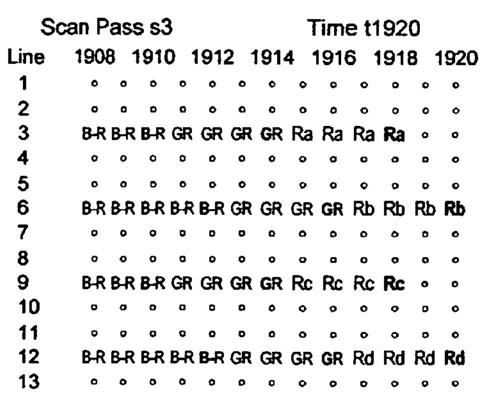
Figure 31F:
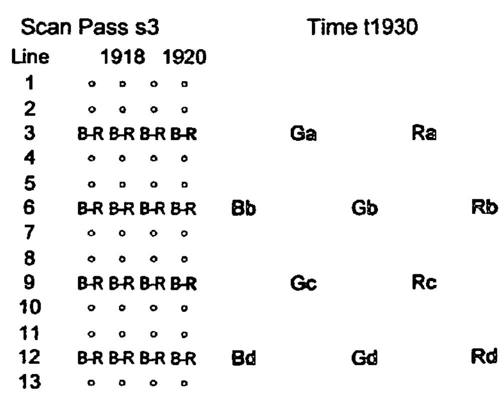
Figures 32A, 32B, 32C, 32D, 32E, 32F, 32G, 32H:
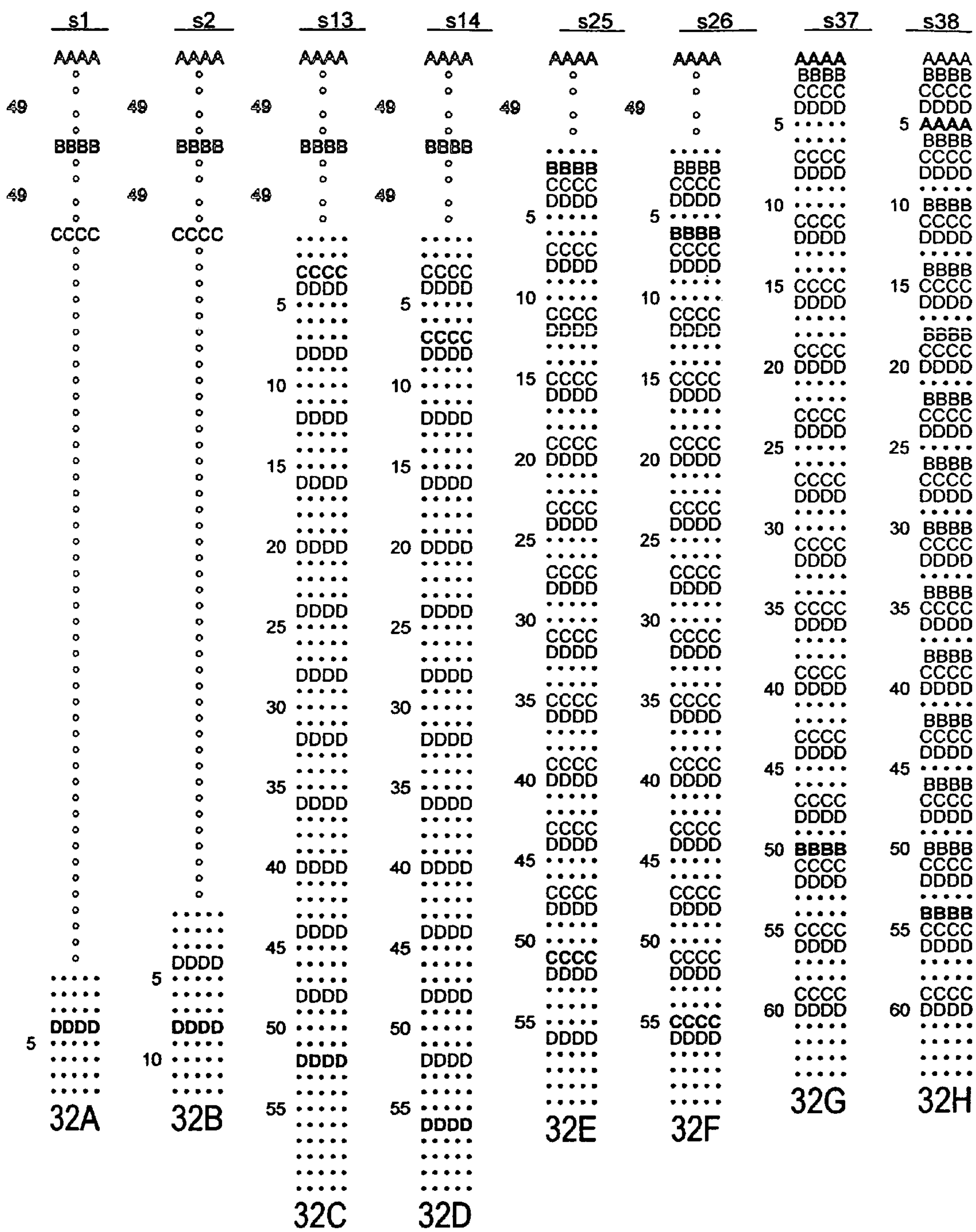
FIGS. 32A through 32H are time sequence diagrams for Example 7, illustrating line reordering for a 4×3 spot pattern similar to that of FIG. 27S having an effective row spacing of 49 lines and a vertical adjustment between scan passes of four lines.

Example 1 illustrates reordering of the video signal to scan complete frames with an emitting end array shown in FIG. 27 and a corresponding spot pattern shown in FIG. 27S of 4 rows by 3 spots per row in a "log" configuration, with the assumptions shown in Tables EX-1A through EX-1C. FIGS. 28A-28H and Table EX-1A describe the lines written at each scan pass s1, s2, s3, . . . . We further assume a uniform or equal physical distance between rows of emitting ends in the output head 58, which is not necessarily required, as described later in connection with other examples. Further, for FIGS. 28A-28H lines written by RowD, RowC, RowB, RowA of emitting ends are indicated by DDDD, CCCC, BBBB, AAAA, respectively.

For this Example 1, as shown by FIGS. 28A through 28D and described in Table EX-1A, the effective row spacing of 3 lines writes the first four lines of the frame during scan passes s1, s2 and s3 in a 4,1,2,3 order. FIGS. 28E through 28H show and Table EX-1A describes the reordering of the pixel information to write lines at the bottom of the frame during scan passes s269-s272 and thereafter, with appropriate blanking of rows when out-of-frame. Thus, for the spot pattern of Example 1, having an effective row spacing of 3 lines, a complete frame is written in 272 scan passes. In the emitting end array shown in FIG. 5 and the resulting spot pattern shown in FIG. 5S, the emitting ends and consequently the pattern of spots of the rows are horizontally centered on the emitting end in the row above and/or below, referred to herein as a "rectangular" or "brick" array or pattern. In such a pattern, during each scan pass, the right-most spots of all rows of the rectangular spot pattern will write the first dot locations in their respective lines, as shown in FIGS. 13A-13E, at approximately the same time. However, FIG. 27 shows a different arrangement, in which the emitting ends, and therefore the spots, in each row are offset such that the emitting ends and spots in alternate rows fit in the valleys between the obverse rows, termed herein for convenience the "log" array or pattern, as shown in FIGS. 27 and 27*s*. As shown in FIG. 31 and Table EX-1B for the 4 row by 3 spots per row pattern of spots of this Example 1 with the log pattern, and assuming a spacing between spots within rows of 4 dot locations, at time t1 during scan pass s3, dot location 1 in lines L6 and L12 will be illuminated by the red spots of RowB and RowD while the green and blue spots of RowB and RowD, and all spots of RowA and RowC will be blanked.

TABLE EX-1A

| Output Head Configuration (spot pattern)<br>Corresponding Figure: FIG. 27, 28 | | Rows: 4 Spots/Row: 3<br>Vertical Adjustment: 4 lines<br>Effective Row spacing: 3 lines | | |
|---|---|---|---|---|
| | Lines Written by Respective Rows of Emitting Ends | | | |
| Scan Pass | Row A | Row B | Row C | Row D |
| 1 | b | b | 1 | 4 |
| 2 | b | 2 | 5 | 8 |
| 3 | 3 | 6 | 9 | 12 |
| 4 | 7 | 10 | 13 | 16 |
| 5 | 11 | 14 | 17 | 20 |
| . | . | . | . | . |
| . | . | . | . | . |
| . | . | . | . | . |
| 270 | 1071 | 1074 | 1077 | 1080 |
| 271 | 1075 | 1078 | b | b |
| 272 | 1079 | b | b | b |

As shown by FIGS. 31B through 31F and described in Table EX-1B, for the remaining times t2-t11 of the illustrative scan pass s3, at time t11 all spots will illuminate dot locations at an appropriately modulated intensity (which may be zero). It should be noted that the color spots need not be in the same order for all rows, as will be described in more detail herein. Table EX-1C illustrates the timing of the dot illumination for scan pass s3 for times t1920-1930 at the end of the line and scan pass prior to initiating the next scan pass s4 shown in FIG. 28D.

EXAMPLE 2

Example 2, described in Table EX-2 below and schematically shown in FIGS. 5S, 29A through 29D is an example of how an effective row spacing that is an even multiple of the number of rows of emitting ends or spots (in this Example 2, an effective row spacing of 4) with a

TABLE EX-1B

Output Head Configuration (spot pattern)<br>Corresponding Figure: FIG. 28, 30<br>Pattern of Spots: Log<br>Scan Pass: 3 Blank = b Rows: 4 Spots/Row: 3<br>Vertical Adjustment: 4 lines<br>Effective Row spacing: 3 lines<br>Spot Spacing w/i Row: 4 dots

| | Row A | | | Row B | | | Row C | | | Row D | | |
|---|---|---|---|---|---|---|---|---|---|---|---|---|
| | Blue | Green | Red | Blue | Green | Red | Blue | Green | Red | Blue | Green | Red |
| Line | time t1 | | | | | Dot Locations | | | | | | |
| 3 | b | b | b | | | | | | | | | |
| . | | | | | | | | | | | | |
| . | | | | | | | | | | | | |
| . | | | | | | | | | | | | |
| 6 | | | | b | b | 1 | | | | | | |
| . | | | | | | | | | | | | |
| . | | | | | | | | | | | | |
| . | | | | | | | | | | | | |
| 9 | | | | | | | b | b | b | | | |
| . | | | | | | | | | | | | |
| . | | | | | | | | | | | | |
| . | | | | | | | | | | | | |
| 12 | | | | | | | | | | b | b | 1 |
| Line | time t2 | | | | | Dot Locations | | | | | | |
| 3 | b | b | b | | | | | | | | | |
| . | | | | | | | | | | | | |
| . | | | | | | | | | | | | |
| . | | | | | | | | | | | | |
| 6 | | | | b | b | 2 | | | | | | |
| . | | | | | | | | | | | | |

TABLE EX-1B-continued

| | | | | | | | | | | | | |
|---|---|---|---|---|---|---|---|---|---|---|---|---|
| . | | | | | | | | | | | | |
| . | | | | | | | | | | | | |
| 9 | | | | | | | b | b | b | | | |
| . | | | | | | | | | | | | |
| . | | | | | | | | | | | | |
| . | | | | | | | | | | | | |
| 12 | | | | | | | | | | b | b | 2 |
| Line | time t3 | | | | Dot Locations | | | | | | | |
| 3 | b | b | 1 | | | | | | | | | |
| . | | | | | | | | | | | | |
| . | | | | | | | | | | | | |
| . | | | | | | | | | | | | |
| 6 | | | | b | b | 3 | | | | | | |
| . | | | | | | | | | | | | |
| . | | | | | | | | | | | | |
| . | | | | | | | | | | | | |
| 9 | | | | | | | b | b | b | | | |
| . | | | | | | | | | | | | |
| . | | | | | | | | | | | | |
| . | | | | | | | | | | | | |
| 12 | | | | | | | | | | b | b | 3 |
| Line | time t5 | | | | Dot Locations | | | | | | | |
| 3 | b | b | 3 | | | | | | | | | |
| . | | | | | | | | | | | | |
| . | | | | | | | | | | | | |
| . | | | | | | | | | | | | |
| 6 | | | | b | 1 | 5 | | | | | | |
| . | | | | | | | | | | | | |
| . | | | | | | | | | | | | |
| . | | | | | | | | | | | | |
| 9 | | | | | | | b | b | 3 | | | |
| . | | | | | | | | | | | | |
| . | | | | | | | | | | | | |
| . | | | | | | | | | | | | |
| 12 | | | | | | | | | | b | 1 | 5 |
| Line | time t11 | | | | Dot Locations | | | | | | | |
| 3 | 1 | 5 | 9 | | | | | | | | | |
| . | | | | | | | | | | | | |
| . | | | | | | | | | | | | |
| . | | | | | | | | | | | | |
| 6 | | | | 3 | 7 | 11 | | | | | | |
| . | | | | | | | | | | | | |
| . | | | | | | | | | | | | |
| . | | | | | | | | | | | | |
| 9 | | | | | | | 1 | 5 | 9 | | | |
| . | | | | | | | | | | | | |
| . | | | | | | | | | | | | |
| . | | | | | | | | | | | | |
| 12 | | | | | | | | | | 3 | 7 | 11 |

TABLE EX-1C

| | |
|---|---|
| Output Head Configuration (spot pattern) | Rows: 4 Spots/Row: 3 |
| Corresponding Figure: FIG. 27, 31 | Vertical Adjustment: 4 lines |
| Pattern of Spots: Log | Effective Row spacing: 3 lines |
| Scan Pass: 3 Blank = b | Spot Spacing w/i Row: 4 dots |

| | Row A | | | Row B | | | Row C | | | Row D | | |
|---|---|---|---|---|---|---|---|---|---|---|---|---|
| | Blue | Green | Red | Blue | Green | Red | Blue | Green | Red | Blue | Green | Red |
| Line | time t1920 | | | | Dot Locations | | | | | | | |
| 3 | 1910 | 1914 | 1918 | | | | | | | | | |
| . | | | | | | | | | | | | |
| . | | | | | | | | | | | | |
| . | | | | | | | | | | | | |
| 6 | | | | 1912 | 1916 | 1920 | | | | | | |
| . | | | | | | | | | | | | |
| . | | | | | | | | | | | | |
| . | | | | | | | | | | | | |

TABLE EX-1C-continued

| | | | | | | | | | | | | |
|---|---|---|---|---|---|---|---|---|---|---|---|---|
| 9 | | | | | | | 1910 | 1914 | 1918 | | | |
| . | | | | | | | | | | | | |
| . | | | | | | | | | | | | |
| . | | | | | | | | | | | | |
| 12 | | | | | | | | | | 1912 | 1916 | 1920 |
| Line | time t1921 | | | | | Dot Locations | | | | | | |
| 3 | 1911 | 1915 | 1919 | | | | | | | | | |
| . | | | | | | | | | | | | |
| . | | | | | | | | | | | | |
| . | | | | | | | | | | | | |
| 6 | | | | 1913 | 1917 | b | | | | | | |
| . | | | | | | | | | | | | |
| . | | | | | | | | | | | | |
| . | | | | | | | | | | | | |
| 9 | | | | | | | 1911 | 1915 | 1919 | | | |
| . | | | | | | | | | | | | |
| . | | | | | | | | | | | | |
| . | | | | | | | | | | | | |
| 12 | | | | | | | | | | 1913 | 1917 | b |
| Line | time t1922 | | | | | Dot Locations | | | | | | |
| 3 | 1912 | 1916 | 1920 | | | | | | | | | |
| . | | | | | | | | | | | | |
| . | | | | | | | | | | | | |
| . | | | | | | | | | | | | |
| 6 | | | | 1914 | 1918 | b | | | | | | |
| . | | | | | | | | | | | | |
| . | | | | | | | | | | | | |
| . | | | | | | | | | | | | |
| 9 | | | | | | | 1912 | 1916 | 1920 | | | |
| . | | | | | | | | | | | | |
| . | | | | | | | | | | | | |
| . | | | | | | | | | | | | |
| 12 | | | | | | | | | | 1914 | 1918 | b |
| Line | time t1924 | | | | | Dot Locations | | | | | | |
| 3 | 1914 | 1918 | b | | | | | | | | | |
| . | | | | | | | | | | | | |
| . | | | | | | | | | | | | |
| . | | | | | | | | | | | | |
| 6 | | | | 1916 | 1920 | b | | | | | | |
| . | | | | | | | | | | | | |
| . | | | | | | | | | | | | |
| . | | | | | | | | | | | | |
| 9 | | | | | | | 1914 | 1918 | b | | | |
| . | | | | | | | | | | | | |
| . | | | | | | | | | | | | |
| . | | | | | | | | | | | | |
| 12 | | | | | | | | | | 1916 | 1920 | b |
| Line | time t1930 | | | | | Dot Locations | | | | | | |
| 3 | 1920 | b | b | | | | | | | | | |
| . | | | | b | b | b | | | | | | |
| . | | | | | | | | | | | | |
| . | | | | | | | | | | | | |
| 6 | | | | | | | | | | | | |
| . | | | | | | | | | | | | |
| . | | | | | | | | | | | | |
| . | | | | | | | | | | | | |
| 9 | | | | | | | 1920 | b | b | | | |
| . | | | | | | | | | | | | |
| . | | | | | | | | | | | | |
| . | | | | | | | | | | | | |
| 12 | | | | | | | | | | b | b | b |

vertical line adjustment between scan passes equal to the number of rows of emitting ends or spots (in this Example 2, a vertical adjustment of 4 lines) is not effective in the exemplary system.

TABLE EX-2

| Output Head Configuration (spot pattern) Corresponding Figure: FIG. 29 | Rows: 4 Spots/Row: 3 Vertical Adjustment: 4 lines Effective Row spacing: 4 lines | | | |
|---|---|---|---|---|
| | Lines Written by Respective Rows of Emitting Ends | | | |
| Scan Pass | Row A | Row B | Row C | Row D |
| 1 | b | b | b | 4 |
| 2 | b | b | 4 | 8 |
| 3 | b | 4 | 8 | 12 |
| 4 | 4 | 8 | 12 | 16 |
| 5 | 8 | 12 | 16 | 20 |
| . | . | . | . | . |
| . | . | . | . | . |
| . | . | . | . | . |
| 270 | 1068 | 1072 | 1076 | 1080 |
| 271 | 1072 | 1076 | 1080 | b |
| 272 | 1076 | 1080 | b | b |

Referring to Table EX-2 and FIGS. 29A-29D, it may be seen that lines L1, L2 and L3; L5, L6, L7; L9, L10, L11; and so forth will not be written during a top to bottom series of scan passes.

EXAMPLE 3

Similarly, in Example 3, described in Table EX-3 and schematically shown in a typical frame format in FIGS. 30A through 30D it may be seen that changing the line adjustment for the four line effective row spacing output head to a five line adjustment still fails to write lines 3, 8, . . . ; etc.

TABLE EX-3

| Output Head Configuration (spot pattern) Corresponding Figure: FIG. 29 | Rows: 4 Spots/Row: 3 Vertical Adjustment: 4 lines Effective Row spacing: 4 lines | | | |
|---|---|---|---|---|
| | Lines Written by Respective Rows of Emitting Ends | | | |
| Scan Pass | Row A | Row B | Row C | Row D |
| 1 | b | b | b | 4 |
| 2 | b | b | 4 | 8 |
| 3 | b | 4 | 8 | 12 |
| 4 | 4 | 8 | 12 | 16 |
| 5 | 8 | 12 | 16 | 20 |
| . | . | . | . | . |
| . | . | . | . | . |
| . | . | . | . | . |
| 270 | 1068 | 1072 | 1076 | 1080 |
| 271 | 1072 | 1076 | 1080 | b |
| 272 | 1076 | 1080 | b | b |

EXAMPLE 4

Figures 79A, 79B, 79C, 79D, 79E, 79F, 79G, 79H:
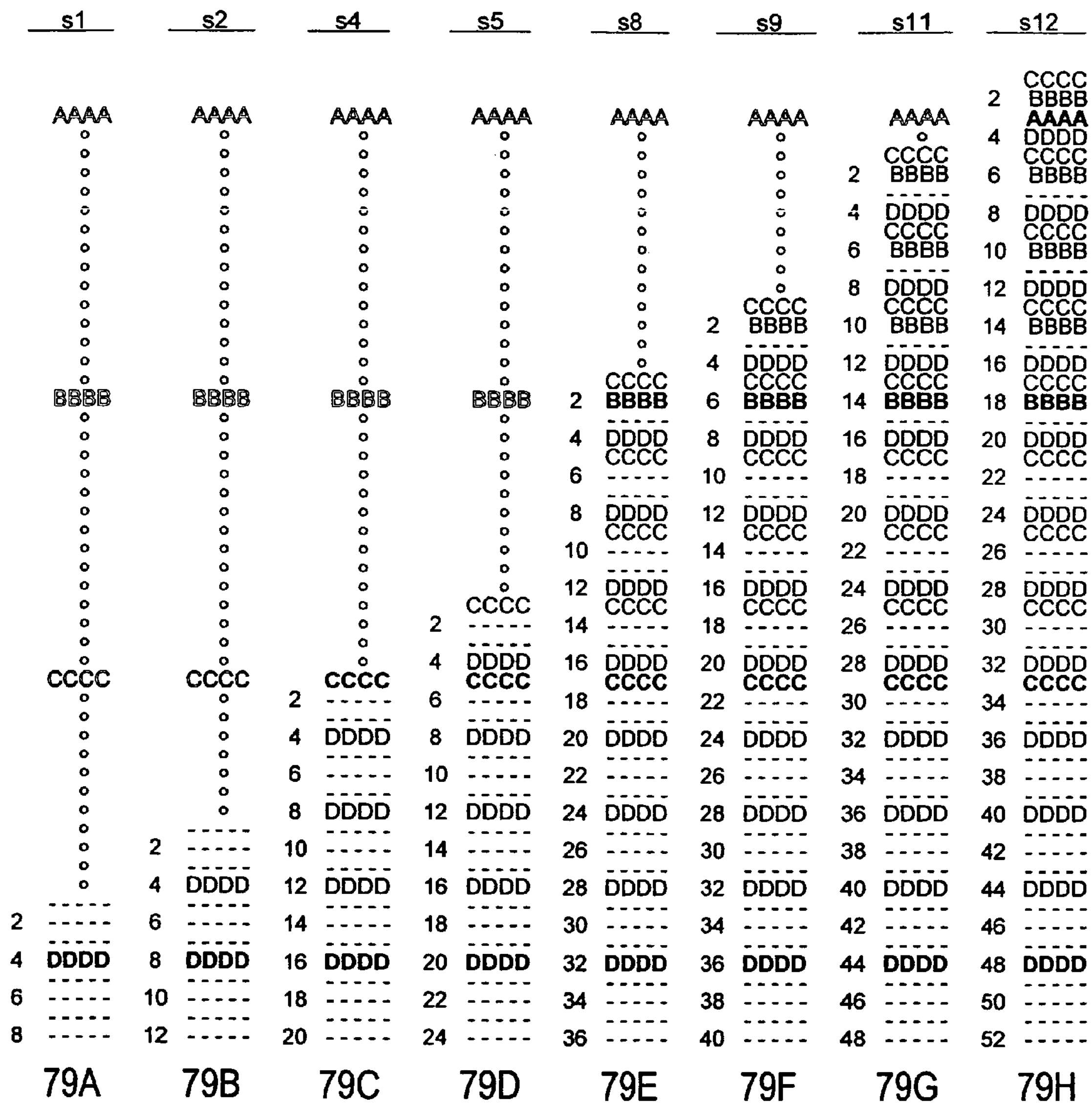
FIGS. 79A through 79P are time sequence diagrams for Example 4, illustrating line reordering for 4×3 spot pattern similar to that of FIG. 28S having an effective row spacing of 15 lines and a vertical adjustment between scan passes of four lines.

For Example 4, described in Table EX-4 and schematically shown in FIGS. 33A-33H, we assume an effective row spacing of about 15 lines. However, 16 lines apart would be an even multiple of the number of rows of spots projected from the array of emitting ends onto the screen and thus would not be effective in writing all lines of the frame. As shown in FIG. 79A, although not required, line L4 of the frame is preferably first written with the bottom row (RowD) of spots. Thus, in summary, lines L1-L4 all will be written after 12 horizontal scan passes have occurred, and the entire frame is written after 281 scan passes.

TABLE EX-4

Figures 79I, 79J, 79K, 79L, 79M, 79N, 79O, 79P:
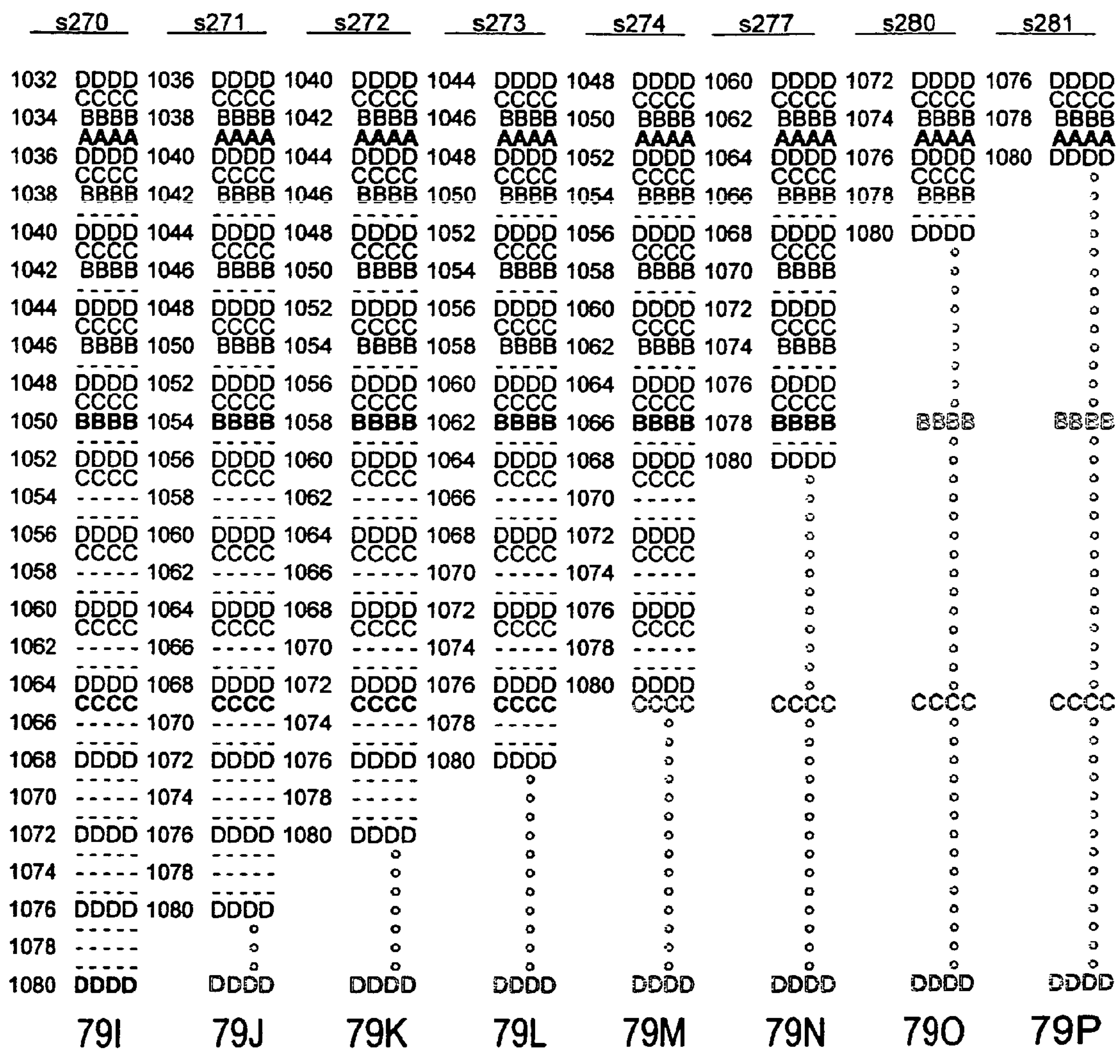

| Output Head Configuration (spot pattern) Corresponding Figure: FIG. 79 | Rows: 4 Spots/Row: 3 Vertical Adjustment: 4 lines Effective Row spacing: 15 lines | | | |
|---|---|---|---|---|
| | Lines Written by Respective Rows of Emitting Ends | | | |
| Scan Pass | Row A | Row B | Row C | Row D |
| 1 | b | b | b | 4 |
| 2 | b | b | b | 8 |
| . | . | . | . | . |
| . | . | . | . | . |
| . | . | . | . | . |
| 4 | b | b | 1 | 16 |
| 5 | b | b | 5 | 20 |
| . | . | . | . | . |
| . | . | . | . | . |
| . | . | . | . | . |
| 8 | b | 2 | 17 | 32 |
| 9 | b | 6 | 21 | 36 |
| . | . | . | . | . |
| . | . | . | . | . |
| . | . | . | . | . |
| 12 | 3 | 18 | 33 | 48 |
| 38 | 7 | 22 | 37 | 52 |
| . | . | . | . | . |
| . | . | . | . | . |
| . | . | . | . | . |
| 270 | 1035 | 1050 | 1065 | 1080 |
| 271 | 1039 | 1054 | 1069 | b |
| . | . | . | . | . |
| . | . | . | . | . |
| . | . | . | . | . |
| 273 | 1047 | 1062 | 1077 | b |
| 274 | 1051 | 1066 | b | b |
| . | . | . | . | . |
| . | . | . | . | . |
| . | . | . | . | . |
| 277 | 1063 | 1078 | b | b |
| 278 | 1067 | b | b | b |
| . | . | . | . | . |
| . | . | . | . | . |
| . | . | . | . | . |
| 281 | 1079 | b | b | b |

EXAMPLE 5

For Example 5, described in Table EX-5 and schematically shown in FIGS. 80A-80H we assume an effective row spacing of about 17 lines, but for the same reasons as for Example 4, not 16 lines apart. In FIG. 38A although not required, line L4 of the frame is preferably first written with the bottom row RowD of the pattern of spots. It should be noted that in this Example 5, the lines are written in a 4,3,2,1 sequence, as opposed to the different order from Example 4 of 4,1,2,3. Thus, in summary, lines L1-L4 all will be written after 13 horizontal scan passes have occurred, and the entire frame is written after 282 scan passes.

TABLE EX-5

Figures 80I, 80J, 80K, 80L, 80M, 80N, 80O, 80P:
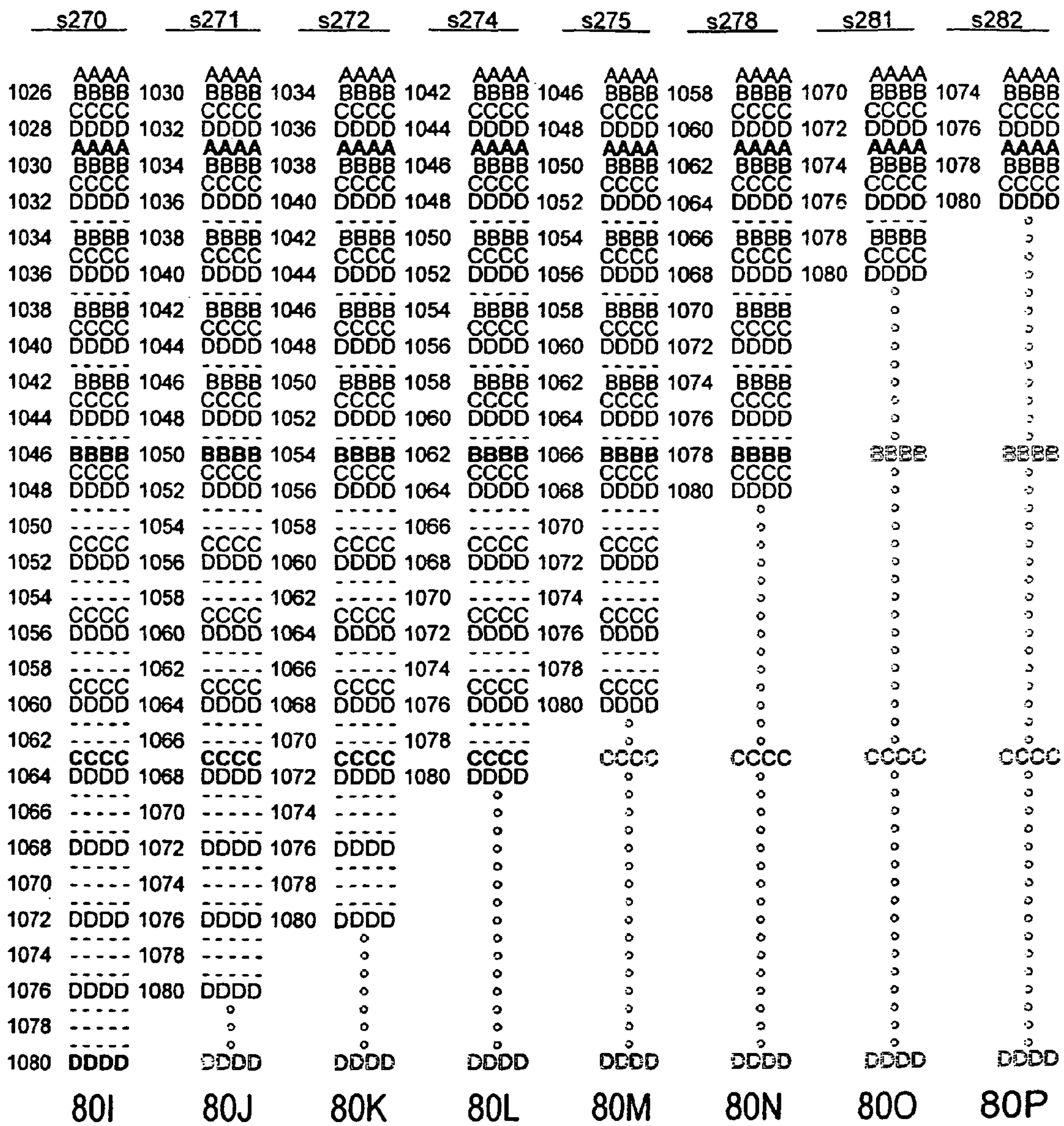
Figures 81A, 81B, 81C, 81D, 81E, 81F, 81G, 81H:
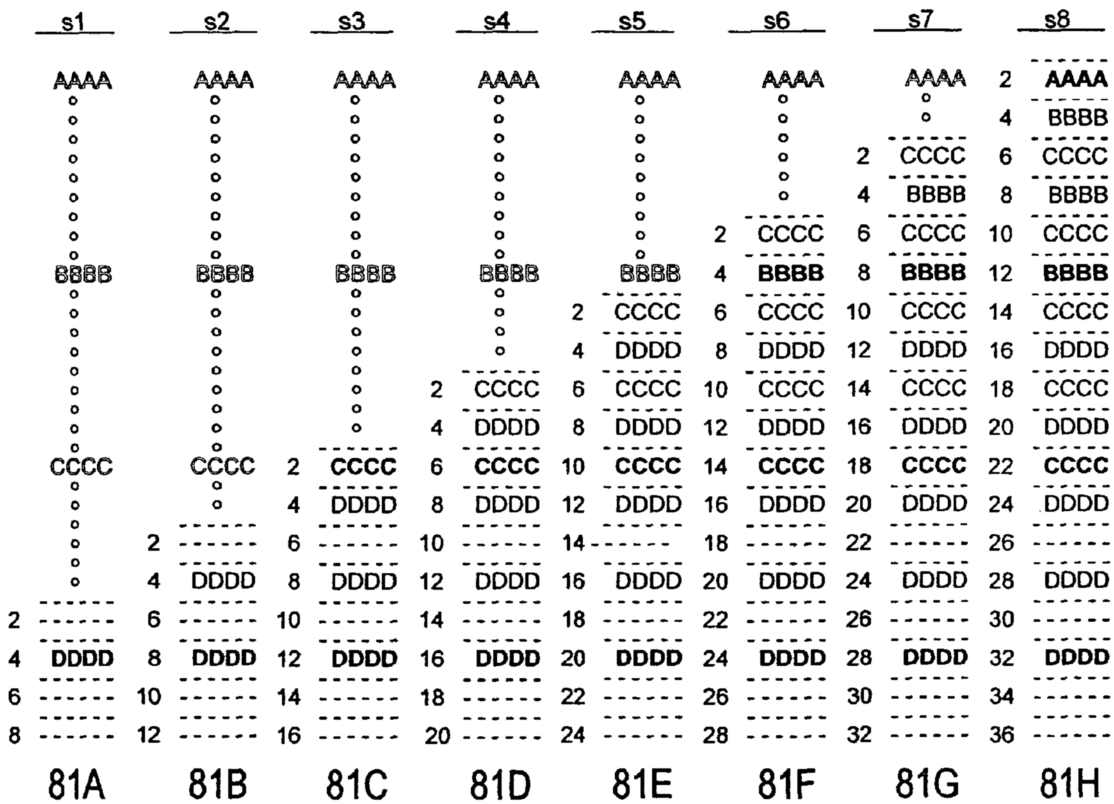
FIGS. 81A through 81H are time sequence diagrams for Example 6, illustrating the ineffective line reordering for 4×3 spot pattern similar to that of FIG. 28S having an effective row spacing of 10 lines and a vertical adjustment between scan passes of four lines.

| | |
|---|---|
| Output Head Configuration (spot pattern) Corresponding Figure: FIG. 80 | Rows: 4 Spots/Row: 3 Vertical Adjustment: 4 lines Effective Row spacing: 17 lines |

TABLE EX-5-continued

| Scan Pass | Lines Written by Respective Rows of Emitting Ends | | | |
|---|---|---|---|---|
| | Row A | Row B | Row C | Row D |
| 1 | b | b | b | 4 |
| 2 | b | b | b | 8 |
| . | . | . | . | . |
| . | . | . | . | . |
| . | . | . | . | . |
| 5 | b | b | 3 | 20 |
| 6 | b | b | 7 | 24 |
| . | . | . | . | . |
| . | . | . | . | . |
| . | . | . | . | . |
| 9 | b | 2 | 19 | 36 |
| 10 | b | 6 | 23 | 40 |
| . | . | . | . | . |
| . | . | . | . | . |
| . | . | . | . | . |
| 13 | 1 | 18 | 35 | 52 |
| 14 | 5 | 22 | 39 | 56 |
| . | . | . | . | . |
| . | . | . | . | . |
| . | . | . | . | . |
| 270 | 1029 | 1046 | 1063 | 1080 |
| 271 | 1033 | 1050 | 1067 | b |
| . | . | . | . | . |
| . | . | . | . | . |
| . | . | . | . | . |
| 274 | 1045 | 1062 | 1079 | b |
| 275 | 1049 | 1066 | b | b |
| . | . | . | . | . |
| . | . | . | . | . |
| . | . | . | . | . |
| 278 | 1061 | 1078 | b | b |
| 279 | 1065 | b | b | b |
| . | . | . | . | . |
| . | . | . | . | . |
| . | . | . | . | . |
| 282 | 1077 | b | b | b |

EXAMPLES 6

Example 6, described in Table EX-6 and schematically shown in FIGS. 81A-81H, illustrates the ineffectiveness of an effective row spacing of 10 lines. In FIG. 81, describing the lines written by the system of Example 6, line L4 of the frame is preferably first written with the bottom row RowD of the pattern of spots while RowC, RowB and RowA are blanked. As shown in FIG. 37 and demonstrated in Table EX-6, after 8 scan passes, and even after 12 scan passes, lines L1 and L3, and indeed all odd numbered lines of dot locations of the frame, will not be written.

TABLE EX-6

| | |
|---|---|
| Output Head Configuration (spot pattern)<br>Corresponding Figure: FIG. 81 | Rows: 4 Spots/Row: 3<br>Vertical Adjustment: 4 lines<br>Effective Row spacing:<br>10 lines |

| Scan Pass | Lines Written by Respective Rows of Emitting Ends | | | |
|---|---|---|---|---|
| | Row A | Row B | Row C | Row D |
| 1 | b | b | b | 4 |
| 2 | b | b | b | 8 |
| 3 | b | b | 2 | 12 |
| 4 | b | b | 6 | 16 |
| 5 | b | b | 10 | 20 |
| 6 | b | 4 | 14 | 24 |
| 7 | b | 8 | 18 | 28 |
| 8 | 2 | 12 | 22 | 32 |
| 9 | 6 | 16 | 26 | 36 |
| 10 | 10 | 20 | 30 | 40 |
| 11 | 14 | 24 | 34 | 44 |
| 12 | 18 | 28 | 38 | 48 |

EXAMPLE 7

Various effective row spacings for the emitting end configurations and spot patterns of the foregoing Examples 1-3 can be used. For this Example 7, described in Table EX-7 and schematically shown in a preferred 1920×1080p frame in FIGS. 32A-32H, we assume an effective row spot spacing of about 49 lines, but not 48 lines, because this would be an even multiple of the number of rows of spots projected from the array of emitting ends onto the screen and thus would not be effecting in writing all lines of the frame.

TABLE EX-7

| | |
|---|---|
| Output Head Configuration (spot pattern)<br>Corresponding Figure: FIG. 32 | Rows: 4 Spots/Row: 3<br>Vertical Adjustment: 4 lines<br>Effective Row spacing:<br>49 lines |

| Scan Pass | Lines Written by Respective Rows of Emitting Ends | | | |
|---|---|---|---|---|
| | Row A | Row B | Row C | Row D |
| 1 | b | b | b | 4 |
| 2 | b | b | b | 8 |
| 3 | b | b | b | 12 |
| . | . | . | . | . |
| . | . | . | . | . |
| . | . | . | . | . |
| 13 | b | b | 3 | 52 |
| 14 | b | b | 7 | 56 |
| . | . | . | . | . |
| . | . | . | . | . |
| . | . | . | . | . |
| 25 | b | 2 | 51 | 100 |
| 26 | b | 6 | 55 | 104 |
| . | . | . | . | . |
| . | . | . | . | . |
| . | . | . | . | . |
| 37 | 1 | 50 | 99 | 148 |
| 38 | 5 | 54 | 103 | 152 |
| . | . | . | . | . |
| . | . | . | . | . |
| . | . | . | . | . |
| 270 | 933 | 982 | 1031 | 1080 |
| 271 | 937 | 986 | 1035 | b |
| . | . | . | . | . |
| . | . | . | . | . |
| . | . | . | . | . |
| 282 | 981 | 1030 | 1079 | b |
| 283 | 985 | 1034 | b | b |
| . | . | . | . | . |
| . | . | . | . | . |
| . | . | . | . | . |
| 294 | 1029 | 1078 | b | b |
| 295 | 1033 | b | b | b |
| . | . | . | . | . |
| . | . | . | . | . |
| . | . | . | . | . |
| 306 | 1077 | b | b | b |

It should be noted that in Example 7, the lines are written in a 4,3,2,1 sequence, as opposed to the different order from Example 1 of 4,1,2,3. As with previous examples, line L4 of the frame is preferably first written with the bottom row RowD of spots, corresponding to the top row RowD of emitting ends of the output head, and as shown in FIGS. 32A-32H and described in Table EX-7, lines L1-L4 will be written after 37 scan passes. For this Example 7, and as shown in Table EX-7, based on the assumed 1920×1080p resolution, after the 270 scans required to move row RowD down to write line L1080, thirty-six additional scans will occur as row RowA is moved down the screen 12 to write line L1077.

EXAMPLES 8-23

The next examples (Examples 8-23) illustrate variations of emitting end (spot pattern) configurations of the output head from the 4×3 array described for Examples 1-7, in which Tables EX-8 through EX-23 show and describe the reordering of the video signal required for a variety of different output head (pattern of snots) configurations.

Unlike Examples 1-7, the following Examples 8-23 are not limited to a 4 row by 3 spots per row spot pattern or corresponding emitting end array, a 4 line vertical adjustment after each horizontal scan pass, a uniform distance between rows of emitting ends, the assumption of three emitting ends in each row emitting one of the three primary colors, or even vertical alignment of spots in different rows.

For convenient reference as to the following examples, we continue to refer to the rows of the pattern of spots from top to bottom, e.g., rows RowA, RowB, RowC, RowD, RowE, for the 5×3 array. As with the previous examples, the lines of spots written by each respective row are denoted in the drawings by a row of letters corresponding to that row (e.g., AAA, BBB, CCC, DDD and EEE or AAAA, BBBB, CCCC, DDDD and EEEE). For all of the Examples 8-23, all system sections and components are the same as with the Initial Example of FIG. 1, except for the output head 58 configuration and resulting spot pattern, and the consequent different reordering performed by the controller section 100, or as specifically noted for the particular example concerned.

EXAMPLES 8-9

Figures 39A, 39B, 39C, 39D, 39E, 39F, 39G, 39H, 39I, 39J:
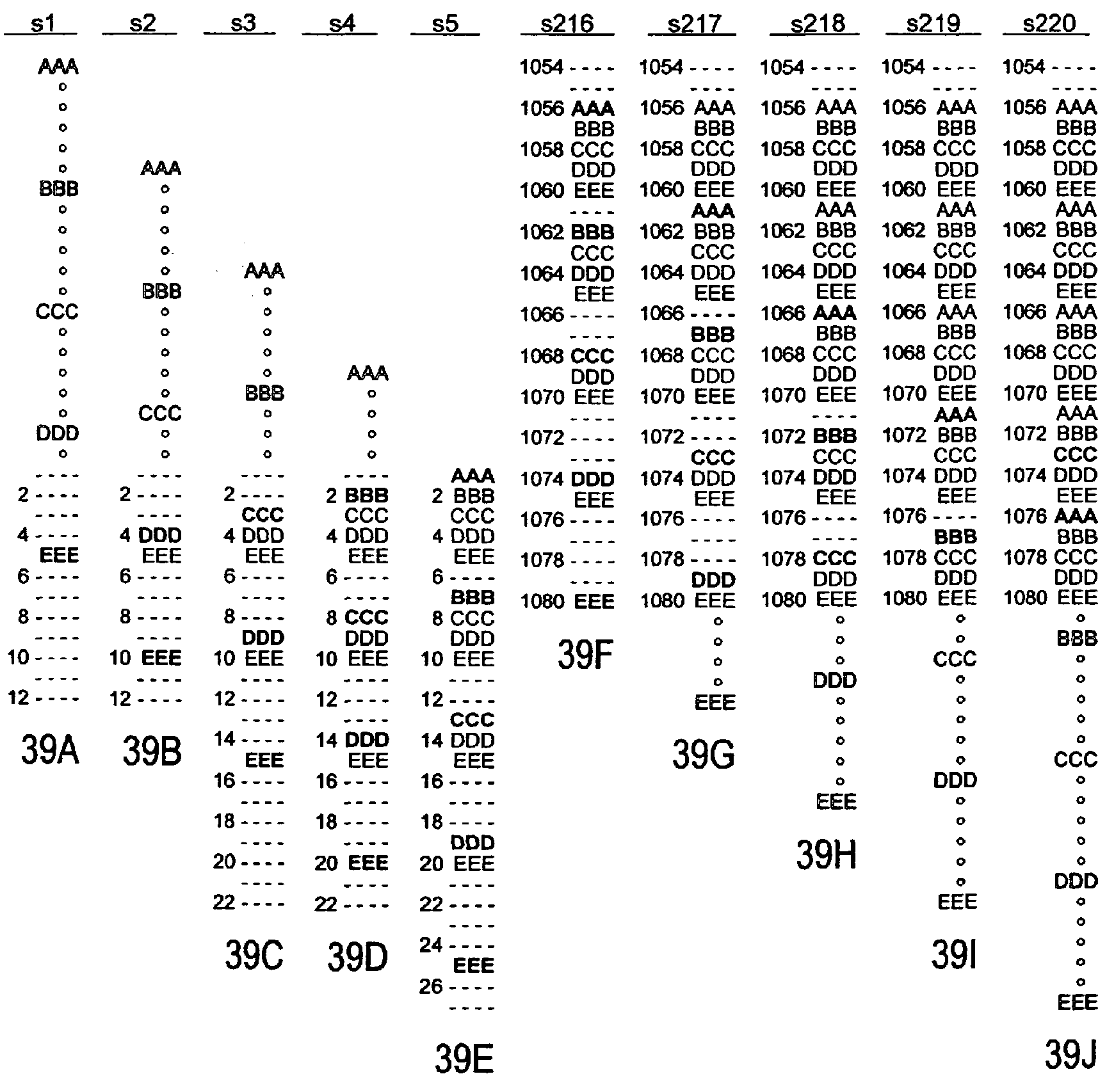
FIGS. 39A through 39J are time sequence diagrams for Example 13, illustrating line reordering for a 5×3 spot pattern of FIG. 38S having an effective row spacing of 6 lines and a vertical adjustment between scan passes of 5 lines.

Another embodiment similar to our Initial Example is an output head having 9 fibers arranged in 3 rows of 3 emitting ends, producing a spot pattern of three vertically spaced apart rows of red, green and blue spots as shown in FIGS. 39 and 39S. Although the 3×3 spot pattern of Examples 8 and 9 requires 360 scan passes per frame, rather than 270 scan passes per frame for the 4×3 spot pattern examples, the expense of beam dividing optics, modulators, other components and perhaps lasers is reduced. This system approaches the practical limits of our preferred polygon mirror for the preferred 1920×1080p resolution.

Figure 33:
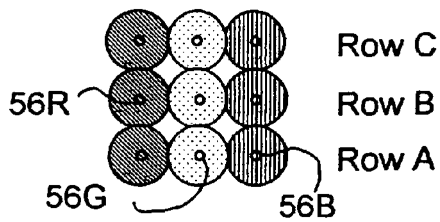
FIG. 33 is a diagram for Examples 8 and 9, showing a 3 row by 3 emitting end per row array of an alternate output head for use in the system of FIG. 1.
Figure 33S:
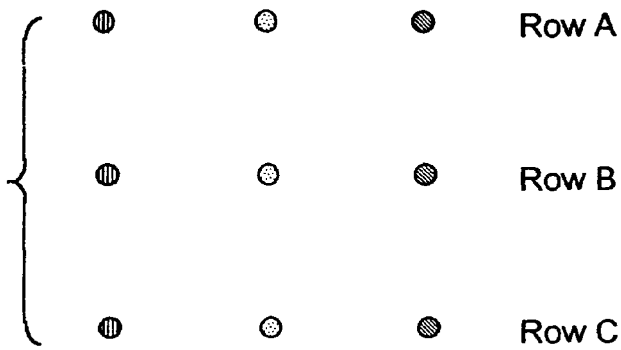
FIG. 33S is a diagram of the pattern of spots projected on a screen using the array shown FIG. 33.

Examples 8 and 9, as shown in FIG. 33, respectively, and described in Tables EX-8 and EX-9, illustrate the reordering required for a 3 row by 3 emitting end per row output head configuration and spot pattern respectively shown in FIGS. 33 and 33S, wherein the vertical adjustment between scan passes is 3 lines of dot locations. As with most of the examples, for Examples 8-9 the vertical adjustment preferably equals the number of rows of emitting ends in the output head for these cases. Although we have not provided as many examples of the reordering required for this output head configuration as for the 4 row by 3 emitting end per row configuration in Examples 1-7, similar alternatives, and many others, can be deduced by extrapolating the two examples described herein.

EXAMPLE 8

In previous examples, a 4 row by 3 spots per row spot pattern is presented as an appropriate compromise between cost and performance. Another embodiment, exemplified by Example 8, is an output head having 9 fibers arranged in 3 rows of 3 emitting ends, producing a spot pattern of three vertically spaced apart rows of red, green and blue spots as shown in FIGS. 33 and 33S. Although the 3×3 spot pattern of Examples 8 require 360 scan passes per frame, rather than 270 scan passes per frame for the 4×3 spot pattern examples, the expense of beam dividing optics, modulators, other components and perhaps lasers is reduced. Further, although approaching the practical limits of our preferred polygon mirror, at least for the preferred 1920×1080p resolution, this output head configuration may also be practical.

Example 8, as shown in FIG. 34 and described in Table EX-8, illustrates the recording required for a 3 row by 3 emitting end per row output head configuration and spot pattern, respectively, shown in FIGS. 33 and 33S, wherein the vertical adjustment between scan passes is 3 lines of dot locations. As with most of the examples, for Example 8 the vertical adjustment preferably equals the number of rows of emitting ends in the output head for these cases. Although we have not provided as many examples of the reordering required for this output head configuration as for the 4 row by 3 emitting end per row configuration in Examples 1-7, similar alternatives, and many others, can be deduced by extrapolating the examples described herein.

TABLE EX-8

| | |
|---|---|
| | Rows: 3 Spots/Row: 3 |
| Output Head Configuration (spot pattern) | Vertical Adjustment: 3 lines |
| Corresponding Figure: FIG. 33 | Effective Row spacing: 4 lines |

| Scan Pass | Lines Written by Respective Rows of Emitting Ends: Row A | Row B | Row C |
|---|---|---|---|
| 1 | b | b | 3 |
| 2 | b | 2 | 6 |
| 3 | 1 | 5 | 9 |
| 4 | 4 | 8 | 12 |
| . | . | . | . |
| . | . | . | . |
| . | . | . | . |
| 359 | 1069 | 1073 | 1077 |
| 360 | 1072 | 1076 | 1080 |
| 361 | 1075 | 1079 | b |
| 362 | 1078 | b | b |

Figures 34A, 34B, 34C, 34D, 34E, 34F, 34G, 34H:
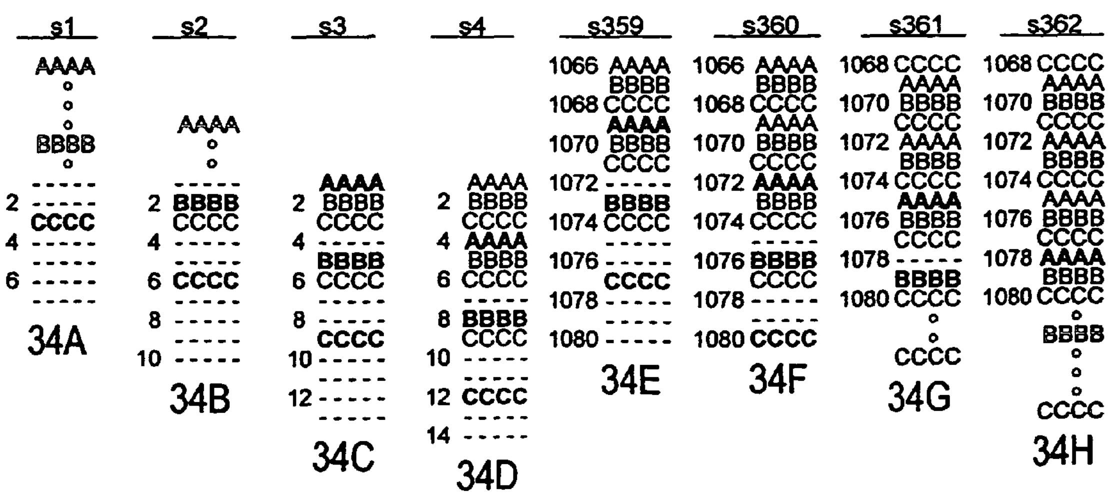
FIGS. 34A through 34H are time sequence diagrams for Example 8, illustrating line reordering for a 3×3 spot pattern of FIG. 33S having an effective row spacing of 4 lines and a vertical adjustment between scan passes of 3 lines.

For Example 8, shown in FIGS. 34A-34H and described in Table EX-8, we assume an effective row spacing of about 4 lines between RowA, RowB and RowC. Referring to FIG. 34A, at times t1, line L3 of the frame is preferably first written with the bottom row RowC of the pattern of spots projected on the screen by the emitting ends of the output head, while RowA and RowB are blanked. As shown in FIGS. 34B-34D, successive scan passes s2, s3 and s4 will write lines L1-L3, and as shown in FIGS. 34E-34H all lines of the frame will be written after 362 scan passes. Note that with this odd number of rows of this Example 8, an even effective row spacing is effective in writing all lines, whereas for the prior examples of an even number of rows, an even effective row spacing is not effective.

TABLE EX-9

| Output Head Configuration (spot pattern) Corresponding Figure: FIG. 82 | Rows: 3 Spots/Row: 3 Vertical Adjustment: 3 lines Effective Row spacing: 17 lines | | |
|---|---|---|---|
| | Lines Written by Respective Rows of Emitting Ends | | |
| Scan Pass | Row A | Row B | Row C |
| 1 | b | b | 3 |
| 2 | b | b | 6 |
| . | . | . | . |
| . | . | . | . |
| . | . | . | . |
| 6 | b | 1 | 18 |
| 7 | b | 4 | 21 |
| . | . | . | . |
| . | . | . | . |
| . | . | . | . |
| 12 | 2 | 19 | 36 |
| 13 | 5 | 22 | 39 |
| . | . | . | . |
| . | . | . | . |
| . | . | . | . |
| 360 | 1046 | 1063 | 1080 |
| 361 | 1049 | 1066 | b |
| . | . | . | . |
| . | . | . | . |
| . | . | . | . |
| 365 | 1061 | 1078 | b |
| 366 | 1064 | b | b |
| . | . | . | . |
| . | . | . | . |
| . | . | . | . |
| 370 | 1076 | b | b |
| 371 | 1079 | b | b |

EXAMPLE 9

Figures 82A, 82B, 82C, 82D, 82E, 82F, 82G, 82H:
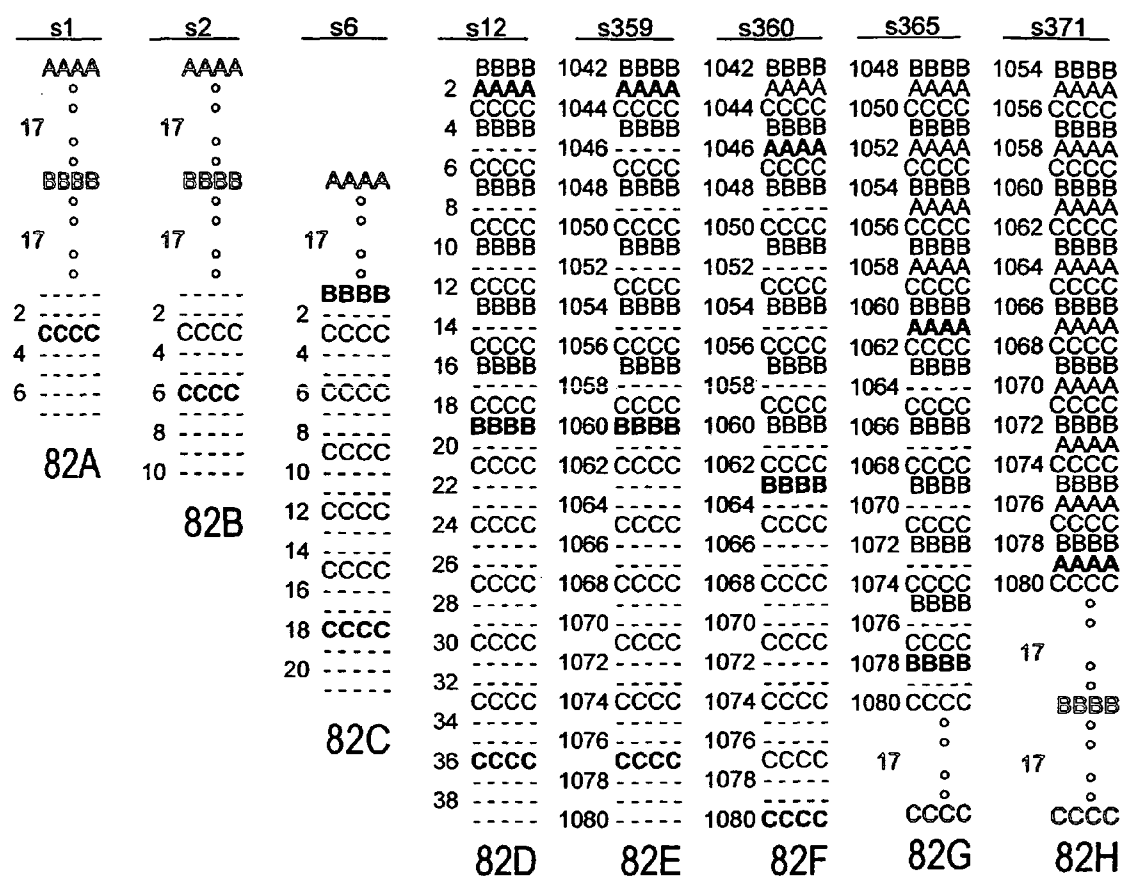
FIGS. 82A through 82H are time sequence diagrams for Example 9, illustrating line reordering for a 3×3 spot pattern similar to that of FIG. 33S having an effective row spacing of 17 lines and a vertical adjustment between scan passes of 3 lines.

For Example 9, shown in FIG. 82A-82H and described in Table EX-9, we assume an effective row spacing of about 17 lines between each RowA, RowB and RowC. Referring to FIG. 82A, at time t1, line L3 of the frame is preferably first written with the bottom row RowC of the pattern of spots projected on the screen by the emitting ends of the output head, while RowA and RowB are blanked. As shown in FIGS. 82B-82D, lines L1-L3 will be written after 12 scan passes, and as shown in FIGS. 82E-82H all lines of the frame will be written after 371 scan passes. Note that with this odd number of rows of these Examples 8 and 9, an even effective row spacing is effective in writing all lines, whereas for the prior examples of an even number of rows, an even effective row spacing is not effective.

TABLE EX-10

| Output Head Configuration (spot pattern) Corresponding Figure: FIG. 35, 36 | Rows: 2 Spots/Row: 3 Vertical Adjustment: 2 lines Effective Row spacing: 9 lines | |
|---|---|---|
| | Lines Written by Respective Rows of Emitting Ends | |
| Scan Pass | Row A | Row B |
| 1 | b | 2 |
| 2 | b | 4 |
| . | . | . |
| . | . | . |
| . | . | . |
| 4 | b | 8 |
| 5 | 1 | 10 |
| 6 | 3 | 12 |

TABLE EX-10-continued

| | | |
|---|---|---|
| . | . | . |
| . | . | . |
| . | . | . |
| 539 | 1069 | 1078 |
| 540 | 1071 | 1080 |
| 541 | 1073 | b |
| . | . | . |
| . | . | . |
| . | . | . |
| 543 | 1077 | b |
| 544 | 1079 | b |

EXAMPLE 10

Figure 35S:
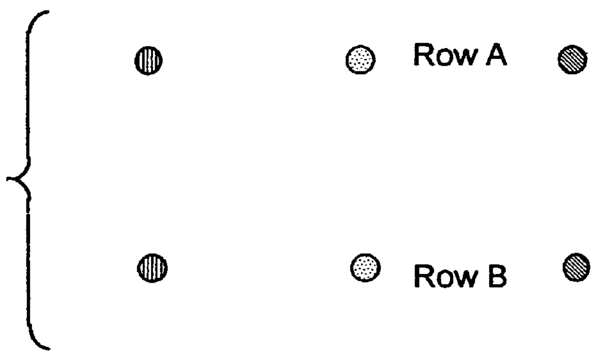
FIG. 35S is a diagram of the pattern of spots projected on a screen using the array shown in FIG. 35.
Figure 35:
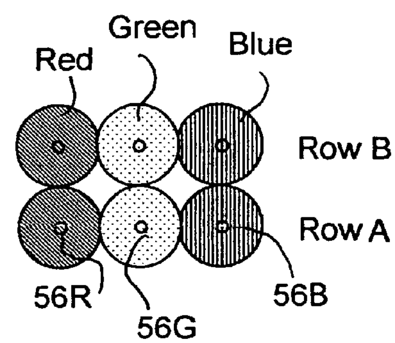
FIG. 35 is a diagram for Example 10, showing a 2 row by 3 emitting end per row array of an alternate output head for use in the system of FIG. 1.
Figures 36A, 36B, 36C, 36D, 36E, 36F, 36G, 36H:
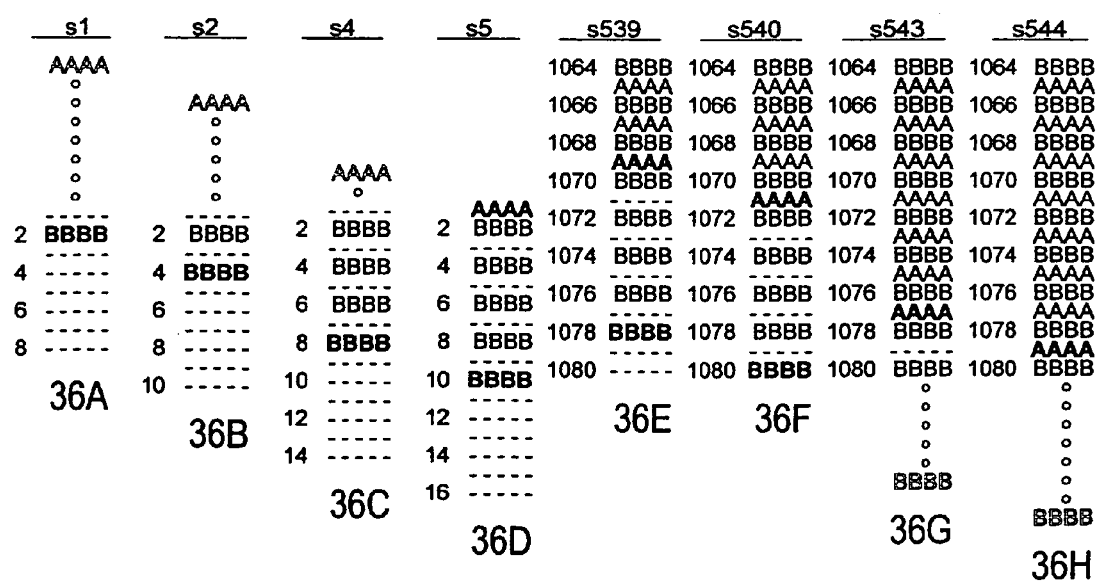
FIGS. 36A through 36H are time sequence diagrams for Example 10, illustrating line reordering for a 2×3 spot pattern similar to that of FIG. 35S having an effective row spacing of 9 lines and a vertical adjustment between scan passes of 2 lines.

Example 10 illustrates a two row by three emitting ends per row array of emitting ends, shown in FIG. 35, projecting a two row by three spots per row pattern of spots on the screen shown in FIG. 35S. In Example 10, FIGS. 36A-36H and Table EX-10 illustrate the reordering required for a 2 row by 3 emitting end per row output head configuration wherein the vertical adjustment between scan passes is two lines, where as with most of the examples, the vertical adjustment equals the number of rows of emitting ends in the output head for these cases. For Example 10, shown in FIG. 36H and described in Table EX-6, we assume an effective row spacing of about 9 lines between each RowA and RowB. Referring to FIG. 36A, at scan pass s1, line L2 of the frame is preferably first written with the bottom row RowB of the pattern of spots projected on the screen by the emitting ends of the output head, while RowA is blanked. Referring to FIGS. 36B-36D, lines L1-L2 will be written after 5 scan passes, and as shown in FIGS. 36E-36H all lines of the frame will be written in 544 scan passes.

EXAMPLES 11-12

Examples 11-12 illustrate the reordering required for a 4 row by 3 spots per row pattern of spots, similar to that of FIG. 28S, projected by an output head configuration wherein the effective row spacing is not uniform. It should be understood that an almost unlimited number of different output head emitting end configurations and patterns of spots are possible, the Examples 11-12 being merely intended to hint at the myriad possible configurations enabled by our invention.

EXAMPLE 11

Figures 37A, 37B, 37C, 37D, 37E, 37F, 37G, 37H:
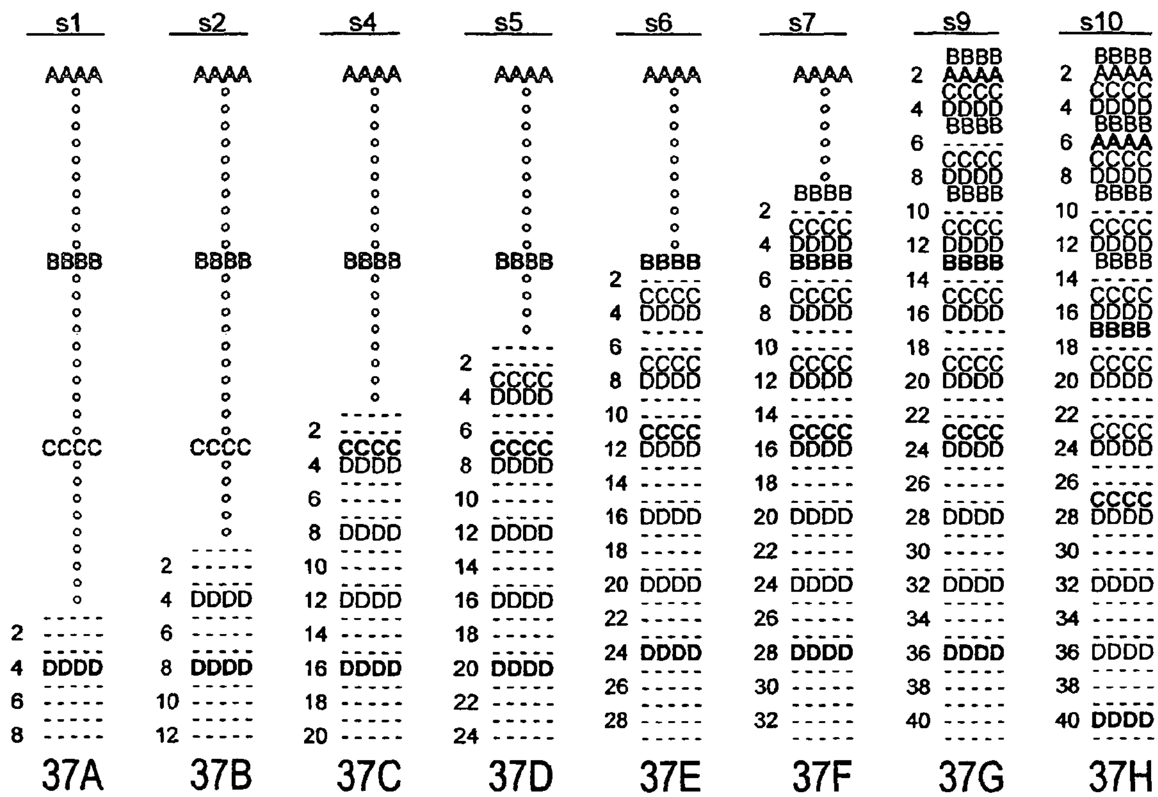
FIGS. 37A through 37H are time sequence diagrams for Example 11, illustrating line reordering for a 4×3 spot pattern similar to that of FIG. 27S having an effective row spacing of 11 lines between RowA and RowB, 10 lines between RowB and RowC, and 13 lines between RowC and RowD, and a vertical adjustment between scan passes of 4 lines.

Example 11 illustrates the reordering required for a 4 row by 3 spots per row pattern of spots, similar to that of FIG. 27S, projected by an output head configuration wherein the effective row spacing is not uniform. Although a corresponding output head configuration is not included in the drawings, for Example 11, Table EX-11 describes and FIGS. 37A-37H graphically illustrate, the reordering that is required for an effective row spacing of about 11 lines between RowA and RowB, of about 10 lines between RowB and RowC, and of about 13 lines between RowC and RowD with four line vertical adjustments. Referring to FIG. 37A, although not required, line L4 of the frame is preferably first written at scan pass s1 with the bottom row RowD of the pattern of spots. As shown in FIGS. 37B-37H, and described in Table EX-11, lines L1-L4 all will be written after 9 horizontal scans have occurred, and 278 scan passes will be required to write a complete frame.

TABLE EX-11

| | |
|---|---|
| | Rows: 4 Spots/Row: 3 |
| | Vertical Adjustment: 4 lines |
| | Effective Row spacing |
| | (RowA-RowB): 11 lines |
| Output Head Configuration (spot pattern) | (RowB-RowC): 10 lines |
| Corresponding Figure: FIG. 37 | (RowC-RowD): 13 lines |

| | Lines Written by Respective Rows of Emitting Ends | | | |
|---|---|---|---|---|
| Scan Pass | Row A | Row B | Row C | Row D |
| 1 | b | b | b | 4 |
| 2 | b | b | b | 8 |
| . | . | . | . | . |
| . | . | . | . | . |
| . | . | . | . | . |
| 4 | b | b | 3 | 16 |
| 5 | b | b | 7 | 20 |
| 6 | b | 1 | 11 | 24 |
| 7 | b | 5 | 15 | 28 |
| . | . | . | . | . |
| . | . | . | . | . |
| . | . | . | . | . |
| 9 | 2 | 13 | 23 | 36 |
| 10 | 6 | 17 | 27 | 40 |
| . | . | . | . | . |
| . | . | . | . | . |
| . | . | . | . | . |
| 270 | 1046 | 1057 | 1067 | 1080 |
| 271 | 1050 | 1061 | 1071 | b |
| . | . | . | . | . |
| . | . | . | . | . |
| . | . | . | . | . |
| 273 | 1058 | 1069 | 1079 | b |
| 274 | 1062 | 1073 | b | b |
| 275 | 1066 | 1077 | b | b |
| 276 | 1070 | b | b | b |
| 277 | 1074 | b | b | b |
| 278 | 1078 | b | b | b |

EXAMPLE 12

Figure 40:
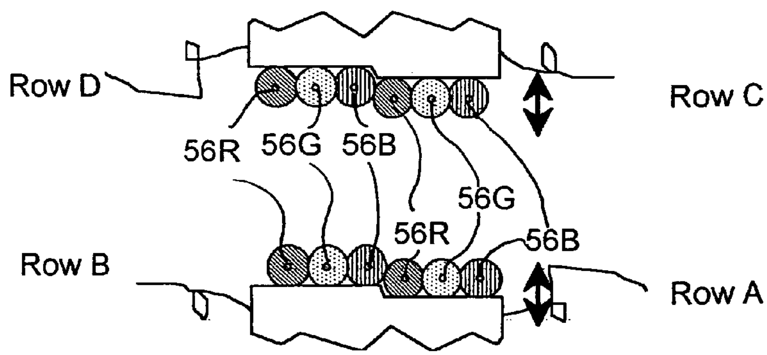
FIG. 40 is a diagram of a 4 row by 3 emitting end per row array of an alternate output head for use in the system of FIG. 1 according to Example 12.
Figure 40S:
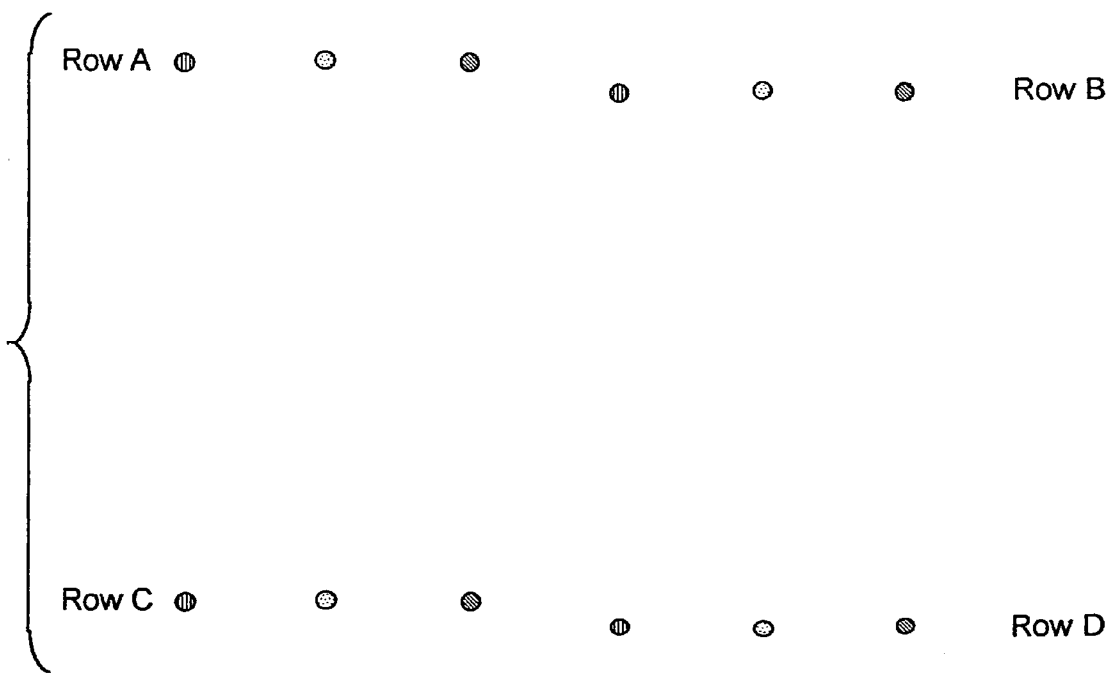
FIG. 40S is a diagram of the pattern of spots projected on a screen using the array shown in FIG. 40.
Figures 41A, 41B, 41C, 41D, 41E, 41F:
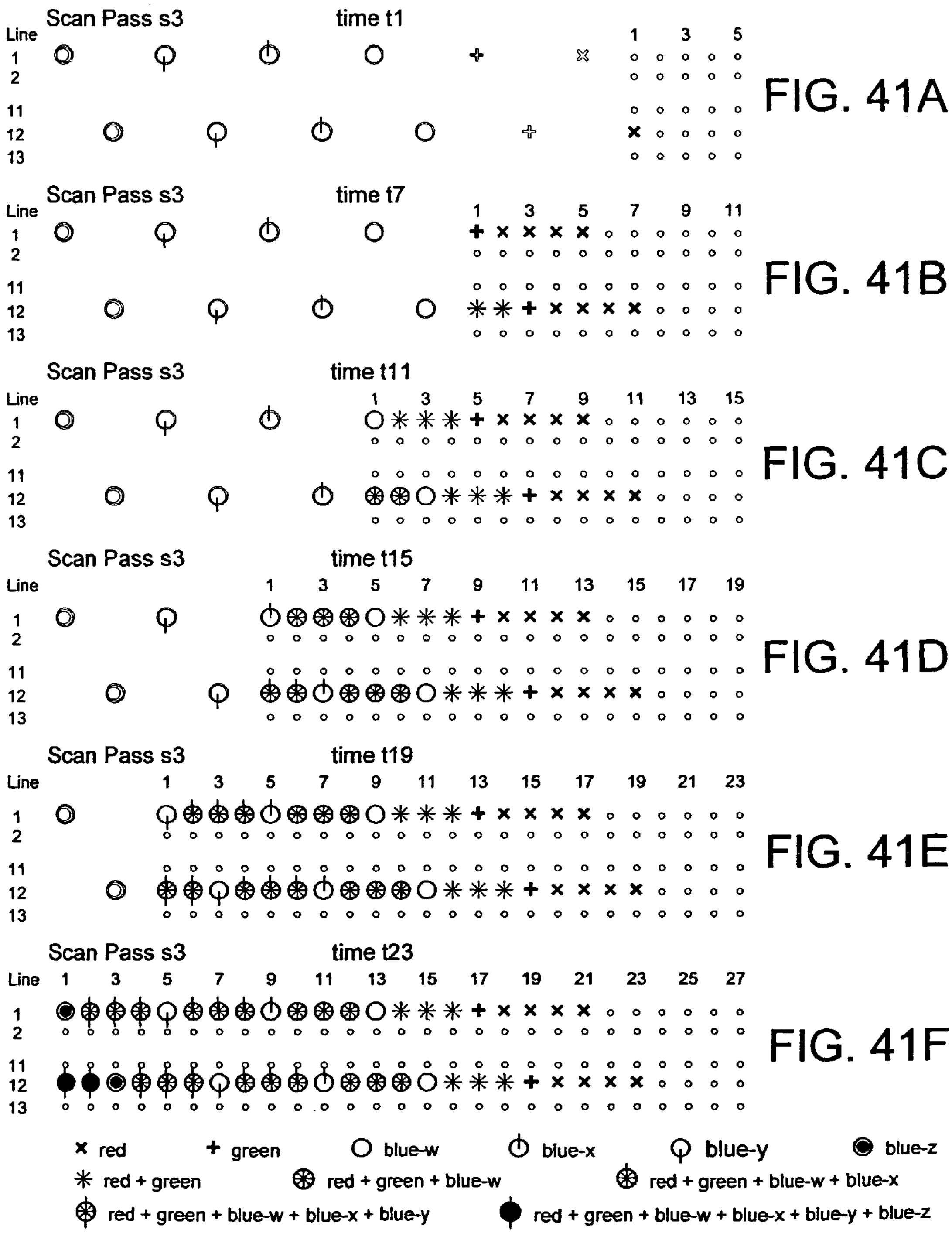
FIGS. 41A through 41F are time sequence diagrams for Example 15, illustrating the time shifting of spots of each primary color in RowA through RowD of a pattern of spots shown in FIG. 8S to form composite spots at dot locations at the beginning of scan pass s3.
Figure 43:
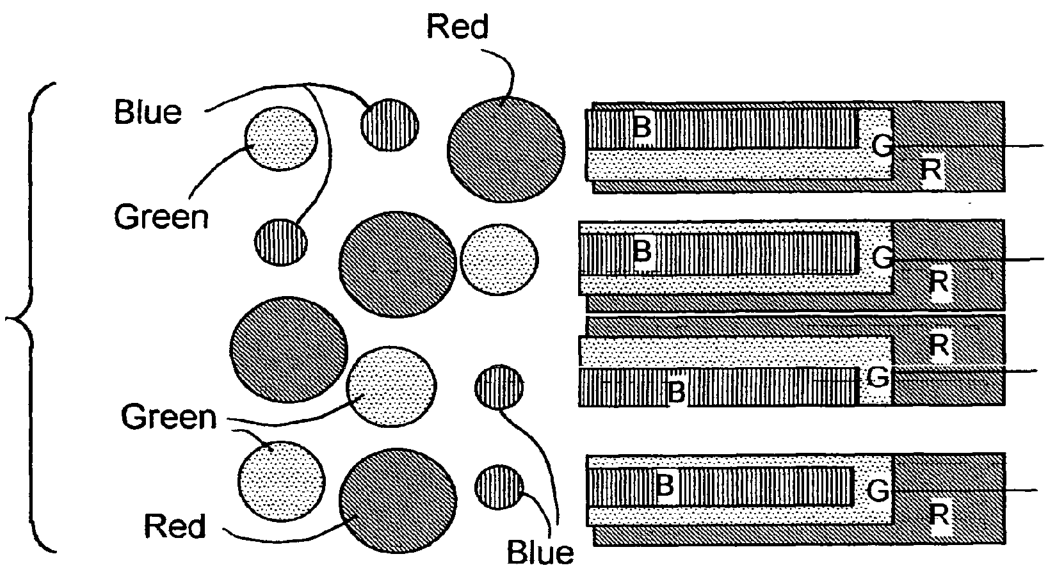
FIG. 43 is a diagram of the pattern of spots and the resulting lines of each color in each line projected on a screen by a 4 row by 3 emitting ends per row array of an alternate output head for use in the system of FIG. 1 according to Example 16.

FIGS. 40 and 40S schematically show an alternate embodiment of the output head 858 wherein the optical fiber emitting ends 856 are set in two blocks 866 and 868, which are adjustable with respect to each other. One may adjust the rows in concert for facet error correction or separately to accommodate changes in throw distance. The adjustment can be made with piezoelectric actuators, or manually adjustable fixtures. For Example 12, Table EX-12 describes and FIGS. 83A-83H graphically illustrate the reordering that is required for the output head configuration shown in FIG. 40 producing the spot pattern shown in FIG. 40S for Example 12, having an effective row spacing of about 1 line between RowA and RowB and between RowC and RowD, and of about 21 lines between RowB and RowC.

TABLE EX-12A

| | |
|---|---|
| | Rows: 4 Spots/Row: 3 |
| | Vertical Adjustment: 4 lines |
| | Effective Row spacing |
| | (RowA-RowB): 1 line |
| Output Head Configuration (spot pattern) | (RowB-RowC): 21 lines |
| Corresponding Figure: FIG. 83-84 | (RowC-RowD): 1 line |

| | Lines Written by Respective Rows of Emitting Ends | | | |
|---|---|---|---|---|
| Scan Pass | Row A | Row B | Row C | Row D |
| 1 | b | b | 3 | 4 |
| 2 | b | b | 7 | 8 |
| . | . | . | . | . |
| . | . | . | . | . |
| . | . | . | . | . |
| 6 | 1 | 2 | 23 | 24 |
| 7 | 5 | 6 | 27 | 28 |
| . | . | . | . | . |
| . | . | . | . | . |
| . | . | . | . | . |
| 270 | 1057 | 1058 | 1079 | 1080 |
| 271 | 1061 | 1062 | b | b |
| . | . | . | . | . |
| . | . | . | . | . |
| . | . | . | . | . |
| 274 | 1073 | 1074 | b | b |
| 275 | 1077 | 1078 | b | b |

As shown in FIGS. 83A-83H and described in Table EX-12A, although not required, but as with Examples 1-7, line L4 of the frame is preferably first written with the bottom row RowD of the patternspots of FIG. 40S. Because RowC is effectively spaced 1 line above RowD, at scan pass s1, RowC will write line 3. Referring to FIG. 40D and Table EX-12A, at scan pass s6, RowD will write line L4, RowC will write line L23, RowB will write line L2 and RowA will write line L1. Thus, in summary, lines L1-L4 all will be written after 6 horizontal scans have occurred, and as shown in FIGS. 83E-83H and described in Table EX-12A, 275 scan passes will be required to write a complete frame.

TABLE EX-12B

| | |
|---|---|
| | Rows: 4 Spots/Row: 3 |
| | Vertical Adjustment: 4 lines |
| | Effective Row spacing |
| Output Head Configuration (spot pattern) | (RowA-RowB): 1 line |
| Corresponding Figure: FIG. 83-84 | (RowB-RowC): 21 lines |
| Pattern of Spots: Log | (RowC-RowD): 1 line |
| Scan Pass: 6 Blank = b | Spot Spacing w/i Row: 4 dots |

| | Row A | | | Row B | | | Row C | | | Row D | | |
|---|---|---|---|---|---|---|---|---|---|---|---|---|
| | Blue | Green | Red | Blue | Green | Red | Blue | Green | Red | Blue | Green | Red |
| Line | | time t1 | | | | | | Dot Locations | | | | |
| 1 | b | b | b | | | | | | | | | |
| 2 | | | | b | b | 1 | | | | | | |
| . | | | | | | | | | | | | |
| . | | | | | | | | | | | | |
| . | | | | | | | | | | | | |

TABLE EX-12B-continued

| | | | | | | | | | | | | |
|---|---|---|---|---|---|---|---|---|---|---|---|---|
| 23 | | | | | | | b | b | b | | | |
| 24 | | | | | | | | | | b | b | 1 |
| Line | time t2 | | | | | Dot Locations | | | | | | |
| 1 | b | b | b | | | | | | | | | |
| 2 | | | | b | b | 2 | | | | | | |
| . | | | | | | | | | | | | |
| . | | | | | | | | | | | | |
| . | | | | | | | | | | | | |
| 23 | | | | | | | b | b | b | | | |
| 24 | | | | | | | | | | b | b | 2 |
| Line | time t5 | | | | | Dot Locations | | | | | | |
| 1 | b | b | 1 | | | | | | | | | |
| 2 | | | | b | 1 | 5 | | | | | | |
| . | | | | | | | | | | | | |
| . | | | | | | | | | | | | |
| . | | | | | | | | | | | | |
| 23 | | | | | | | b | b | b | | | |
| 24 | | | | | | | | | | b | 1 | 5 |
| Line | time t11 | | | | | Dot Locations | | | | | | |
| 3 | b | b | 1 | | | | | | | | | |
| . | | | | | | | | | | | | |
| . | | | | | | | | | | | | |
| . | | | | | | | | | | | | |
| 6 | | | | 5 | 9 | 13 | | | | | | |
| . | | | | | | | | | | | | |
| . | | | | | | | | | | | | |
| . | | | | | | | | | | | | |
| 9 | | | | | | | b | b | 1 | | | |
| . | | | | | | | | | | | | |
| . | | | | | | | | | | | | |
| . | | | | | | | | | | | | |
| 12 | | | | | | | | | | 5 | 9 | 13 |
| Line | time t19 | | | | | Dot Locations | | | | | | |
| 3 | 1 | 5 | 9 | | | | | | | | | |
| . | | | | | | | | | | | | |
| . | | | | | | | | | | | | |
| . | | | | | | | | | | | | |
| 6 | | | | 13 | 17 | 21 | | | | | | |
| . | | | | | | | | | | | | |
| . | | | | | | | | | | | | |
| . | | | | | | | | | | | | |
| 9 | | | | | | | 1 | 5 | 9 | | | |
| . | | | | | | | | | | | | |
| . | | | | | | | | | | | | |
| . | | | | | | | | | | | | |
| 12 | | | | | | | | | | 13 | 17 | 21 |

TABLE EX-12C

Output Head Configuration (spot pattern)
Corresponding Figure: FIG. 83-84
Pattern of Spots: Log
Scan Pass: 6 Blank = b Rows: 4 Spots/Row: 3
Vertical Adjustment: 4 lines
Effective Row spacing
(RowA-RowB): 1 line
(RowB-RowC): 21 lines
(RowC-RowD): 1 line
Spot Spacing w/i Row: 4 dots

| | Row A | | | Row B | | | Row C | | | Row D | | |
|---|---|---|---|---|---|---|---|---|---|---|---|---|
| | Blue | Green | Red | Blue | Green | Red | Blue | Green | Red | Blue | Green | Red |
| Line | time t1920 | | | | | Dot Locations | | | | | | |
| 1 | 1900 | 1904 | 1908 | | | | | | | | | |
| 2 | | | | 1912 | 1916 | 1920 | | | | | | |
| . | | | | | | | | | | | | |
| . | | | | | | | | | | | | |
| 23 | | | | | | | 1900 | 1904 | 1908 | | | |
| 24 | | | | | | | | | | 1912 | 1916 | 1920 |

TABLE EX-12C-continued

| Line | time t1921 | | | | | | Dot Locations | | | | | |
|---|---|---|---|---|---|---|---|---|---|---|---|---|
| 1 | 1901 | 1905 | 1909 | | | | | | | | | |
| 2 | | | | 1913 | 1917 | b | | | | | | |
| . | | | | | | | | | | | | |
| . | | | | | | | | | | | | |
| 23 | | | | | | | 1901 | 1905 | 1909 | | | |
| 24 | | | | | | | | | | 1913 | 1917 | b |
| Line | time t1928 | | | | | | Dot Locations | | | | | |
| 1 | 1908 | 1912 | 1916 | | | | | | | | | |
| 2 | | | | 1920 | b | b | | | | | | |
| . | | | | | | | | | | | | |
| . | | | | | | | | | | | | |
| 23 | | | | | | | 1908 | 1912 | 1916 | | | |
| 24 | | | | | | | | | | 1920 | b | b |
| Line | time t1934 | | | | | | Dot Locations | | | | | |
| 1 | 1916 | 1920 | b | | | | | | | | | |
| 2 | | | | b | b | b | | | | | | |
| . | | | | | | | | | | | | |
| . | | | | | | | | | | | | |
| 23 | | | | | | | 1916 | 1920 | b | | | |
| 24 | | | | | | | | | | b | b | b |
| Line | time t1938 | | | | | | Dot Locations | | | | | |
| 1 | 1920 | b | b | | | | | | | | | |
| 2 | | | | b | b | b | | | | | | |
| . | | | | | | | | | | | | |
| . | | | | | | | | | | | | |
| 23 | | | | | | | 1920 | b | b | | | b |
| 24 | | | | | | | | | | b | b | |

Figure 46A:
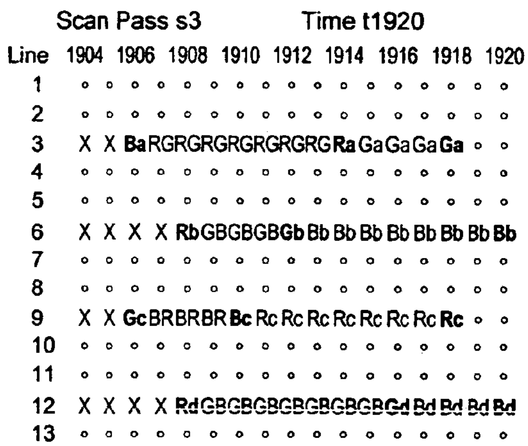
FIGS. 46A through 46F are time sequence diagrams for Example 11, illustrating the time shifting of spots of each primary color at the end of scan pass s3 for the pattern of spots shown in FIG. 44.
Figure 46B:
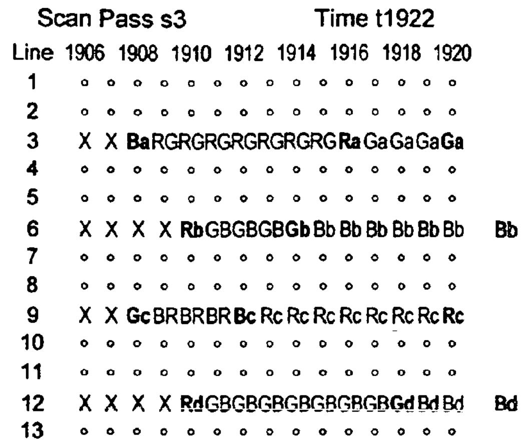
Figure 46C:
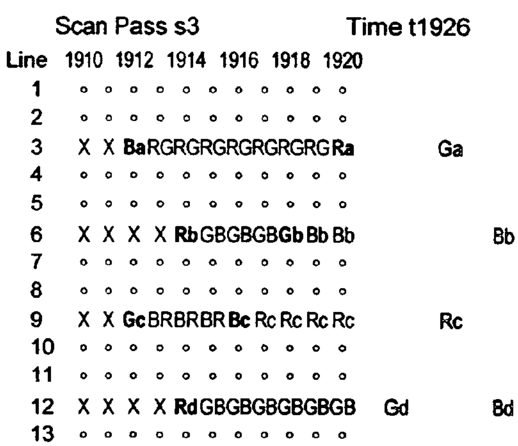
Figure 46D:
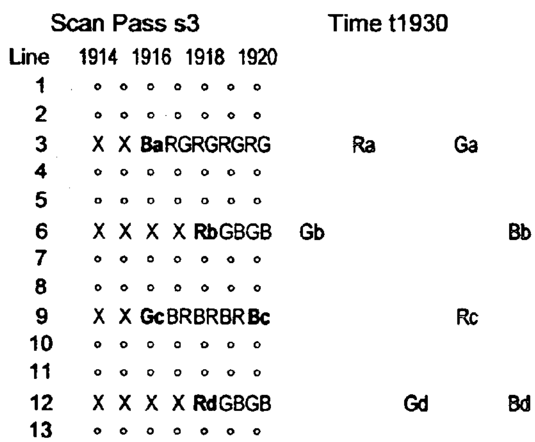
Figure 46E:
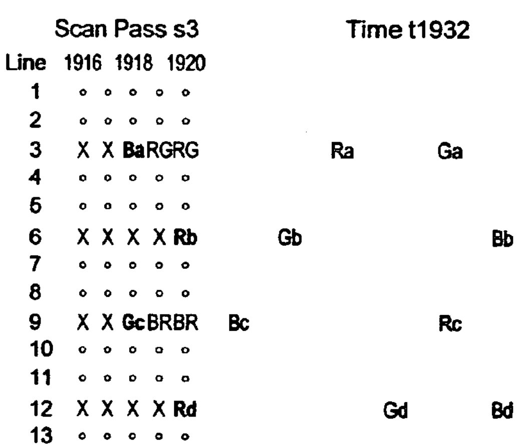
Figure 46F:
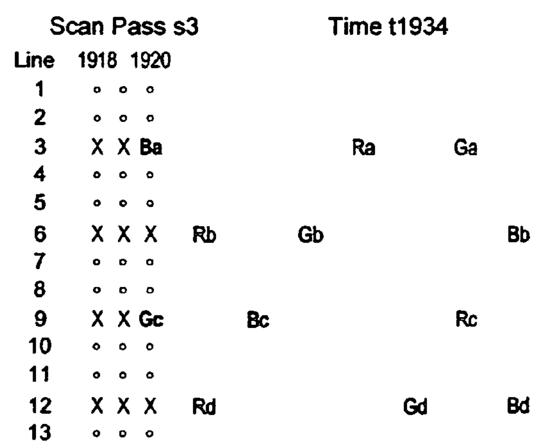

Tables EX-12B and EX-12C describe, and FIGS. 84A-84J show, the time combination of the different spot pattern shown in FIG. 46S, assuming a spacing between spots within rows of 3 dot locations. At time t1 during scan pass s6, dot locations 1 in lines L2 and L24 will be illuminated by the red spots of RowB and RowD while the green and blue spots of RowB and RowD, and all spots of RowA and RowC will be blanked. As shown by FIGS. 84B through 84E and described in Table EX-12B, for the remaining times t2-t11 of the illustrative scan pass s6, at time t11 all spots will illuminate dot locations at an appropriately modulated intensity (which may be zero). It should be noted that the color spots need not be in the same order for all rows, as will be described in more detail herein. FIGS. 84F-84J and Table EX-12C illustrate the timing of the dot illumination and the resulting overscan required to complete the line for times t1920-1940 at the end of scan pass s6 prior to initiating the next scan pass s7.

EXAMPLES 13-14

Figure 38:
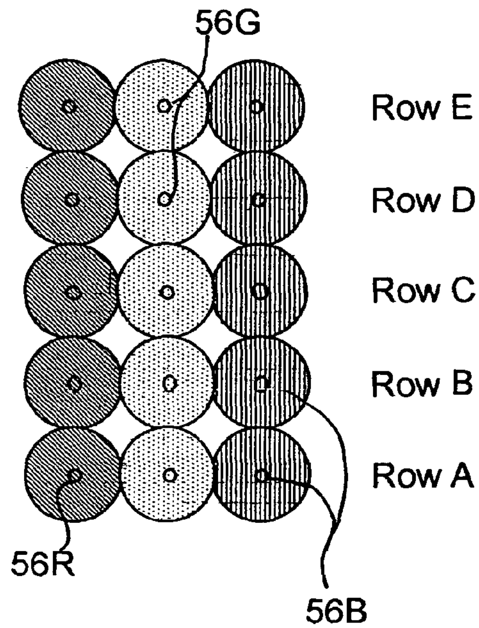
FIG. 38 is a diagram of a 5 row by 3 emitting end per row array of an alternate output head for use in the system of FIG. 1 according to Examples 13 and 14.
Figure 38S:
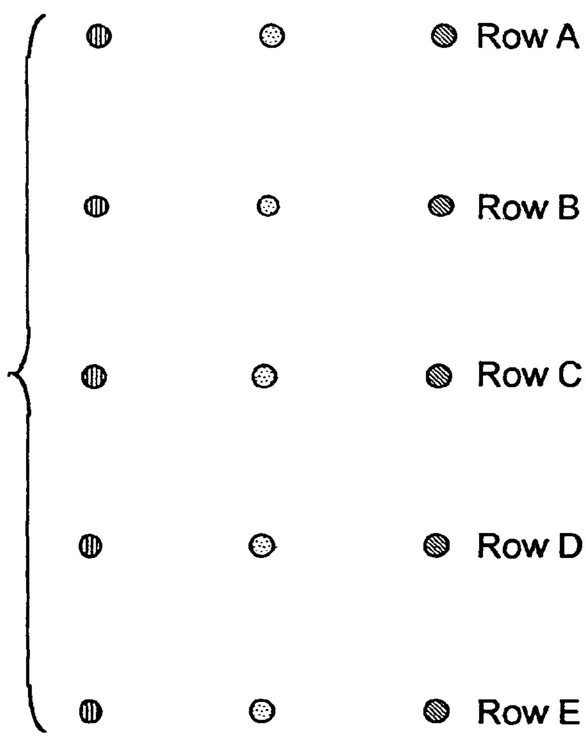
FIG. 38S is a diagram of the pattern of spots projected on a screen using the array shown in FIG. 38.

Examples 13-14 illustrate the reordering required for a 5 row by 3 emitting end per row output head configuration shown in FIG. 38 projecting the spot pattern shown in FIG. 38S, wherein the effective row spacing between rows of the pattern of spots projected by the emitting ends through the scanning section onto the screen is uniform. For these examples, we assume a vertical adjustment between horizontal scans of about 5 lines, where although not required for utilizing our invention, and with most of the foregoing examples, the vertical adjustment equals the number of rows of emitting ends in the output head for these cases. Although we have not provided as many examples of the reordering required for this output head configuration as for the 4 row by 3 emitting end per row configuration, similar examples can be deduced by extrapolating the examples herein.

EXAMPLE 13

Example 13 illustrates the reordering required for a 5 row by 3 emitting end per row output head configuration shown in FIG. 38 projecting the spot pattern shown in FIG. 38S, wherein the effective row spacing between rows of the pattern of spots projected by the emitting ends through the scanning section onto the screen is uniform. For these examples, we assume a vertical adjustment between horizontal scans of about 5 lines, where although not required for utilizing our invention, and as with most of the foregoing examples, the vertical adjustment equals the number of rows of emitting ends in the output head. Although we have not provided as many examples of the recording required for this output head configuration as for the 4 row by 3 emitting end per row configuration, similar examples can be deduced by extrapolating the examples herein.

For Example 13. Table EX-13 describes and FIGS. 39A-39J graphically illustrates, the recording necessitated by an effective row spacing of about 6 lines between RowA, RowB, RowC, RowD and RowE. Although not required, at scan pass s1, line L5 of the frame is preferably first written with the bottom row RowE of the pattern of spots, while RowA, RowB, RowC and RowD are blanked. As shown in FIGS. 39A-39J, lines L1-L4 all will be written after 5 horizontal scan passes have occurred, and as shown in FIGS. 39F-39J, 220 scan passes will be required to write a complete frame.

TABLE EX-13

| | | | | | |
|---|---|---|---|---|---|
| Output Head Configuration (spot pattern) | | | Rows: 5 Spots/Row: 3 | | |
| Corresponding Figure: FIG. 38-39 | | | Vertical Adjustment: 5 lines | | |
| | | | Effective Row spacing: 6 lines | | |
| | Lines Written by Respective Rows of Emitting Ends | | | | |
| Scan Pass | Row A | Row B | Row C | Row D | Row E |
| 1 | b | b | b | b | 5 |
| 2 | b | b | b | 4 | 10 |
| 3 | b | b | 3 | 9 | 15 |
| 4 | b | 2 | 8 | 14 | 20 |
| 5 | 1 | 7 | 13 | 19 | 25 |
| . | . | . | . | . | . |
| . | . | . | . | . | . |
| . | . | . | . | . | . |
| 216 | 1056 | 1062 | 1068 | 1074 | 1080 |
| 217 | 1061 | 1067 | 1073 | 1079 | b |
| 218 | 1066 | 1072 | 1078 | b | b |
| 219 | 1071 | 1077 | b | b | b |
| 220 | 1076 | b | b | b | b |

EXAMPLE 14

Figures 85A, 85B, 85C, 85D, 85E, 85F, 85G, 85H, 85I, 85J:
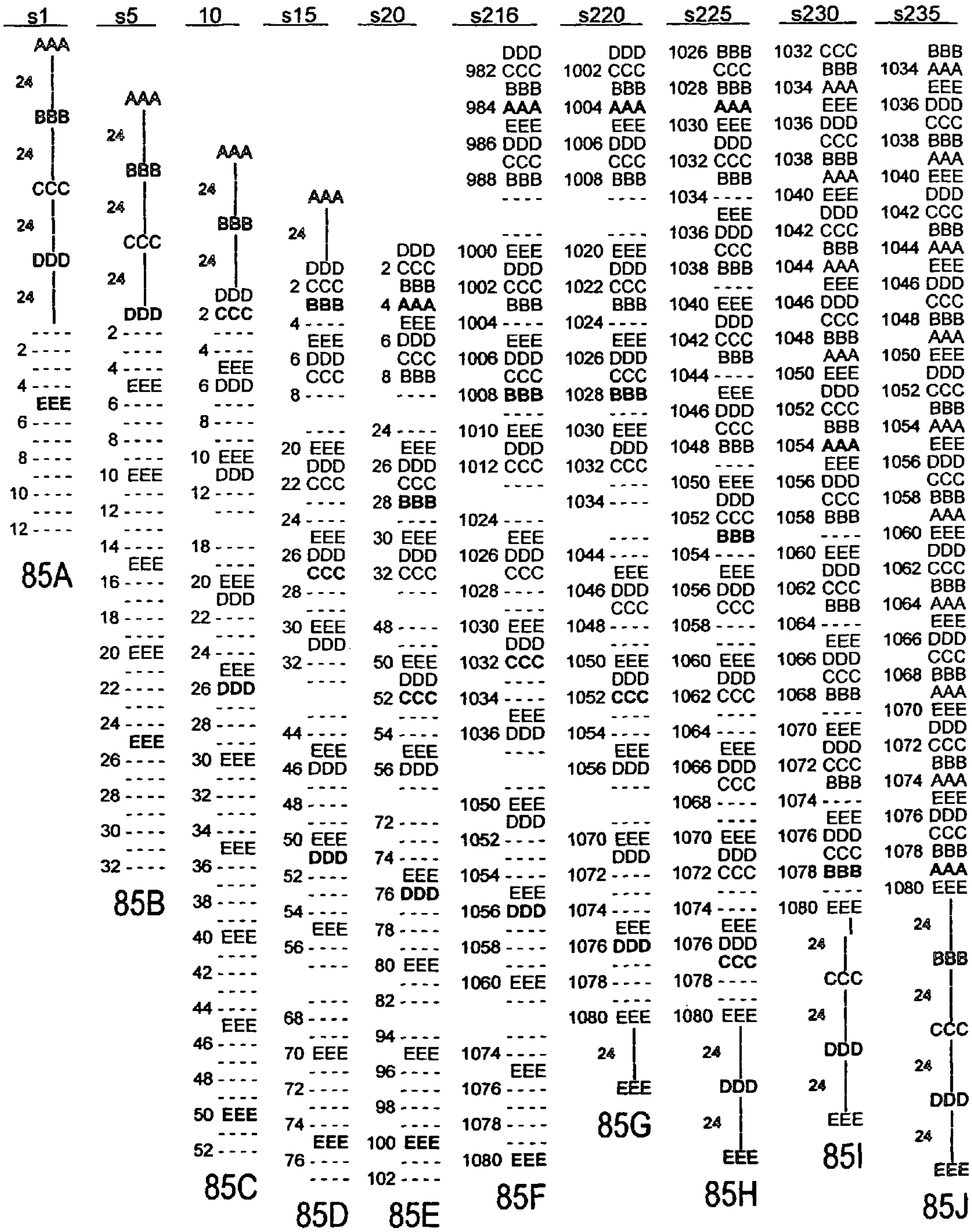
FIGS. 85A through 85J are time sequence diagrams for Example 14, illustrating line reordering for a 5×3 spot pattern similar to that of FIG. 38S having an effective row spacing of 24 lines and a vertical adjustment between scan passes of 5 lines.

Referring to FIG. 85 and Table EX-14 respectively graphically showing and describing the line reordering to accommodate a 24 line effective row spacing between rows of a 5 row by 3 spot per row pattern of spots projected by the emitting ends of a 5×3 output head array, although not required, at time t1, line L5 of the frame is preferably first written with the bottom row RowE, while RowA, RowB, RowC and RowD are blanked. Thus, for this Example 14 lines L1-L5 all will be written after 20 horizontal scan passes have occurred, in the order 5-1-2-3-4. In summary, the complete frame will be scanned after 235 scan passes.

TABLE EX-14

| | | | | | |
|---|---|---|---|---|---|
| Output Head Configuration (spot pattern) | | | Rows: 5 Spots/Row: 3 | | |
| Corresponding Figure: FIG. 38, 85 | | | Vertical Adjustment: 5 lines | | |
| | | | Effective Row spacing: 24 lines | | |
| | Lines Written by Respective Rows of Emitting Ends | | | | |
| Scan Pass | Row A | Row B | Row C | Row D | Row E |
| 1 | b | b | b | b | 5 |
| 2 | b | b | b | b | 10 |
| . | . | . | . | . | . |
| . | . | . | . | . | . |
| . | . | . | . | . | . |
| 5 | b | b | b | 1 | 25 |
| 6 | b | b | b | 6 | 30 |
| . | . | . | . | . | . |
| . | . | . | . | . | . |
| . | . | . | . | . | . |
| 10 | b | b | 2 | 26 | 50 |
| 11 | b | b | 7 | 31 | 55 |
| . | . | . | . | . | . |
| . | . | . | . | . | . |
| . | . | . | . | . | . |
| 15 | b | 3 | 27 | 51 | 75 |
| 16 | b | 8 | 32 | 56 | 80 |
| . | . | . | . | . | . |
| . | . | . | . | . | . |
| . | . | . | . | . | . |
| 20 | 4 | 28 | 52 | 76 | 100 |
| 21 | 9 | 33 | 57 | 81 | 105 |
| . | . | . | . | . | . |
| . | . | . | . | . | . |
| . | . | . | . | . | . |
| 216 | 984 | 1008 | 1032 | 1056 | 1080 |
| 217 | 989 | 1013 | 1037 | 1061 | b |
| . | . | . | . | . | . |
| . | . | . | . | . | . |
| . | . | . | . | . | . |

TABLE EX-14-continued

| | | | | | |
|---|---|---|---|---|---|
| 220 | 1004 | 1028 | 1052 | 1076 | b |
| 221 | 1009 | 1033 | 1057 | b | b |
| . | . | . | . | . | . |
| . | . | . | . | . | . |
| . | . | . | . | . | . |
| 225 | 1029 | 1053 | 1077 | b | b |
| 226 | 1034 | 1058 | b | b | b |
| . | . | . | . | . | . |
| . | . | . | . | . | . |
| . | . | . | . | . | . |
| 230 | 1054 | 1078 | b | b | b |
| 231 | 1059 | b | b | b | b |
| . | . | . | . | . | . |
| . | . | . | . | . | . |
| . | . | . | . | . | . |
| 235 | 1079 | b | b | b | b |

EXAMPLES 15-28

It should be understood that an almost unlimited number of different output head emitting end configurations are possible, including those already illustrated above for 2, 3, 4 and 5 row, and for more than five row arrays of the output head. However, of the many possibilities, several configurations are of particular interest, as described in connection with the following further examples.

EXAMPLE 15

Figure 8S:
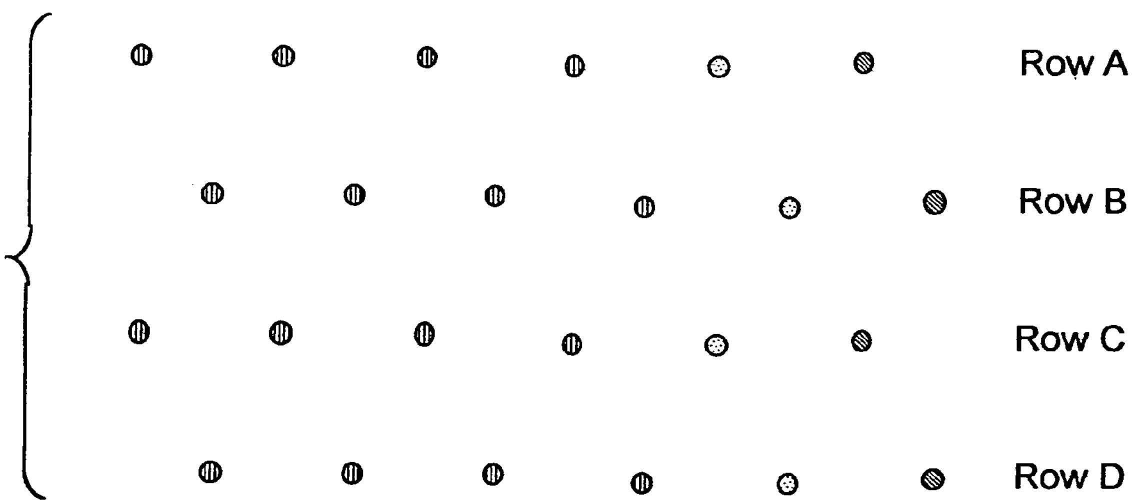
FIG. 8S is a diagram of the pattern of spots projected on a screen using the array shown in FIG. 8.

Example 15, shown in FIGS. 8, 8S, 41 and 42, and further described in Table EX-15, illustrates the reordering required for an output head configuration wherein each row has more than three emitting ends. This Example is an exception to the previously stated rule that all lines should be written by each color exactly once, in that we write one color, in this case blue, with four emitting ends per line. The 4×6 output head array illustrated in Example 15 is schematically shown in FIG. 8 and the corresponding spot pattern is shown in FIG. 8S. FIG. 18 schematically shows a system configuration which may employ this head configuration of Example 15 to advantage. Instead of a system wherein a single laser for generating each of the primary colors is split into four beams for insertion into one of the fibers in each row as shown in FIG. 17, or where individual lasers are employed for the beams inserted into each fiber as shown in FIG. 19, in this embodiment shown in FIG. 18, a single laser each is used to generate the red and green laser beams that are split with splitters into four red and four green beams, and four blue lasers are used for each row, or 16 blue lasers in total to generate the entire spot pattern of 4 rows of 6 spots per row shown in FIG. 8S. A laser projection system according to our invention enables the convenient and efficient use of multiple lasers to scan each line of a frame with a particular color. It may be that multiple blue lasers for each line will be more economical, and produce better quality beams than four more powerful lasers, or a single very powerful laser that is split into four beams.

TABLE EX-15

| Output Head Configuration (spot pattern)<br>Corresponding Figure: FIG. 41-42 | Rows: 4 Spots/Row: 6<br>Vertical Adjustment: 4 lines<br>Effective Row spacing w/i<br>Row (all spots): 3 dots |
|---|---|

| | Left to Right Dot Locations Written by Respective Spots | | | | | |
|---|---|---|---|---|---|---|
| time t | blue-z● | blue-y♀ | blue-x♁ | blue-w ○ | green + | red x |
| 1 | b | b | b | b | b | 1 |
| 2 | b | b | b | b | b | 2 |
| . | . | . | . | . | . | . |
| . | . | . | . | . | . | . |
| . | . | . | . | . | . | . |
| 4 | b | b | b | b | 1 | 4 |
| 5 | b | b | b | b | 2 | 5 |
| . | . | . | . | . | . | . |
| . | . | . | . | . | . | . |
| . | . | . | . | . | . | . |
| 7 | b | b | b | 1 | 4 | 7 |
| 8 | b | b | b | 2 | 5 | 8 |
| . | . | . | . | . | . | . |
| . | . | . | . | . | . | . |
| . | . | . | . | . | . | . |
| 10 | b | b | 1 | 4 | 7 | 10 |
| 11 | b | b | 2 | 5 | 8 | 11 |
| . | . | . | . | . | . | . |
| . | . | . | . | . | . | . |
| . | . | . | . | . | . | . |
| 13 | b | 1 | 4 | 7 | 10 | 13 |
| 14 | b | 2 | 5 | 8 | 11 | 14 |
| . | . | . | . | . | . | . |
| . | . | . | . | . | . | . |
| . | . | . | . | . | . | . |
| 16 | 1 | 4 | 7 | 10 | 13 | 16 |
| 17 | 2 | 5 | 8 | 11 | 14 | 17 |
| . | . | . | . | . | . | . |
| . | . | . | . | . | . | . |
| . | . | . | . | . | . | . |
| 1920 | 1905 | 1908 | 1911 | 1914 | 1917 | 1920 |
| 1921 | 1906 | 1909 | 1912 | 1915 | 1918 | b |
| . | . | . | . | . | . | . |
| . | . | . | . | . | . | . |
| . | . | . | . | . | . | . |
| 1923 | 1908 | 1911 | 1914 | 1917 | 1920 | b |
| 1924 | 1909 | 1912 | 1915 | 1918 | b | b |
| . | . | . | . | . | . | . |
| . | . | . | . | . | . | . |
| . | . | . | . | . | . | . |
| 1926 | 1911 | 1914 | 1917 | 1920 | b | b |
| 1927 | 1912 | 1915 | 1918 | b | b | b |
| . | . | . | . | . | . | . |
| . | . | . | . | . | . | . |
| . | . | . | . | . | . | . |
| 1929 | 1914 | 1917 | 1920 | b | b | b |
| 1930 | 1915 | 1918 | b | b | b | b |
| . | . | . | . | . | . | . |
| . | . | . | . | . | . | . |
| . | . | . | . | . | . | . |
| 1932 | 1917 | 1920 | b | b | b | b |
| 1933 | 1918 | b | b | b | b | b |
| . | . | . | . | . | . | . |
| . | . | . | . | . | . | . |
| . | . | . | . | . | . | . |
| 1935 | 1920 | b | b | b | b | b |

As previously described, for this Example 15, graphically shown in FIGS. 41A-41F and 42A-42F, and further described in Table EX-15, we assume a 4 row output head array having six emitting ends per row, including one emitting a red beam, one emitting a green beam, and four emitting blue beams. The beam from each emitting end in a row strikes each dot location in an appropriate line on the screen in the spot pattern shown in FIG. 8S. Because the beams strike the screen within one microsecond (1.mu.s), the total power of the four blue beams emitted from a particular row of emitting ends directed to each dot location is visualized by the audience as though a single beam of the total power required is utilized, as in the system shown in FIG. 1. and the pattern of spots shown in FIG. 5S or 27S. In assigning the color value from the lookup table, the controller section may either modulate the blue beams equally or unequally as desired to produce the desired aggregate color intensity specified in the video data at the corresponding dot location on the screen. It will be understood that an unlimited number of blue beam power combinations could be employed to produce the desired blue color at the corresponding dot location.

In FIGS. 41A-41F and 42A-42F, the spots of the spot pattern formed by the emitting ends 56 of the fibers 42 in one horizontal row of the output head 58 are identified as follows: the red spot in each row is represented by “x”; the green spot in each row is represented by “+”; and the four blue spots corresponding to the blue-w, blue-x, blue-y and blue-z laser beams are represented by “○ ”, “♁ ”, “♀ ” and “◔ ”, respectively.

As shown in FIGS. 41A-41F, when the polygon mirror facet 74 is in the desired position at a time s1 of the first scan by the bottom row of spots (RowD) of the pattern of spots the first dot location of the fourth line of the frame is written by the red x beam modulated for the value of the red color assigned to that pixel location in the video data, and the green and four blue beams, which if activated would write pixels to the left of the frame (shown with outlined symbols) are blanked by their respective modulators. Table EX-b 15 describes in tabular form the repositioning of the separate spots of the bottom row of spots at successive dot locations of the fourth line of the frame, as graphically shown in FIGS. 41A-41F and 42A-42F. It should be apparent from the illustration of FIGS. 8, 8S, 41A-41F and 42A-42F that with this method according to our invention, a beam of each red and green color modulated for the value of that pixel in the video data, and four separate beams of the blue color modulated for one quarter of the value of the same pixel in the video data, is projected for every dot in that line.

Referring to FIGS. 42A-42F which diagram the end of the scan pass at the end of the line as described in the lower portion of Table EX-15, beginning at time 1920, the red x, green +, blue-w ○, , blue-x ♁ blue-y ♀ and blue-z ◔ beams will write dots 1920, 1917, 1914, 1911, 1908 and 1905, respectively. After the blue-z ◔ beam writes dot 1920 at time t1935, all of the beams are blanked until the next facet of the polygon mirror is in position to begin the next horizontal scan, and the galvanometer mirror has adjusted vertically downward the desired number of lines on the screen to begin the next line.

EXAMPLES 16-17

Examples 16 and 17, shown in FIG. 43 and FIGS. 44S, 45A-45F and 46A-46F, illustrate the pattern of spots shown in FIG. 5S projected by the output head configuration shown in FIG. 5, except that the red, green and blue beams are purposefully assigned to particular fibers and corresponding emitting ends to project spots of each color at particular positions in each row for the reasons described below.

EXAMPLE 16

In actual practice, it is possible that small vertical variations, within acceptable tolerances, will result when the emitting ends of the fibers are mounted in the output head, such that individual fibers may not be positioned exactly in a line of a row, i.e., spaced more or less closely to other rows. Further, we have determined that when the beam emitted from a fiber end is projected on the screen with the simple achromat lens we prefer, the size of the spot for each color may be different, such as the spot sizes shown in FIG. 43. In our preferred embodiments at our preferred throw distance, the size of the red spot is roughly 4 mm in diameter, the size of the green spot is roughly 3.25 mm in diameter, and the size of the blue spot is roughly 2.6 mm in diameter. Because we believe the eye is most sensitive to the resolution of the spots in the green wavelengths, and because we prefer to employ as equal a spacing of the respective rows of the spot pattern as feasible, we prefer to select those fibers for transmitting the green wavelength beam having emitting ends in each row, and corresponding spots, that have the most even vertical spacing feasible. We further prefer to assign the red and blue wavelength beams to be transmitted by the remaining fibers in a particular row having emitting ends positioned so that the areas of each colored spot in a row of the spot pattern are most coincident, or correspond to the greatest extent, with the green spot in that row at each dot location on the screen when scanned, despite the slight misalignment of the emitting ends in a row, such as the arrangement shown in FIG. 43.

EXAMPLE 17

If manufacture of the output head can result in vertical alignment errors of emitting ends within rows, it follows that horizontal spacing errors or nonuniform spacing of emitting ends, and resulting spots, within a row may also occur that are possibly unique for each output head. Such nonuniform spacing is illustrated by the spot pattern shown in FIG. 44, wherein the spots are respectively spaced substantially different distances apart. We prefer to account for this nonuniform spacing by delaying the timing of the modulation of the beam to be emitted from that emitting end such that the spot illuminates the desired dot location on the screen, as shown in FIGS. 45A-45F

TABLE EX-17A

Figure 44:
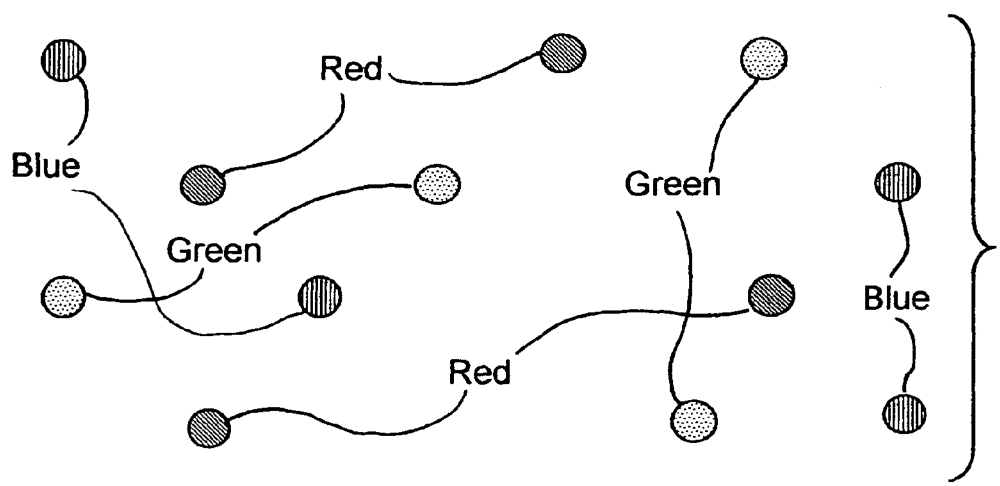
FIG. 44 is a diagram of the pattern of spots projected by a 4 row by 3 emitting ends per row array of another output head for use in the system of FIG. 1 according to Example 17, where the emitting ends, and therefore the pattern of spots, within each row are not uniformly horizontally spaced apart.
Figure 45A:
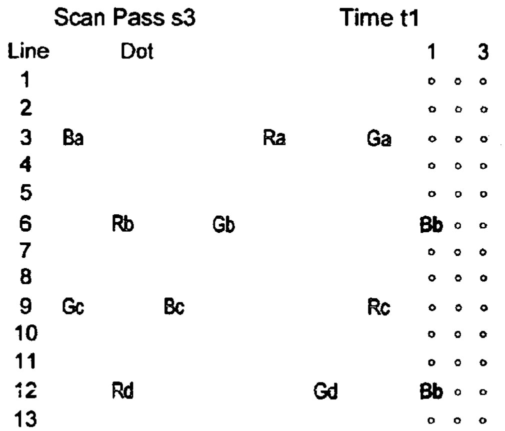
FIGS. 45A through 45F are time sequence diagrams for Example 11, illustrating the time shifting of spots of each primary color at the beginning of scan pass s3 for the pattern of spots shown in FIG. 44.
Figure 45B:
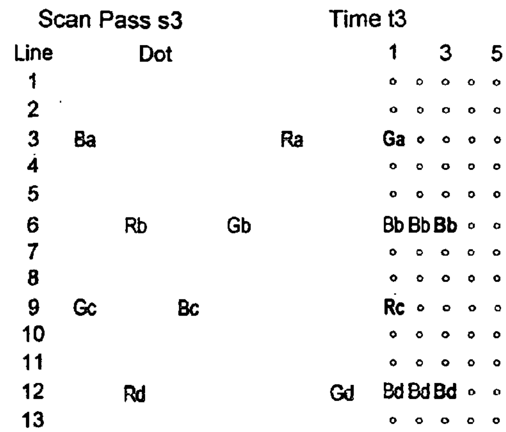
Figure 45C:
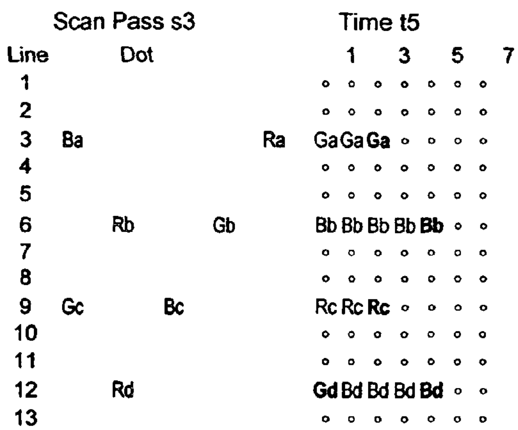
Figure 45D:
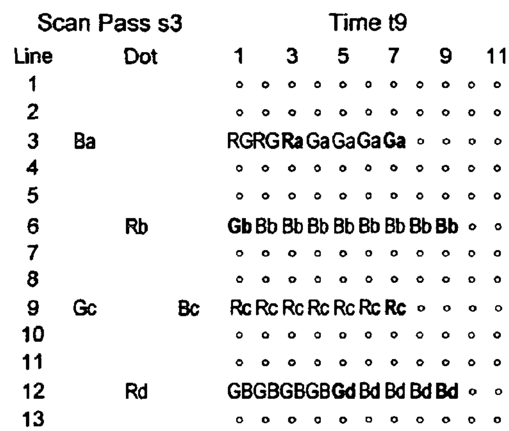
Figure 45E:
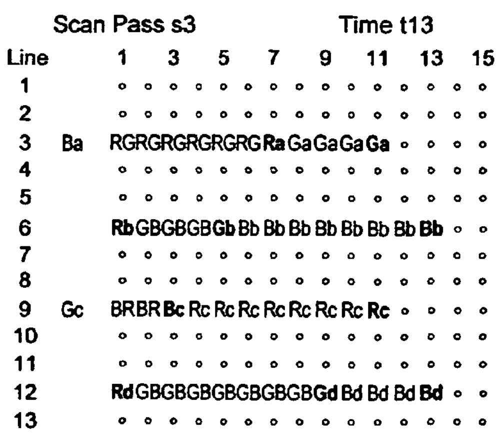
Figure 45F:
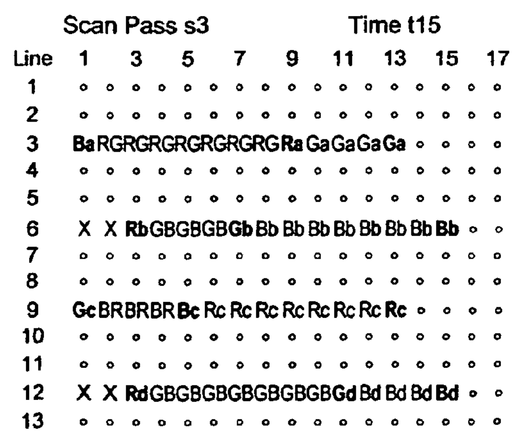

Output Head Configuration (spot pattern) — Rows: 4 Spots/Row: 3
Corresponding Figure: FIG. 44-46 — Vertical Adjustment: 4 lines
Pattern of Spots: Log — Effective Row spacing (all rows): 3 lines
Scan Pass: 3 Blank = b — Spot Spacing w/i Row: 8, 4 dots

| | Row A | | | Row B | | | Row C | | | Row D | | |
|---|---|---|---|---|---|---|---|---|---|---|---|---|
| | Blue | Red | Green | Blue | Red | Green | Blue | Red | Green | Blue | Red | Green |
| Line | | time t1 | | | | | | Dot Locations | | | | |
| 1 | b | b | b | | | | | | | | | |
| 2 | | | | b | b | 1 | | | | | | |
| . | | | | | | | | | | | | |
| . | | | | | | | | | | | | |
| . | | | | | | | | | | | | |
| 23 | | | | | | | b | b | b | | | |
| 24 | | | | | | | | | | b | b | 1 |
| Line | | time t3 | | | | | | Dot Locations | | | | |
| 1 | b | b | 1 | | | | | | | | | |
| 2 | | | | b | b | 3 | | | | | | |
| . | | | | | | | | | | | | |
| . | | | | | | | | | | | | |
| . | | | | | | | | | | | | |
| 23 | | | | | | | b | b | 1 | | | |
| 24 | | | | | | | | | | b | b | 3 |
| Line | | time t5 | | | | | | Dot Locations | | | | |
| 1 | b | b | 3 | | | | | | | | | |
| 2 | | | | b | 1 | 5 | | | | | | |
| . | | | | | | | | | | | | |
| . | | | | | | | | | | | | |
| . | | | | | | | | | | | | |
| 23 | | | | | | | b | b | 3 | | | |
| 24 | | | | | | | | | | b | 1 | 5 |
| Line | | time t9 | | | | | | Dot Locations | | | | |
| 3 | b | 3 | 7 | | | | | | | | | |
| . | | | | | | | | | | | | |
| . | | | | | | | | | | | | |
| . | | | | | | | | | | | | |
| 6 | | | | b | 1 | 9 | | | | | | |
| . | | | | | | | | | | | | |
| . | | | | | | | | | | | | |
| . | | | | | | | | | | | | |
| 9 | | | | | | | b | b | 7 | | | |
| . | | | | | | | | | | | | |
| . | | | | | | | | | | | | |

TABLE EX-17A-continued

| | | | | | | | | | | | | |
|---|---|---|---|---|---|---|---|---|---|---|---|---|
| . | | | | | | | | | | | | |
| 12 | | | | | | | | | | b | 5 | 9 |
| Line | time t15 | | | | | Dot Locations | | | | | | |
| 3 | 1 | 9 | 13 | | | | | | | | | |
| . | | | | | | | | | | | | |
| . | | | | | | | | | | | | |
| . | | | | | | | | | | | | |
| 6 | | | | 3 | 7 | 15 | | | | | | |
| . | | | | | | | | | | | | |
| . | | | | | | | | | | | | |
| . | | | | | | | | | | | | |
| 9 | | | | | | | 1 | 5 | 13 | | | |
| . | | | | | | | | | | | | |
| . | | | | | | | | | | | | |
| . | | | | | | | | | | | | |
| 12 | | | | | | | | | | 3 | 11 | 15 |

TABLE EX-17B

Output Head Configuration (spot pattern)
Corresponding Figure: FIG. 44-46
Pattern of Spots: Log
Scan Pass: 3 Blank = b Rows: 4 Spots/Row: 3
Vertical Adjustment: 4 lines
Effective Row spacing (all rows): 3 lines
Spot Spacing w/i Row: 8, 4 dots

| | Row A | | | Row B | | | Row C | | | Row D | | |
|---|---|---|---|---|---|---|---|---|---|---|---|---|
| | Blue | Red | Green | Blue | Red | Green | Blue | Red | Green | Blue | Red | Green |
| Line | time t1920 | | | | | Dot Locations | | | | | | |
| 1 | 1906 | 1914 | 1918 | | | | | | | | | |
| 2 | | | | 1908 | 1912 | 1920 | | | | | | |
| . | | | | | | | | | | | | |
| . | | | | | | | | | | | | |
| 23 | | | | | | | 1906 | 1910 | 1918 | | | |
| 24 | | | | | | | | | | 1908 | 1916 | 1920 |
| Line | time t1922 | | | | | Dot Locations | | | | | | |
| 1 | 1908 | 1916 | 1920 | | | | | | | | | |
| 2 | | | | 1910 | 1914 | b | | | | | | |
| . | | | | | | | | | | | | |
| . | | | | | | | | | | | | |
| 23 | | | | | | | 1908 | 1912 | 1920 | | | |
| 24 | | | | | | | | | | 1910 | 1918 | b |
| Line | time t1926 | | | | | Dot Locations | | | | | | |
| 1 | 1912 | 1920 | b | | | | | | | | | |
| 2 | | | | 1914 | 1918 | b | | | | | | |
| . | | | | | | | | | | | | |
| . | | | | | | | | | | | | |
| 23 | | | | | | | 1912 | 1916 | b | | | |
| 24 | | | | | | | | | | 1914 | b | b |
| Line | time t1930 | | | | | Dot Locations | | | | | | |
| 1 | 1916 | b | b | | | | | | | | | |
| 2 | | | | 1918 | b | b | | | | | | |
| . | | | | | | | | | | | | |
| . | | | | | | | | | | | | |
| 23 | | | | | | | 1916 | 1920 | b | | | |
| 24 | | | | | | | | | | 1918 | b | b |
| Line | time t1934 | | | | | Dot Locations | | | | | | |
| 1 | 1920 | b | b | | | | | | | | | |
| 2 | | | | b | b | b | | | | | | |
| . | | | | | | | | | | | | |
| . | | | | | | | | | | | | |
| 23 | | | | | | | 1920 | b | b | | | |
| 24 | | | | | | | | | | b | b | b |

and 46A-46F, and described in Tables EX-17A and EX-17B. Because the horizontal error is the same for all scan passes and horizontal repositioning of the spot pattern, the necessary delay may be incorporated for each output head at the factory when calibrating the particular laser projection system concerned. One should also consider that it is not necessary to use the same size fiber for each color, as assumed in previous examples herein. In some useful fiber configurations, some fiber cores (but typically not the outer diameter of the cladding) are larger in diameter, thus being multimode, and others are smaller, closer, or more similar, to single mode. As noted above, most of the perception of resolution occurs in the green. Given potential losses in the process of inserting light into fibers 42, it may be advantageous to use single (or nearly single mode) fiber for the green beams, albeit at some lesser insertion efficiency where the higher insertion losses are made up by having more powerful laser beams, and more multimode fibers having lower insertion losses to more efficiently relay the red and blue laser beams, to attain the greatest feasible resolution of the photoptically perceived green spots while maintaining necessary overall brightness.

EXAMPLE 18

Figure 47:
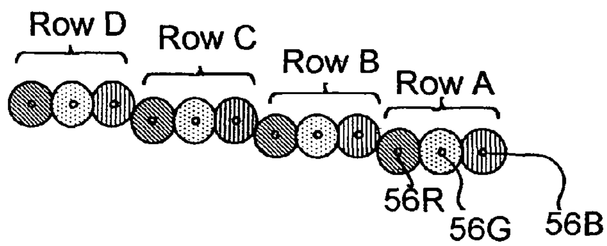
FIG. 47 is a diagram of a 4 row by 3 emitting ends per row array oriented in a step configuration, for use in the system of FIG. 1 according to Example 18.
Figure 47S:
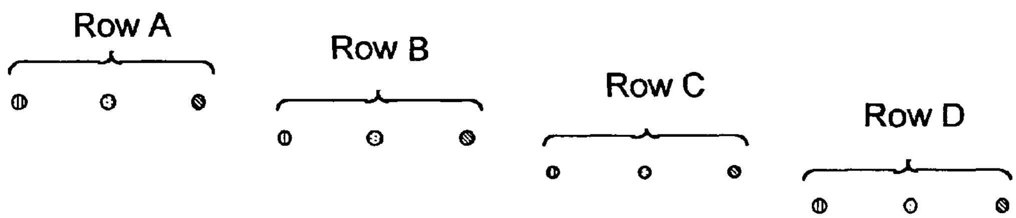
FIG. 47S is a diagram of the pattern of spots projected on a screen using the array shown in FIG. 47.

Example 18, shown in FIGS. 47, 47S, 48 and 49, and described in Tables 18A and EX-18B, illustrates an alternate output head configuration from that shown in FIG. 5 and in the other examples, wherein the rows of three emitting ends which are oriented substantially in vertical alignment in the prior embodiments of output heads are instead positioned out of vertical alignment, in a substantially stepped arrangement to produce the pattern of spots on the screen shown in FIG. 47S. The output head includes four groups of three emitting ends, with each group arranged in horizontal alignment. In this arrangement of the output head emitting ends, and therefore the pattern of spots, the three primary colors are assigned to each group or row. The reordering of the video pixel data for this Example 18 is graphically shown in FIGS. 48A-48E and 49A-49E, and described on a line and spot basis in Tables EX-18A and EX-18B. In this embodiment, the adjacent rows preferably have an effective row spacing of 1 line, that is the lines written during each scan pass are vertically adjacent. Although not required, during a complete initial scan pass lines L1-L4 of the frame are preferably respectively written with rows RowA, RowB, RowC and RowD of the pattern of spots. Because of the orientation of the pattern of spots shown in FIG. 47S and the assumed left

TABLE EX-18A

Output Head Configuration (spot pattern) Rows: 4 Spots/Row: 3
Corresponding Figure: FIG. 47-49 Vertical Adjustment: 4 lines
Pattern of Spots: Step Effective Row spacing (all rows): 1 line
Scan Pass: 1 Blank = b Spots Between Rows: 3 Spot Spacing w/i Row: 3 dots

| | Row D | | | Row C | | | Row B | | | Row A | | |
|---|---|---|---|---|---|---|---|---|---|---|---|---|
| | Red | Green | Blue | Red | Green | Blue | Red | Green | Blue | Red | Green | Blue |
| Line | | time t1 | | | | | | Dot Locations | | | | |
| 1 | 1b | b | b | | | | | | | | | |
| 2 | | | | b | b | b | | | | | | |
| 3 | | | | | | | b | b | b | | | |
| 4 | | | | | | | | | | b | b | b |
| Line | | time t7 | | | | | | Dot Locations | | | | |
| 1 | 7 | 4 | 1 | | | | | | | | | |
| 2 | | | | b | b | b | | | | | | |
| 3 | | | | | | | b | b | b | | | |
| 4 | | | | | | | | | | b | b | b |
| Line | | time t10 | | | | | | Dot Locations | | | | |
| 1 | 10 | 7 | 4 | | | | | | | | | |
| 2 | | | | 1 | b | b | | | | | | |
| 3 | | | | | | | b | b | b | | | |
| 4 | | | | | | | | | | b | b | b |
| Line | | time t19 | | | | | | Dot Locations | | | | |
| 1 | 19 | 16 | 13 | | | | | | | | | |
| 2 | | | | 10 | 7 | 4 | | | | | | |
| 3 | | | | | | | 1 | b | b | | | |
| 4 | | | | | | | | | | b | b | b |
| Line | | time t28 | | | | | | Dot Locations | | | | |
| 1 | 28 | 25 | 22 | | | | | | | | | |
| 2 | | | | 19 | 16 | 13 | | | | | | |
| 3 | | | | | | | 10 | 7 | 4 | | | |
| 4 | | | | | | | | | | 1 | b | b |
| Line | | time t34 | | | | | | Dot Locations | | | | |
| 1 | 34 | 31 | 28 | | | | | | | | | |
| 2 | | | | 25 | 22 | 19 | | | | | | |

TABLE EX-18A-continued

| | | | | | | | | | | | | |
|---|---|---|---|---|---|---|---|---|---|---|---|---|
| 3 | | | | | | | 16 | 13 | 10 | | | |
| 4 | | | | | | | | | | 7 | 4 | 1 |

to right scanning of the spot pattern, the spots of RowD will each illuminate the dot locations of line 1 of the frame in right to left sequence at different times, followed by RowC, RowB and RowA. Tables EX-18A and EX-18B and FIGS. 48A-48E and 49A-49E describe the writing of the lines and dot locations of the lines for the pattern of spots of this Example 18. In the embodiment of this Example 18, it is not necessary to blank any rows at the top or bottom of the frame, as the effective line spacing is one. Reordering, or time combination, of the video pixel data, and blanking of the spots to the left and right of the frame at the beginning and end of each scan pass is still required, however, to an even greater extent than shown in FIG. 13 above, because the width of the spot pattern is greater. For this Example 18, the horizontal spacing between spots emitted from adjacent fiber emitting ends is assumed to be three dots on the screen, i.e., there are two dots between horizontally adjacent spots on the screen. We also assume an effective horizontal spot spacing between the ends of horizontally adjacent rows of three dots. We further assume a red, green, blue order of each row of emitting ends. It should be understood that these assumptions are merely for illustrative purposes, and that larger or smaller effective horizontal spot spacings and/or vertical row spacing may be required in actual practice, and that more or fewer emitting ends per row, and more or fewer rows of emitting ends, may be employed within the concept of our invention.

TABLE EX-18B

| Output Head Configuration (spot pattern) | Rows: 4 Spots/Row: 3 |
|---|---|
| Corresponding Figure: FIG. 47-49 | Vertical Adjustment: 4 lines |
| Pattern of Spots: Step | Effective Row spacing (all rows): 1 line |
| Scan Pass: 1 Blank = b | Spots Between Rows: 3 Spot Spacing w/i Row: 3 dots |

| | Row D | | | Row C | | | Row B | | | Row A | | |
|---|---|---|---|---|---|---|---|---|---|---|---|---|
| | Red | Green | Blue | Red | Green | Blue | Red | Green | Blue | Red | Green | Blue |
| Line | time t1920 | | | | | | Dot Locations | | | | | |
| 1 | 1920 | 1917 | 1914 | | | | | | | | | |
| 2 | | | | 1911 | 1908 | 1905 | | | | | | |
| 3 | | | | | | | 1902 | 1899 | 1896 | | | |
| 4 | | | | | | | | | | 1893 | 1890 | 1887 |
| Line | time t1921 | | | | | | Dot Locations | | | | | |
| 1 | 1920 | 1917 | 1914 | | | | | | | | | |
| 2 | | | | 1911 | 1908 | 1905 | | | | | | |
| 3 | | | | | | | 1902 | 1899 | 1896 | | | |
| 4 | | | | | | | | | | 1893 | 1890 | 1887 |
| Line | time t1929 | | | | | | Dot Locations | | | | | |
| 1 | b | b | b | | | | | | | | | |
| 2 | | | | 1920 | 1917 | 1914 | | | | | | |
| 3 | | | | | | | 1911 | 1908 | 1905 | | | |
| 4 | | | | | | | | | | 1902 | 1899 | 1896 |
| Line | time t1935 | | | | | | Dot Locations | | | | | |
| 1 | b | b | b | | | | | | | | | |
| 2 | | | | b | b | 1920 | | | | | | |
| 3 | | | | | | | 1917 | 1914 | 1911 | | | |
| 4 | | | | | | | | | | 1908 | 1905 | 1902 |
| Line | time t1944 | | | | | | Dot Locations | | | | | |
| 1 | b | b | b | | | | | | | | | |
| 2 | | | | b | b | b | | | | | | |
| 3 | | | | | | | b | b | 1920 | | | |
| 4 | | | | | | | | | | 1917 | 1914 | 1911 |
| Line | time t1953 | | | | | | | | | | | |
| 1 | b | b | b | | | | | | | | | |
| 2 | | | | b | b | b | | | | | | |
| 3 | | | | | | | b | b | b | | | |
| 4 | | | | | | | | | | b | b | 1920 |

Thus, as shown in FIGS. 48A-48E and 49A-49E and Tables EX-18A and EX-18B, for a horizontal scan at scan pass time s1 scanning lines L1, L2, L3 and L4, at time t1 dot 1 of line L1 is written by the red spot of RowA, while the green and blue spots of RowA and all spots of RowB, RowC and RowD are blanked. The remaining illuminations of the dot locations of lines L1-L4 at various times during scan pass s1 are described in Tables EX-18A and EX-18B.

The detailed description relating to FIGS. 48A-48E, and to Table EX-18A, illustrates the time combination required for the spot pattern shown in FIG. 47S at the beginning of the scan pass. As shown in FIGS. 49A-49F and described in Table EX-18B, with similar writing of spots on dot locations at the end of the scan pass for lines L4, L3, L2 and L1, and blanking of spots in each RowD, RowC, RowB and RowA in the inverse order of that needed at the beginning of the scan pass, 1953 horizontal dot shifts of the spot pattern will be needed to complete the lines of the first horizontal scan pass. When the complete frame of 1080 lines is written, the galvanometer mirror retraces to the top of the frame, and the scanning of a new frame is begun. Of course, the number of configurations of this type of output head and resulting spot pattern are almost endless. The primary limitation of an output head having the type of spot pattern illustrated by this Example 18 is the overall width of the spot pattern. However, this configuration has the advantage of reducing the horizontal scan passes per frame, and somewhat simplifying the timing of the input pixel data.

EXAMPLES 19-20

Figure 50:
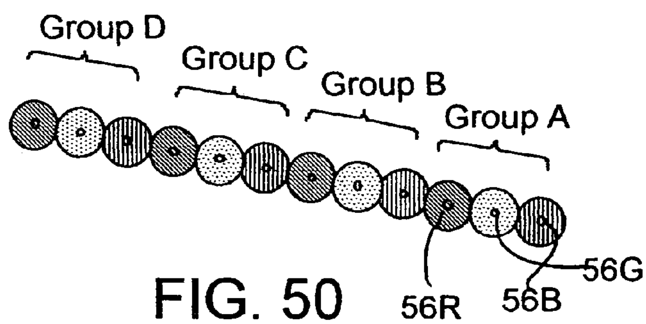
FIG. 50 is a diagram of a 12 emitting end linear array for use in the system of FIG. 1 according to Example 19.
Figure 50S:
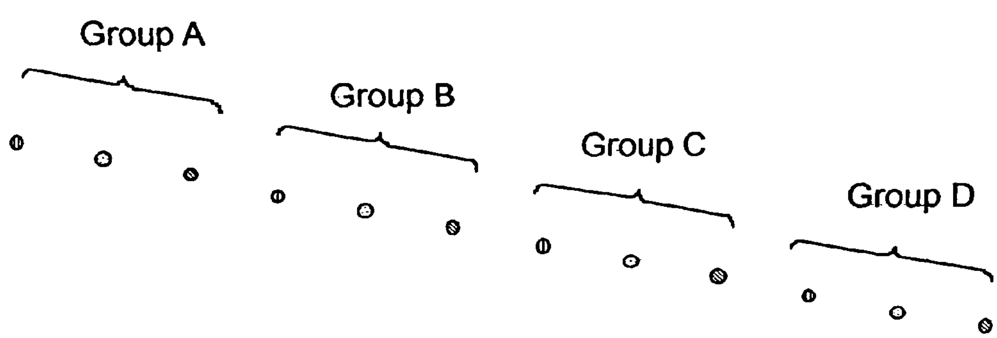
FIG. 50S is a diagram of the pattern of spots projected on a screen using the array shown in FIG. 50.
Figure 48A:
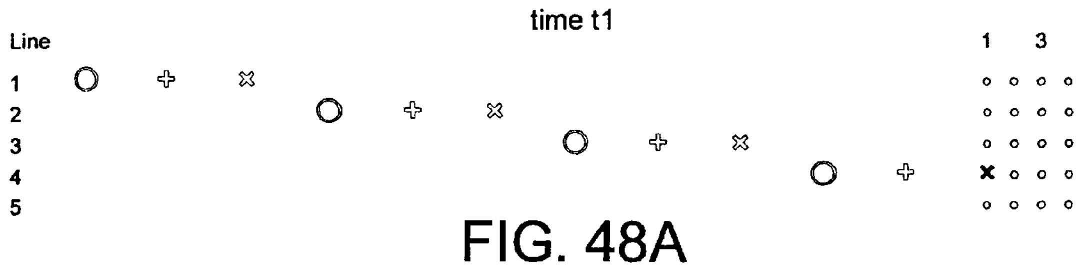
FIGS. 48A through 48E are time sequence diagrams for Example 18 illustrating the time shifting of spots of each primary color at the beginning of scan pass s1 for a pattern of spots shown in FIG. 47S.
Figure 48B:
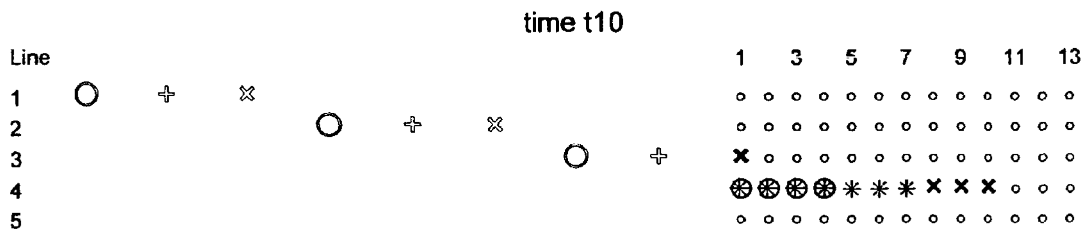
Figure 48C:
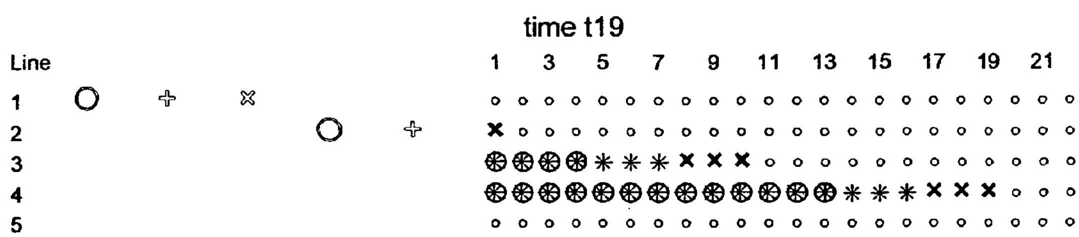
Figure 48D:
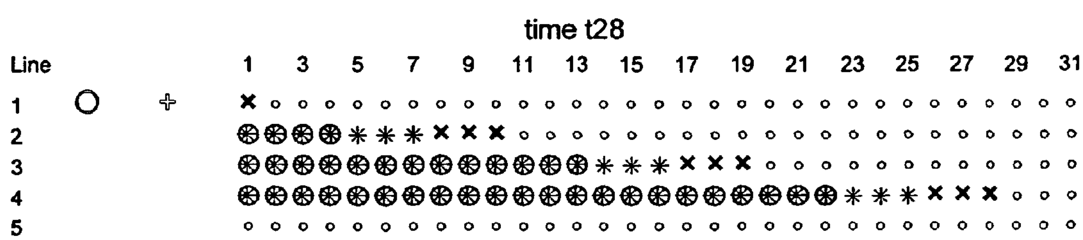
Figure 48E:
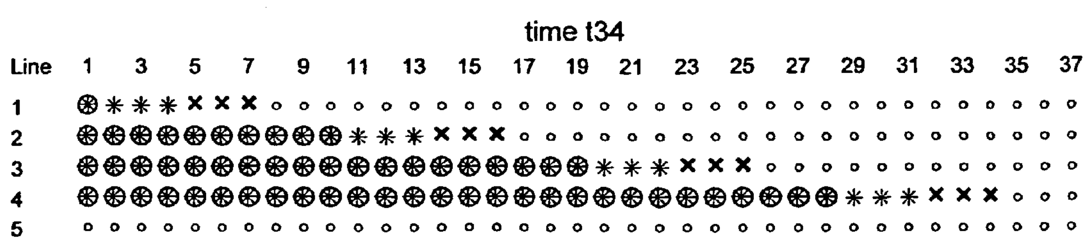
Figure 49A:
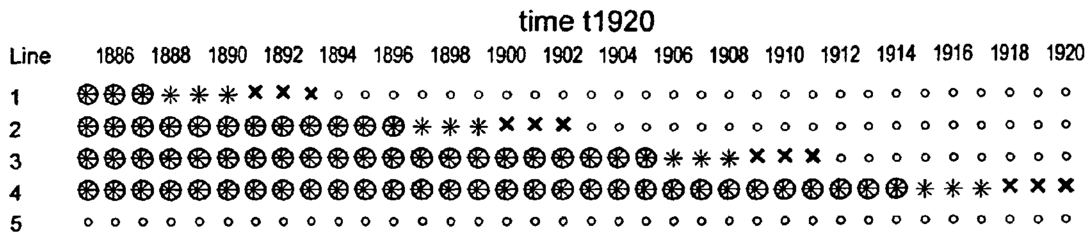
FIGS. 49A through 49E are time sequence diagrams for Example 18 illustrating the time shifting of spots of each primary color at the end of scan pass s1 for a pattern of spots shown in FIG. 47S.
Figure 49B:
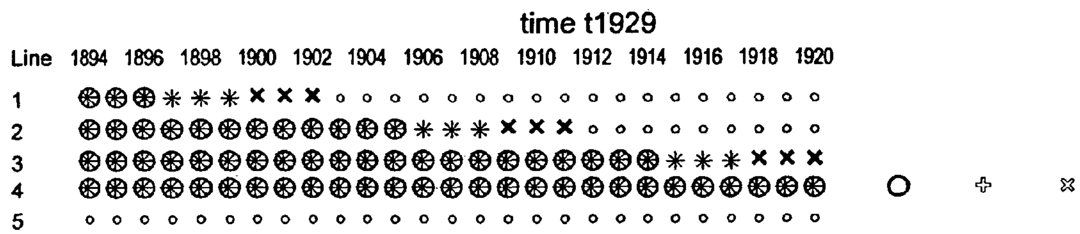
Figure 49C:
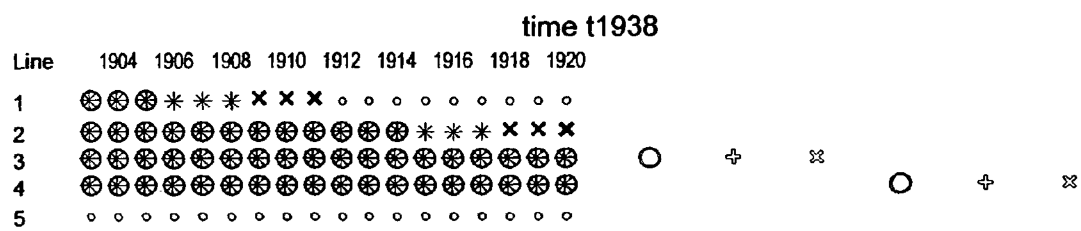
Figure 49D:
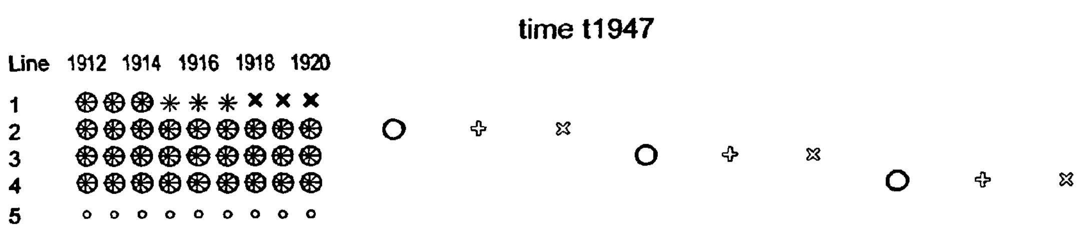
Figure 49E:
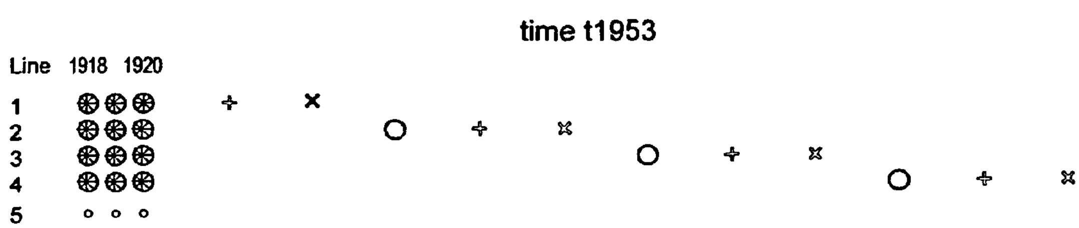
Figure 51:
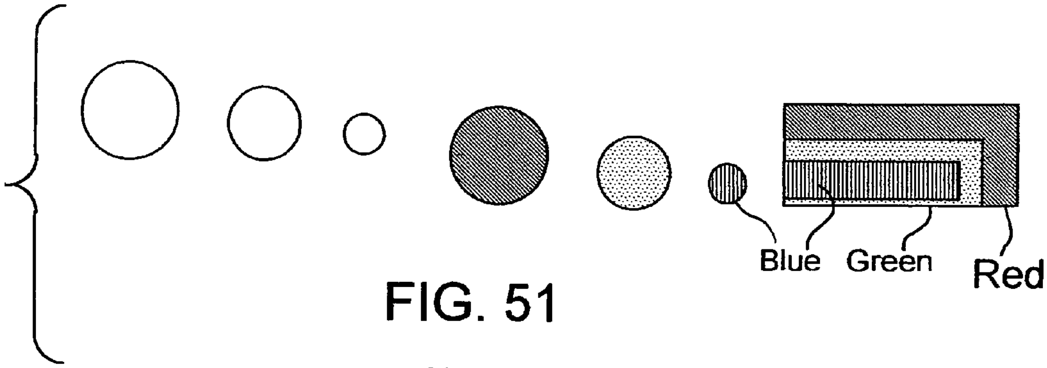
FIG. 51 is a diagram of a portion of the pattern of spots shown in FIG. 50S, showing spots where the relative sizes of the spots are not the same for each color and the resulting overlapping of the lines of each color in each line.
Figure 52:
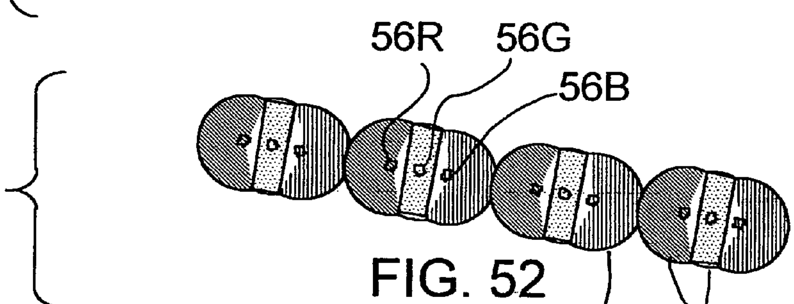
FIG. 52 is a diagram of a 12 emitting end linear array for use in the system of FIG. 1 according to Example 20, with the fibers within each RGB Group modified to space the emitting ends closer together.

FIGS. 50, 50S, and 51, and FIGS. 52, 52S and 53, and corresponding Tables EX-19 and EX-20, respectively illustrate for Examples 19 and 20 alternate versions of the stepped array and pattern of spots described in FIGS. 47 and 47S for Example 18, wherein the linear array of emitting ends and the pattern of spots (FIGS. 50S and 52S respectively) projected by the arrays shown in FIGS. 50 and 52 are slanted somewhat with respect to the horizontal aspect of the frame projected on the screen to somewhat approximate the result of the stepped configuration of Example 18, but in a significantly more manufacturable flat or linear alignment.

Figure 52S:
FIG. 52S is a diagram of the pattern of spots projected on a screen using the array shown in FIG. 52.
Figure 53:
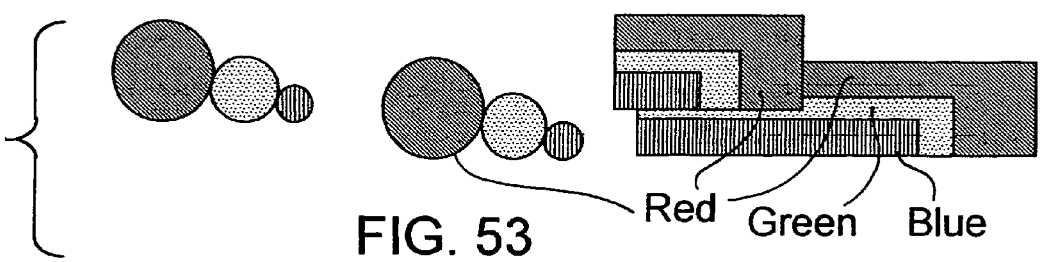
FIG. 53 is a diagram of a portion of the pattern of spots, and of the resulting overlapping of the lines of each color in each line, projected on a screen by linear spot pattern shown in 52S.

For Examples 19 and 20 the groups of emitting ends and corresponding spots of the spot pattern are arranged in groups of red, green and blue spots, herein referred to as "RGB groups A, B, C and D", respectively. The RGB groups of spots shown in FIGS. 50S and 52S are not horizontally aligned as shown in FIG. 47S, but the spots produced thereby do significantly, both physically and perceptually, overlap vertically as shown in FIGS. 51 and 52. Each such RGB group corresponds to a row of Example 18 above, having substantially the same line reordering and time combination within rows shown in FIGS. 48 and 49 of Example 18.

EXAMPLE 19

Since the outboard red and blue spots of each RGB group are not horizontally aligned with the center green spots of their own RGB group, the edges of the color spots of one group may overlap one or more color spots of an adjacent group somewhat, as shown in FIG. 51. This overlap is not typically perceived since most of the resolution perception of an image occurs in the green, and even though the red and blue are not exactly coincident with the green spot of the respective RGB group, resolution doesn't noticeably suffer.

By selecting different orders for the colors of the fibers within particular RGB groups such as red-green-blue for one RGB group and green-blue-red for another RGB group, the perceived vertical position of the spots of each RGB group projected on the screen by the linear array will be effectively vertically spaced a line apart. It may be preferable to place green, the more photoptically perceived color, at the center of each RGB group. In other words, if the four green spots are at the middle of each RGB group, an appropriate slant or angle of the head will write four lines of green spots with an effective row spacing of one line (or more) on the screen, as shown for Example 18 and FIG. 48 and Tables EX-18A and EX-18B. As previously noted, the pattern of those spots and the extent of overlap is graphically shown in FIG. 51. Although it might seem that the omission of the discrete steps of the emitting end array and resulting spot pattern of Example 19 might not yield the effect shown in FIGS. 48 and 49 of Example 18, appropriate assignment of the colors to the appropriate emitting ends as described for this Example 19 should yield the appropriate composite spots at effective dot locations of each line on the screen that are perceptually equivalent to the dot locations illustrated in Example 18.

EXAMPLE 20

FIGS. 52 and 52S illustrate an alternate embodiment of the slanted configuration shown in FIGS. 50 and 50S, respectively, wherein the fibers, and therefore the spots of the spot pattern, are spaced closer together to minimize the effective spacing of spots within an RGB group and thereby reduce the portion of the red and blue spots that do not overlap the more photoptically perceived green spot. Referring again to FIG. 52, the cladding of the fibers are shaved, skived or ground away to reduce the thickness of the cladding, or the distance between fiber centers, and therefore the effective horizontal spot spacing within each RGB group. This fiber treatment may also be useful in array configurations other than those illustrated in Examples 19 and 20, both for the spacing of beams within horizontal rows and effective vertical spacing between rows, because the greater the spacing, the greater the overlap of rows of beams that must be blanked at the top and bottom of the frame.

The output head configuration illustrated in FIG. 52 and the resulting spot pattern shown in FIG. 52S may enable the adjustment of the system to provide different effective row spacing, resolutions, and aspect ratios by altering the slant or angle of the rows with respect to the horizontal axis of the screen. It may be seen that as the angle of any of the rows of emitting ends, and consequently of the spot pattern, from horizontal is varied, the effective vertical row spacing on the screen is varied. The angle of the output array, or pattern of spots, may be manually adjustable, such as when calibrating the system at the factory, or at a particular location. Automatic, or dynamic, adjustment could also be accomplished during setup of the laser projection system at a new location, or as part of a portable system used at different locations, or to accommodate different aspect ratio and resolution requirements for the video image or for different video sources.

EXAMPLES 21-22

Figure 54:
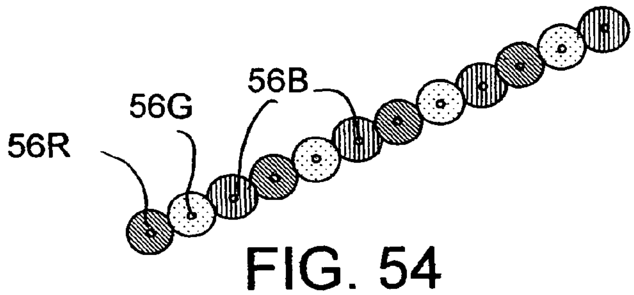
FIG. 54 is a diagram of a 12 emitting end linear array for use in the system of FIG. 1 according to Example 21 angled more from the horizontal aspect than the array of FIG. 50.
Figure 54S:
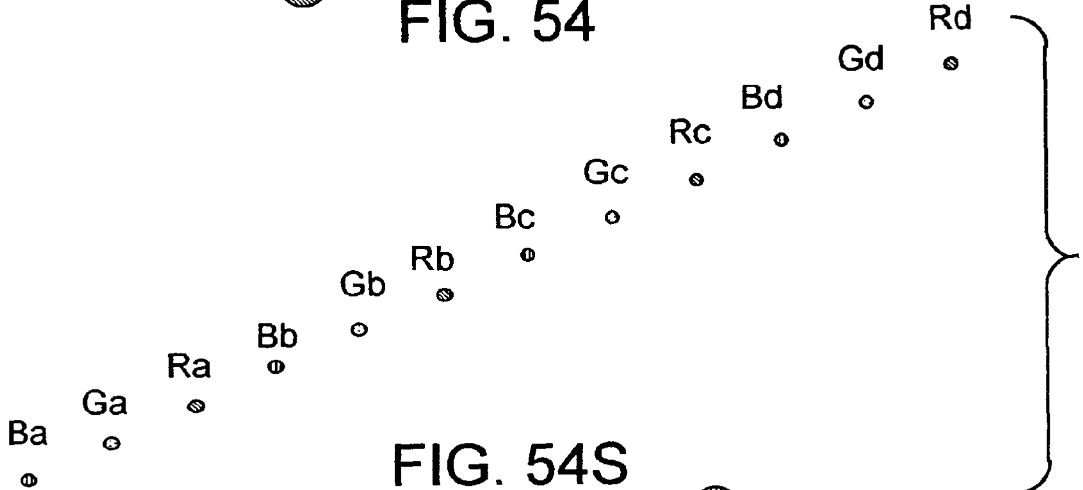
FIG. 54S is a diagram of the pattern of spots projected on a screen using the array shown in FIG. 54.
Figure 58:
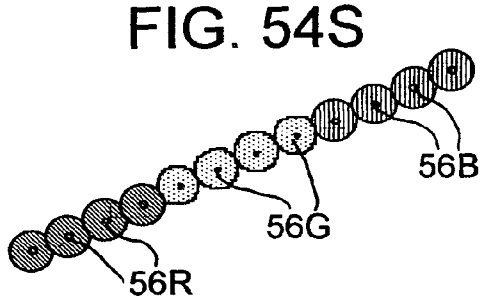
FIG. 58 is a diagram of a 12 emitting end linear array for use in the system of FIG. 1 according to Example 22 similar to that of FIG. 54 of Example 21, with a different assignment of colors to the fibers of the array.
Figure 58S:
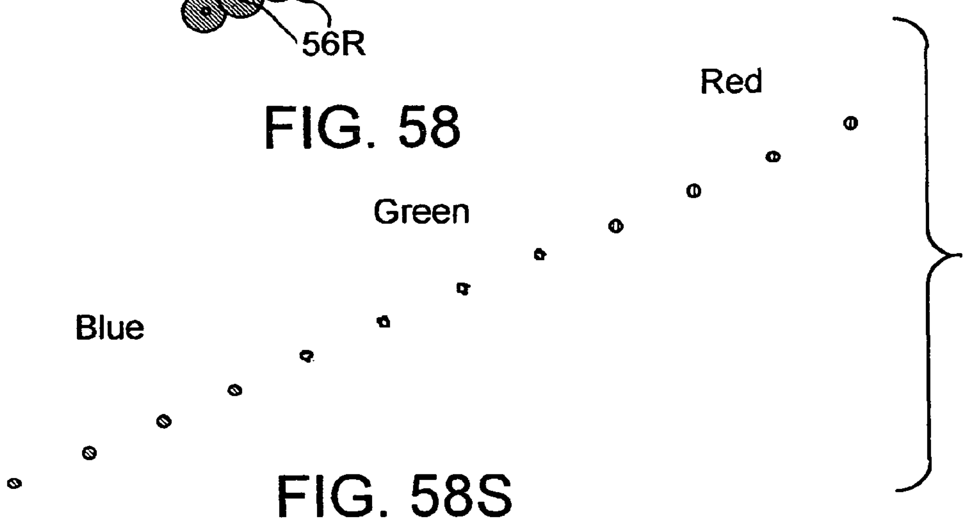
FIG. 58S is a diagram of the pattern of spots projected on a screen using the array shown in FIG. 58.
Figures 55A, 55B, 55C, 55D, 55E, 55F, 55G, 55H:
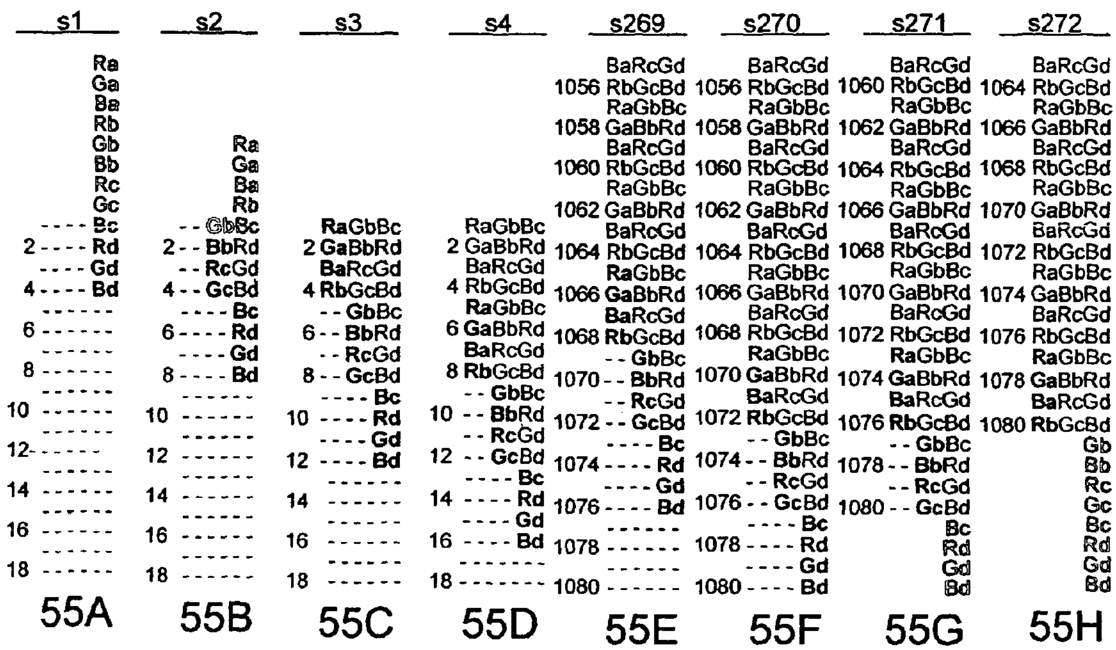
FIGS. 55A through 55H are time sequence diagrams for Example 21, illustrating line reordering for a linear spot pattern similar to that of FIG. 54S having an effective row spacing of 1 line and a vertical adjustment between scan passes of 4 lines.
Figure 56A:
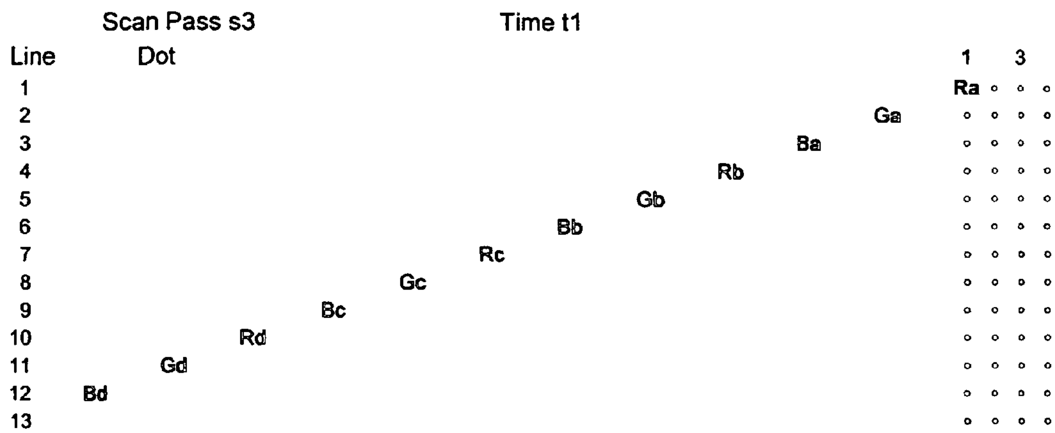
FIGS. 56A through 56C are time sequence diagrams for Example 21 illustrating the time shifting of spots of each primary color at the start of scan pass s3 for a pattern of spots shown in FIG. 54S.
Figure 56B:
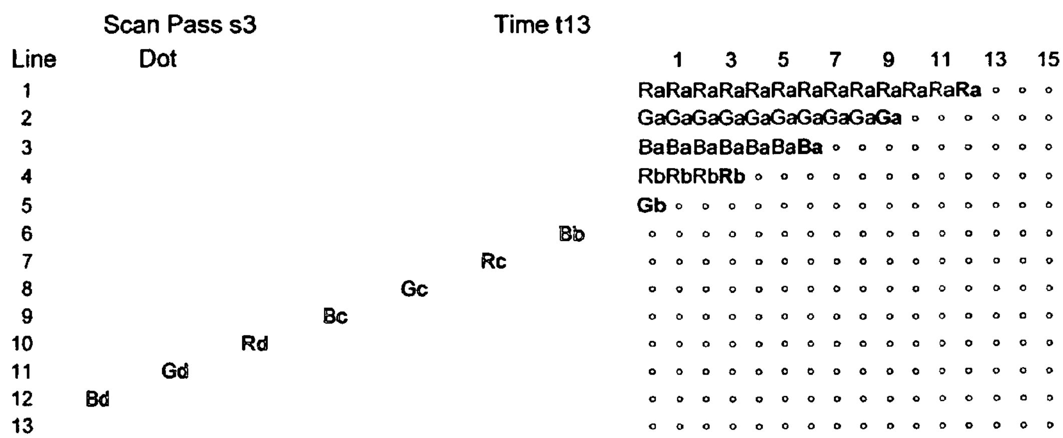
Figure 56C:
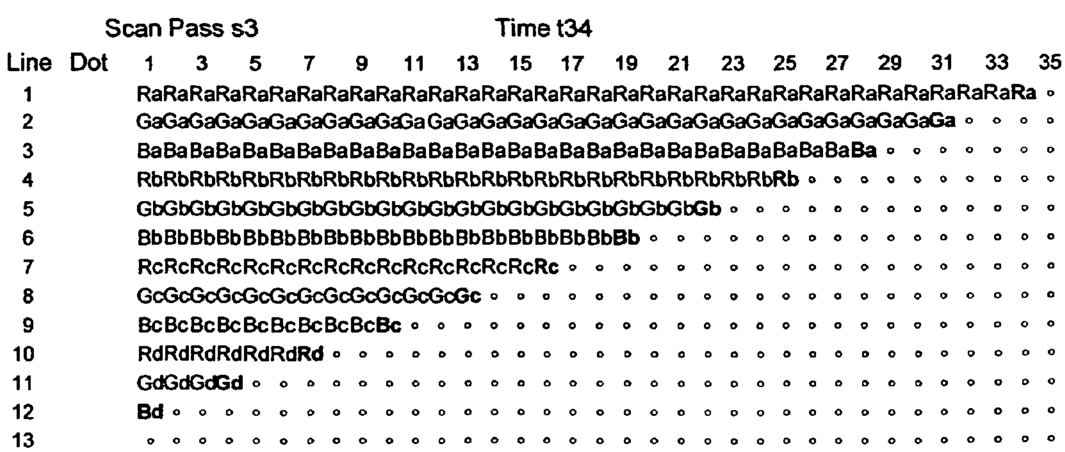
Figure 57A:
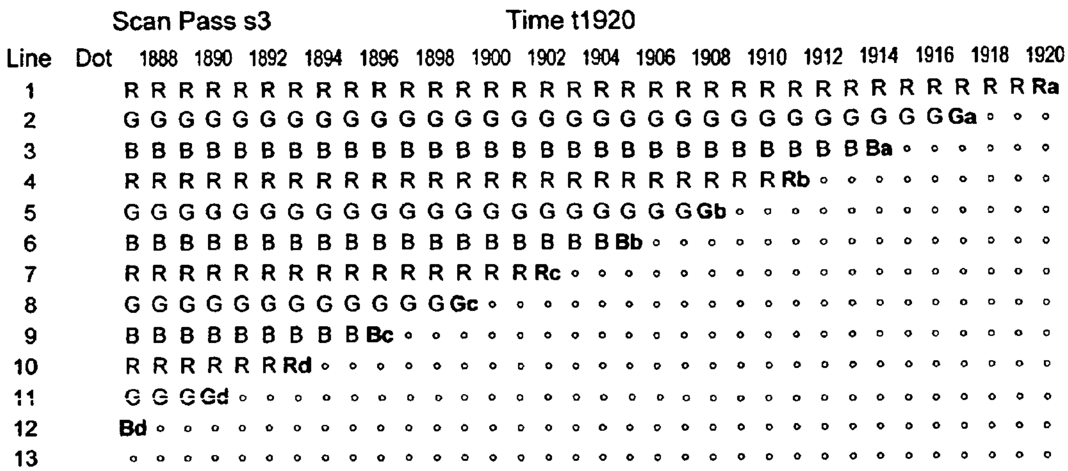
FIGS. 57A through 57C are time sequence diagrams for Example 21 illustrating the time shifting of spots of each primary color at the end of scan pass s3 for a pattern of spots shown in FIG. 54S.
Figure 57B:
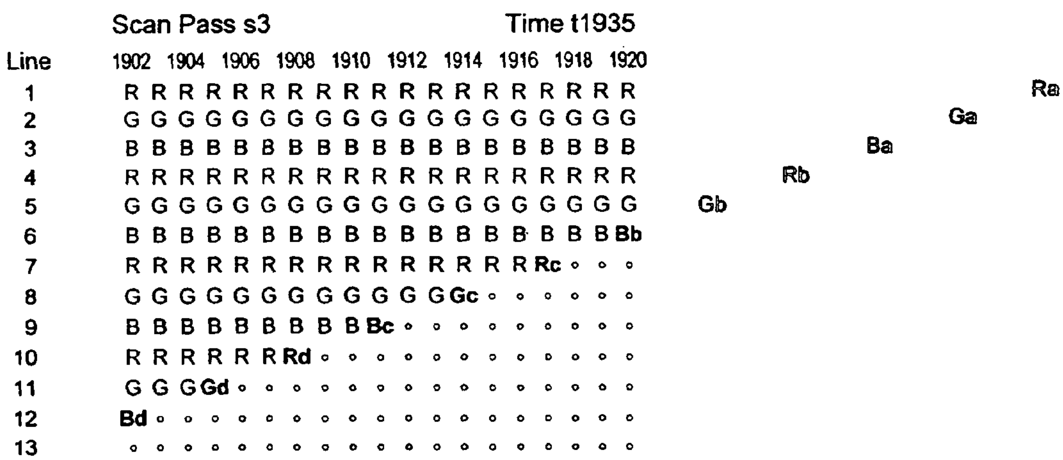
Figure 57C:
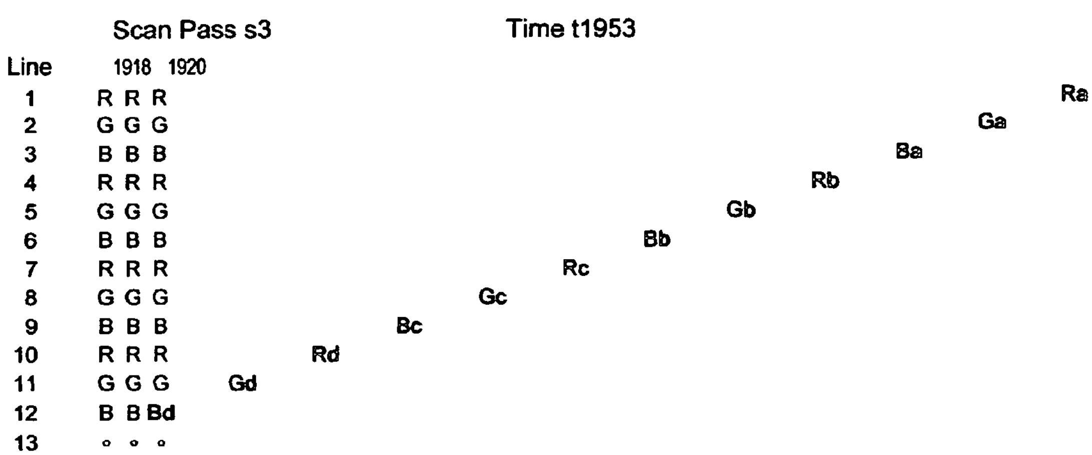
Figures 59A, 59B, 59C, 59D, 59E, 59F, 59G, 59H:
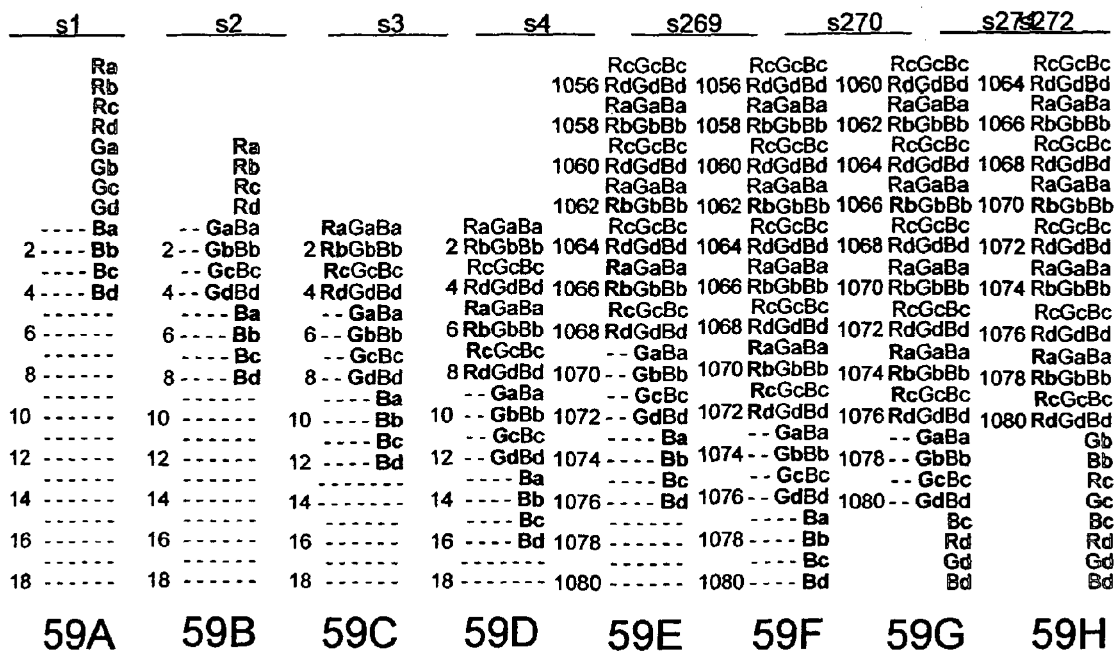
FIGS. 59A through 59H are time sequence diagrams for Example 22, illustrating line reordering for a linear spot pattern similar to that of FIG. 58S having an effective row spacing of 1 line and a vertical adjustment between scan passes of 4 lines.
Figure 60A:
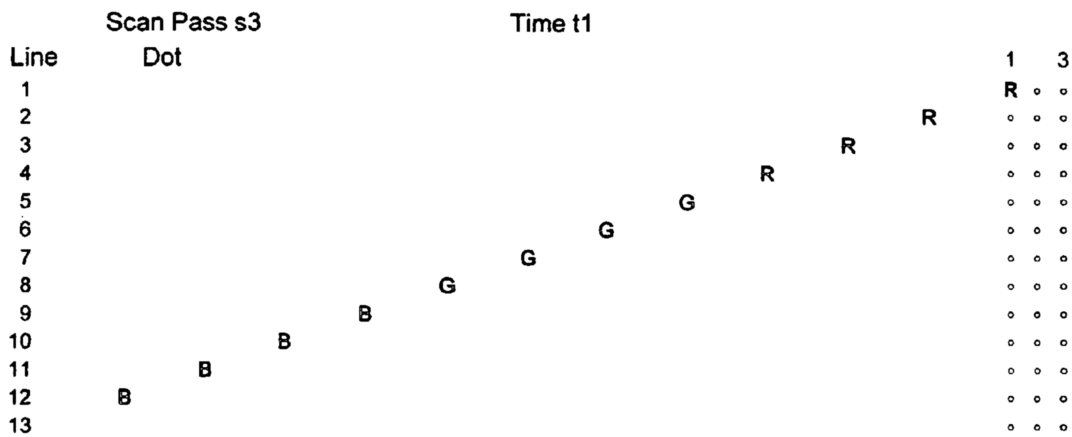
FIGS. 60A through 60C are time sequence diagrams for Example 22 illustrating the time shifting of spots of each primary color at the start of scan pass s3 for a pattern of spots shown in FIG. 58S.
Figure 60B:
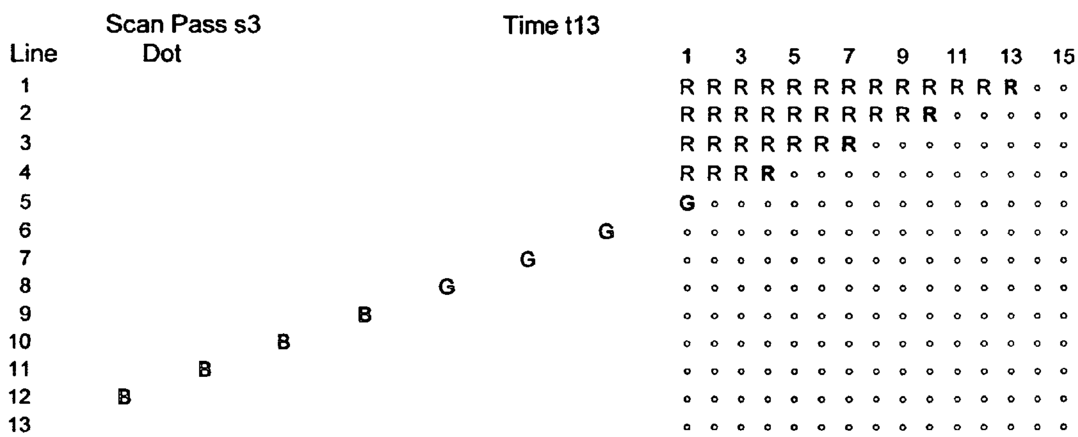
Figure 60C:
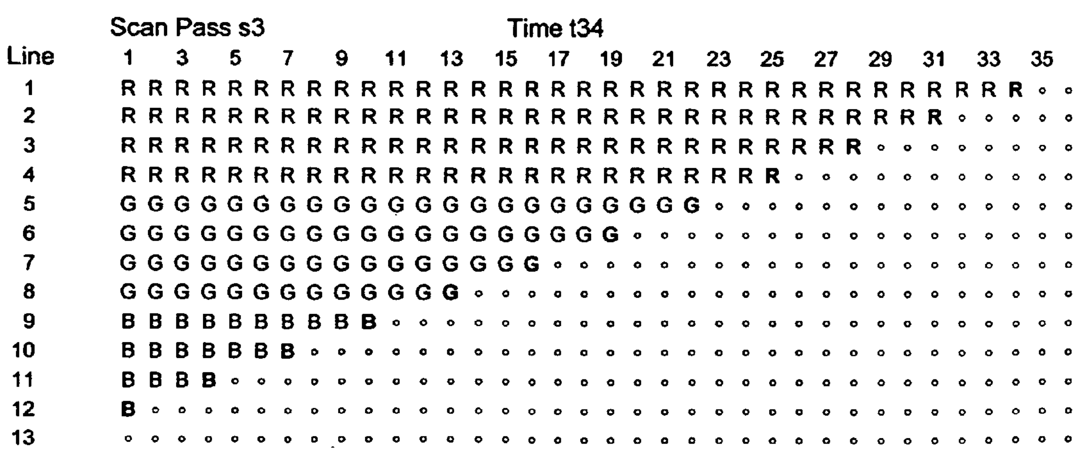
Figure 61A:
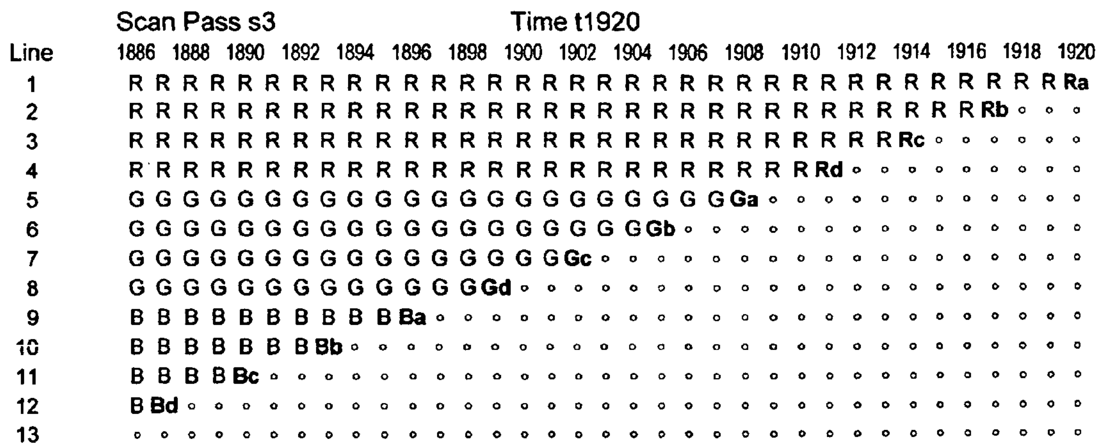
FIGS. 61A through 61C are time sequence diagrams for Example 22 illustrating the time shifting of spots of each primary color at the end of scan pass s3 for a pattern of spots shown in FIG. 58S.
Figure 61B:
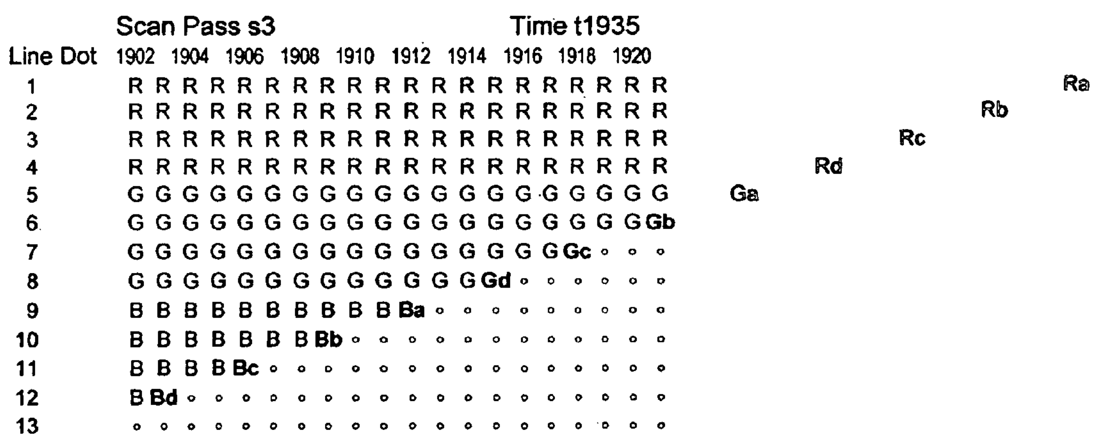
Figure 61C:
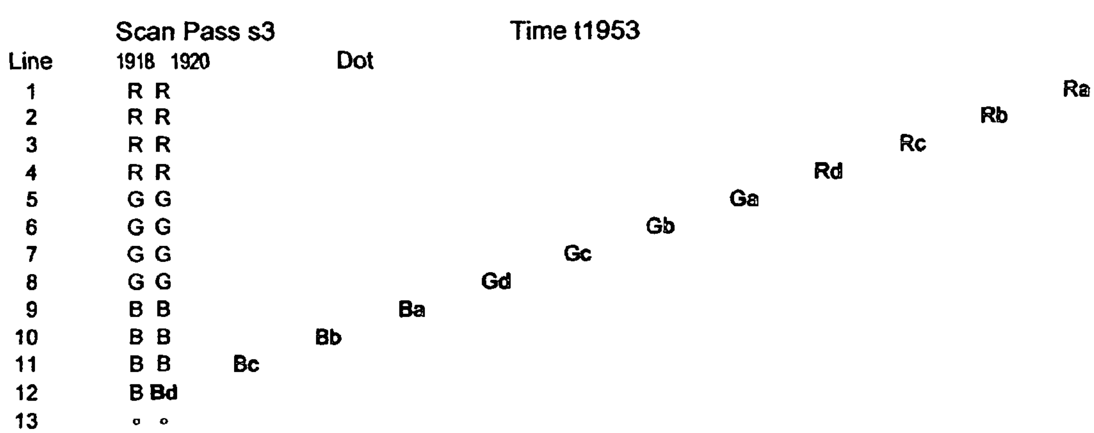

For Examples 21 and 22, FIGS. 54 and 58 show alternate output head emitting end configurations and FIGS. 54S and 58 show the corresponding alternate spot patterns, similar to that of the linear array of Example 19 shown in FIGS. 50 and 50S, but angled more from horizontal so that each spot of the spot pattern projected on the screen is at an effective row spacing of 1 line. The difference between Examples 21 and 22 resides in the assignment of colors of beams to the fibers. Example 21 employs four red-green-blue groups, whereas Example 22 employs groups of colors, for example, red-red-red-red/green-green-green-green/blue-blue-blue-blue.

Figure 78:
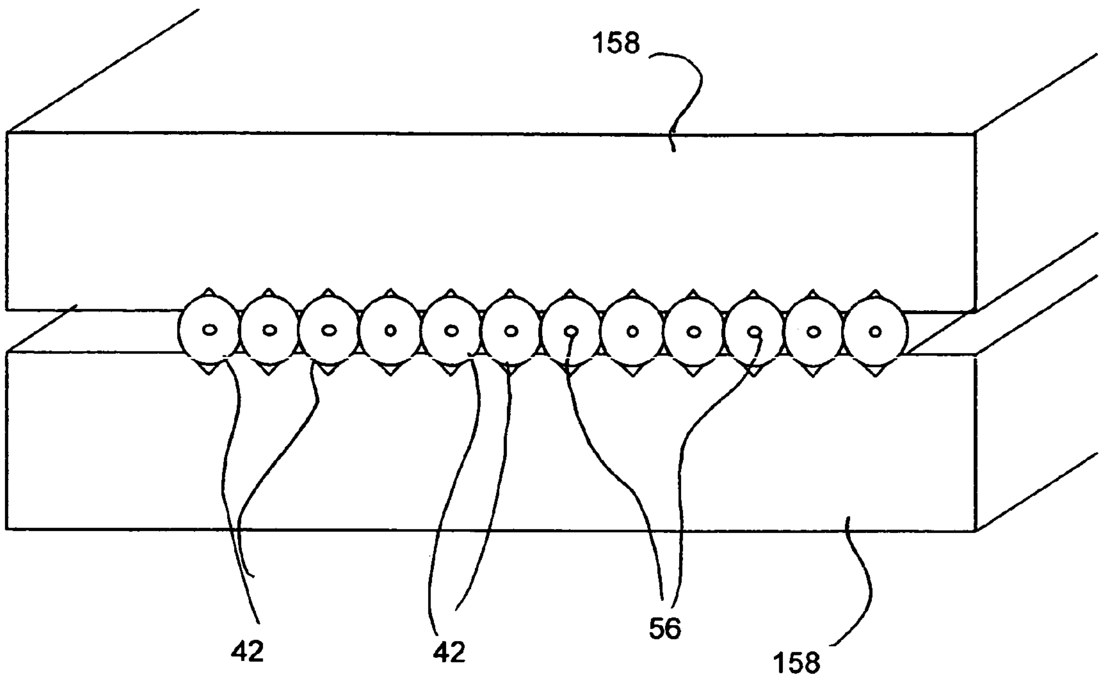
FIG. 78 is a diagram of an output head assembly constructed with silicon "V" grooves to place and hold the fiber emitting ends.

Examples 21 and 22 are our most preferred embodiments for the head arrangement for the following reasons. The output head is relatively easy to manufacture using a silicon "V" groove as shown in FIG. 78 for positioning the emitting ends in a line. In FIG. 78 we show, for example, 12 fibers 42 captured between two silicon "V" groove blocks 158, such that the emitting ends 56 are evenly spaced and linearly aligned to within a micron or two. We prefer to use such twelve-fiber heads manufactured to our design by Haleos, Inc. of Peppers Ferry Loop, Radford, Va. 24141. Also, if their are to be changes in aspect ratio, the spacing between adjacent lines on the image surface is easily adjusted simply by varying the slant of the head. Further, with the lines close together vertically, the next frame or subframe is completed with fewer scan passes.

Figure 12:
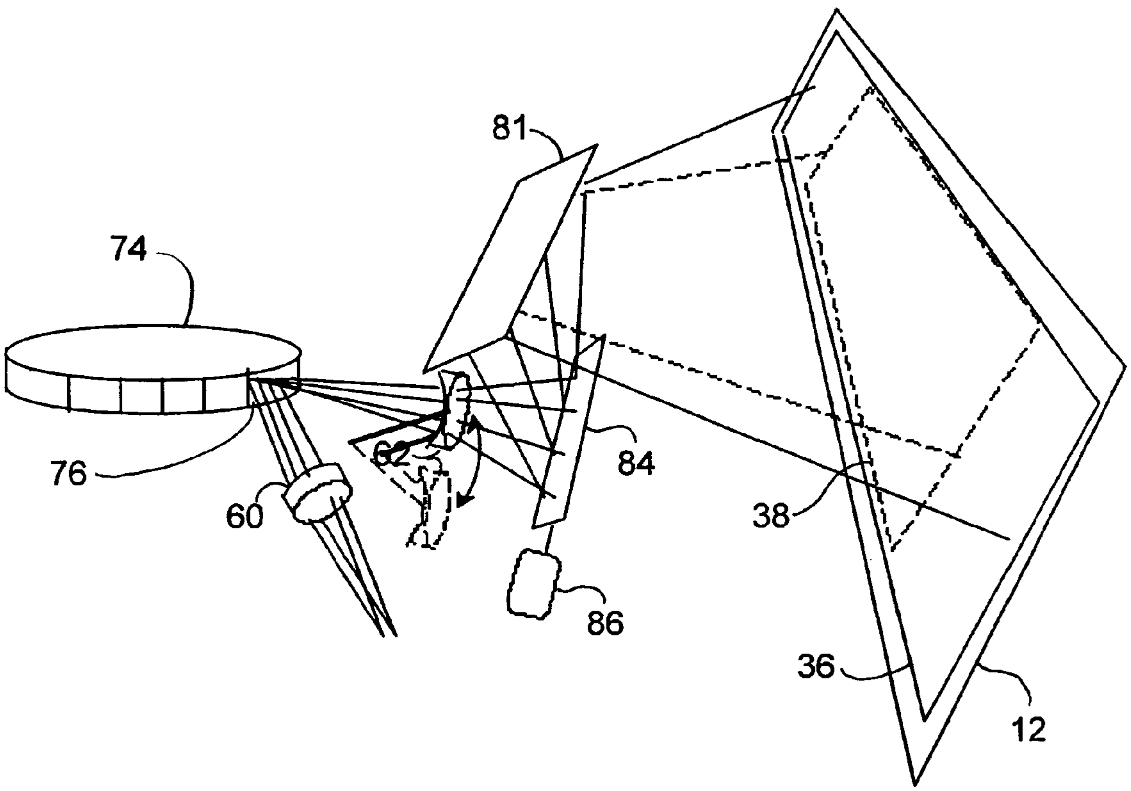
FIG. 12 is a schematic diagram similar to FIG. 9 except that there is a negative Barlow lens between the polygon and the galvanometer that widens the fan of the emitted beams on the screen.

Referring to FIG. 2, the throw distance, that is the distance between the scanning section 70, or in FIG. 2 the scanning module 18, and the screen 12, is fixed and is determined by the angle between facets 76 on the polygon mirror 74 and the desired image size. Our preferred system for the motion picture theater application, once installed, does not require changes in throw distance or a variable throw distance. However, our preferred embodiments may include one or more Barlow lenses 62, as shown in FIG. 12, to accommodate the different aspect ratios in different presentation formats. Our preferred Barlow lens 62 is a small, simple two element (usually) negative achromat. This negative lens expands the scanned image 38 on the screen 12 primarily in the horizontal direction to a wider image 36.

In some theater installations it may not be convenient to place the projection subsystem 70 at its natural throw distance. By including a negative Barlow lens in the system, the throw distance may be conveniently shortened, while with a weak positive Barlow, the throw distance may be lengthened. In a system capable of two (or more) throw distances or aspect ratios, a simple mechanism would be required to insert or change the Barlow lenses, change the focal distance vis-a-vis the lens 60 and preserve the desired effective row spacing, preferably, in an embodiment such as described in Examples 21 and 22, by slightly rotating the output head.

EXAMPLE 21

For this Example 21, a 12 emitting end output head array projecting a 12 spot pattern, we assume that red, green, blue beams are assigned to fibers in groups of three (as shown in FIGS. 54, 54S, and 55-57), a 4 line vertical adjustment equal to the number of groups of RGB emitting ends, and identify each of the twelve spots, from top to bottom of the spot pattern, as Ra, Ga, Ba, Rb, Gb, Bb, Rc, Gc, Bc, Rd, Gd and Bd, respectively. As shown in FIGS. 55A-55H and Table EX-21A all lines of a frame will be scanned with spots of all three primary colors in 272 scan passes and lines L1-L4 of a frame will be scanned with spots of all three primary colors after initial

TABLE EX-21A

Output Head Configuration (spot pattern) — Rows: 12 Spots/Row: 1
Corresponding Figure: FIGS. 54-58 — Vertical Adjustment: 4 lines
Blank = b — Effective Vertical spacing: 1 line

| Scan | Lines Written by Respective Spots | | | | | | | | | | | |
|---|---|---|---|---|---|---|---|---|---|---|---|---|
| Pass | Ra | Ga | Ba | Rb | Gb | Bb | Rc | Gc | Bc | Rd | Gd | Bd |
| 1 | b | b | b | b | b | b | b | b | 1 | 2 | 3 | 4 |
| 2 | b | b | b | b | 1 | 2 | 3 | 4 | 5 | 6 | 7 | 8 |
| 3 | 1 | 2 | 3 | 4 | 5 | 6 | 7 | 8 | 9 | 10 | 11 | 12 |
| 4 | 5 | 6 | 7 | 8 | 9 | 10 | 11 | 12 | 13 | 14 | 15 | 16 |
| . | . | . | . | . | . | . | . | . | . | . | . | . |
| . | . | . | . | . | . | . | . | . | . | . | . | . |
| . | . | . | . | . | . | . | . | . | . | . | . | . |
| 269 | 1265 | 1266 | 1267 | 1268 | 1269 | 1270 | 1271 | 1272 | 1273 | 1274 | 1275 | 1276 |
| 270 | 1269 | 1270 | 1271 | 1272 | 1273 | 1274 | 1275 | 1276 | 1277 | 1278 | 1279 | 1280 |
| 271 | 1273 | 1274 | 1275 | 1276 | 1277 | 1278 | 1279 | 1280 | b | b | b | b |
| 272 | 1277 | 1278 | 1279 | 1280 | b | b | b | b | b | b | b | b |

scan passes s1, s2 and s3. FIGS. 56A-56C and 57A-57C show, and Tables EX-21A, EX-21B and EX-21C describe, the time delays necessary to scan each dot location in a line for scan pass s3, revealing the necessity of 1953 horizontal adjustments of the spots to complete each scan pass, or an overscan at one side of the frame of 33 dot locations.

TABLE EX-21B

Output Head Configuration (spot pattern) — Rows: 12 Spots/Row: 1
Corresponding Figure: FIG. 54, 56 — Vertical Adjustment: 4 lines
Pattern of Spots: Ramp — Effective Vertical Spot Spacing: 1 line
Scan Pass: 3 Blank = b — Effective Horizontal Spot Spacing: 3

| | Ra | Ga | Ba | Rb | Gb | Bb | Rc | Gc | Bc | Rd | Gd | Bd |
|---|---|---|---|---|---|---|---|---|---|---|---|---|
| Line | time t1 | | | | Dot Locations | | | | | | | |
| 1 | 1 | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | b |
| Line | time t16 | | | | Dot Locations | | | | | | | |
| 1 | 16 | | | | | | | | | | | |
| 2 | | 13 | | | | | | | | | | |
| 3 | | | 10 | | | | | | | | | |
| 4 | | | | 7 | | | | | | | | |
| 5 | | | | | 4 | | | | | | | |
| 6 | | | | | | 1 | | | | | | |
| 7 | | | | | | | b | | | | | |
| 8 | | | | | | | | b | | | | |
| 9 | | | | | | | | | b | | | |
| 10 | | | | | | | | | | b | | |

TABLE EX-21B-continued

| | | | | | | | | | | | | |
|---|---|---|---|---|---|---|---|---|---|---|---|---|
| 11 | | | | | | | | | | | b | |
| 12 | | | | | | | | | | | | b |
| Line | time t34 | | | Dot Locations | | | | | | | | |
| 1 | 34 | | | | | | | | | | | |
| 2 | | 31 | | | | | | | | | | |
| 3 | | | 28 | | | | | | | | | |
| 4 | | | | 25 | | | | | | | | |
| 5 | | | | | 22 | | | | | | | |
| 6 | | | | | | 19 | | | | | | |
| 7 | | | | | | | 16 | | | | | |
| 8 | | | | | | | | 13 | | | | |
| 9 | | | | | | | | | 10 | | | |
| 10 | | | | | | | | | | 7 | | |
| 11 | | | | | | | | | | | 4 | |
| 12 | | | | | | | | | | | | 1 |

TABLE EX-21C

| | |
|---|---|
| Output Head Configuration (spot pattern) | Rows: 12 Spots/Row: 1 |
| Corresponding Figure: FIG. 55, 58 | Vertical Adjustment: 4 lines |
| Pattern of Spots: Ramp | Effective Vertical Spot Spacing: 1 line |
| Scan Pass: 3 Blank = b | Effective Horizontal Spot Spacing: 3 |

| | Ra | Ga | Ba | Rb | Gb | Bb | Rc | Gc | Bc | Rd | Gd | Bd |
|---|---|---|---|---|---|---|---|---|---|---|---|---|
| Line | time t1920 | | | | | | Dot Locations | | | | | |
| 1 | 1920 | | | | | | | | | | | |
| 2 | | 1917 | | | | | | | | | | |
| 3 | | | 1914 | | | | | | | | | |
| 4 | | | | 1911 | | | | | | | | |
| 5 | | | | | 1908 | | | | | | | |
| 6 | | | | | | 1905 | | | | | | |
| 7 | | | | | | | 1902 | | | | | |
| 8 | | | | | | | | 1899 | | | | |
| 9 | | | | | | | | | 1896 | | | |
| 10 | | | | | | | | | | 1893 | | |
| 11 | | | | | | | | | | | 1890 | |
| 12 | | | | | | | | | | | | 1887 |
| Line | time t1938 | | | | | | Dot Locations | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | 1920 | | | | | |
| 8 | | | | | | | | 1917 | | | | |
| 9 | | | | | | | | | 1914 | | | |
| 10 | | | | | | | | | | 1911 | | |
| 11 | | | | | | | | | | | 1908 | |
| 12 | | | | | | | | | | | | 1905 |
| Line | time t1953 | | | | | | Dot Locations | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | 1920 |

EXAMPLE 22

For Example 22, FIG. 58 shows an alternate output head configuration, identical to that of the linear array of Example 21 shown in FIG. 54, but having a different assignment of colors to produce a substantive alternative to Example 21. As with Example 21, each spot of the spot pattern projected on the screen shown in FIG. 58S for this Example 16 has an effective row spacing of 1 line. For this Example 22, however, we assume that red, green, and blue beams are assigned to fibers in three groups of four fibers, the fibers of each group all having the same color (as shown in FIGS. 58, 58S and 59-61), although we assume a 4 line vertical adjustment equal to the number of groups of RGB emitting ends as in Example 5.

TABLE EX-22A

Output Head Configuration (spot pattern) — Rows: 12 Spots/Row: 1
Corresponding Figure: FIGS. 58-61 — Vertical Adjustment: 4 lines
Blank = b — Effective Vertical spacing: 1 line

| Scan | Lines Written by Respective Spots | | | | | | | | | | | |
|---|---|---|---|---|---|---|---|---|---|---|---|---|
| Pass | Ra | Rb | Rc | Rd | Ga | Gb | Gc | Gd | Ba | Bb | Bc | Bd |
| 1 | b | b | b | b | b | b | b | b | 1 | 2 | 3 | 4 |
| 2 | b | b | b | b | 1 | 2 | 3 | 4 | 5 | 6 | 7 | 8 |
| 3 | 1 | 2 | 3 | 4 | 5 | 6 | 7 | 8 | 9 | 10 | 11 | 12 |
| 4 | 5 | 6 | 7 | 8 | 9 | 10 | 11 | 12 | 13 | 14 | 15 | 16 |
| . | . | . | . | . | . | . | . | . | . | . | . | . |
| . | . | . | . | . | . | . | . | . | . | . | . | . |
| . | . | . | . | . | . | . | . | . | . | . | . | . |
| 269 | 1265 | 1266 | 1267 | 1268 | 1269 | 1270 | 1271 | 1272 | 1273 | 1274 | 1275 | 1276 |
| 270 | 1269 | 1270 | 1271 | 1272 | 1273 | 1274 | 1275 | 1276 | 1277 | 1278 | 1279 | 1280 |
| 271 | 1273 | 1274 | 1275 | 1276 | 1277 | 1278 | 1279 | 1280 | b | b | b | b |
| 272 | 1277 | 1278 | 1279 | 1280 | b | b | b | b | b | b | b | b |

In FIG. 59 we identify the twelve spots, from top to bottom of the spot pattern, as Ra, Rb, Rc, Rd, Ga, Gb, Gc, Gd, Ba, Bb, Bc and Bd, respectively. As shown in FIG. 59 and Table EX-22A, all lines of a frame will be scanned with spots of all three primary colors in 272 scan passes and lines L1-L4 of a frame will be scanned with spots of all three primary colors after initial scan passes s1, s2 and s3. FIGS. 60A-60J and 61A-61J show, and Tables EX-22B and EX-22C describe,

TABLE EX-22B

Output Head Configuration (spot pattern) — Rows: 12 Spots/Row: 1
Corresponding Figure: FIG. 58-61 — Vertical Adjustment: 4 lines
Pattern of Spots: Ramp — Effective Vertical Spot Spacing: 1 line
Scan Pass: 3 Blank = b — Effective Horizontal Spot Spacing: 3 dots

| | Ra | Rb | Rc | Rd | Ga | Gb | Gc | Gd | Ba | Bb | Bc | Bd |
|---|---|---|---|---|---|---|---|---|---|---|---|---|
| Line | time t1 | | | | Dot Locations | | | | | | | |
| 1 | 1 | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | b |
| Line | time t16 | | | | Dot Locations | | | | | | | |
| 1 | 16 | | | | | | | | | | | |
| 2 | | 13 | | | | | | | | | | |
| 3 | | | 10 | | | | | | | | | |
| 4 | | | | 7 | | | | | | | | |
| 5 | | | | | 4 | | | | | | | |
| 6 | | | | | | 1 | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | b |
| Line | time t34 | | | | Dot Locations | | | | | | | |
| 1 | 34 | | | | | | | | | | | |
| 2 | | 31 | | | | | | | | | | |
| 3 | | | 28 | | | | | | | | | |
| 4 | | | | 25 | | | | | | | | |
| 5 | | | | | 22 | | | | | | | |
| 6 | | | | | | 19 | | | | | | |
| 7 | | | | | | | 16 | | | | | |
| 8 | | | | | | | | 13 | | | | |
| 9 | | | | | | | | | 10 | | | |
| 10 | | | | | | | | | | 7 | | |
| 11 | | | | | | | | | | | 4 | |
| 12 | | | | | | | | | | | | 1 |

TABLE EX-22C

| Output Head Configuration (spot pattern) | Rows: 12 Spots/Row: 1 |
|---|---|
| Corresponding Figure: FIG. 58-61 | Vertical Adjustment: 4 lines |
| Pattern of Spots: Ramp | Effective Vertical Spot Spacing: 1 line |
| Scan Pass: 3 Blank = b | Effective Horizontal Spot Spacing: 3 dots |

| Line | Ra | Rb | Rc | Rd | Ga | Gb | Gc | Gd | Ba | Bb | Bc | Bd |
|---|---|---|---|---|---|---|---|---|---|---|---|---|
| Line | time t1920 | | | | Dot Locations | | | | | | | |
| 1 | 1920 | | | | | | | | | | | |
| 2 | | 1917 | | | | | | | | | | |
| 3 | | | 1914 | | | | | | | | | |
| 4 | | | | 1911 | | | | | | | | |
| 5 | | | | | 1908 | | | | | | | |
| 6 | | | | | | 1905 | | | | | | |
| 7 | | | | | | | 1902 | | | | | |
| 8 | | | | | | | | 1899 | | | | |
| 9 | | | | | | | | | 1896 | | | |
| 10 | | | | | | | | | | 1893 | | |
| 11 | | | | | | | | | | | 1890 | |
| 12 | | | | | | | | | | | | 1887 |
| Line | time t1938 | | | | Dot Locations | | | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | 1920 | | | | | |
| 8 | | | | | | | | 1917 | | | | |
| 9 | | | | | | | | | 1914 | | | |
| 10 | | | | | | | | | | 1911 | | |
| 11 | | | | | | | | | | | 1908 | |
| 12 | | | | | | | | | | | | 1905 |
| Line | time t1953 | | | | Dot Locations | | | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | 1920 |

The time delays or time combining necessary to scan each dot location in a line for scan pass s3, revealing the necessity of 1953 horizontal adjustments of the spots to complete each scan, or an overscan at one side of the frame of 33 dot locations. While the pattern of spots projected on the screen by the linear array is aligned in a straight angled line with respect to horizontal, this array is in actuality a two-dimensional pattern of spots with respect to the sweep direction during the scan pass.

Figure 62:
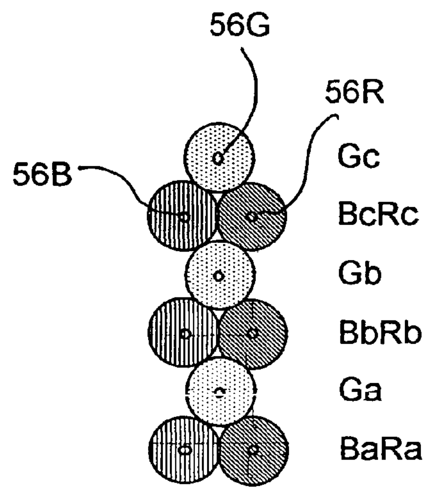
FIG. 62 is a diagram of an array of fiber emitting ends in an output head whose pattern includes both a single spot per scan line and multiple spots per row, a "totem pole" configuration.
Figure 62S:
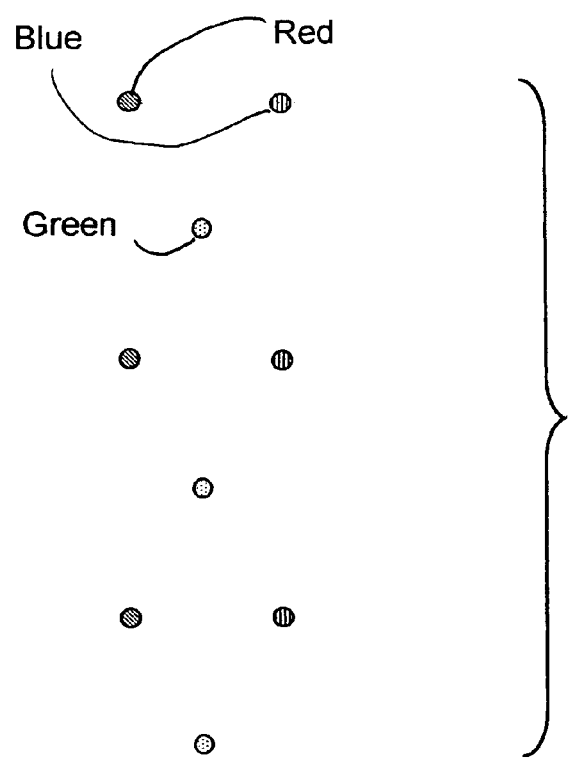
FIG. 62S is a diagram of the pattern of spots projected on a screen using the array shown in FIG. 62.
Figures 63A, 63B, 63C, 63D, 63E, 63F, 63G, 63H:
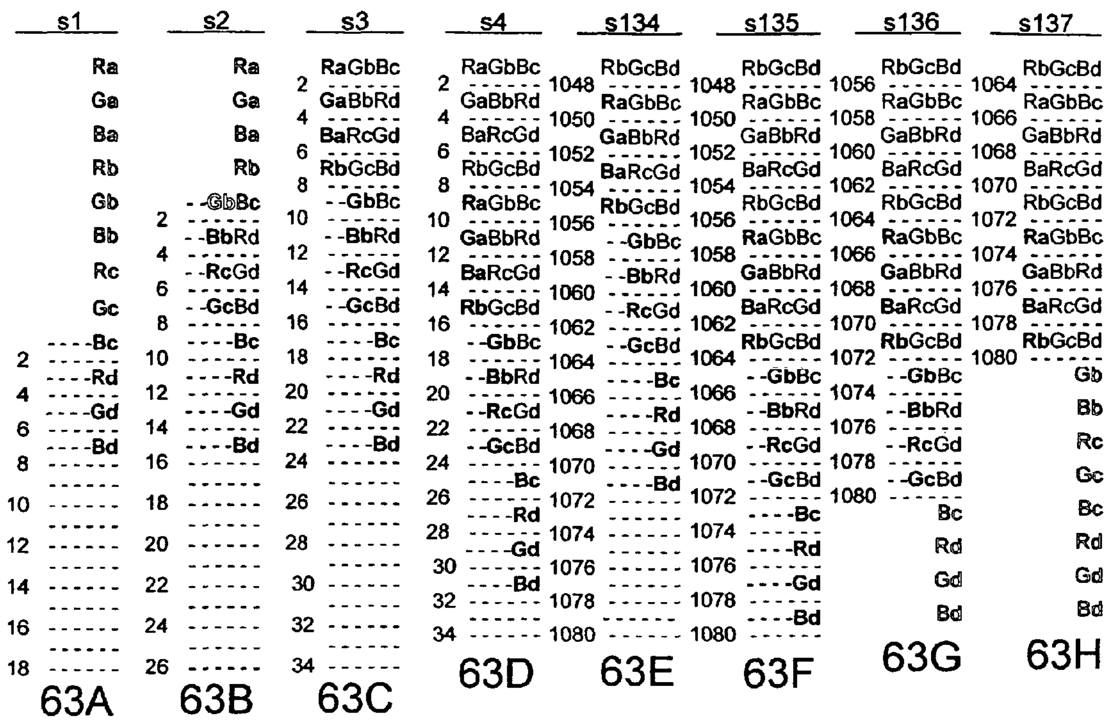
FIGS. 63A through 63H are time sequence diagrams for Example 24, illustrating line reordering during Subframe A using interlaced scanning for a linear spot pattern similar to that of FIG. 54S, having an effective row spacing of 2 lines and a vertical adjustment between scan passes of 8 frame lines.
Figures 64A, 64B, 64C, 64D, 64E, 64F, 64G, 64H:
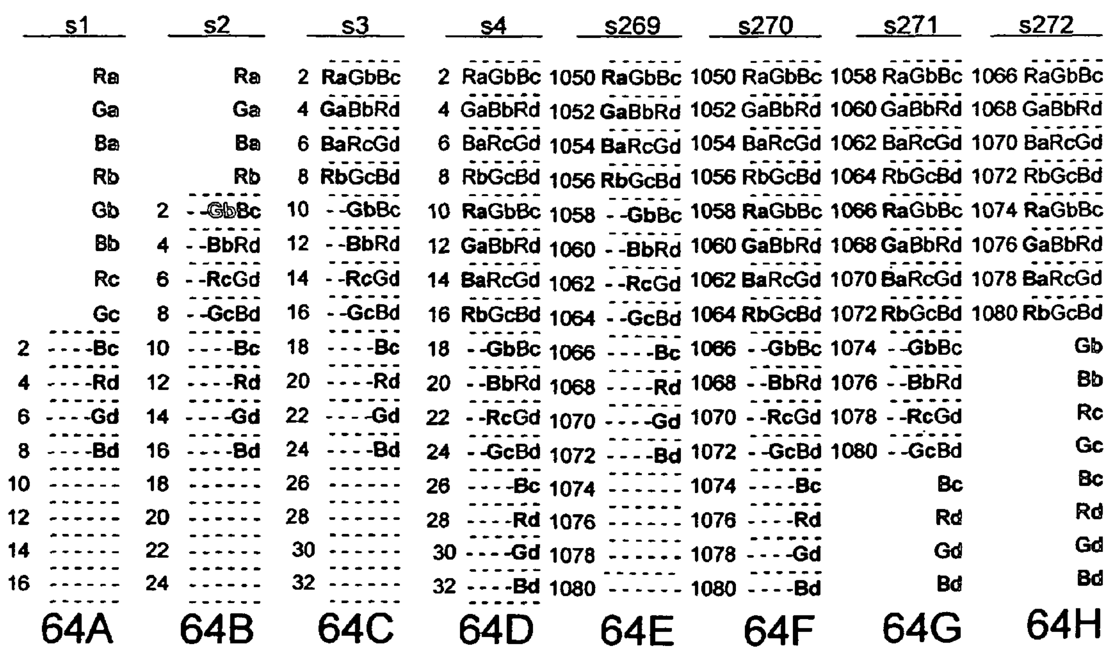
FIGS. 64A through 64H are time sequence diagrams for Example 24, illustrating line reordering during Subframe B using interlaced scanning for the linear spot pattern similar to that of FIG. 54S, having an effective row spacing of 2 lines end a vertical adjustment between scan passes of 8 lines.
Figures 65A, 65B, 65C, 65D, 65E, 65F, 65G, 65H:
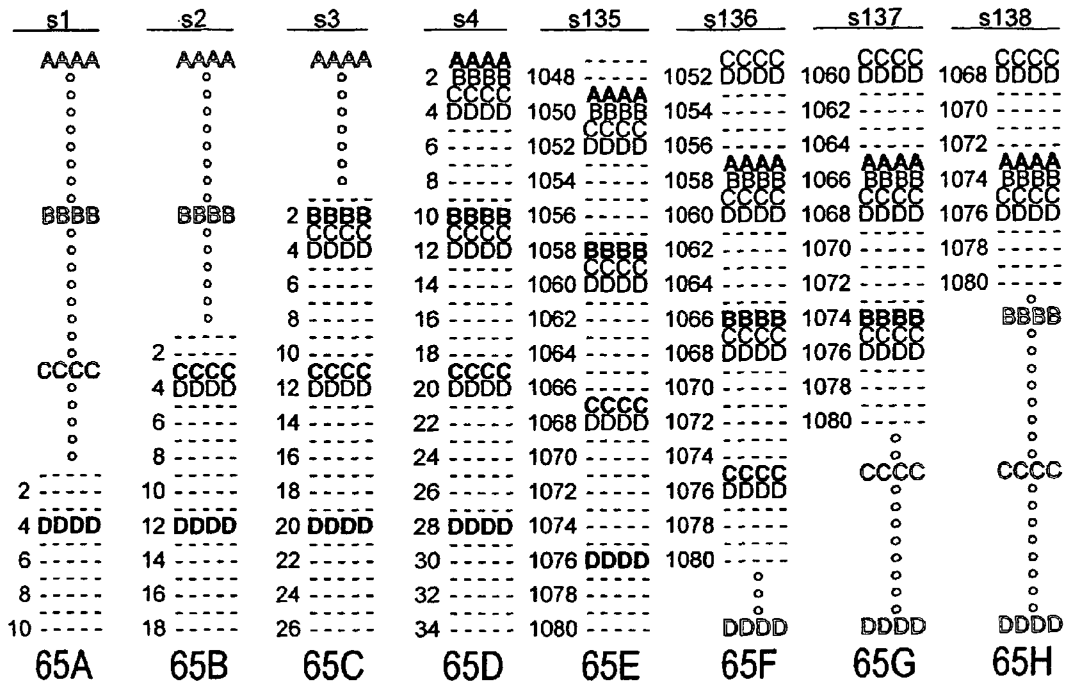
FIGS. 65A through 65H are time sequence diagrams for Example 25, illustrating line reordering during Subframe A using interlaced scanning for a spot pattern similar to that of FIG. 27S, having an effective row spacing of 9 lines and a vertical adjustment between scan passes of 8 lines.

As noted previously, all of the foregoing examples are only intended to demonstrate the breadth of our invention. Many additional variations on emitting head configuration, pattern of spots, and effective row spacing are possible, including configurations that blend some of the features and principles noted previously. One such example would be a "totem pole" configuration as shown in FIGS. 62 and 62S which alternates rows of single emitting ends with rows of two emitting ends in a "log-like" pattern. Preferably, the green beams are assigned to the rows having a single fiber because the fiber may be smaller single mode fiber, with benefits previously discussed.

EXAMPLE 23

Figures 86A, 86B, 86C, 86D, 86E, 86F, 86G, 86H:
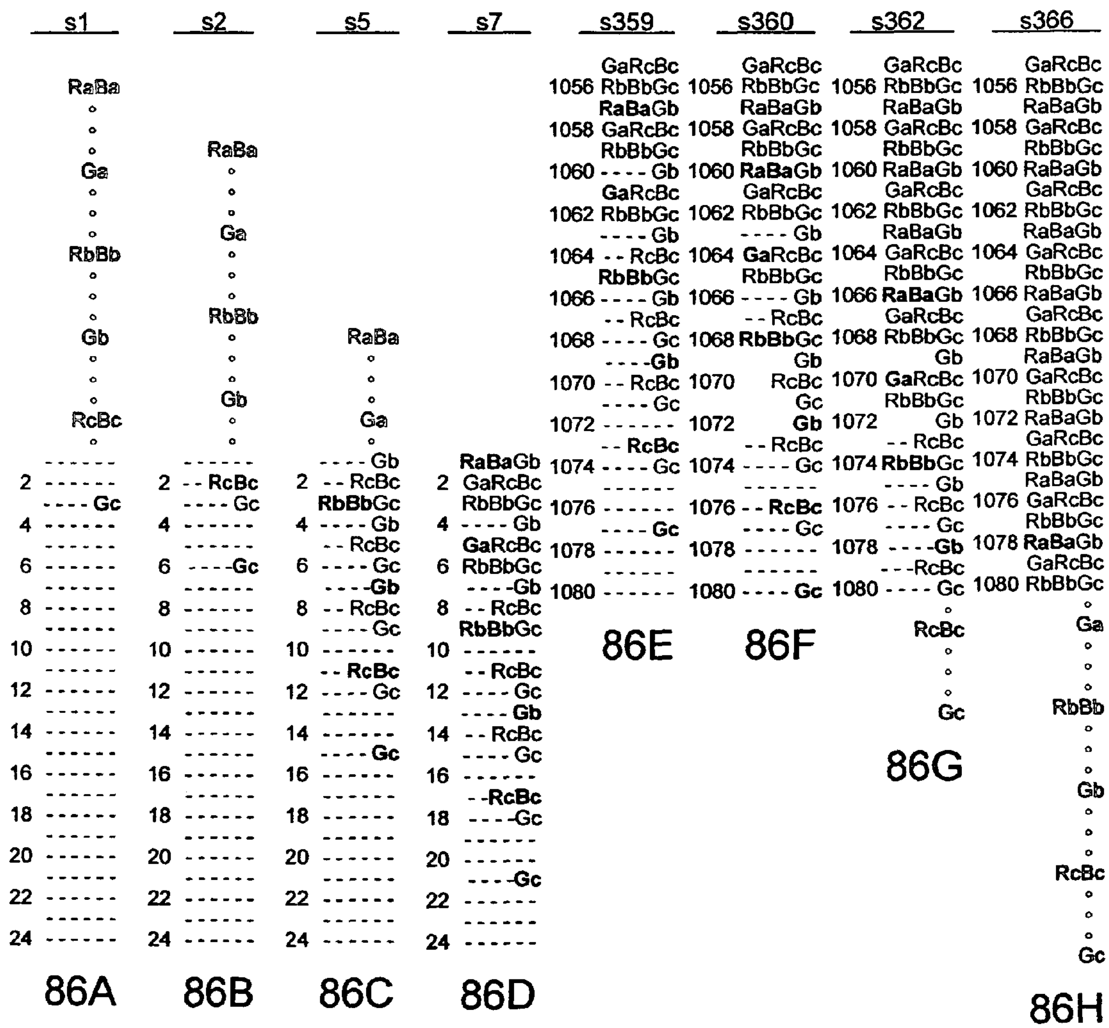
FIGS. 86A through 86H are time sequence diagrams for Example 23, illustrating line reordering for the spot pattern of FIG. 62S having an effective row spacing of 4 lines and a vertical adjustment between scan passes of 3 lines.

For Example 23, FIG. 62 shows an alternate output head emitting head configuration comprising three fibers of each color (referred to herein as the "totem pole" configuration), which is substantially a combination of the slanted linear arrays and A log configuration, wherein two emitting ends are positioned in a row above (and below) a single emitting end. Preferably, the green beams are assigned to the row having a single fiber because the fiber may be a smaller single mode fiber, with the benefits previously discussed. For convenience, we refer to a contiguous 3 emitting end or spot group of red, green, blue colors as an RGB group (A, B, C), similar to the row designations used for Example 22. For this hybrid 6 row by two/one spot per row spot pattern on the screen of this Example 23, we assume a 3 line vertical adjustment equal to the number of RGB groups. We further identify each of the nine spots, from top to bottom of the spot pattern, as Ra, Ga, Ba, Rb, Gb, Bb, Rc, Gc, and Bc, respectively. Spots that are blanked are indicated in outline, and the spots that currently illuminate a dot location are indicated in boldface. As shown in FIG. 86 and Table EX-23A, all lines of a frame will be scanned with spots of all three primary colors in 366 scan passes and lines L1-L3 of a frame will be scanned with spots of all three primary colors after initial scan passes s1-s7. FIGS. 87A-87D and 88A-88D show, and Tables EX-23B and EX-23C describe, the time delays necessary to scan each dot location in a line for scan pass s7, revealing the necessity of 1926 horizontal adjustments of the spots to complete each scan pass, or an overscan at each side of the frame of 6 dot locations.

TABLE EX-23A

| | |
|---|---|
| Output Head Configuration (spot pattern) | Rows: 8 Spots/Row: 2/1<br>Vertical Adjustment: 3 lines |
| Corresponding Figure: FIGS. 86-88 | Effective Row Spacing |
| Blank = b | (all spots): 4 lines |

| Scan | Lines Written by Respective Spots | | | | | |
|---|---|---|---|---|---|---|
| Pass | RaBa | Ga | RbBb | Gb | RcBc | Gc |
| 1 | b | b | b | b | b | 3 |
| 2 | b | b | b | b | 2 | 6 |
| 3 | b | b | b | 1 | 5 | 9 |
| 4 | b | b | b | 4 | 8 | 12 |
| 5 | b | b | 3 | 7 | 11 | 15 |
| 6 | b | 2 | 6 | 10 | 14 | 18 |
| 7 | 1 | 5 | 9 | 13 | 17 | 21 |
| 8 | 4 | 8 | 12 | 16 | 20 | 24 |
| . | . | . | . | . | . | . |
| . | . | . | . | . | . | . |
| . | . | . | . | . | . | . |
| 359 | 1057 | 1061 | 1065 | 1069 | 1073 | 1077 |
| 360 | 1060 | 1064 | 1068 | 1072 | 1076 | 1080 |
| 361 | 1063 | 1067 | 1071 | 1075 | 1079 | b |
| 362 | 1066 | 1070 | 1074 | 1078 | b | b |
| 363 | 1069 | 1073 | 1077 | b | b | b |
| 364 | 1072 | 1076 | 1080 | b | b | b |
| 365 | 1075 | 1079 | b | b | b | b |
| 366 | 1078 | b | b | b | b | b |

TABLE EX-23B

| | |
|---|---|
| Output Head Configuration (spot pattern) | Rows: 6 Spots/Row: 2/1<br>Vertical Adjustment: 3 lines |
| Corresponding Figure: FIG. 86-88 | Effective Row Spacing<br>(all rows): 4 lines |
| Pattern of Spots: Totem Pole | Spots Spacing w/i Red-Blue |
| Scan Pass: 7 Blank = b | Row: 6 |

| | Ra | Ba | Ga | Rb | Bb | Gb | Rc | Bc | Gc |
|---|---|---|---|---|---|---|---|---|---|
| Line | time t1 | | | Dot Locations | | | | | |
| 1 | b | 1 | | | | | | | |
| 3 | | | | | | | | | |
| 5 | | | b | | | | | | |
| 7 | | | | | | | | | |
| 9 | | | | b | 1 | | | | |
| 11 | | | | | | | | | |
| 13 | | | | | | b | | | |
| 15 | | | | | | | | | |
| 17 | | | | | | | b | 1 | |
| 19 | | | | | | | | | |
| 21 | | | | | | | | | b |
| Line | time t4 | | | Dot Locations | | | | | |
| 1 | 4 | b | 1 | | | | | | |
| 3 | | | | | | | | | |
| 5 | | | 1 | | | | | | |
| 7 | | | | | | | | | |
| 9 | | | | 4 | b | | | | |
| 11 | | | | | | | | | |
| 13 | | | | | | 1 | | | |
| 15 | | | | | | | | | |
| 17 | | | | | | | 4 | b | |
| 19 | | | | | | | | | |
| 21 | | | | | | | | | 1 |
| Line | time t7 | | | Dot Locations | | | | | |
| 1 | 7 | 1 | 1 | | | | | | |
| 3 | | | | | | | | | |
| 5 | | | 4 | | | | | | |
| 7 | | | | | | | | | |
| 9 | | | | 7 | 1 | | | | |
| 11 | | | | | | | | | |
| 13 | | | | | | 4 | | | |
| 15 | | | | | | | | | |
| 17 | | | | | | | 7 | 1 | |
| 19 | | | | | | | | | |
| 21 | | | | | | | | | 4 |

TABLE EX-23C

| | |
|---|---|
| Output Head Configuration (spot pattern) | Rows: 6 Spots/Row: 2/1<br>Vertical Adjustment: 4 lines<br>Effective Row Spacing (all |
| Corresponding Figure: FIG. 86-88 | rows): 3 lines |
| Pattern of Spots: Totem Pole | Spots Spacing w/i Red-Blue |
| Scan Pass: 7 Blank = b | Row: 6 |

| | Ra | Ba | Ga | Rb | Bb | Gb | Rc | Bc | Gc |
|---|---|---|---|---|---|---|---|---|---|
| Line | time t1920 | | | Dot Locations | | | | | |
| 1 | 1920 | 1914 | | | | | | | |
| 3 | | | | | | | | | |
| 5 | | | 1917 | | | | | | |
| 7 | | | | | | | | | |
| 9 | | | | 1920 | 1914 | | | | |
| 11 | | | | | | | | | |
| 13 | | | | | | 1917 | | | |
| 15 | | | | | | | | | |
| 17 | | | | | | | 1920 | 1914 | |
| 19 | | | | | | | | | |
| 21 | | | | | | | | | 1917 |
| Line | time t1923 | | | Dot Locations | | | | | |
| 1 | b | 1917 | | | | | | | |
| 3 | | | | | | | | | |
| 5 | | | 1920 | | | | | | |
| 7 | | | | | | | | | |
| 9 | | | | b | 1917 | | | | |
| 11 | | | | | | | | | |
| 13 | | | | | | 1920 | | | |
| 15 | | | | | | | | | |
| 17 | | | | | | | b | 1917 | |
| 19 | | | | | | | | | |
| 21 | | | | | | | | | 1920 |
| Line | time t1926 | | | Dot Locations | | | | | |
| 1 | b | 1920 | | | | | | | |
| 3 | | | | | | | | | |
| 5 | | | b | | | | | | |
| 7 | | | | | | | | | |
| 9 | | | | b | 1920 | | | | |
| 11 | | | | | | | | | |
| 13 | | | | | | b | | | |
| 15 | | | | | | | | | |
| 17 | | | | | | | b | 1920 | |
| 19 | | | | | | | | | |
| 21 | | | | | | | | | b |

EXAMPLES 24-26

All of the preceding examples have assumed that the image is progressively scanned, that is, all of the lines are written in each vertical frame pass. Although progressive scanning is the preferred mode for our laser projector, interlaced scanning is also facilitated by our invention as shown in the following three Examples 24-26.

These Examples 24-26 are based on the preferred laser projection system of FIGS. 1 and 2, and use substantially the same output head configurations and corresponding spot patterns of the previous progressive scanning examples. Progressive scanning is our preferred embodiment given that the image is less prone to flicker, and is easily accomplished with the scanning performance enabled by our invention. However, within our invention the interlaced scanning Examples 24-26 employ reordering of the input pixel data similar to that for the progressive scanning examples, but use different adjustments of the galvanometer mirror. While the prior examples assume the preferred standard HDTV resolution of 1920×1080p at a refresh rate of 60 frames per second or better, the following Examples 24-26 assume an alternate HDTV resolution of 1920×1080i, where 60 subframes are written per second, producing 30 interlaced complete frames per second. Although our examples illustrate interlacing using two subframes, it should be understood that more than two subframes could be employed. One possible interlacing approach would be to employ three subframes, with two sweep paths of other sub frames between lines written during each sweep or scan pass of a subframe.

The following examples illustrate three different ways of accomplishing interlacing with our invention.

EXAMPLE 24

For this Example 24, we assume a 12 emitting end array projecting a 12 spot pattern in a ramp configuration projecting a pattern of spots such as shown in Example 21 and in FIGS. 54 and 54S. We further assume an effective row spacing of 2 lines, as opposed to the 1 line effective row spacing of Example 15. The effective row spacing on the screen can be easily changed by doubling the angle of the ramp from horizontal, shown in FIG. 54 to produce a pattern of spots with a vertical effective row spacing of two lines. Moreover, instead of the four line vertical adjustment of Example 21, we assume an eight line vertical adjustment between the initiation of each sweep during the scanning of each subframe. One way of accomplishing this is by slowing the mirror polygon to half the rate described for Example 21.

We further assume that the galvanometer is positioned at the beginning of the first of the pair of subframes ("Subframe A") to begin writing of the subframe so that the odd-numbered lines, i.e., 1, 3, 5, 7, 9, . . . , 1075, 1077, and 1079 are written, and the galvanometer is positioned at the beginning of the second of the pair of subframes ("Subframe B") to begin writing of the subframe so that the even-numbered lines, i.e., 2, 4, 6, 8, 10, . . . , 1076, 1078, and 1080 are written.

Referring to FIGS. 63A-63H and Table EX-24A, the reordering of the data for Subframe A is illustrated. It should be noted that the number of scan passes to write the first subframe is half that required to write a complete frame in progressive scanning of Example 15, namely 136 for interlaced versus 272 for progressive. Instead of beginning with writing line 4 of the frame as in the progressive scanning Example 21, Subframe A begins with writing line 7 of the frame, which is effectively the fourth line of Subframe A at an effective row spacing for the subframe of 1 subframe line. The effective subframe row spacing of 1 subframe line works for the same basic reasons as outlined for the 1 regular frame line effective row spacing illustrated in FIGS. 55A-55J for Example 21. The reordering of the data for Subframe B is illustrated in FIGS. 64A-64H and Table EX-24B. It should be noted that each subframe writes 540 lines of the 1080 lines of a complete frame, and that the two subframes interlaced will write the same number of scan passes as one frame of progressive scanning.

TABLE EX-24A

Output Head Configuration (spot pattern) — Rows: 12 Spots/Row: 1
Corresponding Figure: FIGS. 54, 63 — Vertical Adjustment: 8 lines
Subframe: A Blank = b — Effective Vertical spacing: 2 lines

| Scan Pass | Lines Written by Respective Spots: Ra | Ga | Ba | Rb | Gb | Bb | Rc | Gc | Bc | Rd | Gd | Bd |
|---|---|---|---|---|---|---|---|---|---|---|---|---|
| 1 | b | b | b | b | b | b | b | b | 1 | 3 | 5 | 7 |
| 2 | b | b | b | b | 1 | 3 | 5 | 7 | 9 | 11 | 13 | 15 |
| 3 | 1 | 3 | 5 | 7 | 9 | 11 | 13 | 15 | 17 | 19 | 21 | 23 |
| 4 | 9 | 11 | 13 | 15 | 17 | 19 | 21 | 23 | 25 | 27 | 29 | 31 |
| . | . | . | . | . | . | . | . | . | . | . | . | . |
| . | . | . | . | . | . | . | . | . | . | . | . | . |
| . | . | . | . | . | . | . | . | . | . | . | . | . |
| 134 | 1049 | 1051 | 1053 | 1055 | 1057 | 1059 | 1061 | 1063 | 1065 | 1067 | 1069 | 1071 |
| 135 | 1057 | 1059 | 1061 | 1063 | 1065 | 1067 | 1069 | 1071 | 1073 | 1075 | 1077 | 1079 |
| 136 | 1065 | 1067 | 1069 | 1071 | 1073 | 1075 | 1077 | 1079 | b | b | b | b |
| 137 | 1073 | 1075 | 1077 | 1279 | b | b | b | b | b | b | b | b |

Given an interlaced source signal, this approach is uncomplicated, because the source material for a given subframe is completely written in one vertical sweep, and the only compensations for interlacing are changing the speed of the polygon and an alternating initial position of the galvanometer for the subframes.

TABLE EX-24B

| Output Head Configuration (spot pattern) | Rows: 12 Spots/Row: 1 |
|---|---|
| Corresponding Figure: FIGS. 63, 64 | Vertical Adjustment: 8 lines |
| Subframe: B Blank = b | Effective Vertical spacing: 2 lines |

| Scan | Lines Written by Respective Spots | | | | | | | | | | | |
|---|---|---|---|---|---|---|---|---|---|---|---|---|
| Pass | Ra | Ga | Ba | Rb | Gb | Bb | Rc | Gc | Bc | Rd | Gd | Bd |
| 1 | b | b | b | b | b | b | b | b | 2 | 4 | 6 | 8 |
| 2 | b | b | b | b | 2 | 4 | 6 | 8 | 10 | 12 | 14 | 16 |
| 3 | 2 | 4 | 6 | 8 | 10 | 12 | 14 | 16 | 18 | 20 | 22 | 24 |
| 4 | 10 | 12 | 14 | 16 | 18 | 20 | 22 | 24 | 26 | 28 | 30 | 32 |
| . | . | . | . | . | . | . | . | . | . | . | . | . |
| . | . | . | . | . | . | . | . | . | . | . | . | . |
| . | . | . | . | . | . | . | . | . | . | . | . | . |
| 134 | 1050 | 1052 | 1054 | 1056 | 1058 | 1060 | 1062 | 1064 | 1066 | 1068 | 1070 | 1072 |
| 135 | 1058 | 1060 | 1062 | 1064 | 1066 | 1068 | 1070 | 1072 | 1074 | 1076 | 1078 | 1080 |
| 136 | 1066 | 1068 | 1070 | 1072 | 1074 | 1076 | 1078 | 1080 | b | b | b | b |
| 137 | 1074 | 1076 | 1078 | 1280 | b | b | b | b | b | b | b | b |

EXAMPLE 25

In Example 25 we show interlacing where the re-ordering for the subframes is handled differently. In this example, the head configuration is "bricks" as in FIGS. 5 and 5S or "logs" as in FIGS. 27 and 27S. Herein the subframes are not divided by odd-even lines, but divided by odd-even scan pass number. Referring to the prior progressive scanning Examples 1 and 4, at the beginning of the first horizontal pass in the first Subframe A, the galvanometer starts in position to write those lines exactly as in the first pass in such prior Examples. For the next pass, the galvanometer has moved down 8 full frame lines, rather than 4 lines of the prior Examples, and on the next pass writes those lines written by the third pass in the prior Examples. Thus all the lines appropriate to the odd numbered passes are successively written, as shown in Table EX-25A and FIGS. 65A-65H for the first Subframe A of the frame being written.

For the first pass of the next Subframe B, the galvanometer is positioned 4 full frame lines lower at the beginning of the first scan pass than the initial scan pass of Subframe A. This first scan pass of Sub frame B corresponds to the second scan pass of the progressively scanned frame. At the beginning of the next scan pass of Subframe B, the galvanometer has been adjusted down eight lines from the beginning of the first scan pass, and so forth.

For each subframe, the process ends when half the number of passes is made when compared with the referenced non-interlaced examples. For this interlacing process, however, the reordering of the data is more complex, particularly if a standard interlaced input signal is employed.

TABLE EX-25A

| Output Head Configuration (spot pattern) | Rows: 4 Spots/Row: 3 |
|---|---|
| | Vertical Adjustment: 8 lines |
| Corresponding Figure: FIG. 65 | Effective Row |

TABLE EX-25A-continued

| Subframe: A | Spacing (all rows): 9 lines |
|---|---|

| | Lines Written by Respective Rows of Emitting Ends | | | |
|---|---|---|---|---|
| Scan Pass | Row A | Row B | Row C | Row D |
| 1 | b | b | b | 4 |
| 2 | b | b | 3 | 12 |
| 3 | b | 2 | 11 | 20 |
| 4 | 1 | 10 | 19 | 28 |
| 5 | 9 | 18 | 27 | 36 |
| . | . | . | . | . |
| . | . | . | . | . |
| . | . | . | . | . |
| 134 | 1041 | 1050 | 1059 | 1068 |
| 135 | 1049 | 1058 | 1067 | 1076 |
| 136 | 1057 | 1066 | 1075 | b |
| 137 | 1065 | 1074 | b | b |
| 138 | 1073 | b | b | b |

TABLE EX-25B

Figures 66A, 66B, 66C, 66D, 66E, 66F, 66G, 66H:
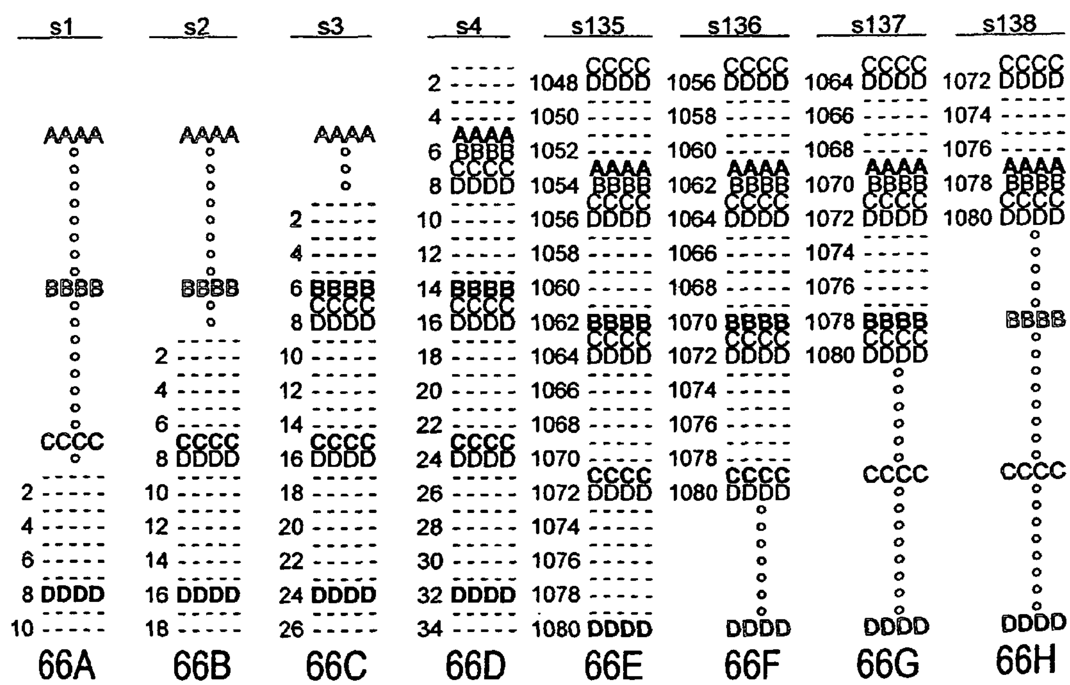
FIGS. 66A through 66H are time sequence diagrams for Example 25, illustrating line reordering during Subframe B using interlaced scanning for the linear spot pattern similar to that of FIG. 27S, having an effective row spacing of 9 lines and a vertical adjustment between scan passes of 8 lines.
Figures 67A, 67B, 67C, 67D, 67E, 67F, 67G, 67H:
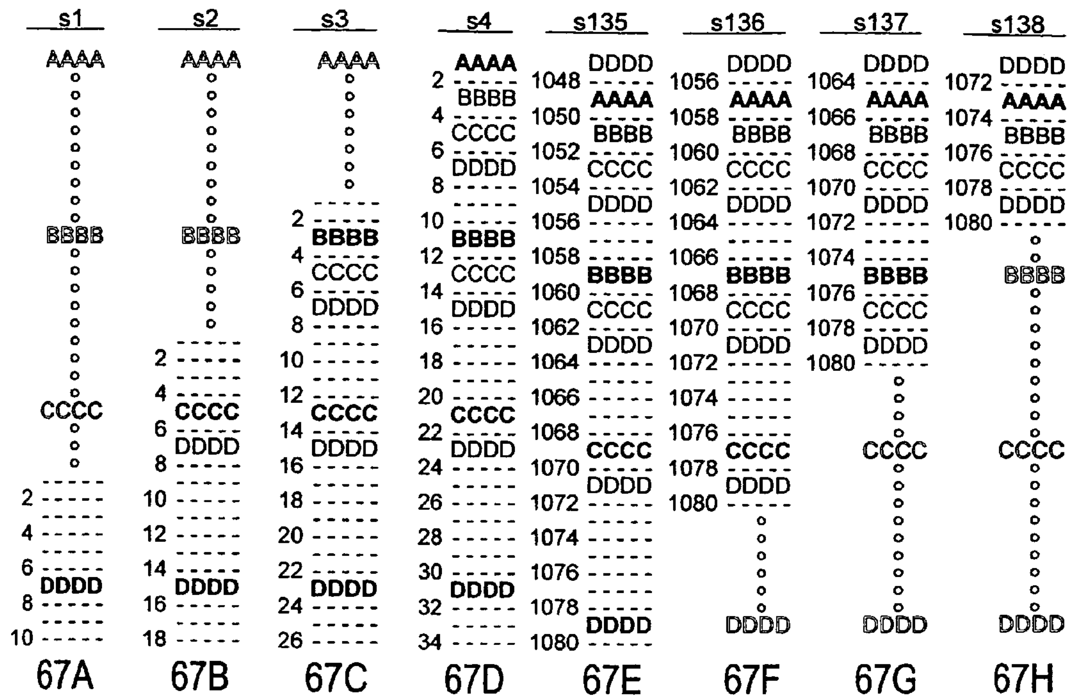
FIGS. 67A through 67H are time sequence diagrams for Example 26, illustrating line reordering during Subframe A using interlaced scanning for a spot pattern similar to that of FIG. 27S, having an effective row spacing of 5 lines and a vertical adjustment between passes of 10 lines.

| Output Head Configuration (spot pattern) | Rows: 4 Spots/Row: 3 |
|---|---|
| Corresponding Figure: FIG. 66 | Vertical Adjustment: 8 lines |
| Subframe: B | Effective Row Spacing (all rows): 9 lines |

| | Lines Written by Respective Rows of Emitting Ends | | | |
|---|---|---|---|---|
| Scan Pass | Row A | Row B | Row C | Row D |
| 1 | b | b | b | 8 |
| 2 | b | b | 7 | 16 |
| 3 | b | 6 | 15 | 24 |
| 4 | 5 | 14 | 23 | 32 |
| 5 | 13 | 22 | 31 | 40 |

TABLE EX-25B-continued

| | | | | |
|---|---|---|---|---|
| . | . | . | . | . |
| . | . | . | . | . |
| . | . | . | . | . |
| 134 | 1045 | 1054 | 1063 | 1072 |
| 135 | 1053 | 1062 | 1071 | 1080 |
| 136 | 1061 | 1070 | 1079 | b |
| 137 | 1069 | 1078 | b | b |
| 138 | 1077 | b | b | b |

EXAMPLE 26

For this Example 26, we assume a 12 emitting end output head and a 12 spot pattern in a four row by three emitting ends per row array, with red, green and blue beams assigned to the three fibers in each row, such as shown in FIGS. 5 and 5S and in FIGS. 27 and 27S. Unlike Example 25, however, this type of interlacing employs an adjustment of the effective row spacing similar to that of Example 24, wherein the effective row spacing is substantially doubled, and odd and even lines written during successive subframes. Unlike Example 24, the effective row spacing of the brick or log pattern output head configuration of this Example 26 cannot be as easily adjusted as with the ramp configuration of Example 24. Further, an effective row spacing of 10 lines is required, as opposed to the 5 lines effective row spacing of the introductory example. As with Examples 24 and 25, an eight full frame line vertical adjustment is assumed between the initiation of each sweep during the scanning of each subframe, to effectively write the odd-numbered lines, I.e., 1, 3, 5, 7, 9, . . . , 1075, 1077, and 1079 during Subframe A, and the even-numbered lines, I.e., 2, 4, 6, 8, 10, . . . , 1076, 1078, and 1080 during Subframe B.

Referring to FIGS. 67A-67H and Table EX-26A, the reordering of the input data at the beginning and end of Subframe A is illustrated. As with Example 25, the number of scan passes to write the first Subframe A is half that to write a complete frame in progressive scanning, namely 138 for interlaced versus 276 for progressive. Instead of beginning with writing line 4 of the frame, Subframe A begins with writing line 7 of the frame, which is effectively line 4 of the subframe at an effective row spacing for the subframe of 5 subframe lines. Note that an effective row spacing of ten complete frame lines that is ineffective for progressive scanning is effective for interlaced scanning.

TABLE EX-26A

Output Head Configuration (spot pattern): Rows: 4 Spots/Row: 3
Corresponding Figure: FIG. 67 — Vertical Adjustment: 8 lines
Subframe: A — Effective Row Spacing (all rows): 10 lines

| Scan Pass | Lines Written by Respective Rows of Emitting Ends: Row A | Row B | Row C | Row D |
|---|---|---|---|---|
| 1 | b | b | b | 7 |
| 2 | b | b | 5 | 15 |
| 3 | b | 3 | 13 | 23 |
| 4 | 1 | 11 | 21 | 31 |
| 5 | 9 | 19 | 29 | 39 |
| . | . | . | . | . |
| . | . | . | . | . |
| . | . | . | . | . |
| 135 | 1049 | 1059 | 1069 | 1079 |
| 136 | 1057 | 1067 | 1077 | b |
| 137 | 1065 | 1075 | b | b |
| 138 | 1073 | b | b | b |

TABLE EX-26B

Figures 68A, 68B, 68C, 68D, 68E, 68F, 68G, 68H:
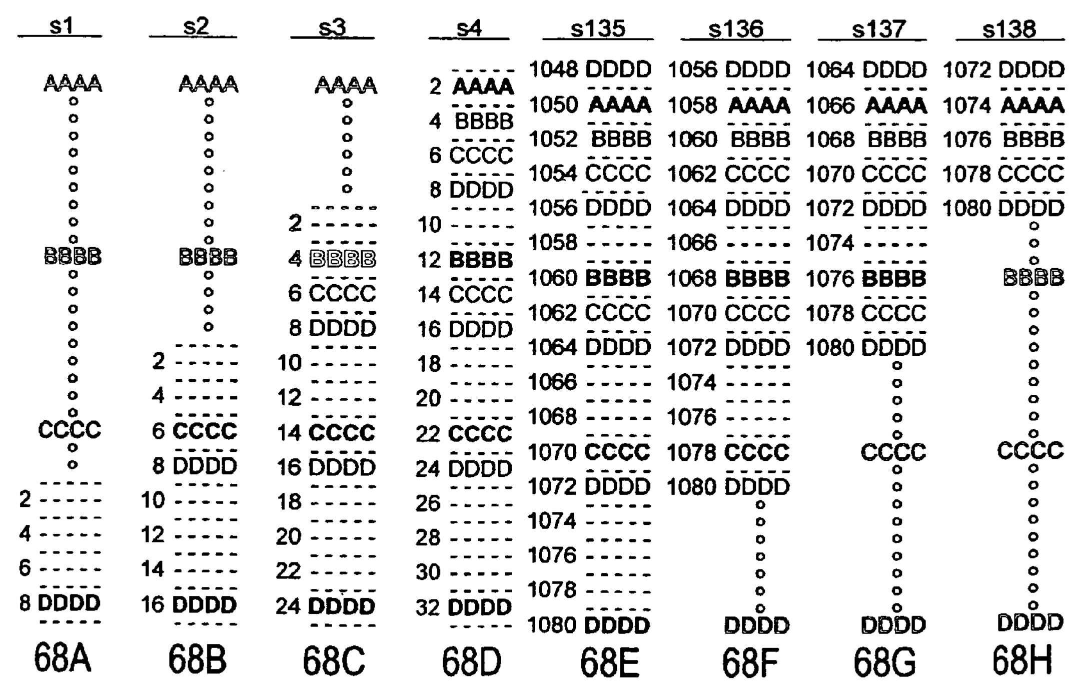
FIGS. 68A through 68H are time sequence diagrams for Example 26, illustrating line reordering during Subframe B using interlaced scanning for a spot pattern similar to that of FIG. 27S, having an effective row spacing of 5 lines and a vertical adjustment between passes of 10 lines.

Output Head Configuration (spot pattern): Rows: 4 Spots/Row: 3
Corresponding Figure: FIG. 68 — Vertical Adjustment: 8 lines
Subframe: B — Effective Row Spacing (all rows): 10 lines

| Scan Pass | Lines Written by Respective Rows of Emitting Ends: Row A | Row B | Row C | Row D |
|---|---|---|---|---|
| 1 | b | b | b | 8 |
| 2 | b | b | 6 | 16 |
| 3 | b | 4 | 14 | 24 |
| 4 | 2 | 12 | 22 | 32 |
| 5 | 12 | 20 | 30 | 40 |
| . | . | . | . | . |
| . | . | . | . | . |
| . | . | . | . | . |
| 135 | 1050 | 1060 | 1070 | 1080 |
| 136 | 1058 | 1068 | 1078 | b |
| 137 | 1066 | 1076 | b | b |
| 138 | 1074 | b | b | b |

The effective subframe row spacing of 5 subframe lines is effective for the same basic reason as outlined for the five line effective row spacing.

The reordering of the data Subframe B is illustrated in FIGS. 68A-68H and Table EX-26B. It should be noted that each subframe writes 540 lines of the 1080 lines of a complete frame and that the two subframes interlaced will write the same number of scan passes as one frame of progressive scanning.

To summarize these three examples, interlacing can be accomplished in a number of different ways, a wider variety than when only one line is being written per pass. Any of a number of interlacing processes may be selected within the present invention.

EXAMPLE 27

Figure 69:
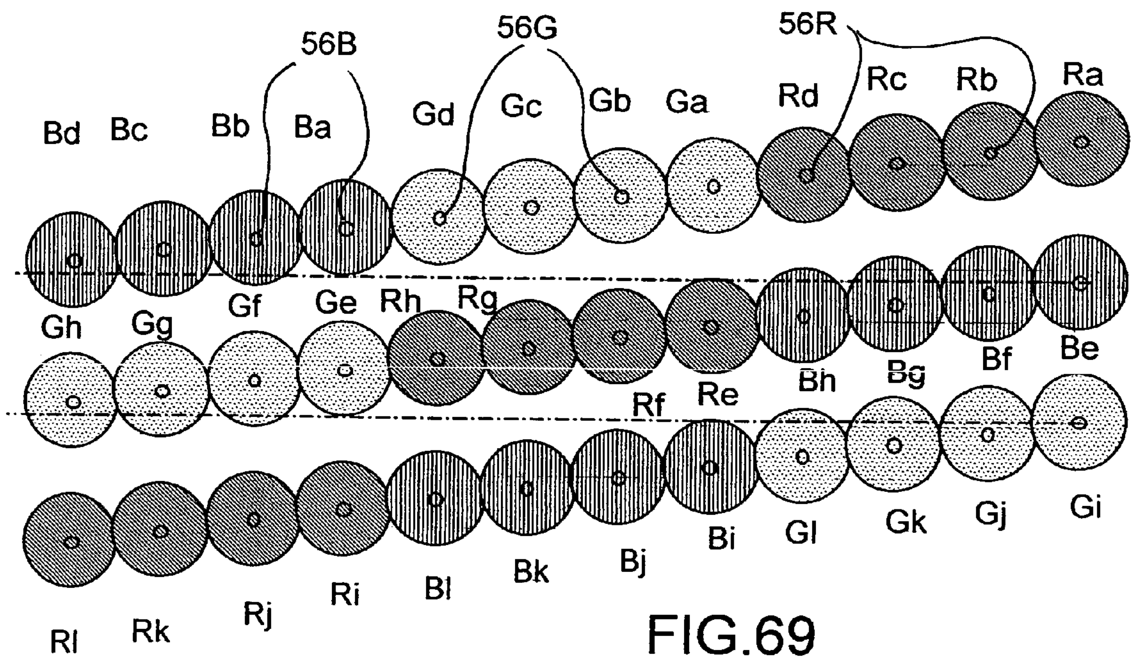
FIG. 69 is a diagram of a 36 emitting end linear array for use in the system of FIG. 1 according to Example 27 employing three rows of the array of Example 22 shown in FIG. 58.

FIG. 69 illustrates an extension of the ramp principle shown in Examples 21 and 22, wherein an array of 36 fibers is arranged in a configuration of three rows of ramp configuration emitting ends. The slant or angle of the rows is selected to achieve an effective spot spacing of 1 line between the spots in each row projected by the array. Moreover, the distance between each row is selected to provide an effective spacing of 1 line between the spots projected by the beams emitted from the emitting ends at the opposite ends of adjacent rows. For this Example 27, the colors of the laser beams assigned to each fiber within each row are arranged in RRRR-GGGG-BBBB groups as in Example 22. A variety of arrangements of emitting ends within rows can be employed, including an arrangement such as in Example 21, so long as each column of emitting ends within the fiber output head is assigned one each of red, green and blue laser beams.

The resultant line reordering necessary to progressively scan a 1920×1080p image on the screen is similar to that of Example 21 illustrated in FIGS. 59A-59H and Table EX-21. The writing of successive dot locations within lines during each scan pass for each row of ramped emitting ends would be similar to that of Tables EX-22B and EX-22C, except for a slightly different line reordering and time combination. For clarity, Table EX-27B, EX-27C and EX-27D are

TABLE EX-27A

| Output Head Configuration (spot pattern)<br>Corresponding Figure: FIGS. 69, 70<br>Blank = b | Rows: 36 Spots/Row: 1<br>Vertical Adjustment: 12 lines<br>Effective Vertical spacing: 1 line |
|---|---|

| | Lines Written by Respective Spots | | | | | | | | | | | |
|---|---|---|---|---|---|---|---|---|---|---|---|---|
| | Gi | Gj | Gk | Gl | Bi | Bj | Bk | Bl | Ri | Rj | Rk | Rl |
| Scan | Be | Bf | Bg | Bh | Re | Rf | Rg | Rh | Ge | Gf | Gg | Gh |
| Pass | Ra | Rb | Rc | Rd | Ga | Gb | Gc | Gd | Ba | Bb | Bc | Bd |
| 1 | b | b | b | b | b | b | b | b | b | b | b | b |
| | b | b | b | b | b | b | b | b | b | b | b | b |
| | 1 | 2 | 3 | 4 | 5 | 6 | 7 | 8 | 9 | 10 | 11 | 12 |
| 2 | b | b | b | b | b | b | b | b | b | b | b | b |
| | 1 | 2 | 3 | 4 | 5 | 6 | 7 | 8 | 9 | 10 | 11 | 12 |
| | 13 | 14 | 15 | 16 | 17 | 18 | 19 | 20 | 21 | 22 | 23 | 24 |
| 3 | 1 | 2 | 3 | 4 | 5 | 6 | 7 | 8 | 9 | 10 | 11 | 12 |
| | 13 | 14 | 15 | 16 | 17 | 18 | 19 | 20 | 21 | 22 | 23 | 24 |
| | 25 | 26 | 27 | 28 | 29 | 30 | 31 | 32 | 33 | 34 | 35 | 36 |
| 4 | 13 | 14 | 15 | 16 | 17 | 18 | 19 | 20 | 21 | 22 | 23 | 24 |
| | 25 | 26 | 27 | 28 | 29 | 30 | 31 | 32 | 33 | 34 | 35 | 36 |
| | 37 | 38 | 39 | 40 | 41 | 42 | 43 | 44 | 45 | 46 | 47 | 48 |
| . | . | . | . | . | . | . | . | . | . | . | . | . |
| . | . | . | . | . | . | . | . | . | . | . | . | . |
| . | . | . | . | . | . | . | . | . | . | . | . | . |
| 90 | 1245 | 1246 | 1247 | 1248 | 1249 | 1250 | 1251 | 1252 | 1253 | 1254 | 1255 | 1256 |
| | 1257 | 1258 | 1259 | 1260 | 1261 | 1262 | 1263 | 1264 | 1265 | 1266 | 1267 | 1268 |
| | 1269 | 1270 | 1271 | 1272 | 1273 | 1274 | 1275 | 1276 | 1277 | 1278 | 1279 | 1280 |
| 91 | 1257 | 1258 | 1259 | 1260 | 1261 | 1262 | 1263 | 1264 | 1265 | 1266 | 1267 | 1268 |
| | 1269 | 1270 | 1271 | 1272 | 1273 | 1274 | 1275 | 1276 | 1277 | 1278 | 1279 | 1280 |
| | b | b | b | b | b | b | b | b | b | b | b | b |
| 92 | 1269 | 1270 | 1271 | 1272 | 1273 | 1274 | 1275 | 1276 | 1277 | 1278 | 1279 | 1280 |
| | b | b | b | b | b | b | b | b | b | b | b | b |
| | b | b | b | b | b | b | b | b | b | b | b | b |

included herein reflecting three different times at the beginning of scan pass 3. It is presumed that the end of the scan pass illustrated for Example 22 in Table EX-22C will be apparent from a comparison of Tables EX-22B and EX-27B through EX-27D.

TABLE EX-27B

| Output Head Configuration (spot pattern)<br>Corresponding Figure: FIGS. 69, 70<br>Pattern of Spots: MultiRamp<br>Scan Pass: 3 Blank = b | Rows: 36 Spots/Row: 1<br>Vertical Adjustment: 12 lines<br>Effective Vertical Spot<br>Spacing: 1 line<br>Effective Horizontal Spot<br>Spacing: 3 dots |
|---|---|

| | Gi | Gj | Gk | Gl | Bi | Bj | Bk | Bl | Ri | Rj | Rk | Rl |
|---|---|---|---|---|---|---|---|---|---|---|---|---|
| | Be | Bf | Bg | Bh | Re | Rf | Rg | Rh | Ge | Gf | Gg | Gh |
| | Ra | Rb | Rc | Rd | Ga | Gb | Gc | Gd | Ba | Bb | Bc | Bd |
| Line | time t1 | | | | Dot Locations | | | | | | | |
| 1 | | | | | | | | | | | | 1 |
| 2 | | | | | | | | | | | b | |
| 3 | | | | | | | | | | b | | |
| 4 | | | | | | | | | b | | | |
| 5 | | | | | | | | b | | | | |
| 6 | | | | | | | b | | | | | |
| 7 | | | | | | b | | | | | | |
| 8 | | | | | b | | | | | | | |
| 9 | | | | b | | | | | | | | |
| 10 | | | b | | | | | | | | | |
| 11 | | b | | | | | | | | | | |
| 12 | b | | | | | | | | | | | |
| 13 | | | | | | | | | | | | 1 |
| 14 | | | | | | | | | | | b | |
| 15 | | | | | | | | | | b | | |
| 16 | | | | | | | | | b | | | |
| 17 | | | | | | | | b | | | | |
| 18 | | | | | | | b | | | | | |
| 19 | | | | | | b | | | | | | |
| 20 | | | | | b | | | | | | | |
| 21 | | | | b | | | | | | | | |
| 22 | | | b | | | | | | | | | |
| 23 | | b | | | | | | | | | | |
| 24 | b | | | | | | | | | | | |
| 25 | | | | | | | | | | | | 1 |
| 26 | | | | | | | | | | | b | |
| 27 | | | | | | | | | | b | | |
| 28 | | | | | | | | | b | | | |
| 29 | | | | | | | | b | | | | |
| 30 | | | | | | | b | | | | | |
| 31 | | | | | | b | | | | | | |
| 32 | | | | | b | | | | | | | |
| 33 | | | | b | | | | | | | | |
| 34 | | | b | | | | | | | | | |
| 35 | | b | | | | | | | | | | |
| 36 | b | | | | | | | | | | | |

TABLE EX-27C

| Output Head Configuration (spot pattern)<br>Corresponding Figure: FIGS. 69, 70<br>Pattern of Spots: MultiRamp<br>Scan Pass: 3 Blank = b | Rows: 36 Spots/Row: 1<br>Vertical Adjustment: 12 lines<br>Effective Vertical Spot<br>Spacing: 1 line<br>Effective Horizontal Spot<br>Spacing: 3 dots |
|---|---|

| | Gi | Gj | Gk | Gl | Bi | Bj | Bk | Bl | Ri | Rj | Rk | Rl |
|---|---|---|---|---|---|---|---|---|---|---|---|---|
| | Be | Bf | Bg | Bh | Re | Rf | Rg | Rh | Ge | Gf | Gg | Gh |
| | Ra | Rb | Rc | Rd | Ga | Gb | Gc | Gd | Ba | Bb | Bc | Bd |
| Line | time t16 | | | | Dot Locations | | | | | | | |
| 1 | | | | | | | | | | | | 16 |
| 2 | | | | | | | | | | | 13 | |
| 3 | | | | | | | | | | 10 | | |
| 4 | | | | | | | | | 7 | | | |
| 5 | | | | | | | | 4 | | | | |
| 6 | | | | | | | 1 | | | | | |

TABLE EX-27C-continued

| | | | | | | | | | | | | |
|---|---|---|---|---|---|---|---|---|---|---|---|---|
| 7 | | | | | | b | | | | | | |
| 8 | | | | | b | | | | | | | |
| 9 | | | | b | | | | | | | | |
| 10 | | | b | | | | | | | | | |
| 11 | | b | | | | | | | | | | |
| 12 | b | | | | | | | | | | | |
| 13 | | | | | | | | | | | | 16 |
| 14 | | | | | | | | | | | 13 | |
| 15 | | | | | | | | | | 10 | | |
| 16 | | | | | | | | | 7 | | | |
| 17 | | | | | | | | 4 | | | | |
| 18 | | | | | | | 1 | | | | | |
| 19 | | | | | | b | | | | | | |
| 20 | | | | | b | | | | | | | |
| 21 | | | | b | | | | | | | | |
| 22 | | | b | | | | | | | | | |
| 23 | | b | | | | | | | | | | |
| 24 | b | | | | | | | | | | | |
| 25 | | | | | | | | | | | | 16 |
| 26 | | | | | | | | | | | 13 | |
| 27 | | | | | | | | | | 10 | | |
| 28 | | | | | | | | | 7 | | | |
| 29 | | | | | | | | 4 | | | | |
| 30 | | | | | | | 1 | | | | | |
| 31 | | | | | | b | | | | | | |
| 32 | | | | | b | | | | | | | |
| 33 | | | | b | | | | | | | | |
| 34 | | | b | | | | | | | | | |
| 35 | | b | | | | | | | | | | |
| 36 | b | | | | | | | | | | | |

TABLE EX-27D

| Output Head Configuration (spot pattern) | Rows: 36 Spots/Row: 1 |
|---|---|
| Corresponding Figure: FIGS. 69, 70 | Vertical Adjustment: 12 lines |
| Pattern of Spots: MultiRamp | Effective Vertical Spot Spacing: 1 line |
| Scan Pass: 3 Blank = b | Effective Horizontal Spot Spacing: 3 dots |

| | Gi Be Ra | Gj Bf Rb | Gk Bg Rc | Gl Bh Rd | Bi Re Ga | Bj Rf Gb | Bk Rg Gc | Bl Rh Gd | Ri Ge Ba | Rj Gf Bb | Rk Gg Bc | Rl Gh Bd |
|---|---|---|---|---|---|---|---|---|---|---|---|---|
| Line time t34 | Dot Locations | | | | | | | | | | | |
| 1 | | | | | | | | | | | | 34 |
| 2 | | | | | | | | | | | 31 | |
| 3 | | | | | | | | | | 28 | | |
| 4 | | | | | | | | | 25 | | | |
| 5 | | | | | | | | 22 | | | | |
| 6 | | | | | | | 19 | | | | | |
| 7 | | | | | | 16 | | | | | | |
| 8 | | | | | 13 | | | | | | | |
| 9 | | | | 10 | | | | | | | | |
| 10 | | | 7 | | | | | | | | | |
| 11 | | 4 | | | | | | | | | | |
| 12 | 1 | | | | | | | | | | | |
| 13 | | | | | | | | | | | | 34 |
| 14 | | | | | | | | | | | 31 | |
| 15 | | | | | | | | | | 28 | | |
| 16 | | | | | | | | | 25 | | | |
| 17 | | | | | | | | 22 | | | | |
| 18 | | | | | | | 19 | | | | | |
| 19 | | | | | | 16 | | | | | | |
| 20 | | | | | 13 | | | | | | | |
| 21 | | | | 10 | | | | | | | | |
| 22 | | | 7 | | | | | | | | | |
| 23 | | 4 | | | | | | | | | | |
| 24 | 1 | | | | | | | | | | | |
| 25 | | | | | | | | | | | | 34 |
| 26 | | | | | | | | | | | 31 | |
| 27 | | | | | | | | | | 28 | | |
| 28 | | | | | | | | | 25 | | | |
| 29 | | | | | | | | 22 | | | | |
| 30 | | | | | | | 19 | | | | | |
| 31 | | | | | | 16 | | | | | | |
| 32 | | | | | 13 | | | | | | | |
| 33 | | | | 10 | | | | | | | | |
| 34 | | | 7 | | | | | | | | | |
| 35 | | 4 | | | | | | | | | | |
| 36 | 1 | | | | | | | | | | | |

The order of the assignment of colors within a row may not be the same as within any other row in order to write each dot location with all three colors, as shown in Table EX-27 and FIGS. 70A-70H. It will be apparent after the teachings of the 4×3 brick and log, and the 12×1 ramp emitting end configurations above that the configuration of this Example 27 has aspects of each. A primary advantage of this configuration and resulting spot pattern on the screen is the ability to drastically reduce the speed or increase facet size of the polygon mirror or other horizontal scanning component because the number of scan passes has been cut by a factor of about three to 92 scan passes per progressively scanned frame.

This configuration also allows for much higher aggregate power levels to be conveyed to the screen, thus permitting this system to be used for still larger screen sizes. Further, maintaining the speed of the mirror polygon with this head configuration would allow the achievement of higher resolution levels within the restrictions of current technology and components.

Fiber-Based Beam Coupling

Figure 20:
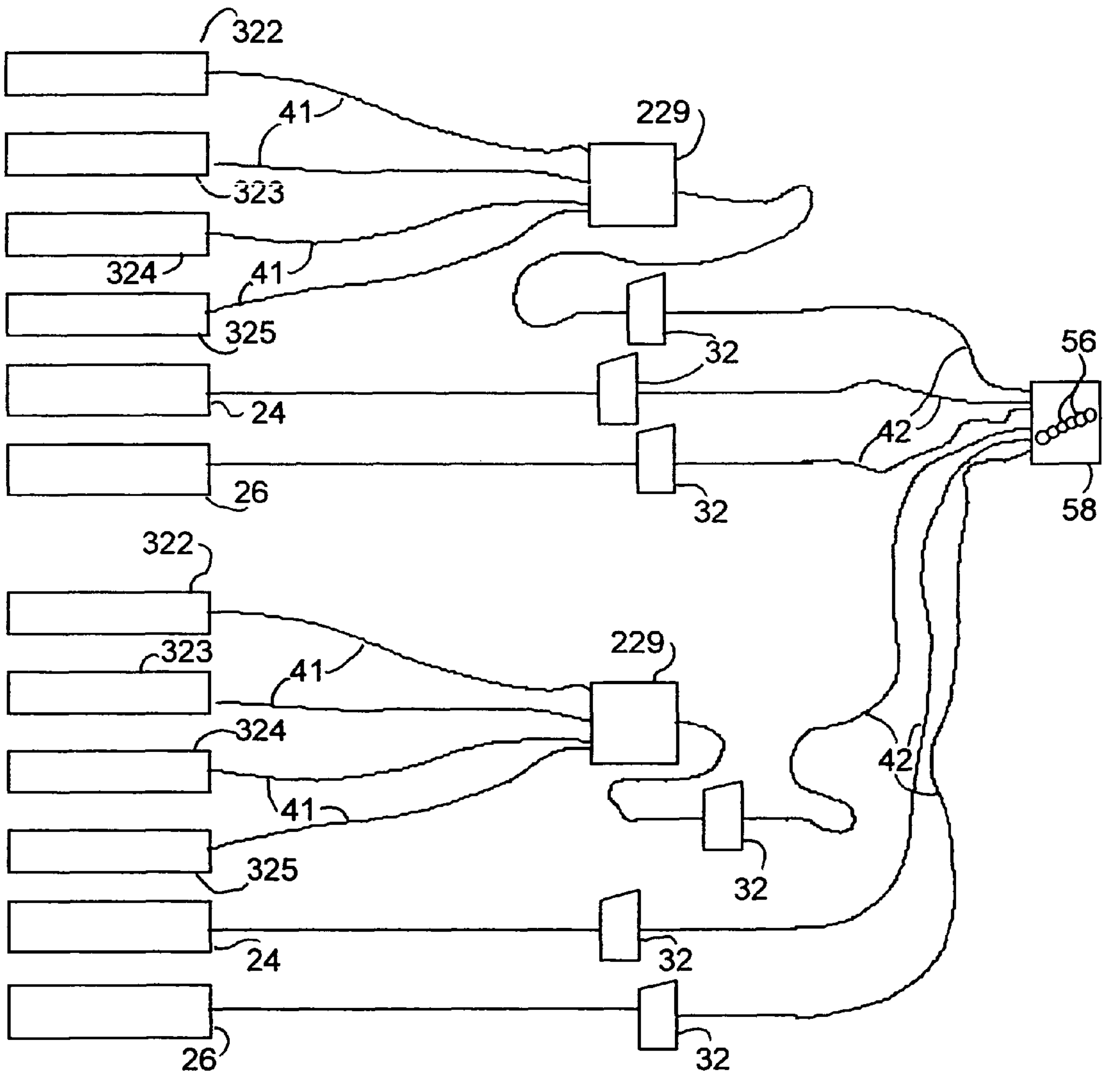
FIG. 20 is a schematic diagram of elements of the laser, modulation and spot projection sections where, for example, several lasers of slightly different red wavelengths are combined after insertion into fiber and modulation using wavelength division multiplexing techniques.
Figure 21:
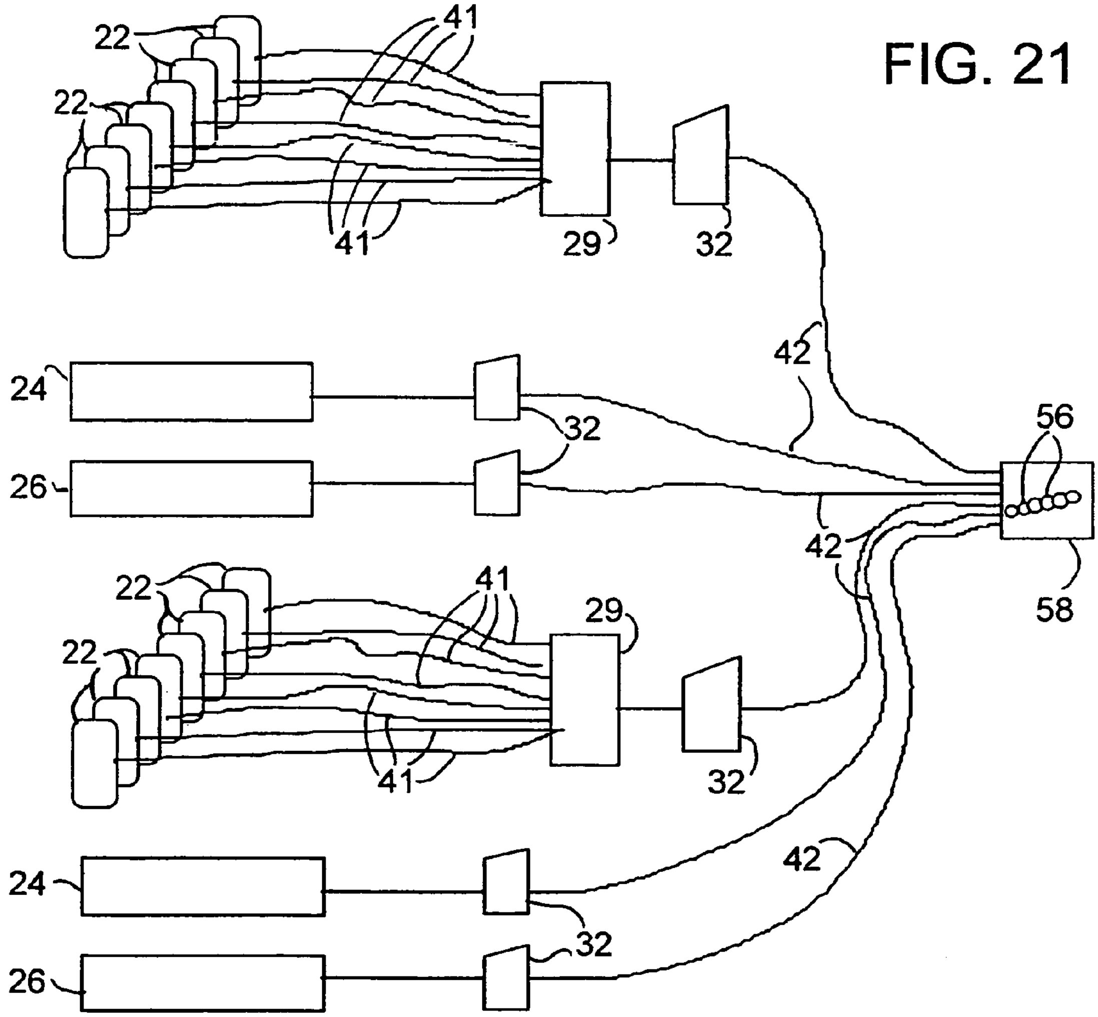
FIG. 21 is a schematic diagram of elements of the laser, modulation and spot projection sections where multiple smaller lasers are combined after insertion into fiber and modulation using other fiber-based beam coupling.
Figure 22:
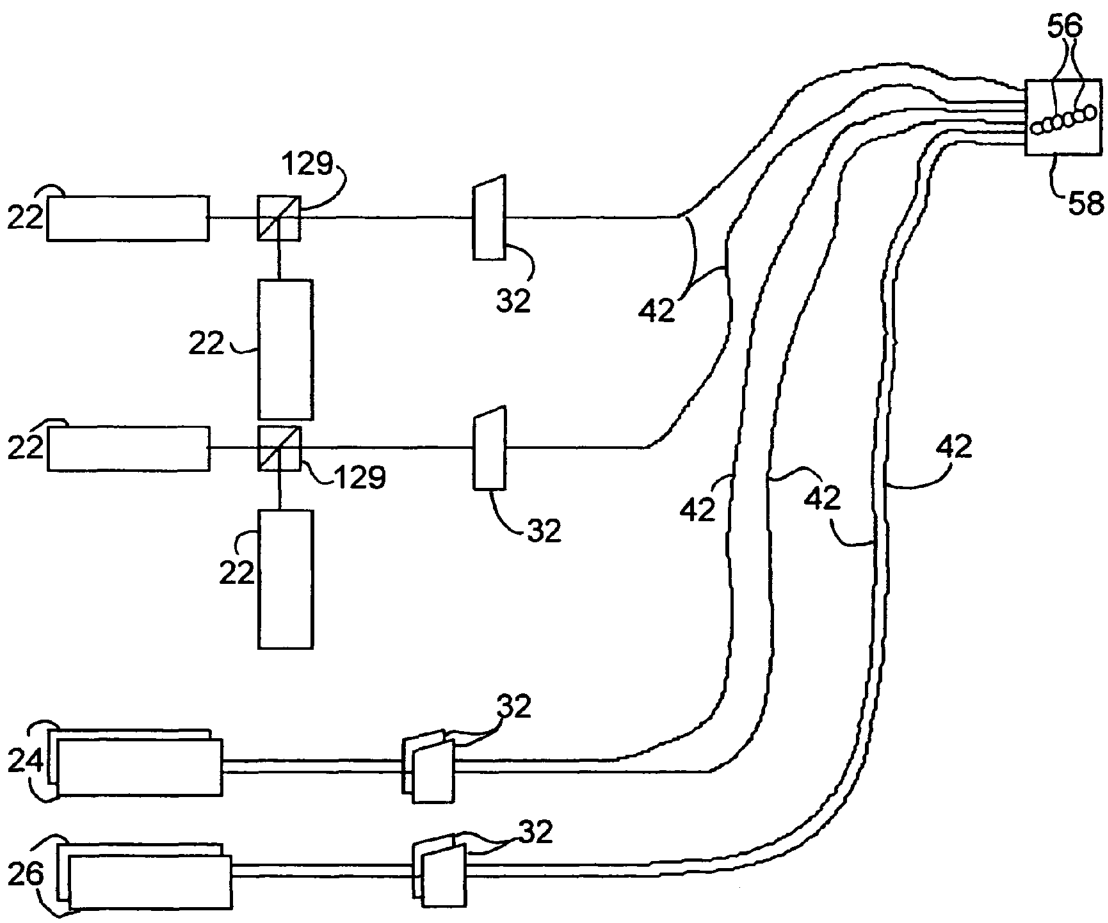
FIG. 22 is a schematic diagram of elements of the laser, modulation and spot projection sections where multiple smaller lasers are combined after insertion into fiber, but before modulation, using polarizing combiners.
Figure 24:
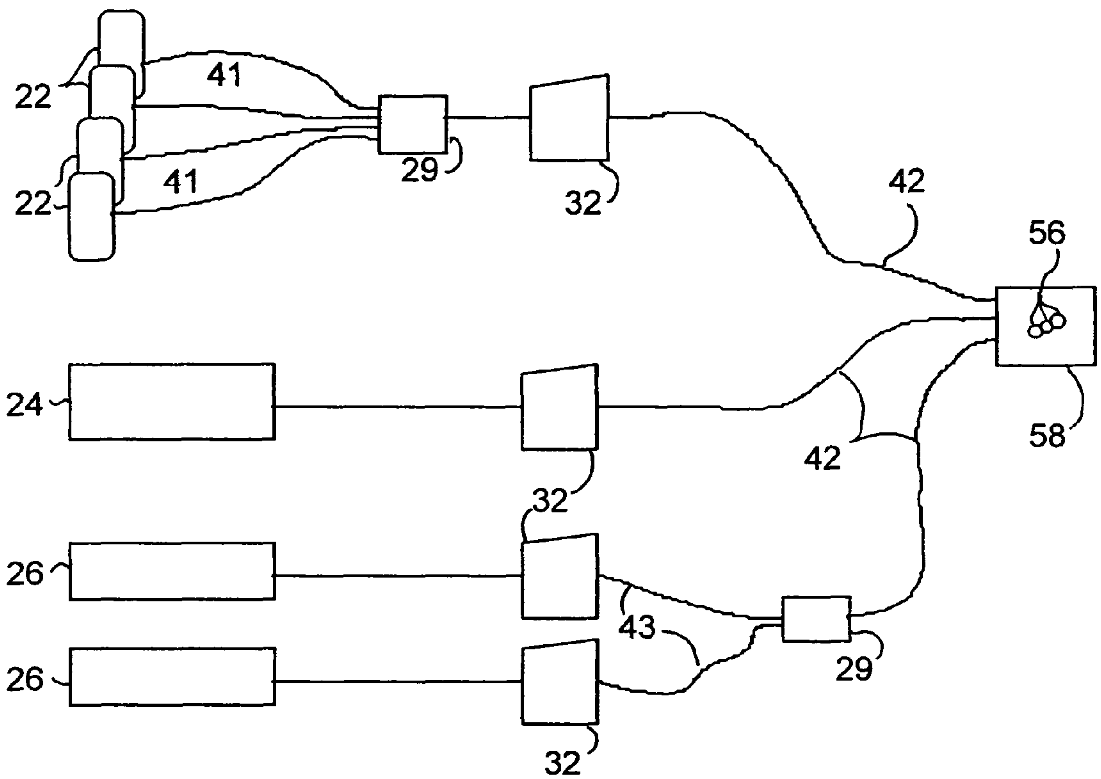
FIG. 24 is a schematic diagram of elements of the laser, modulation and spot projection sections where combining of beams after insertion into fiber occurs for one color before modulation, and, in a second case, after modulation.

As discussed previously, our invention permits several important applications of fiber-based beam coupling, several of which are synergistic with advantages resulting from other aspects of our invention. (For convenience, we use "fiber-based beam coupling" to refer both to the combination and division or splitting of laser beams in a fiber environment.) For example, the use of fiber and multiple line scanning as in our invention allow the use of multiple lasers per color, one laser of each color per line. In addition, time combining allows multiple lasers of a given color per line as shown in FIG. 18. Alone or in combination this permits us to use smaller, perhaps much more economical lasers and modulators within our system. Fiber-based beam coupling allows us to achieve similar ends differently or to pursue synergistic gains, for instance, using several blue lasers that are combined either before or after modulation using fiber-based beam coupling techniques to achieve the blue power levels required of a single line. Thus, we may achieve the advantages of multi-line scanning and fiber without having to adopt a 4×6 output head, for example. Further, as will be described in Example 25, fiber-based beam coupling also allows us to efficiently form composite ("white") beams to illuminate the dots of a given line. In FIGS. 20, 21 and 22 we show configurations of an exemplary two-row system where several smaller lasers of a given color are combined before their respective modulators. In FIG. 20, the beams of red lasers 322, 323, 324 and 325 are of slightly different wavelengths, perhaps 631 nm, 633 nm, 635 nm, and 637 nm, respectively, and are inserted into fibers 43 and the beams are combined using Wavelength Division Multiplexing (WDM) combiner 229 into fibers 43 without leaving the fiber environment. In FIG. 24, the beams from lasers 22 are inserted in fibers 41 and then combined via fiber-based beam combiners 29 using other well known techniques that do not require differences in wavelength. The light from the fibers 41 then emerges into free space and is thence collimated into modulators 32. In FIG. 22, polarization combining optics 129 are used to combine the beams of two pairs of lasers 22.

Figure 23:
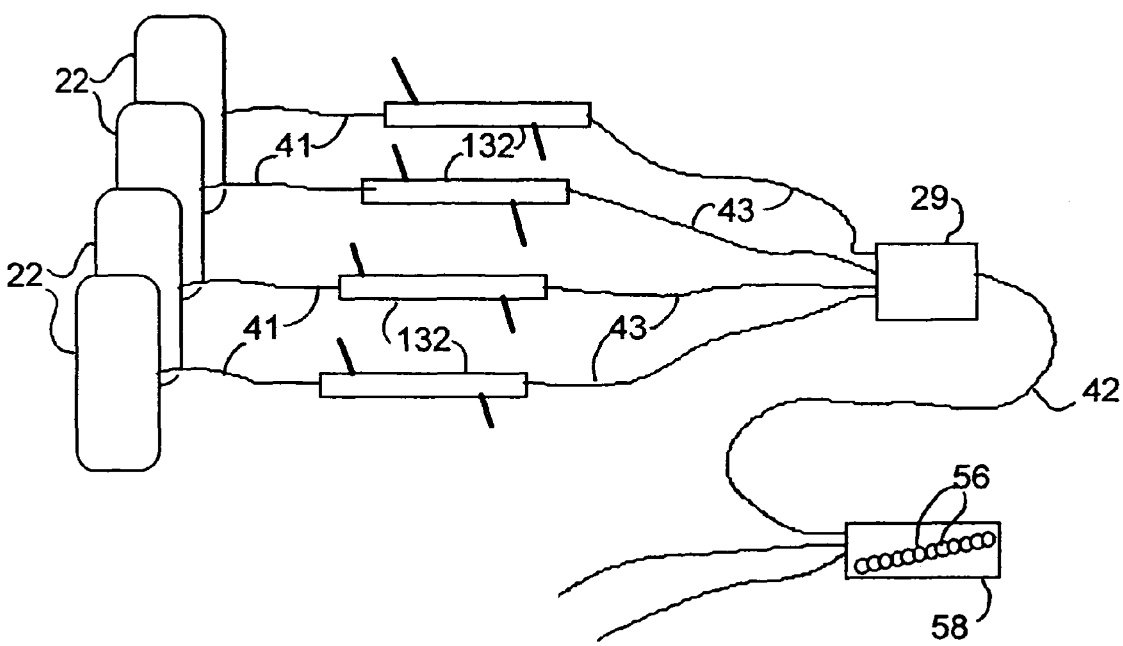
FIG. 23 is a schematic diagram of elements of the laser, modulation and spot projection sections where many modulators are used for the same color for a given line, in which the modulators are preferably fiber-based modulators.

In FIG. 23 we show another configuration with multiple lasers per color per row and fiber-based beam coupling, only in this example combining occurs after each of the beams has been separately modulated by modulators, which would preferably be fiber modulators 232. For clarity, only one fiber 42 is shown. Such a configuration might take advantage of emerging fiber modulation technology where inexpensive modulators operate directly on the beam in the fiber, but which cannot withstand higher power levels. This configuration also allows for the use of diode lasers where the lasers themselves are modulated by either pulsing or varying the input power to them.

Figure 25:
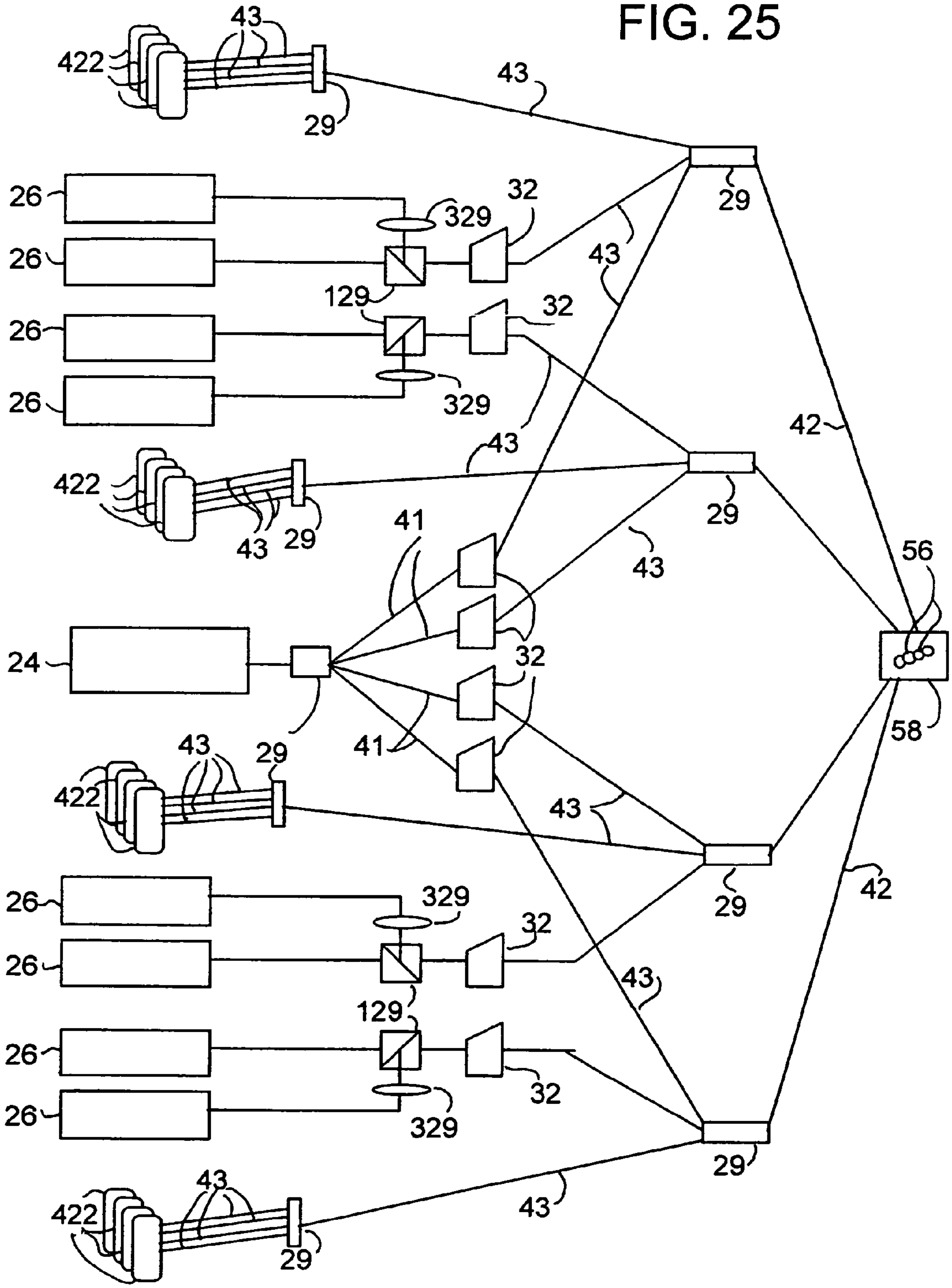
FIG. 25 is a schematic diagram of elements of the laser, modulation and spot projection sections for use with the system of FIG. 1 and the four row by one emitting end per row output head according to Example 28 showing several separate combinations and divisions of beams after insertion into fiber.

FIGS. 24 and 25 both show configuration in which both pre-modulator and post-modulator combination is used to advantage. FIG. 24 is an exemplary one-line system, while FIG. 25 demonstrates some of the breadth and flexibility of our invention in the context of a four-line system. This latter example employs one large green laser 24 capable of supplying power to all four lines, its beam being split using either dichroic optics or fiber-based splitters 129 into fibers 43, 16 red diode lasers 422, each of which is self-modulated as described above and than launched into fibers 143, with groups of four then combined using fiber-based couplers into fibers 43, and eight blue lasers 26. The blue lasers are combined using either fiber-based combiners or, for example and as shown, polarizing combiner cubes 129 with the aid of half wave plates 329, two before each of four modulators 32, after which the light is launched into fibers 42. This figure further shows the modulated beams in 12 fibers 42 being combined into four fibers 42, each with three primary colors, by combiners 29, to form the output head 58 of Example 21.

In the foregoing, we have discussed combining the light from two or more fibers into one fiber, and have referred to WDM as being useful in combining (or splitting) beams of different wavelengths. WDM can be used for combining widely different wavelengths, such as red, green, and blue, or for combining beams of very slightly different wavelengths, as shown in FIG. 20. Other techniques well known in the communications industry are generally not dependent upon wavelength variations, and multiple beams of either the same or different wavelengths may be combined. These are described in texts such as Introduction to Fiber Optics, Ghatak and Thyagarajan, Cambridge University Press, 1998 and include such techniques as fiber gratings, fused taper couplers, shaved block couplers, as well as others. Note that, as opposed to the polarizing beam splitter/combiners shown in FIG. 22 and the dichroics used in prior art laser projectors, both WDM and other fiber-based beam coupling techniques can be used to combine more than two beams of the same or nearly the same color, usually by cascading 2:1 couplers.

These and other fiber-based beam coupling techniques are included in our invention as well as the use of dichroics and other conventional combining optics, either alone or in combination with fiber and/or fiber-based beam couplers in combination with fiber. There are also other techniques emerging that will accomplish these same goals and could be used to advantage in our invention.

EXAMPLE 28

Figure 6:
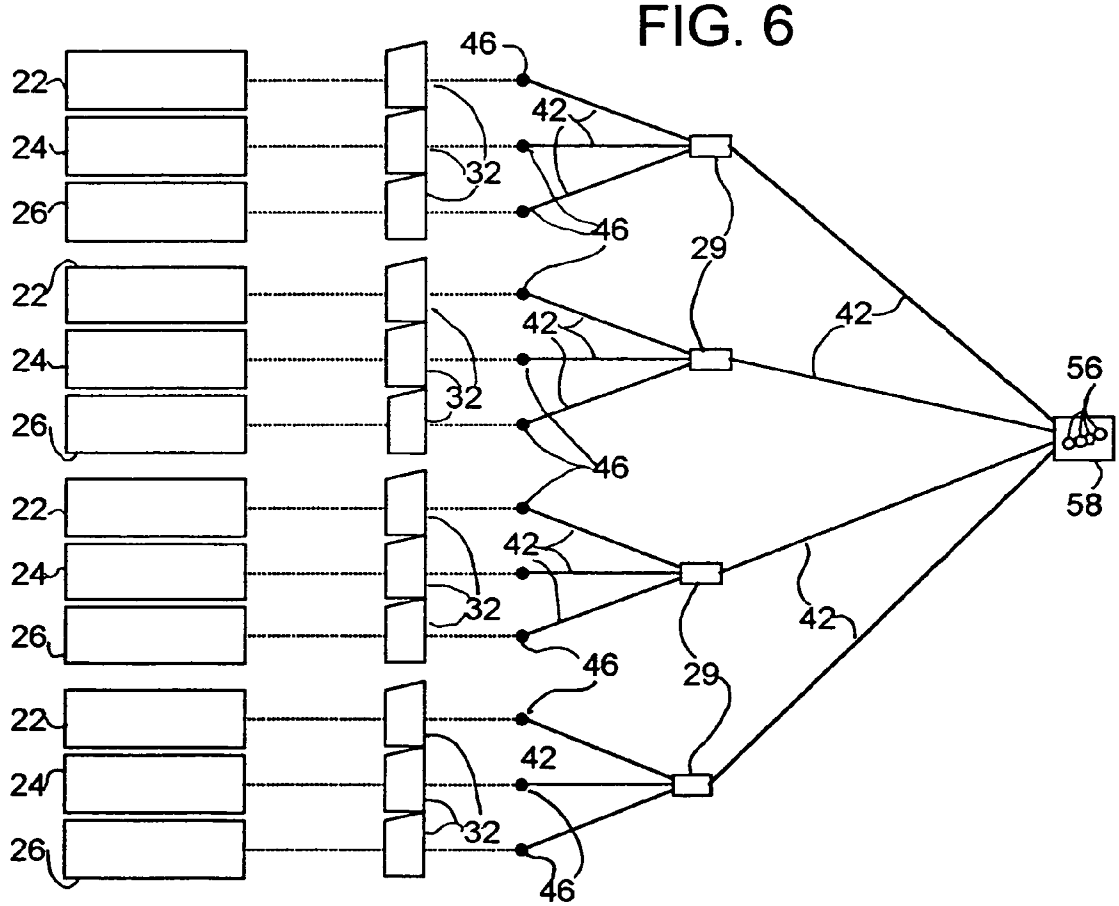
FIG. 6 is a diagram showing elements of the laser, spot projection and modulation sections where the colored beams for each of several lines are combined after insertion into fiber and modulation using wavelength division multiplexing or other fiber-based beam coupling.

As discussed previously, it may be advantageous to combine the separately modulated beams of the colors destined for a single row into a single fiber emitting end. FIG. 6 shows an alternate embodiment of elements of the spot projection, modulation and laser sections 40, 30, and 20, respectively, of FIG. 1 that might be effective for such a purpose. The colored beams for a given row are modulated by modulators 32, inserted individually into fibers 41, and the beams from each red-green-blue group of the 12 fibers 42 are combined by fiber-based coupler 29 into one of the fibers 42 terminating in one of emitting ends 56. The advantage of this technique is that the width of the pattern of spots on the screen is reduced compared with prior Examples, allowing for less blanking time between scan passes, giving somewhat more brightness. This approach also preserves the relatively low power levels within the modulators and at the fiber tips where the insertion of higher power laser beams is most likely to cause damage. Further, and as described previously, this fiber-based combination is much more efficient than techniques of prior art laser projectors which generally use dichroics.

Figure 7:
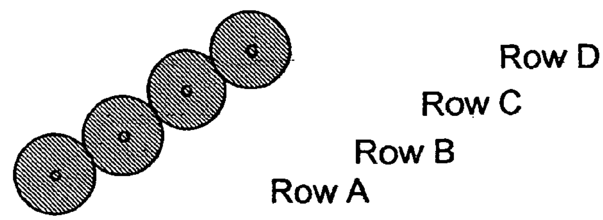
FIG. 7 is a diagram of an alternate output head for use in the systems of FIG. 1 and FIG. 6, according to Example 28, and having four row by one emitting end per row array arranged on a slant.
Figure 7S:
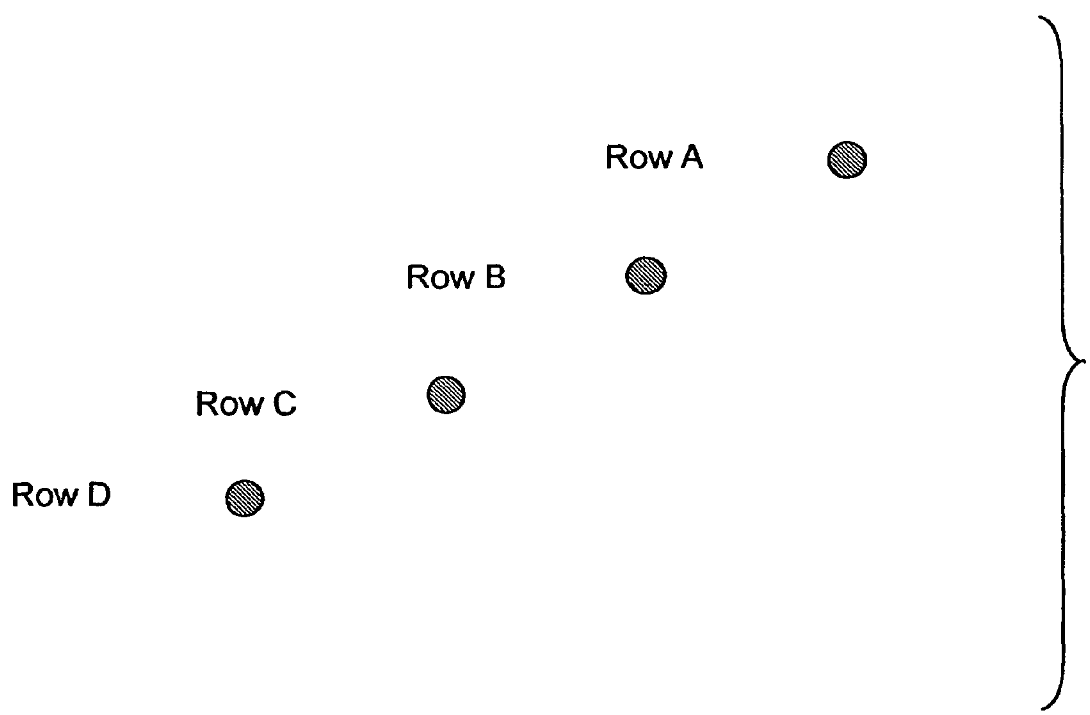
FIG. 7S is a diagram of the pattern of spots projected on a screen using the array shown in FIG. 7.

This Example 28 illustrates a four row by one emitting end per row output head, as shown in FIG. 7, projecting a pattern of spots as shown in FIG. 7S, and employing fiber-based combination of the different color beams to form composite beams, using such an exemplary system as shown in FIG. 6. As further described in Tables EX-28A, EX-28B and FIGS. 72 through 74, the combination of separately modulated beams of more than one color into a single fiber terminating in an emitting end and emitting such combined beams as a single effective beam from such emitting end as heretofore described for our invention yields a simplified system similar to the ramp system of Examples 21 and 22, having a one line effective row spacing in an effective 4 row by 1 emitting end of a row. Each spot illuminated by the combined color beams emitted from an emitting end of a row is indicated by RGBa, RGBb, RGBc or RGBd. The line recording shown in Table EX-28A and FIGS. 72A-72D is a simple successive four line adjustment for progressive scanning, producing no overlap at the top and bottom of the screen. Further, the width of the array and corresponding spot pattern is reduced in comparison with the ramp array of Example 21, the overlap on either side of the screen at the beginning and end of each scan pass is reduced, as shown in FIGS. 73A-73H. As with the discussion relating to Examples 21-22, the linear array has added flexibility in accommodating changes in resolution and aspect ratio.

TABLE EX-28A

Output Head
Configuration (spot pattern) — Rows: 4 Spots/Row: 1
Corresponding Figure: FIG. 7, 72 — Vertical Adjustment: 4 lines
Blank = b — Effective Vertical Spacing: 1 line

| | Lines Written by Respective Spots | | | |
|---|---|---|---|---|
| Scan Pass | RGBa | RGBb | RGBc | RGBd |
| 1 | 1 | 2 | 3 | 4 |
| 2 | 5 | 6 | 7 | 8 |
| 3 | 9 | 10 | 11 | 12 |
| . | . | . | . | . |
| . | . | . | . | . |
| . | . | . | . | . |
| 268 | 1069 | 1070 | 1071 | 1072 |
| 269 | 1073 | 1074 | 1075 | 1076 |
| 270 | 1077 | 1078 | 1079 | 1080 |

TABLE EX-28B

Output Head
Configuration (spot pattern)
Corresponding Figure: FIG. 7, 73 — Rows: 4 Spots/Row: 1
Vertical Adjustment: 4 lines TABLE EX-28B-continued Pattern of Spots: Ramp Effective Vertical Spot Spacing: 1 line
Scan Pass: 1 Blank = b Effective Horizontal Spot Spacing: 3

| | RGBa | RGBb | RGBc | RGBd |
|---|---|---|---|---|
| Line | time t1 | | Dot Locations | |
| 1 | 1 | | | |
| 2 | | b | | |
| 3 | | | b | |
| 4 | | | | b |
| Line | time t4 | | Dot Locations | |
| 1 | 4 | | | |
| 2 | | 1 | | |
| 3 | | | b | |
| 4 | | | | b |
| Line | time t7 | | Dot Locations | |
| 1 | 7 | | | |
| 2 | | 4 | | |
| 3 | | | 1 | |
| 4 | | | | b |
| Line | time t10 | | Dot Locations | |
| 1 | 10 | | | |
| 2 | | 7 | | |
| 3 | | | 4 | |
| 4 | | | | 1 |
| Line | time t1920 | | Dot Locations | |
| 1 | 1920 | | | |
| 2 | | 1917 | | |
| 3 | | | 1914 | |
| 4 | | | | 1911 |
| Line | time t1923 | | Dot Locations | |
| 1 | b | | | |
| 2 | | 1920 | | |
| 3 | | | 1917 | |
| 4 | | | | 1914 |
| Line | time t1926 | | Dot Locations | |
| 1 | b | | | |
| 2 | | b | | |
| 3 | | | 1920 | |
| 4 | | | | 1917 |
| Line | time t1929 | | Dot Locations | |
| 1 | b | | | |
| 2 | | b | | |
| 3 | | | b | |
| 4 | | | | 1920 |

Figure 71:
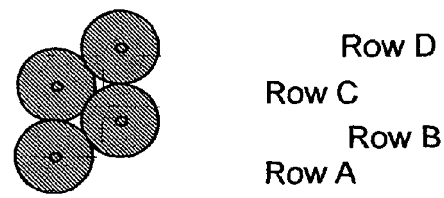
FIG. 71 is a diagram of an emitting end array where multiple colors emit from emitting ends arranged in a 4×1 "logs" pattern.
Figure 71S:
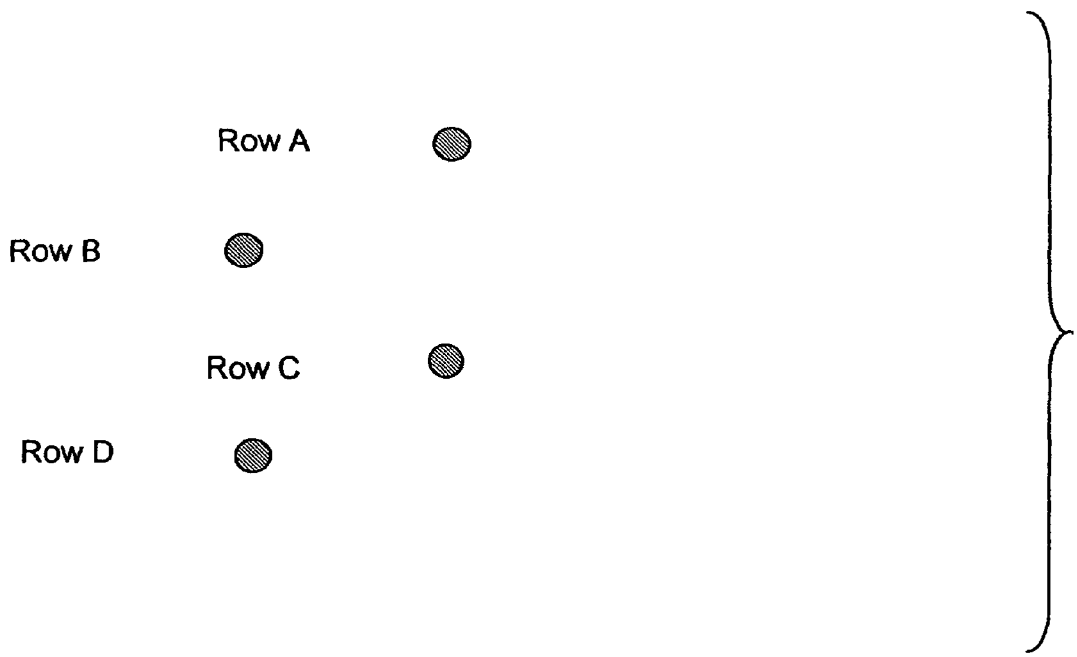
FIG. 71S is a diagram of the spots formed using the arrangement shown in FIG. 71.
Figure 73A:
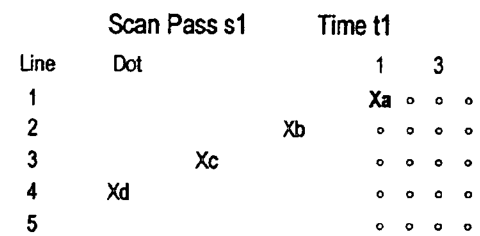
FIGS. 73A through 73H are the horizontal time sequence diagrams for Example 28, illustrating the timing of the display of spots at the beginning and end of a horizontal sweep.
Figure 73B:
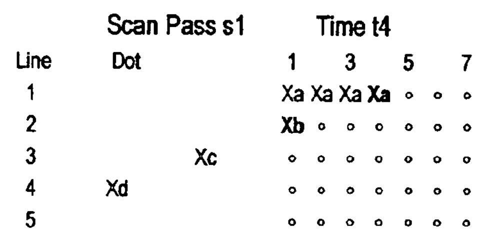
Figure 73C:
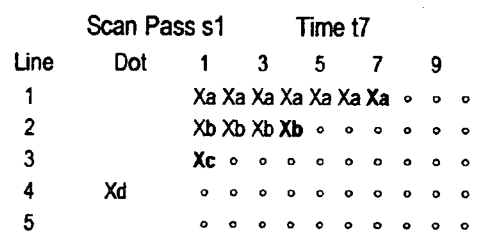
Figure 73D:
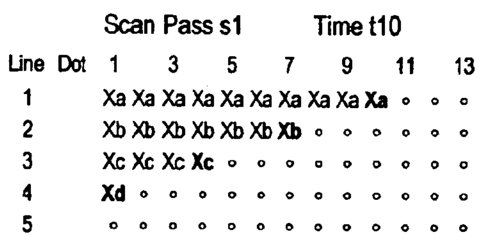
Figure 73E:
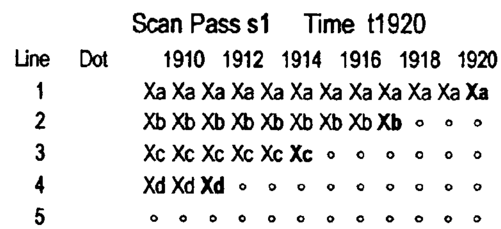
Figure 73F:
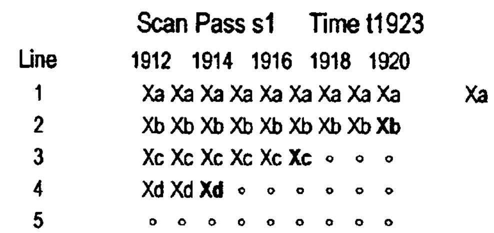
Figure 73G:
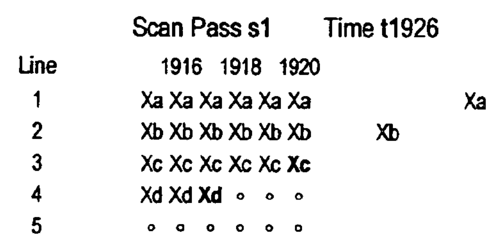
Figure 73H:
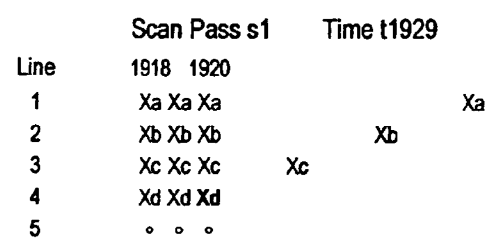
Figure 75:
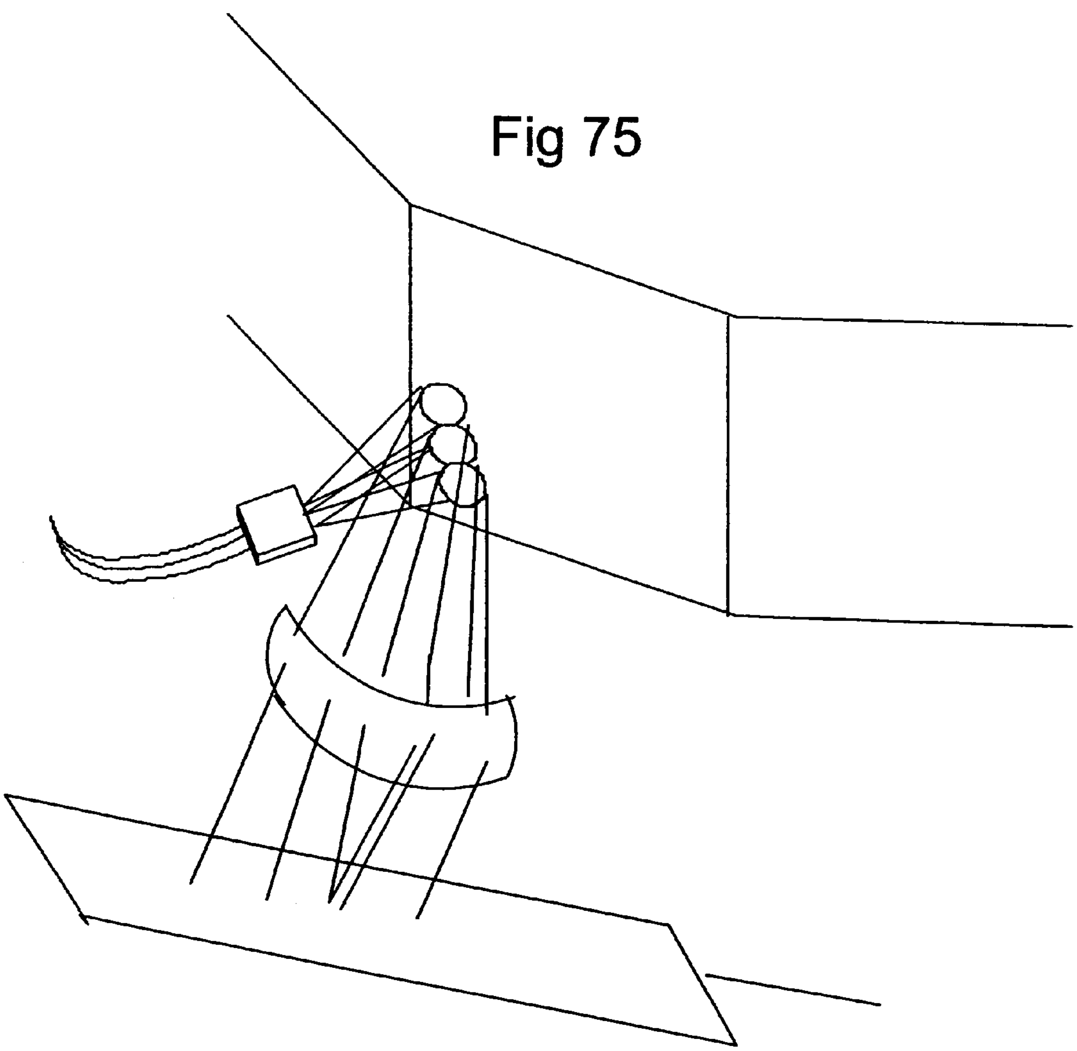
FIG. 75 is a diagram of an optical configuration where the beams from the emitting ends strikes the polygon face before striking a lens.
Figure 76:
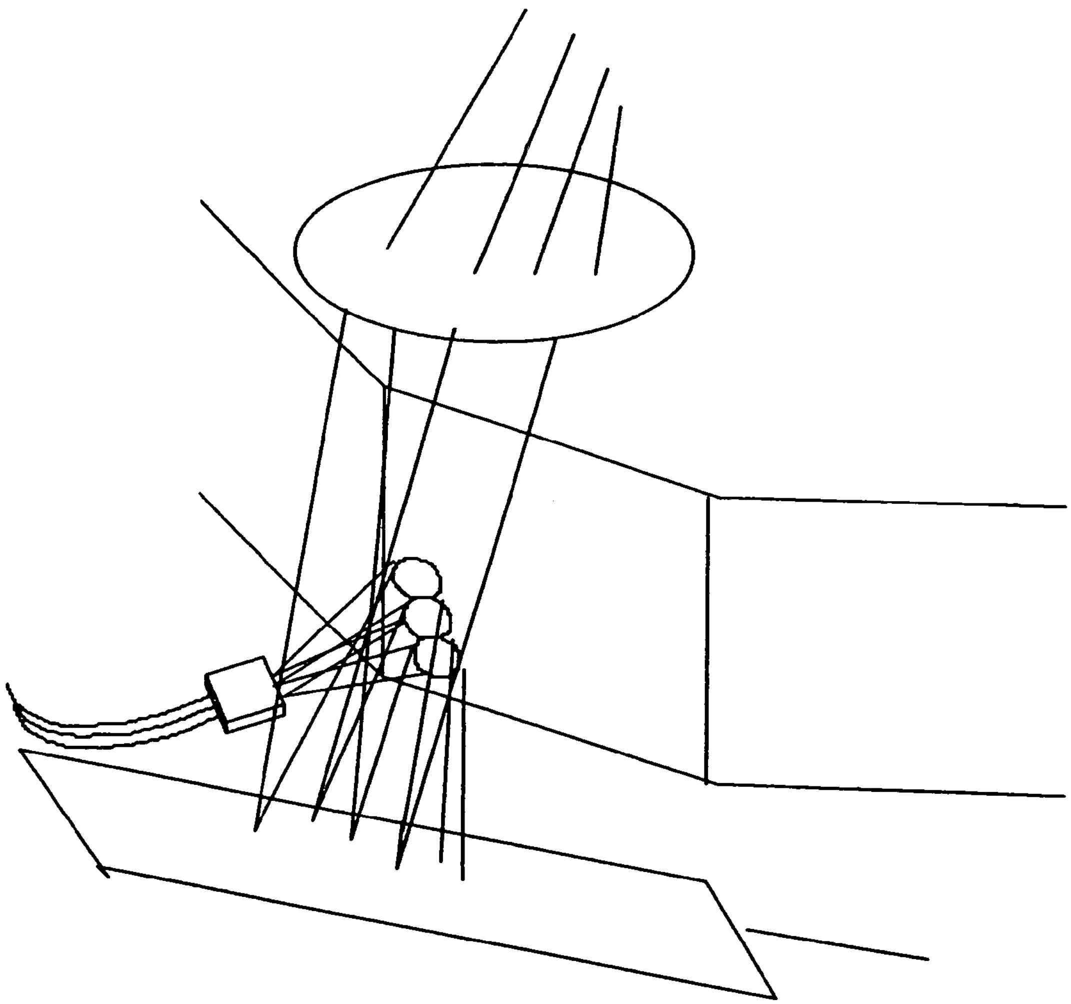
FIG. 76 is a diagram of an optical configuration where the beams from the emitting ends of the fibers strike both the polygon facet and galvanometer mirror before striking the first lens or focusing optic.
Figure 77:
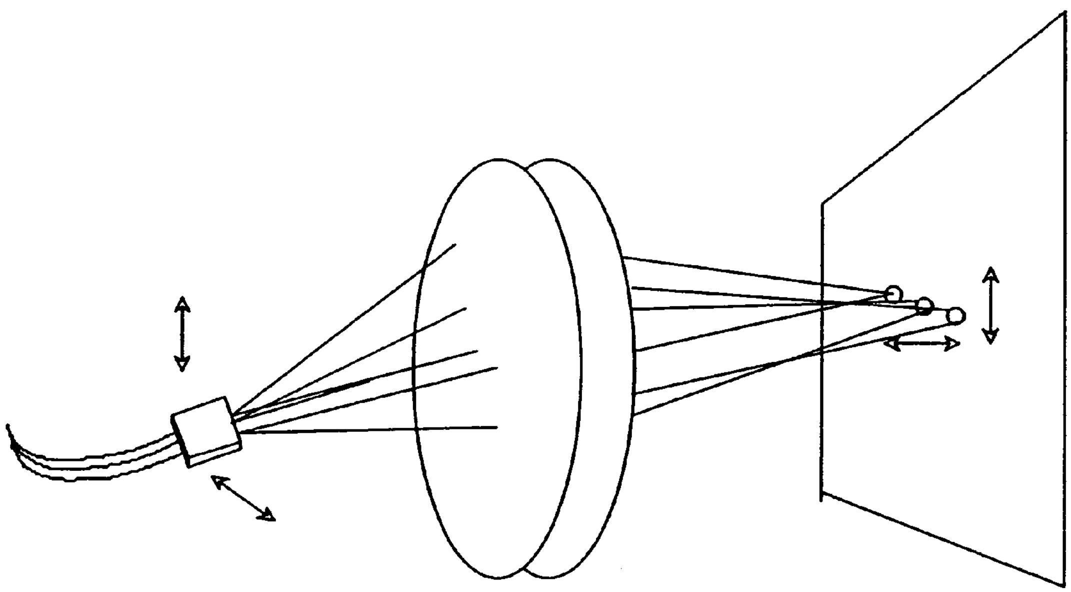
FIG. 77 is a diagram of a scanning system where the output head itself is cycled such that the emitted beams strike a lens at different orientations to scan an image on a viewing surface.

The use of fiber-based beam combining can also be applied to the other emitting end configurations described herein and that may occur to those skilled in the art with the benefit of this disclosure of our invention. For instance, in Example 1, illustrating the line reordering and time combining for a 4 row by 3 emitting ends per row output head configuration, described in Tables EX-1A and Tables EX-1B, 1C and schematically shown in FIGS. 28A-28H, we assumed an effective row spacing of about 3 lines. If an output head configuration of 4 rows by 1 emitting end per row is employed, with the fibers arranged in a log array, the line reordering is substantially the same as shown in EX-1A. However, the time combination of colors shown in Tables EX-1B, 1C is now unnecessary. With the log arrangement shown in FIGS. 71 and 71S there will be overlap at the ends of the horizontal line writing scan passes, as shown in FIGS. 74A-74D. If a brick arrangement is employed, the line reordering remains the same, although all other things such as fiber diameter being equal, at a greater effective row spacing than for the log arrangement. Further with the brick arrangement, the overlap at the ends of each scan pass is eliminated, but with consequent increased overlap at the top and bottom.

The reduced size of the array possible with fiber-based beam combining may also be used to advantage for more than four rows of a single emitting end configuration to achieve even greater resolution. This and other advantages and applications of our invention disclosed herein may occur to others after a full consideration of the possibilities inherent in our conception of the use of fiber emitting ends in combination with multiple line scanning, as illustrated most recently herein using fiber-based beam combining techniques.

We claim:

1. A method for projecting an image onto a viewing surface, comprising the steps of:

emitting at least three light beams from an adjustable head, directing the light beams to the viewing surface, forming a pattern of three or more spots on the viewing surface, at least three spots of such pattern being substantially aligned, sweeping the aligned spots substantially simultaneously along three or more substantially parallel sweep paths with a scanner, repeating the sweeping step a desired number of times, and adjusting the physical orientation of the head with respect to the scanner to orient the aligned spots at a desired slant angle substantially non-perpendicular to the sweep paths, thereby establishing a desired spacing, corresponding to the slant angle, between the sweep paths substantially simultaneously swept by the substantially aligned spots.

2. The method as in claim 1, further comprising the step of:

readjusting the physical orientation of the head with respect to the scanner to reorient the aligned spots at a different slant angle substantially non-perpendicular to the sweep paths, thereby establishing a different desired spacing, corresponding to the different slant angle, between the sweep paths substantially simultaneously swept by the substantially aligned spots.

3. The method as in claim 1, wherein the adjusting step further includes the step of:

establishing desired spacing corresponding to the slant angle between the sweep paths substantially simultaneously illuminated by the substantially aligned spots.

4. A system for projecting an image onto a viewing surface, comprising:

a head adapted to emit three or more light beams, and a scanner adapted to direct the light beams to form a pattern of three or more spots on the viewing surface wherein at least three of the spots of such pattern are substantially aligned, and to sweep such substantially aligned spots along three or more different sweep paths on the viewing surface during each of a succession of scan passes, and an adjustor adapted to physically orient the head with respect to the scanner to orient such substantially aligned spots at a desired slant angle substantially non-perpendicular to the substantially simultaneously swept sweep paths corresponding to a desired spacing between such sweep paths.

5. The system as in claim 4, wherein the head is configured such that all of the spots of the pattern of spots are substantially aligned.

6. The system as in claim 4, wherein the substantially aligned spots are substantially evenly spaced.

7. The system as in claim 6, wherein the head is configured such that all of the spots of the pattern of spots are substantially aligned.

8. The system as in claim 4, wherein the substantially aligned spots are substantially unevenly spaced.

9. The system as in claim 8, wherein the head is configured such that all of the spots of the pattern of spots are substantially aligned.

10. The system as in claim 4, wherein the area of the viewing surface illuminated by at least one of the substantially aligned spots during a given scan pass overlaps at least a portion of the area of the viewing surface illuminated by at least one other of the substantially aligned spots during such given scan pass.

11. The system as in claim 4, wherein said adjustor is adapted to move the head with respect to the scanner to reorient the such substantially aligned spots at a desired different slant angle substantially non-perpendicular to the substantially simultaneously swept sweep paths corresponding to a different desired spacing between such sweep paths.

12. The system as in claim 11, wherein said adjustor is adapted to rotate said head with respect to said scanner to rotate the aligned spots to the desired different slant angle on the viewing surface.

13. The system as in claim 4, wherein said adjustor is adapted to move the head relative to the scanner to select at least two different slant angles of the aligned spots wherein each different slant angle corresponds to a different desired spacing between the substantially simultaneously swept sweep paths, and said adjustor and said scanner are configured such that each of at least two of the different desired spacings between such sweep paths corresponds to a different image display format.

14. The system as in claim 13, wherein said adjustor and said scanner are further adapted such that at least two of the different image display formats are interlaced and non-interlaced formats.

15. The system as in claim 4, wherein said adjustor is adapted to rotate said head with respect to the scanner to rotate the aligned spots to the desired slant angle on the viewing surface.

* * * * *